US012086562B2

United States Patent
Paley et al.

(10) Patent No.: US 12,086,562 B2
(45) Date of Patent: *Sep. 10, 2024

(54) APPLIED ARTIFICIAL INTELLIGENCE TECHNOLOGY FOR PERFORMING NATURAL LANGUAGE GENERATION (NLG) USING COMPOSABLE COMMUNICATION GOALS AND ONTOLOGIES TO GENERATE NARRATIVE STORIES

(71) Applicant: Salesforce, Inc., San Francisco, CA (US)

(72) Inventors: Andrew R. Paley, Chicago, IL (US); Nathan Drew Nichols, Chicago, IL (US); Matthew Lloyd Trahan, Chicago, IL (US); Maia Jane Lewis Meza, Chicago, IL (US); Lawrence A. Birnbaum, Evanston, IL (US); Kristian J. Hammond, Chicago, IL (US)

(73) Assignee: Salesforce, Inc., San Francisco, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 16/987,509

(22) Filed: Aug. 7, 2020

(65) Prior Publication Data

US 2020/0401770 A1    Dec. 24, 2020

Related U.S. Application Data

(63) Continuation of application No. 15/897,331, filed on Feb. 15, 2018, now Pat. No. 10,762,304.

(Continued)

(51) Int. Cl.
G06F 40/56    (2020.01)
G06F 16/36    (2019.01)
(Continued)

(52) U.S. Cl.
CPC ............ *G06F 40/56* (2020.01); *G06F 16/367* (2019.01); *G06F 40/166* (2020.01);
(Continued)

(58) Field of Classification Search
CPC .......... G06F 40/20; G06F 40/30; G06F 40/56; G06F 16/367; G06F 40/40; G06F 16/3344

See application file for complete search history.

(56) References Cited

U.S. PATENT DOCUMENTS 4,992,939 A    2/1991 Tyler
5,619,631 A    4/1997 Schott
(Continued)

FOREIGN PATENT DOCUMENTS

WO        9630844 A1    10/1996
WO    2006122329 A2    11/2006
(Continued)

OTHER PUBLICATIONS

Thomas, K., and Sripada, S. (2008). What's in a message? Interpreting Geo-referenced Data for the Visually-impaired. Proceedings of the Int. conference on NLG.

(Continued)

*Primary Examiner* — Mark Villena
(74) *Attorney, Agent, or Firm* — Polygon IP, LLP

(57) ABSTRACT

Artificial intelligence (AI) technology can be used process natural language statements to facilitate the automated generation of narratives about data sets that achieve a desired communication goal without any need for a user to directly author computer code. This AI technology permits NLG systems to determine the appropriate content for inclusion in the narrative in a manner that will satisfy the desired communication goal.

20 Claims, 171 Drawing Sheets

Related U.S. Application Data

(60) Provisional application No. 62/460,349, filed on Feb. 17, 2017.

(51) Int. Cl.

| | |
|---|---|
| *G06F 40/166* | (2020.01) |
| *G06F 40/169* | (2020.01) |
| *G06F 40/174* | (2020.01) |
| *G06F 40/20* | (2020.01) |
| *G06F 40/295* | (2020.01) |
| *G06F 40/30* | (2020.01) |
| *G06N 5/02* | (2023.01) |
| *G06N 5/025* | (2023.01) |
| *G06N 5/043* | (2023.01) |
| *G06Q 10/10* | (2023.01) |
| *G06F 40/106* | (2020.01) |

(52) U.S. Cl.
CPC .......... *G06F 40/169* (2020.01); *G06F 40/174* (2020.01); *G06F 40/20* (2020.01); *G06F 40/295* (2020.01); *G06F 40/30* (2020.01); *G06N 5/02* (2013.01); *G06N 5/025* (2013.01); *G06N 5/043* (2013.01); *G06Q 10/10* (2013.01); *G06F 40/106* (2020.01)

(56) References Cited

U.S. PATENT DOCUMENTS

| | | |
|---|---|---|
| 5,734,916 A | 3/1998 | Greenfield et al. |
| 5,794,050 A | 8/1998 | Dahlgren |
| 5,802,495 A | 9/1998 | Goltra |
| 6,006,175 A | 12/1999 | Holzrichter |
| 6,144,938 A | 11/2000 | Surace et al. |
| 6,278,967 B1 | 8/2001 | Akers et al. |
| 6,289,363 B1 | 9/2001 | Consolatti et al. |
| 6,651,218 B1 | 11/2003 | Adler |
| 6,665,666 B1 | 12/2003 | Brown |
| 6,757,362 B1 | 6/2004 | Cooper et al. |
| 6,771,290 B1 | 8/2004 | Hoyle |
| 6,917,936 B2 | 7/2005 | Cancedda |
| 6,968,316 B1 | 11/2005 | Hamilton |
| 6,976,031 B1 | 12/2005 | Toupal et al. |
| 7,027,974 B1 | 4/2006 | Busch et al. |
| 7,246,315 B1 | 7/2007 | Andrieu et al. |
| 7,324,936 B2 | 1/2008 | Saldanha et al. |
| 7,333,967 B1 | 2/2008 | Bringsjord et al. |
| 7,496,621 B2 | 2/2009 | Pan et al. |
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,818,329 B2 | 10/2010 | Campbell |
| 7,825,929 B2 | 11/2010 | Kincaid |
| 7,836,010 B2 | 11/2010 | Hammond et al. |
| 7,840,448 B2 | 11/2010 | Musgrove et al. |
| 7,856,390 B2 | 12/2010 | Schiller |
| 7,865,496 B1 | 1/2011 | Schiller |
| 7,930,169 B2 | 4/2011 | Billerey-Mosier |
| 8,046,226 B2 | 10/2011 | Soble et al. |
| 8,190,423 B2 | 5/2012 | Rehberg et al. |
| 8,311,863 B1 | 11/2012 | Kemp |
| 8,355,903 B1 | 1/2013 | Birnbaum et al. |
| 8,374,848 B1 | 2/2013 | Birnbaum et al. |
| 8,442,940 B1 | 5/2013 | Faletti |
| 8,447,604 B1 | 5/2013 | Chang |
| 8,463,695 B2 | 6/2013 | Schiller |
| 8,494,944 B2 | 7/2013 | Schiller |
| 8,515,737 B2 | 8/2013 | Allen |
| 8,612,208 B2 | 12/2013 | Cooper |
| 8,630,844 B1 | 1/2014 | Nichols et al. |
| 8,630,912 B2 | 1/2014 | Seki et al. |
| 8,630,919 B2 | 1/2014 | Baran et al. |
| 8,645,124 B2 | 2/2014 | Karov Zangvil |
| 8,645,825 B1 | 2/2014 | Cornea et al. |
| 8,676,691 B2 | 3/2014 | Schiller |
| 8,688,434 B1 | 4/2014 | Birnbaum et al. |
| 8,751,563 B1 | 6/2014 | Warden et al. |
| 8,762,133 B2 | 6/2014 | Reiter |
| 8,762,134 B2 | 6/2014 | Reiter |
| 8,762,285 B2 | 6/2014 | Davis |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 8,892,419 B2 | 11/2014 | Lundberg et al. |
| 8,903,711 B2 | 12/2014 | Lundberg et al. |
| 8,977,953 B1 | 3/2015 | Pierre |
| 9,111,534 B1 * | 8/2015 | Sylvester ................ G10L 13/00 |
| 9,135,244 B2 | 9/2015 | Reiter |
| 9,164,982 B1 | 10/2015 | Kaeser |
| 9,208,147 B1 | 12/2015 | Nichols et al. |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,348,815 B1 | 5/2016 | Estes |
| 9,355,093 B2 | 5/2016 | Reiter |
| 9,396,168 B2 | 7/2016 | Birnbaum et al. |
| 9,396,181 B1 | 7/2016 | Sripada et al. |
| 9,396,758 B2 | 7/2016 | Oz et al. |
| 9,405,448 B2 | 8/2016 | Reiter |
| 9,424,254 B2 | 8/2016 | Howald et al. |
| 9,430,557 B2 | 8/2016 | Bhat et al. |
| 9,460,075 B2 | 10/2016 | Mungi et al. |
| 9,473,637 B1 | 10/2016 | Venkatapathy et al. |
| 9,483,520 B1 | 11/2016 | Reiner et al. |
| 9,529,795 B2 | 12/2016 | Kondadadi et al. |
| 9,535,902 B1 | 1/2017 | Michalak |
| 9,536,049 B2 | 1/2017 | Brown |
| 9,569,729 B1 | 2/2017 | Oehrle et al. |
| 9,576,009 B1 | 2/2017 | Hammond et al. |
| 9,665,259 B2 | 5/2017 | Lee et al. |
| 9,697,178 B1 | 7/2017 | Nichols et al. |
| 9,697,192 B1 | 7/2017 | Estes |
| 9,697,197 B1 | 7/2017 | Birnbaum et al. |
| 9,697,492 B1 | 7/2017 | Birnbaum et al. |
| 9,720,884 B2 | 8/2017 | Birnbaum et al. |
| 9,720,899 B1 | 8/2017 | Birnbaum et al. |
| 9,741,151 B2 | 8/2017 | Breedvelt-Schouten |
| 9,767,145 B2 | 9/2017 | Prophete |
| 9,870,362 B2 | 1/2018 | Lee |
| 9,870,629 B2 | 1/2018 | Cardno |
| 9,875,494 B2 | 1/2018 | Kalns et al. |
| 9,910,914 B1 | 3/2018 | Cowley et al. |
| 9,946,711 B2 | 4/2018 | Reiter et al. |
| 9,971,967 B2 | 5/2018 | Bufe, III et al. |
| 9,977,773 B1 | 5/2018 | Birnbaum et al. |
| 9,990,337 B2 | 6/2018 | Birnbaum et al. |
| 10,019,512 B2 | 7/2018 | Boyle et al. |
| 10,031,901 B2 * | 7/2018 | Chakra ................... G06F 40/56 |
| 10,037,377 B2 | 7/2018 | Boyle et al. |
| 10,049,152 B2 | 8/2018 | Ajmera et al. |
| 10,073,840 B2 | 9/2018 | Hakkani-Tur |
| 10,073,861 B2 | 9/2018 | Shamir |
| 10,095,692 B2 | 10/2018 | Song |
| 10,101,889 B2 | 10/2018 | Prophete |
| 10,115,108 B1 | 10/2018 | Gendelev et al. |
| 10,162,900 B1 | 12/2018 | Chatterjee et al. |
| 10,185,477 B1 | 1/2019 | Paley et al. |
| 10,332,297 B1 | 6/2019 | Vadodaria |
| 10,387,970 B1 | 8/2019 | Wang et al. |
| 10,416,841 B2 | 9/2019 | Riche et al. |
| 10,482,381 B2 | 11/2019 | Nichols et al. |
| 10,489,488 B2 | 11/2019 | Birnbaum et al. |
| 10,565,308 B2 | 2/2020 | Reiter |
| 10,572,606 B1 | 2/2020 | Paley et al. |

(56) References Cited

U.S. PATENT DOCUMENTS

| | | |
|---|---|---|
| 10,579,835 B1 | 3/2020 | Phillips |
| 10,585,983 B1 | 3/2020 | Paley et al. |
| 10,599,767 B1 | 3/2020 | Mattera |
| 10,606,953 B2 | 3/2020 | Mulwad et al. |
| 10,621,183 B1 | 4/2020 | Chatterjee et al. |
| 10,657,201 B1 | 5/2020 | Nichols et al. |
| 10,679,011 B2 | 6/2020 | Galitsky |
| 10,698,585 B2 | 6/2020 | Kraljic |
| 10,699,079 B1 | 6/2020 | Paley et al. |
| 10,706,236 B1 | 7/2020 | Platt et al. |
| 10,747,823 B1 | 8/2020 | Birnbaum et al. |
| 10,755,042 B2 | 8/2020 | Birnbaum et al. |
| 10,755,046 B1 | 8/2020 | Lewis Meza et al. |
| 10,762,304 B1 | 9/2020 | Paley et al. |
| 10,853,583 B1 | 12/2020 | Platt et al. |
| 10,943,069 B1 | 3/2021 | Paley et al. |
| 10,956,656 B2 | 3/2021 | Birnbaum et al. |
| 10,963,649 B1 | 3/2021 | Sippel et al. |
| 10,990,767 B1 | 4/2021 | Smathers et al. |
| 11,003,866 B1 | 5/2021 | Sippel et al. |
| 11,023,689 B1 | 6/2021 | Sippel et al. |
| 11,030,408 B1 | 6/2021 | Lewis Meza et al. |
| 11,037,342 B1 | 6/2021 | Agnew |
| 11,042,708 B1 | 6/2021 | Pham et al. |
| 11,042,709 B1 | 6/2021 | Pham et al. |
| 11,042,713 B1 | 6/2021 | Platt et al. |
| 11,055,497 B2 | 7/2021 | Noh |
| 11,068,661 B1 | 7/2021 | Nichols et al. |
| 11,126,798 B1 | 9/2021 | Lewis Meza et al. |
| 11,144,838 B1 | 10/2021 | Platt et al. |
| 11,170,038 B1 | 11/2021 | Platt et al. |
| 11,182,556 B1 | 11/2021 | Lewis Meza et al. |
| 11,188,588 B1 | 11/2021 | Platt et al. |
| 11,222,184 B1 | 1/2022 | Platt et al. |
| 11,232,268 B1 | 1/2022 | Platt et al. |
| 11,232,270 B1 | 1/2022 | Platt et al. |
| 11,238,090 B1 | 2/2022 | Platt et al. |
| 11,270,211 B2 | 3/2022 | Ramos et al. |
| 11,288,328 B2 | 3/2022 | Birnbaum et al. |
| 11,334,726 B1 | 5/2022 | Platt et al. |
| 11,341,330 B1 | 5/2022 | Smathers et al. |
| 11,341,338 B1 | 5/2022 | Platt et al. |
| 11,475,076 B2 | 10/2022 | Birnbaum et al. |
| 11,501,220 B2 | 11/2022 | Birnbaum et al. |
| 11,521,079 B2 | 12/2022 | Nichols et al. |
| 11,561,684 B1 | 1/2023 | Paley et al. |
| 11,561,986 B1 | 1/2023 | Sippel et al. |
| 11,562,146 B2 | 1/2023 | Paley et al. |
| 11,568,148 B1 | 1/2023 | Nichols et al. |
| 11,741,301 B2 | 8/2023 | Birnbaum et al. |
| 2002/0046018 A1 | 4/2002 | Marcu et al. |
| 2002/0083025 A1 | 6/2002 | Robarts et al. |
| 2002/0107721 A1 | 8/2002 | Darwent et al. |
| 2003/0004706 A1 | 1/2003 | Yale et al. |
| 2003/0061029 A1 | 3/2003 | Shaket |
| 2003/0110186 A1 | 6/2003 | Markowski et al. |
| 2003/0182102 A1 | 9/2003 | Corston-Oliver |
| 2003/0216905 A1 | 11/2003 | Chelba et al. |
| 2004/0015342 A1 | 1/2004 | Garst |
| 2004/0034520 A1 | 2/2004 | Langkilde-Geary et al. |
| 2004/0083092 A1 | 4/2004 | Valles |
| 2004/0103116 A1 | 5/2004 | Palanisamy |
| 2004/0138899 A1 | 7/2004 | Birnbaum et al. |
| 2004/0174397 A1 | 9/2004 | Cereghini et al. |
| 2004/0225651 A1 | 11/2004 | Musgrove et al. |
| 2004/0230989 A1 | 11/2004 | Macey et al. |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0033582 A1 | 2/2005 | Gadd et al. |
| 2005/0049852 A1 | 3/2005 | Chao |
| 2005/0125213 A1 | 6/2005 | Chen et al. |
| 2005/0137854 A1 | 6/2005 | Cancedda et al. |
| 2005/0273362 A1 | 12/2005 | Harris et al. |
| 2006/0031182 A1 | 2/2006 | Ryan et al. |
| 2006/0101335 A1 | 5/2006 | Pisciottano |
| 2006/0181531 A1 | 8/2006 | Goldschmidt |
| 2006/0212446 A1 | 9/2006 | Hammond et al. |
| 2006/0218485 A1 | 9/2006 | Blumenthal |
| 2006/0224570 A1 | 10/2006 | Quiroga |
| 2006/0253431 A1 | 11/2006 | Bobick et al. |
| 2006/0253783 A1 | 11/2006 | Vronay et al. |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0136657 A1 | 6/2007 | Blumenthal et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2008/0005677 A1 | 1/2008 | Thompson |
| 2008/0140696 A1 | 6/2008 | Mathuria |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0055164 A1 | 2/2009 | Hu et al. |
| 2009/0083288 A1 | 3/2009 | LeDain et al. |
| 2009/0089100 A1 | 4/2009 | Nenov et al. |
| 2009/0119584 A1 | 5/2009 | Herbst |
| 2009/0144608 A1 | 6/2009 | Oisel et al. |
| 2009/0144609 A1 | 6/2009 | Liang |
| 2009/0157664 A1 | 6/2009 | Wen |
| 2009/0175545 A1 | 7/2009 | Cancedda et al. |
| 2009/0187556 A1* | 7/2009 | Ross .................. G06F 16/2428 707/999.005 |
| 2009/0248399 A1 | 10/2009 | Au |
| 2010/0146393 A1 | 6/2010 | Land et al. |
| 2010/0161541 A1 | 6/2010 | Covannon et al. |
| 2010/0185984 A1 | 7/2010 | Wright et al. |
| 2010/0228693 A1* | 9/2010 | Dawson .................. G06F 40/30 707/769 |
| 2010/0241620 A1 | 9/2010 | Manister |
| 2010/0325107 A1 | 12/2010 | Kenton |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0288852 A1 | 11/2011 | Dymetman et al. |
| 2011/0295903 A1 | 12/2011 | Chen |
| 2011/0307435 A1 | 12/2011 | Overell et al. |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0166180 A1 | 6/2012 | Au |
| 2012/0265531 A1 | 10/2012 | Bennett |
| 2012/0310699 A1 | 12/2012 | McKenna |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0144605 A1 | 6/2013 | Brager et al. |

(56) References Cited

U.S. PATENT DOCUMENTS

| | | |
|---|---|---|
| 2013/0144606 A1 | 6/2013 | Birnbaum et al. |
| 2013/0145242 A1 | 6/2013 | Birnbaum et al. |
| 2013/0173285 A1 | 7/2013 | Hyde |
| 2013/0174026 A1 | 7/2013 | Locke |
| 2013/0185049 A1 | 7/2013 | Zhao |
| 2013/0185051 A1 | 7/2013 | Buryak |
| 2013/0187926 A1 | 7/2013 | Silverstein et al. |
| 2013/0211855 A1 | 8/2013 | Eberle et al. |
| 2013/0238316 A1 | 9/2013 | Shastri |
| 2013/0238330 A1 | 9/2013 | Casella Dos Santos |
| 2013/0246300 A1 | 9/2013 | Fischer et al. |
| 2013/0246934 A1 | 9/2013 | Wade et al. |
| 2013/0253910 A1 | 9/2013 | Turner et al. |
| 2013/0262086 A1 | 10/2013 | Kim et al. |
| 2013/0262092 A1 | 10/2013 | Wasick |
| 2013/0275121 A1 | 10/2013 | Tunstall-Pedoe |
| 2013/0304507 A1 | 11/2013 | Dail et al. |
| 2013/0316834 A1 | 11/2013 | Vogel et al. |
| 2014/0006012 A1 | 1/2014 | Zhou |
| 2014/0040312 A1 | 2/2014 | Gorman et al. |
| 2014/0062712 A1 | 3/2014 | Reiter |
| 2014/0075004 A1 | 3/2014 | Van Dusen |
| 2014/0129213 A1 | 5/2014 | Kimelfeld et al. |
| 2014/0129942 A1 | 5/2014 | Rathod |
| 2014/0134590 A1 | 5/2014 | Hiscock, Jr. |
| 2014/0149107 A1 | 5/2014 | Schilder |
| 2014/0163962 A1 | 6/2014 | Castelli et al. |
| 2014/0173425 A1 | 6/2014 | Hailpern et al. |
| 2014/0200878 A1 | 7/2014 | Mylonakis et al. |
| 2014/0201202 A1 | 7/2014 | Jones et al. |
| 2014/0208215 A1 | 7/2014 | Deshpande |
| 2014/0282184 A1 | 9/2014 | Dewan et al. |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0019540 A1* | 1/2015 | Ganjam ............ G06F 16/24578 707/723 |
| 2015/0032730 A1 | 1/2015 | Cialdea, Jr. |
| 2015/0039537 A1 | 2/2015 | Peev et al. |
| 2015/0049951 A1 | 2/2015 | Chaturvedi et al. |
| 2015/0078232 A1 | 3/2015 | Djinki et al. |
| 2015/0088808 A1 | 3/2015 | Tyagi et al. |
| 2015/0134694 A1 | 5/2015 | Burke et al. |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0249584 A1 | 9/2015 | Cherifi |
| 2015/0261745 A1 | 9/2015 | Song et al. |
| 2015/0268930 A1 | 9/2015 | Lee et al. |
| 2015/0286747 A1 | 10/2015 | Anastasakos |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0331846 A1 | 11/2015 | Guggilla et al. |
| 2015/0331850 A1 | 11/2015 | Ramish |
| 2015/0332665 A1 | 11/2015 | Mishra et al. |
| 2015/0347400 A1 | 12/2015 | Sripada |
| 2015/0347901 A1 | 12/2015 | Cama et al. |
| 2015/0356463 A1 | 12/2015 | Overell |
| 2015/0356967 A1 | 12/2015 | Byron et al. |
| 2015/0363364 A1 | 12/2015 | Sripada |
| 2015/0370778 A1 | 12/2015 | Tremblay et al. |
| 2016/0019200 A1 | 1/2016 | Allen |
| 2016/0026253 A1 | 1/2016 | Bradski et al. |
| 2016/0027125 A1 | 1/2016 | Bryce |
| 2016/0054889 A1 | 2/2016 | Hadley |
| 2016/0062604 A1 | 3/2016 | Kraljic |
| 2016/0103559 A1 | 4/2016 | Maheshwari |
| 2016/0132489 A1 | 5/2016 | Reiter |
| 2016/0140090 A1 | 5/2016 | Dale et al. |
| 2016/0162582 A1 | 6/2016 | Chatterjee et al. |
| 2016/0196491 A1 | 7/2016 | Chandrasekaran et al. |
| 2016/0217133 A1 | 7/2016 | Reiter et al. |
| 2016/0232152 A1 | 8/2016 | Mahamood |
| 2016/0232221 A1 | 8/2016 | McCloskey et al. |
| 2016/0314121 A1 | 10/2016 | Arroyo et al. |
| 2016/0314123 A1 | 10/2016 | Ramachandran |
| 2017/0004415 A1 | 1/2017 | Moretti et al. |
| 2017/0006135 A1 | 1/2017 | Siebel |
| 2017/0017897 A1 | 1/2017 | Bugay et al. |
| 2017/0024465 A1 | 1/2017 | Yeh et al. |
| 2017/0026705 A1 | 1/2017 | Yeh et al. |
| 2017/0039275 A1* | 2/2017 | Akolkar ............... G06F 16/345 |
| 2017/0046016 A1 | 2/2017 | Riche et al. |
| 2017/0060857 A1 | 3/2017 | Imbruce et al. |
| 2017/0061093 A1 | 3/2017 | Amarasingham et al. |
| 2017/0068551 A1 | 3/2017 | Vadodaria |
| 2017/0083484 A1 | 3/2017 | Patil |
| 2017/0091291 A1 | 3/2017 | Bostick et al. |
| 2017/0116327 A1 | 4/2017 | Gorelick et al. |
| 2017/0124062 A1 | 5/2017 | Bhaowal |
| 2017/0140405 A1 | 5/2017 | Gottemukkala et al. |
| 2017/0177559 A1 | 6/2017 | Dang et al. |
| 2017/0177660 A1* | 6/2017 | Chang ................. G06F 16/2425 |
| 2017/0177715 A1 | 6/2017 | Chang et al. |
| 2017/0185674 A1 | 6/2017 | Tonkin et al. |
| 2017/0199928 A1 | 7/2017 | Zhao et al. |
| 2017/0212671 A1 | 7/2017 | Sathish |
| 2017/0213157 A1 | 7/2017 | Bugay et al. |
| 2017/0228372 A1 | 8/2017 | Moreno et al. |
| 2017/0242886 A1 | 8/2017 | Jolley et al. |
| 2017/0270105 A1 | 9/2017 | Ninan et al. |
| 2017/0286377 A1* | 10/2017 | Chakra ................. G06F 40/279 |
| 2017/0293864 A1 | 10/2017 | Oh et al. |
| 2017/0329842 A1 | 11/2017 | Ng Tari et al. |
| 2017/0358295 A1 | 12/2017 | Roux et al. |
| 2017/0371856 A1 | 12/2017 | Can et al. |
| 2018/0025726 A1 | 1/2018 | Gatti de Bayser et al. |
| 2018/0082184 A1 | 3/2018 | Guo et al. |
| 2018/0089177 A1 | 3/2018 | Cho |
| 2018/0114158 A1 | 4/2018 | Foubert et al. |
| 2018/0189284 A1 | 7/2018 | Hosabettu |
| 2018/0232443 A1 | 8/2018 | Delgo et al. |
| 2018/0234442 A1 | 8/2018 | Luo et al. |
| 2018/0260380 A1 | 9/2018 | Birnbaum et al. |
| 2018/0261203 A1 | 9/2018 | Zoller et al. |
| 2018/0285324 A1 | 10/2018 | Birnbaum et al. |
| 2018/0293483 A1 | 10/2018 | Abramson et al. |
| 2018/0300311 A1 | 10/2018 | Krishnamurthy |
| 2018/0314689 A1 | 11/2018 | Wang et al. |
| 2019/0042559 A1 | 2/2019 | Allen |
| 2019/0095499 A1 | 3/2019 | Payne et al. |
| 2019/0102614 A1 | 4/2019 | Winder |
| 2019/0138615 A1 | 5/2019 | Huh |
| 2019/0147849 A1 | 5/2019 | Talwar |
| 2019/0179893 A1 | 6/2019 | Mulwad et al. |
| 2019/0197097 A1 | 6/2019 | Nagarajan et al. |
| 2019/0236140 A1 | 8/2019 | Canim et al. |
| 2019/0332666 A1 | 10/2019 | Dadachev et al. |
| 2020/0074310 A1 | 3/2020 | Li |
| 2020/0089735 A1 | 3/2020 | Birnbaum |
| 2020/0202846 A1 | 6/2020 | Bapna |
| 2021/0192132 A1 | 6/2021 | Birnbaum et al. |
| 2021/0192144 A1 | 6/2021 | Paley et al. |
| 2022/0114206 A1 | 4/2022 | Platt et al. |
| 2022/0284195 A1 | 9/2022 | Platt et al. |
| 2023/0027421 A1 | 1/2023 | Birnbaum et al. |
| 2023/0053724 A1 | 2/2023 | Birnbaum et al. |
| 2023/0109572 A1 | 4/2023 | Nichols |
| 2023/0206006 A1 | 6/2023 | Nichols et al. |

FOREIGN PATENT DOCUMENTS

| | | | |
|---|---|---|---|
| WO | 2014035400 | A1 | 3/2014 |
| WO | 2014035402 | A1 | 3/2014 |

(56) References Cited

FOREIGN PATENT DOCUMENTS

| WO | 2014035403 A1 | 3/2014 |
|---|---|---|
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Thomas, K., Sumegi, L., Ferres, L., and Sripada, S. (2008). Enabling Access to Geo-referenced Information: Atlas.txt. Proceedings of the Cross-disciplinary Conference on Web Accessibility.

van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

1 Prosecution History for U.S. Appl. No. 15/897,331, now U.S. Pat. No. 10,762,304, filed Feb. 15, 2018.

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real- time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Character Writer Version 3.1, Typing Chimp Software LLC, 2012, screenshots from working program, pp. 1-19.

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural -Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to Improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool For Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

McKeown, K., Kukich, K., & Shaw, J. (1994). Practical issues in automatic documentation generation. 4th Conference on Applied Natural Language Processing, Stuttgart, Germany, pp. 7-14.

Meehan, James R., Tale-Spin. (1977). An Interactive Program that Writes Stories. In Proceedings of the Fifth International Joint Conference on Artificial Intelligence.

Memorandum Opinion and Order for *O2 Media, LLC* v. *Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Movie Magic Screenwriter, Write Brothers, 2009, user manual.

Notice of Allowance for U.S. Appl. No. 15/897,359 dated Apr. 9, 2020.

Notice of Allowance for U.S. Appl. No. 15/897,373 dated Mar. 25, 2020.

Notice of Allowance for U.S. Appl. No. 15/897,381 dated Mar. 25, 2020.

Office Action for U.S. Appl. No. 15/897,350 dated Mar. 25, 2019.

Office Action for U.S. Appl. No. 15/897,359 dated Sep. 5, 2019.

Office Action for U.S. Appl. No. 15/897,373 dated Sep. 13, 2019.

Office Action for U.S. Appl. No. 15/897,381 dated Oct. 3, 2019.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.

Portet, F., Reiter, E., Hunter, J., and Sripada, S. (2007). Automatic Generation of Textual Summaries from Neonatal Intensive Care

(56) References Cited

OTHER PUBLICATIONS

Data. In: Bellazzi, Riccardo, Ameen Abu-Hanna and Jim Hunter (Ed.), 11th Conference on Artificial Intelligence in Medicine (AIME 07), pp. 227-236.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "From Linear Story Generation to Branching Story Graphs", IEEE Computer Graphics and Applications, 2006, pp. 23-31.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Georeferenced Data to Text for NLG. Paper presented at Proceedings of the 2007 European Natural Language Generation Workshop (ENLG07).
Cyganiak et al., "RDF 1.1 Concepts and Abstract Syntax", W3C Recommendation, 2014, vol. 25, No. 2.
Englisheforums, "Direct Objects, Indirect Objects, Obliques, Dative Movement?", [online] https://www.englishforums.com, published 2007. (Year: 2007).
Mack et al., "A Framework for Metrics in Large Complex Systems", IEEE Aerospace Conference Proceedings, 2004, pp. 3217-3228, vol. 5, doi: 10.1109/AERO .2004.1368127.
Mahamood et al., "Generating Annotated Graphs Using the NLG Pipeline Architecture", Proceedings of the 8th International Natural Language Generation Conference (INLG), 2014.
Office Action for U.S. Appl. No. 18/145,193 dated Aug. 24, 2023.
Prosecution history for U.S. Appl. No. 14/521,264, now U.S. Pat. No. 9,720,899, filed Oct. 22, 2014.
Prosecution history for U.S. Appl. No. 14/570,834, now U.S. Pat. No. 9,977,773, filed Dec. 15, 2014.
Prosecution history for U.S. Appl. No. 15/977,141, now U.S. Pat. No. 10,755,042, filed May 11, 2018.
Prosecution history for U.S. Appl. No. 17/000,516, filed Aug. 24, 2020.
Prosecution History for U.S. Appl. No. 16/047,800, now U.S. Pat. No. 10,699,079, filed Jul. 27, 2018.
Prosecution History for U.S. Appl. No. 16/183,270, filed Nov. 7, 2018, now U.S. Pat. No. 11,568,148, granted Jan. 31, 2023.
Prosecution History for U.S. Appl. No. 17/191,362, filed Mar. 3, 2021, now U.S. Pat. No. 11,562,146, granted Jan. 24, 2023.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Saleh et al., "A Reusable Model for Data-Centric Web Services," 2009, pp. 288-297, Springer-Verlag Berlin.
Segel et al., "Narrative Visualization: Telling Stories with Data", Stanford University, Oct. 2010, 10 pgs.
Smari et al., "An Integrated Approach to Collaborative Decision Making Using Computer-Supported Conflict Management Methodology", IEEE International Conference on Information Reuse and Integration, 2005, pp. 182-191.
Smith, "The Multivariable Method in Singular Perturbation Analysis", SIAM Review, 1975, pp. 221-273, vol. 17, No. 2.
Weston et al., "A Framework for Constructing Semantically Composable Feature Models from Natural Language Requirements", SPLC '09: Proceedings of the 13th International Software Product Line Conference, Aug. 2009, p. 211-220.
Notice of Allowance for U.S. Appl. No. 16/047,800 dated Feb. 18, 2020.
Office Action for U.S. Appl. No. 15/897,331 dated Mar. 25, 2019.
Office Action for U.S. Appl. No. 16/183,270 dated Apr. 13, 2021.

\* cited by examiner

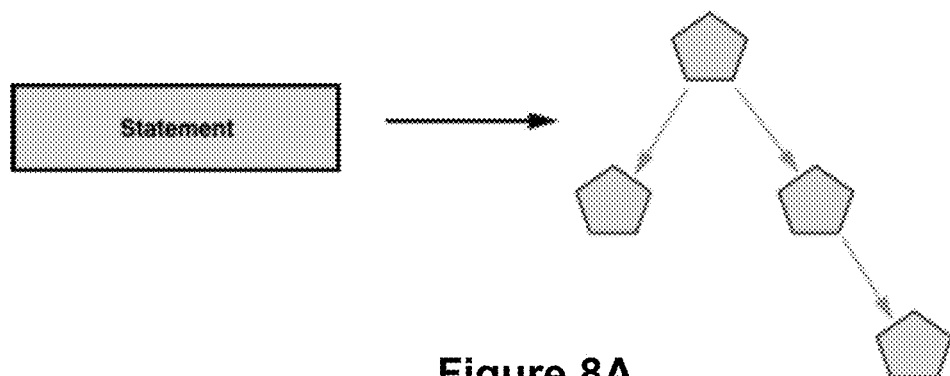
Figure 8A
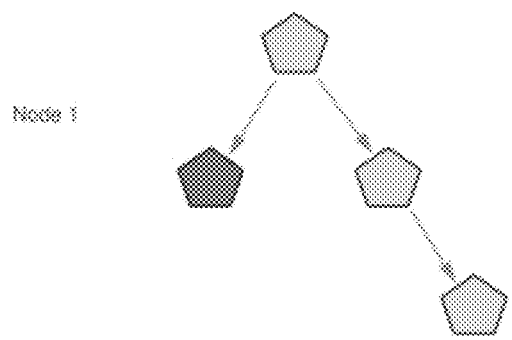
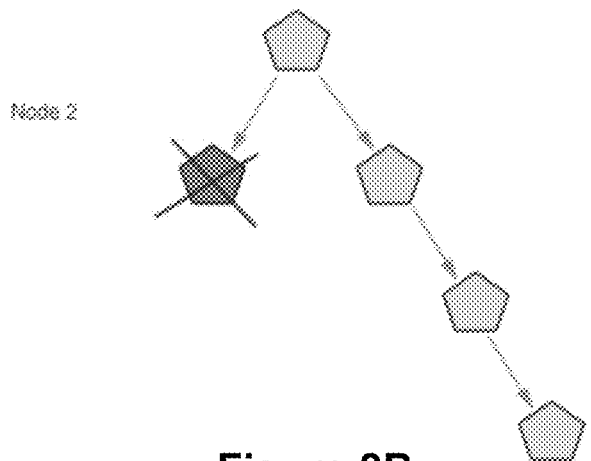
Figure 8B

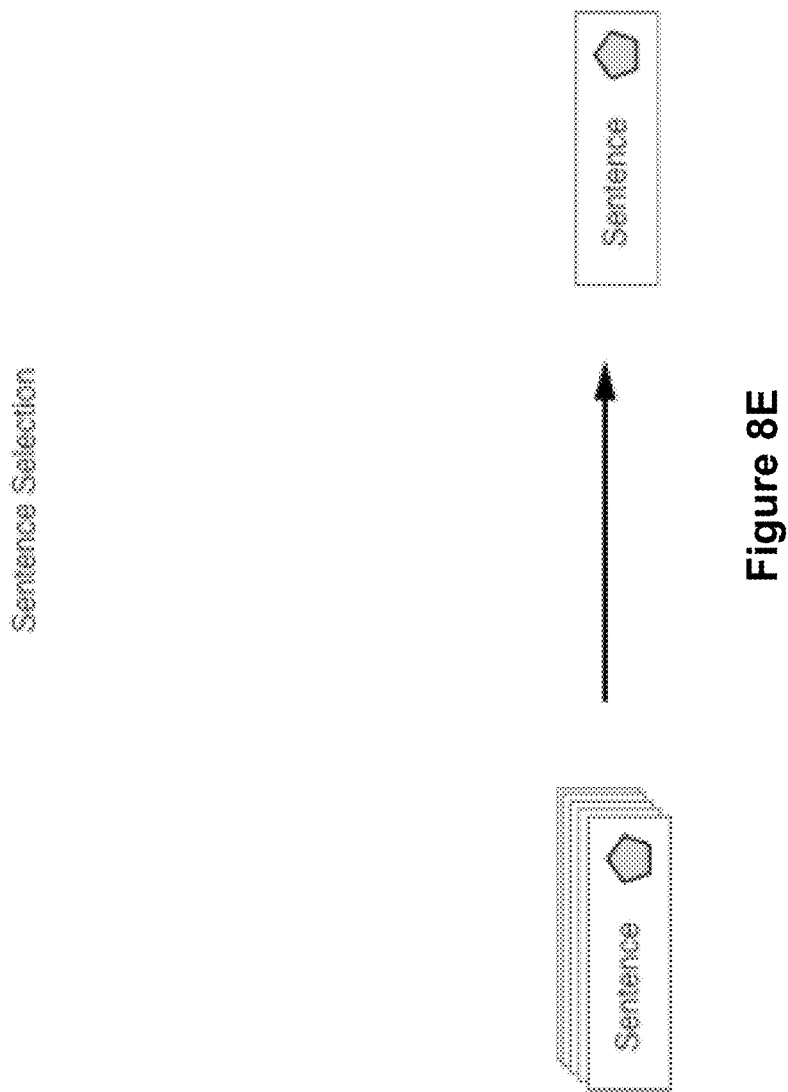

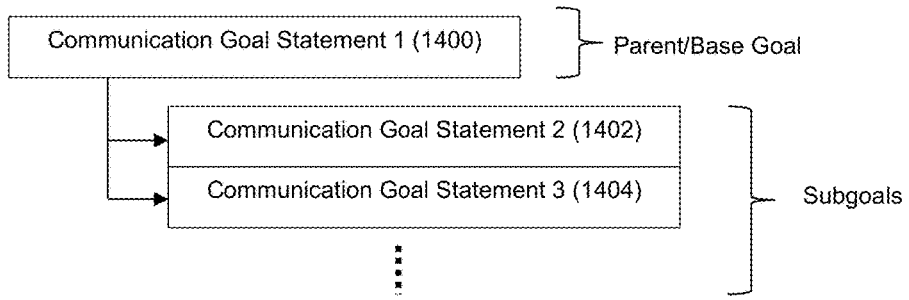
Figure 14A
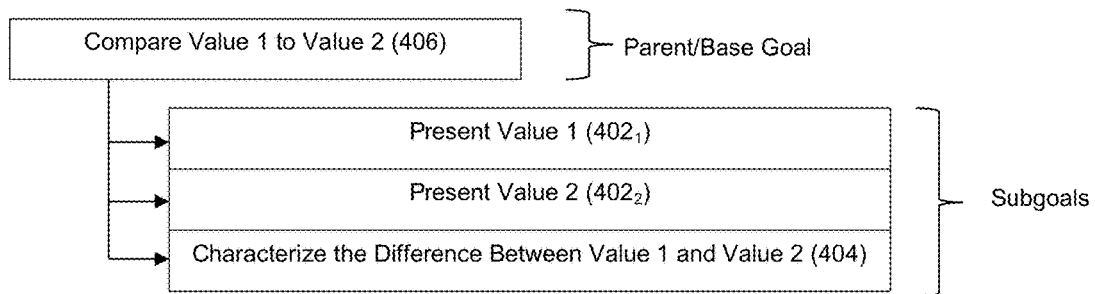
Figure 14B
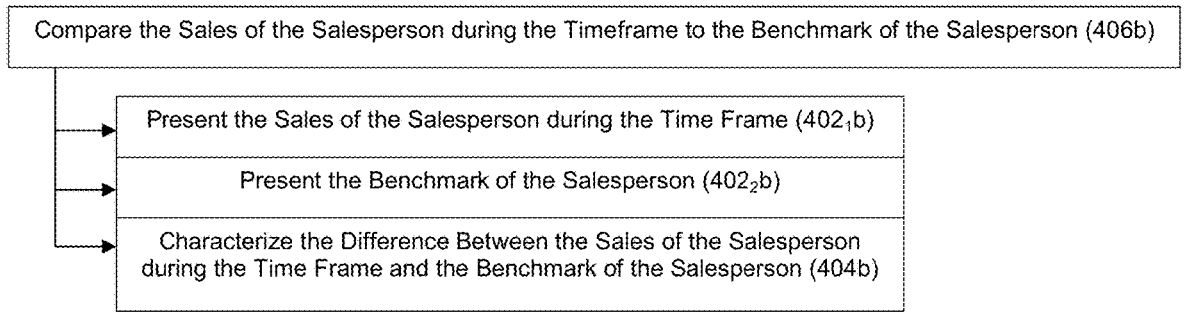
Figure 14C
"The sales in October 2014 of the salesperson was $14.5M, and the sales benchmark of the salesperson was $9.7M. The salesperson outperformed the sales benchmark of the salesperson by $4.8M."
Figure 14D

| City Expense Report Project: Draft ▼ | | Admin User ▼ |
|---|---|---|

Authoring

OUTLINE  ENTITIES  DATA REQUIREMENTS (4/4)  LIVE STORY

Review ⬤ Edit                                                                                            [ rewrite ]

The total value for expenses among the departments within the city was $625.2M. Of departments within the city, Fleet And Facility Management, Finance and Department Of Law had the highest ranking expenses.

The expenses of the highest ranking department by expenses within the city was $329.5M The highest ranking department by expenses within the city slightly exceeded the budget of the highest ranking department by expenses within the city by $9.5M. The highest ranking line item by amount recorded by the highest ranking department by expenses within the city was Salaries And Wages. Of line items recorded by the highest ranking department by expenses within the city, Drugs Medicine And Chemical Materials had the lowest ranking amount.

Department Budgets
departmentexpense.csv ▼

Department Line Items
cityexpense.csv ▼

Monthly Performance Update Project: Draft ▼                                             Admin User ▼

Authoring

OUTLINE  ENTITIES  DATA REQUIREMENTS (4/4)  LIVE STORY

Review ⬤ Edit                                                                                            [ rewrite ]

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month
2014-10 ▼

Salesperson Name
Jason Butler ▼

PerformanceData
data_real_timeframes.csv ▼

Monthly Performance Update Project: Draft ▾     👤 Admin User ▾

Project Administration

[Central Daylight Time ⇅]

MONITORING   CHANGE LOG   API DOCUMENTATION   PROJECT SETTINGS   SCHEDULING

| Request ▾ | Time ▾ | Duration | User ▾ | Run Type ▾ | Version ▾ | Story Output | Logic Trace |
|---|---|---|---|---|---|---|---|
| ○ bcfda60a285446df9687db6b2213aca0 | Jun 21, 2016, 4:11:37 pm | 542ms | Site Administrator | UI | Current Draft | 📄 | 📄 |
| ○ c9006b2790974ed1b494fed63b734c6f | Jun 21, 2016, 2:09:57 pm | 337ms | Site Administrator | UI | Current Draft | 📄 | 📄 |
| ○ 8076c5be6814a1abb4ac6f0f8e7b79b2 | Jun 21, 2016, 2:06:46 pm | 347ms | Site Administrator | UI | Current Draft | 📄 | 📄 |
| ○ 2f70cb46a14447c59d7ff0523a5a560c | Jun 21, 2016, 2:06:17 pm | 639ms | Site Administrator | UI | Current Draft | 📄 | 📄 |
| ○ 016e441abb45484eb2e5442e2d989947 | Jun 21, 2016, 1:59:19 pm | 349ms | Site Administrator | API | Current Draft | 📄 | 📄 |
| ● 97d759018e794cbeb98e272ad0a2883a | Jun 21, 2016, 1:59:06 pm | 62ms | Site Administrator | API | Current Draft | ⚠ | |
| ● 56a03120faf34c4ca64ed06e62f0652a | Jun 21, 2016, 1:59:03 pm | 70ms | Site Administrator | API | Current Draft | ⚠ | |
| ○ a7248cc7baa345d9bf259553888a58be | Jun 21, 2016, 1:58:47 pm | 534ms | Site Administrator | API | Current Draft | 📄 | 📄 |
| ● 66734b39f8354309956eb67fd64f6bb8 | Jun 21, 2016, 1:58:29 pm | 76ms | Site Administrator | API | Current Draft | ⚠ | |
| ● 44822678997e424ba6845e9585d8a2e | Jun 21, 2016, 1:55:52 pm | 75ms | Site Administrator | API | Current Draft | ⚠ | |

[← Newer]     [Older →]

ACME Budget Report Project: Draft ▾     👤 Admin User ▾

Project Administration

[Central Daylight Time ⇅] [Download CSV]

MONITORING   CHANGE LOG   API DOCUMENTATION   PROJECT SETTINGS   SCHEDULING

| Time ▾ | User ▾ | Version ▾ | Action | Detail |
|---|---|---|---|---|
| Jun 19, 2016, 2:50:36 pm | Admin User | Current Draft | Add a communication goal | Call out the entity |
| Jun 19, 2016, 2:50:33 pm | Admin User | Current Draft | Remove a communication goal | Call out the person |
| Jun 19, 2016, 2:49:41 pm | Admin User | Current Draft | Update a communication goal | Call out the person |
| Jun 19, 2016, 2:49:41 pm | Admin User | Current Draft | Add an entity | person |
| Jun 19, 2016, 2:47:18 pm | Admin User | Current Draft | Update a communication goal | Call out the department |
| Jun 19, 2016, 2:47:10 pm | Admin User | Current Draft | Add a communication goal | Call out the entity |
| Jun 19, 2016, 2:15:26 pm | Admin User | Current Draft | Update a communication goal | Call out the 3 highest ranking departments by expenses within the city |
| Jun 19, 2016, 2:14:28 pm | Admin User | Current Draft | Add a communication goal | Call out the entity |
| Jun 19, 2016, 2:14:25 pm | Admin User | Current Draft | Remove a communication goal | Call out the city |
| Jun 19, 2016, 2:14:12 pm | Admin User | Current Draft | Update a communication goal | Call out the city |
| Jun 19, 2016, 2:14:03 pm | Admin User | Current Draft | Add a communication goal | Call out the entity |
| Jun 19, 2016, 2:14:01 pm | Admin User | Current Draft | Remove a communication goal | Call out the 3 highest ranking departments by expenses within the city |
| Jun 19, 2016, 2:13:54 pm | Admin User | Current Draft | Update a communication goal | Call out the 3 highest ranking departments by expenses within the city |
| Jun 19, 2016, 2:13:23 pm | Admin User | Current Draft | Add a communication goal | Call out the entity |

Figures 68, 69:
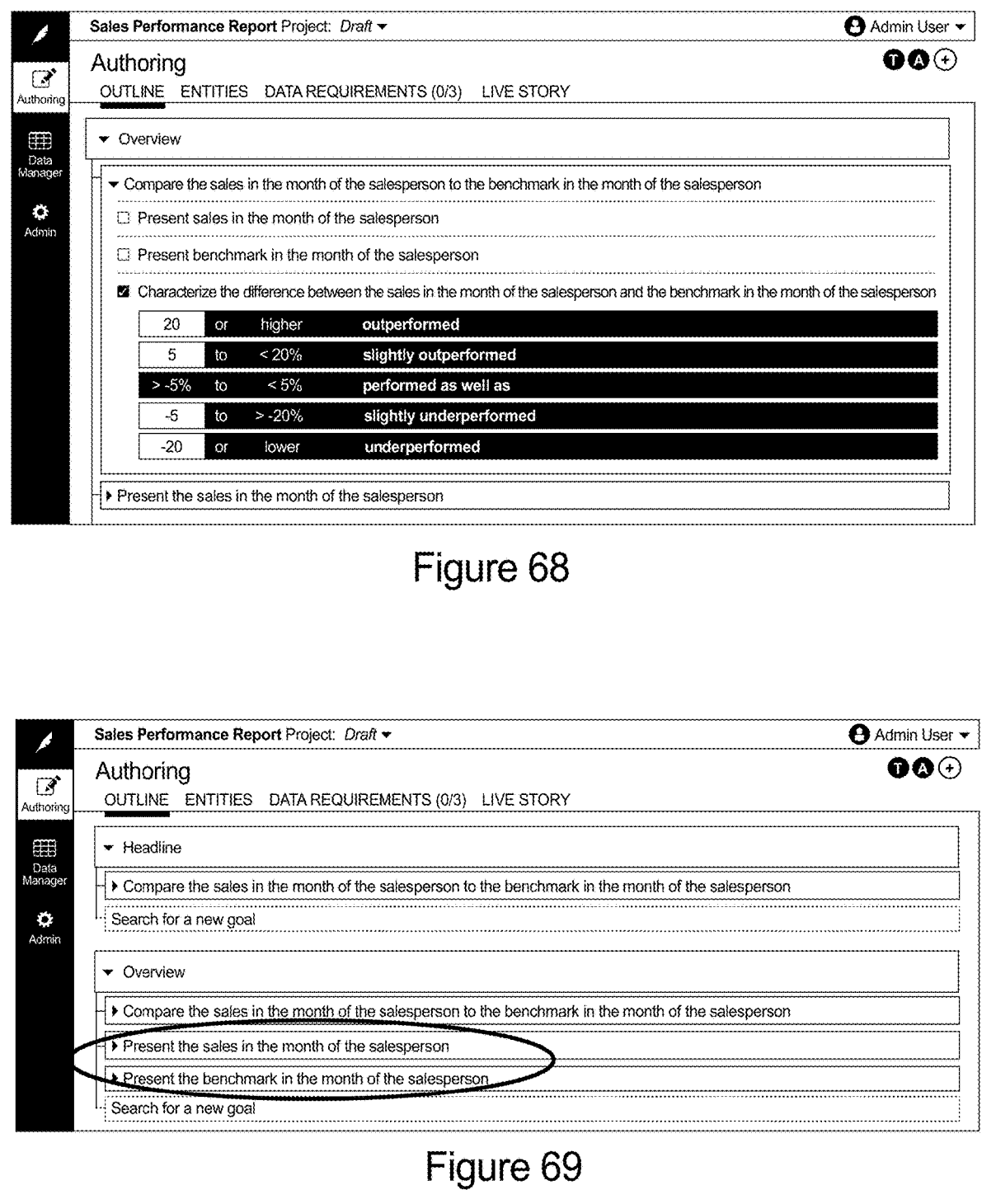

| | | | |
|---|---|---|---|
| 20 | or | higher | outperformed |
| 5 | to | < 20% | slightly outperformed |
| > -5% | to | < 5% | performed as well as |
| -5 | to | > -20% | slightly underperformed |
| -20 | or | lower | underperformed |

Sales Performance Report Project: *Draft* ▼      🙂 Admin User ▼

Authoring

OUTLINE   ENTITIES   DATA REQUIREMENTS (0/4)   LIVE STORY

▼ Overview
- ▶ Compare the sales in the month of the salesperson to the benchmark in the month of the salesperson
- ▶ Present the sales in the month of the salesperson
- ▶ Present the benchmark in the month of the salesperson
- Search for a new goal ▼ Drivers
- ▶ Present the contribution of sales of the sector to the entity
- ▶ Present the value
- Search for a new goal + Section

Edit entity   x
sector

Entity Type
sector

Relationship   x
related entity or group

+ Add relationship
+ Add qualification
+ Add group analysis

Okay

Sales Performance Report Project: *Draft* ▼      🙂 Admin User ▼

Authoring

OUTLINE   ENTITIES   DATA REQUIREMENTS (0/4)   LIVE STORY

▼ Overview
- ▶ Compare the sales in the month of the salesperson to the benchmark in the month of the salesperson
- ▶ Present the sales in the month of the salesperson
- ▶ Present the benchmark in the month of the salesperson
- Search for a new goal ▼ Drivers
- ▶ Present the contribution of sales of the sector to the entity
- ▶ Present the value
- Search for a new goal + Section

Select entity   x
known   new
single   plural

*Available Entities*
salesperson

| | Sales Performance Report Project: *Draft* ▼ | Admin User ▼ |
|---|---|---|

Authoring

OUTLINE  ENTITIES  DATA REQUIREMENTS (0/4)  LIVE STORY

▼ Overview
- ▶ Compare the sales in the month of the salesperson to the benchmark in the month of the salesperson
- ▶ Present the sales in the month of the salesperson
- ▶ Present the benchmark in the month of the salesperson
- Search for a new goal ▼ Drivers
- ▶ Call out the highest ranking sector by sales in the month managed by the salesperson
- ▶ Present the contribution of sales in the month of the highest ranking sector by sales in the month managed by the salesperson to the salesperson
- ▶ Present the contribution of sales in the month of the second highest ranking sector by sales in the month managed by the salesperson to the salesperson
- Search for a new goal

Authoring

OUTLINE  ENTITIES  DATA REQUIREMENTS (0/4)  LIVE STORY

▼ Overview
- ▶ Compare the sales in the month of the salesperson to the benchmark in the month of the salesperson
- ▶ Present the sales in the month of the salesperson
- ▶ Present the benchmark in the month of the salesperson
- Search for a new goal ▼ Drivers
- ▶ Call out the highest ranking sector by sales in the month managed by the salesperson
- ▶ Present the contribution of sales in the month of the highest ranking sector by sales in the month managed by the salesperson to the salesperson
- ▶ Present the contribution of sales in the month of the second highest ranking sector by sales in the month managed by the salesperson to the salesperson
- Search for a new goal
  - Call out the entity
  - Compare a value to another value
  - Present the characterization of the entity
  - Present the value

Sales Performance Report Project: Draft ▼     ● Admin User ▼

Authoring

OUTLINE   ENTITIES   DATA REQUIREMENTS (6/6)   LIVE STORY

Region

| Question | Answer |
|---|---|
| Where do I find the name? | Account Industry ☑ |
| Where do I find the sales? | Opportunity Max Amount ☑ |
| What column is the date in? | Quarter ☑ |
| What should I do if there are multiple values? | sum |
| To relate a sector and a salesperson, where do I find the unique identifier of a salesperson? | Salesperson |
| In the Sales Performance Data data model, which column is the identifier of a sector in? | Account Industry |

I need the month this story is about

Where do I find the month?     Story Variable

I need the salesperson this story is about

Where do I find the salesperson?     Story Variable

Figure 107

Monthly Performance Update Project: Draft ▼     ● Admin User ▼

Authoring

OUTLINE   ENTITIES   DATA REQUIREMENTS (6/6)   LIVE STORY

Review ⬤ Edit     [rewrite]

There was a $4.8M difference between the sales in October 2014 of the salesperson and the benchmark of the salesperson.

The sales in October 2014 of the salesperson was $14.5M and the benchmark of the salesperson was $9.7M. There was a $4.8M difference between the sales of the salesperson and the benchmark of the salesperson.

In October 2014, of sectors managed by the salesperson, Engineering Services had the highest ranking sales. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Of regions managed by the salesperson, Australia, Chile and Brazil had the highest ranking sales.

Story Variables

Month
[ 2014-10 ▼ ]

Salesperson Identifier
[ Jason Butler ▼ ]

Sales Performance Data
[ Sales Performance Data.csv ▼ ]

| | Sales Performance Report Project: *Draft* ▼ | | | 👤 Admin User ▼ |
|---|---|---|---|---|
| Authoring | Authoring | | | ⓣⓐ⊕ |
| | OUTLINE  ENTITIES  DATA REQUIREMENTS (0/3)  LIVE STORY | | | |

Timeframes month salesperson  PERSON                                                                                        x

| Specific | Generic Singular | Generic Plural |
|---|---|---|
| ✓ [name] | ✓ salesperson | ✓ salespeople |
| + add expression | + add expression | + add expression |

Characterizations

Performance

| ▼ star | the salesperson was outstanding, it was a(n) star, they were stars |
|---|---|
| the sales is greater than 10000 | |
| + Qualification | |

+ Outcome

| default | the salesperson was adequate, it was a(n) average performer, they were average performers |

Figure 142

| | Sales Performance Report Project: *Draft* ▼ | 👤 Admin User ▼ |
|---|---|---|
| Authoring | Authoring | ⓣⓐ⊕ |
| | OUTLINE  ENTITIES  DATA REQUIREMENTS (0/3)  LIVE STORY | |

Timeframes month

+ add expression    + add expression

Characterizations

Performance

| ▶ star | the salesperson was outstanding, it was a(n) star, they were stars |
|---|---|
| ▶ laggard | the salesperson was disappointing, it was a(n) laggard, they were laggards |

+ Outcome

| default | the salesperson was adequate, it was a(n) average performer, they were average performers |

+ Characterization

Attributes

| benchmark | currency |
|---|---|
| gender | string |

Sales Performance Report Project: *Draft* ▼     👤 Admin User ▼

Authoring

OUTLINE   ENTITIES   DATA REQUIREMENTS (4/4)   LIVE STORY

▼ The highest ranking department

▸ Present the expenses of the highest ranking department by expenses within the city ▼ Compare the expenses of the highest ranking department by expenses within the city to the budget of the highest ranking department by expenses within the city ☐ Present expenses of the highest ranking department by expenses within the city ☐ Present budget of the highest ranking department by expenses within the city ☑ Characterize the difference between the expenses of the highest ranking department by expenses within the city and the budget of the highest ranking department by expenses within the city

| | | | |
|---|---|---|---|
| 5 | or | higher | exceeded |
| 1 | to | < 5% | slightly exceeded |
| > -1% | to | <1% | came in on |
| -1 | to | > -5% | came in slightly under |
| -5 | or | lower | came in under |

▸ Call out the highest ranking line item amount recorded by the highest ranking department by expenses within the city

Figure 147

Sales Performance Report Project: *Draft* ▼     👤 Admin User ▼

Authoring

OUTLINE   ENTITIES   DATA REQUIREMENTS (4/4)   LIVE STORY

▼ The highest ranking department

▸ Present the expenses of the highest ranking department by expenses within the city ▼ Compare the expenses of the highest ranking department by expenses within the city to the budget of the highest ranking department by expenses within the city ☐ Present expenses of the highest ranking department by expenses within the city ☐ Present budget of the highest ranking department by expenses within the city ☑ Characterize the difference between the expenses of the highest ranking department by expenses within the city and the budget of the highest ranking department by expenses within the city

| | | | |
|---|---|---|---|
| 5 | or | higher | exceeded |
| -10| | to | < 5% | slightly exceeded |
| > -11% | to | <-10% | came in on |
| -11 | to | > -12% | came in slightly under |
| -12 | or | lower | came in under |

▸ Call out the highest ranking line item amount recorded by the highest ranking department by expenses within the city

Figure 148

City Expense Report Project: Draft ▼     Admin User ▼

Authoring

OUTLINE   ENTITIES   DATA REQUIREMENTS (4/4)   LIVE STORY

▼ The highest ranking department

▶ Present the expenses of the highest ranking department by expenses within the city ▼ Compare the expenses of the highest ranking department by expenses within the city to the budget of the highest ranking department by expenses within the city ☐ Present expenses of the highest ranking department by expenses within the city ☐ Present budget of the highest ranking department by expenses within the city ☑ Characterize the difference between the expenses of the highest ranking department by expenses within the city and the budget of the highest ranking department by expenses within the city

| 20 | or | higher | outperformed |
|---|---|---|---|
| 5 | to | < 20% | slightly outperformed |
| > -5% | to | <-5% | performed as well as |
| -5 | to | > -20% | slightly underperformed |

Edit expressions   x outperformed primary

✓ outperformed

+ add expression

City Expense Report Project: Draft ▼     Admin User ▼

Authoring

OUTLINE   ENTITIES   DATA REQUIREMENTS (4/4)   LIVE STORY

▶ Present the expenses of the highest ranking department by expenses within the city ▼ Compare the expenses of the highest ranking department by expenses within the city to the budget of the highest ranking department by expenses within the city ☐ Present expenses of the highest ranking department by expenses within the city ☐ Present budget of the highest ranking department by expenses within the city ☑ Characterize the difference between the expenses of the highest ranking department by expenses within the city and the budget of the highest ranking department by expenses within the city

| 20 | or | higher | outperformed (+1) |
|---|---|---|---|
| 5 | to | < 20% | slightly outperformed |
| > -5% | to | <5% | performed as well as |
| -5 | to | > -20% | slightly underperformed |
| -20 | or | lower | underperformed |

Edit expressions   x outperformed primary

✓ outperformed

☑ beat

☐ came ahead of   x

+ add expression

| | ACME Budget Report Project: Draft ▼ | 🙂 Admin User ▼ |
|---|---|---|

Authoring  ⊕Ⓐ🅐⊕

OUTLINE  ENTITIES  DATA REQUIREMENTS (0/6)  LIVE STORY

▼ The City

▶ Call out the 3 highest ranking departments by expenses in the month within the city ▶ Call out the people employed by the department Search for a new goal ▼ The highest ranking department ▶ Compare the expenses of the highest ranking department by expenses within the city to the budget of the highest ranking department by expenses within the city    Txt ▼ 🗑 ⋮

Search for a new goal

+ Section

ACME Budget Report Project: *Draft* ▼      👤 Admin User ▼

Authoring

OUTLINE    ENTITIES    DATA REQUIREMENTS (3/3)    LIVE STORY

▼ The City

▸ Present the total expenses of the departments within the city     Txt ▼

- normal text
- headline
- bullet

▸ Call out the 3 highest ranking departments by expenses in the month within the city Search for a new goal ▼ The highest ranking department ▸ Compare the expenses of the highest ranking department by expenses within the city to the budget of the highest ranking department by expenses within the city Search for a new goal + Section

ACME Budget Report Project: *Draft* ▼      👤 Admin User ▼

Authoring

OUTLINE    ENTITIES    DATA REQUIREMENTS (3/3)    LIVE STORY

Review ⬤ Edit      [ rewrite ]

The total value for Expenses Among the Departments Within the City Was $625.2M.

Fleet And Facility Management, Finance and Department Of Law had the highest ranking expenses of departments within the city.

The highest ranking department by expenses within the city slightly outperformed the budget of the highest ranking department by expenses within the city by $9.5M.

Chicago Departments
cityexpense.csv ▼

Chicago Expenses
departmentexpense.csv ▼

Houston Expenses
cityexpense-houston.csv ▼

Figure 205

| | ACME Budget Report Project: *Draft* ▼ | Admin User ▼ |
|---|---|---|
| Authoring | Authoring | ❶❷❸⊕ |
| Data Manager | OUTLINE  ENTITIES  DATA REQUIREMENTS (3/3)  LIVE STORY | |
| Admin | ▼ The city | |
| | ▶ Present the total expenses of the departments within the city | |
| | ▶ Call out the 3 highest ranking departments by expenses within the city | |
| | ▶ Present the expenses of the departments within the city    Txt ▼ 🗑 ▦ | |
| | normal text | |
| | Search for a new goal    headline | |
| | ▼ The highest ranking department    (chart) | |
| | bullet | |
| | ▶ Compare the expenses of the highest ranking department by expenses within the city to the ~~budget of the highest~~ ranking department by expenses within the city | |
| | Search for a new goal | |
| | ＋ Section | |

| | ACME Budget Report Project: *Draft* ▼ | Admin User ▼ |
|---|---|---|
| Authoring | Authoring | T A A ⊕ |
| | OUTLINE  ENTITIES  DATA REQUIREMENTS (0/6)  LIVE STORY | |

| City | |
|---|---:|
| Where do I find the expenses? | select view and column |
| Where do I find the name? | select view and column |
| In the Chicago Expenses data model, which column is the identifier of a city in? | select view and column |

| Department | |
|---|---:|
| Where do I find the budget? | select view and column |
| Where do I find the expenses? | select view and column |
| Where do I find the name? | select view and column |
| What column is the identifier for city? | select view and column |
| In the Chicago Expenses data model, which column is the identifier of a department in? | select view and column |

| ACME Budget Report Project: *Draft* ▼ | | 👤 Admin User ▼ |
|---|---|---|
| Authoring | | T A A ⊕ |
| OUTLINE  ENTITIES  DATA REQUIREMENTS (2/3)  LIVE STORY | | |

| Department | |
|---|---|
| Where do I find the budget? | Budget ☑ |
| What should I do if there are multiple values? | constant |
| Where do I find the expenses? | Expenses ☑ |
| What should I do if there are multiple values? | constant |
| Where do I find the name? | Department ☑ |
| What column is the identifier for city? | FUND TYPE |
| In the Chicago Expenses data model, which column is the identifier of a department in? | Department |

| I need the city this story is about | |
|---|---|
| Where do I find the city? | select source |

Select source    x
Story Variable
Static Value

Figure 219

| ACME Budget Report Project: Draft ▼ | | Admin User ▼ |
|---|---|---|
| Authoring | | |
| OUTLINE  ENTITIES  DATA REQUIREMENTS (3/4)  LIVE STORY | | |

City

| Where do I find the name? | FUND TYPE ☑ |
|---|---|
| In the Chicago Expenses data model, which column is the identifier of a department in? | FUND TYPE |

Department

| Where do I find the budget? | Budget ☑ |
|---|---|
| What should I do if there are multiple values? | constant |
| Where do I find the expenses? | Expenses ☑ |
| What column is the date in? | (Year ☑) |
| What should I do if there are multiple values? | constant |
| Where do I find the name? | Department ☑ |
| What column is the identifier for city? | FUND TYPE |

Figure 221

| ACME Budget Report Project: Draft ▼ | | Admin User ▼ |
|---|---|---|
| Authoring | | |
| OUTLINE  ENTITIES  DATA REQUIREMENTS (3/4)  LIVE STORY | | |

Edit validation rules  x

Year is a date (01-31-2015)

If invalid format, fail story ▼

If null, fail story ▼

City

| Where do I find the name? | FUND TYPE ☑ |
|---|---|
| In the Chicago Expenses data model, which column is the identifier of a city in? | FUND TYPE |

Department

| Where do I find the budget? | Budget ☑ |
|---|---|
| What should I do if there are multiple values? | constant |
| Where do I find the expenses? | Expenses ☑ |
| What column is the date in? | Year ☑ |
| What should I do if there are multiple values? | constant |
| Where do I find the name? | Department ☑ |
| What column is the identifier for city? | FUND TYPE |

Monthly Performance Update Project: *Draft* ▼    👤 Admin User ▼

Authoring

OUTLINE  ENTITIES  DATA REQUIREMENTS (6/6)  LIVE STORY

Review ⬤◯ Edit    [ rewrite ]

The Salesperson Outperformed the Sales Benchmark of the Salesperson by $4.8M The sales in October 2014 of the salesperson was $14.5M and the sales benchmark of the salesperson was $9.7M. The salesperson (outperformed) the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month
[ 2014-10 ▼ ]

Salesperson Name
[ Jason Butler ▼ ]

PerformanceData
[ data_real_timeframe.csv ▼ ]

Monthly Performance Update Project: *Draft* ▼     👤 Admin User ▼

Authoring

OUTLINE   ENTITIES   DATA REQUIREMENTS (6/6)   LIVE STORY

Review ⚫ Edit     [ rewrite ]

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

- ☐ The salesperson outperformed the sales benchmark of the salesperson by $4.8M.
- ☐ The sales of the salesperson outperformed the sales benchmark of the salesperson by $4.8M.
- ☐ The salesperson's sales outperformed the salesperson's sales benchmark by $4.8M
- ☐ The sales of the salesperson outperformed the salesperson's sales benchmark by $4.8M.
- ☐ The salesperson's sales outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit

Story Variables

Month
[ 2014-10 ▼ ]

Salesperson Name
[ Jason Butler ▼ ]

PerformanceData
[ data_real_timeframe.csv ▼ ]

Figure 255

| Monthly Performance Update Project: Draft ▼ | | | | 👤 Admin User ▼ |
|---|---|---|---|---|
| Authoring | | | | Ⓐ Ⓣ ⊕ |
| OUTLINE ENTITIES DATA REQUIREMENTS (6/6) LIVE STORY | | | | |

(Review ◯▬ Edit)                                                                                         [ rewrite ]

---

The Salesperson Outperformed the Sales Benchmark of the Salesperson by $4.8M

The sales in October 2014 of the salesperson was $14.5M and the sales benchmark of the salesperson was $9.7M. The salesperson outperformed the sales benchmark of the salesperson by $4.8M.

In October 2014, Engineering Services had the highest ranking sales of sectors managed by the salesperson. The sales of the highest ranking sector by sales managed by the salesperson was $7.3M. The highest ranking sector by sales managed by the salesperson contributed 50.67% to the salesperson's sales. The highest ranking customer by sales within the highest ranking sector by sales managed by the salesperson was Magna Phasellus Dolor Incorporated. The 2nd highest ranking sector by sales managed by the salesperson was Transaction, Credit & Collections. The 2nd highest ranking sector by sales managed by the salesperson had sales of $3.4M. The 2nd highest ranking sector by sales managed by the salesperson contributed 23.64% to the salesperson's sales. The highest ranking customer by sales within the 2nd highest ranking sector by sales managed by the salesperson was Suspendisse Incorporated. Australia, Chile and Brazil had the highest ranking sales of regions managed by the salesperson. The sales of the 3 highest ranking regions by sales managed by the salesperson were $7.3M, $3.4M and $779K.

Story Variables

Month
[ 2014-10 ▼ ]

Salesperson Name
[ Jason Butler ▼ ]

PerformanceData
[ data_real_timeframe.csv ▼ ]

| | City Expense Report Project: *Published* ▼ | | Admin User ▼ |
|---|---|---|---|
| Authoring | Project Administration | | |
| | MONITORING  CHANGE LOG  <u>API DOCUMENTATION</u>  PROJECT SETTINGS  SCHEDULING | | |
| Data Manager | Resource URL<br>https://integ-quill3-saas.n-s.us/api/v1/analysis/projects/329/stories/ | Request Builder<br>Department Budgets<br>departmentexpense.csv (Saved File) | |
| Admin | Request Headers<br>content-type (optional)<br>Request format (multipart/form-data) | Department Line Items<br>cityexpense.csv (Saved File) | |
| | x-ns-api-token (required)<br>Authentication token, which can be generated on your user page. | Story Format<br>✓ Plain Text | |
| | x-ns-accept (optional)<br>Story format to return (text/plain, text/html, application/json, etc) | HTML<br>JSON<br>Word | |
| | Request Body<br>Optionally provide data payloads in a multipart/form-data POST payload. Provide valid file data for one or more of the following fields:<br>• Department Line Items (tabular)<br>• Department Budgets (tabular) | cURL  python  javascript<br>curl "https://integ-quill3-saas.n-s.us/api/v1/analysis/projects/329/stories/?"\<br>-H "x-ns-api-token: <YOUR_API_TOKEN>"\<br>-H "x-ns-accept: text/plain" | |

Figure 277

Syntax

| cURL | python | javascript |
|---|---|---|

```
curl "https://integ-quill3-onprem.n-s.us/api/v1/analysis/projects/7/stories/?"\
--cert <PATH_TO_CERT_FILE>\
--key <PATH_TO_KEY_FILE>\
-H "x-ns-accept: text/plain"\
-X POST
```

APPLIED ARTIFICIAL INTELLIGENCE TECHNOLOGY FOR PERFORMING NATURAL LANGUAGE GENERATION (NLG) USING COMPOSABLE COMMUNICATION GOALS AND ONTOLOGIES TO GENERATE NARRATIVE STORIES

CROSS-REFERENCE AND PRIORITY CLAIM TO RELATED PATENT APPLICATIONS

This patent application is a continuation of U.S. patent application Ser. No. 15/897,331, filed Feb. 15, 2018, and entitled "Applied Artificial Intelligence Technology for Performing Natural Language Generation (NLG) Using Composable Communication Goals and Ontologies to Generate Narrative Stories", now U.S. Pat. No. 10,762,304, which claims priority to U.S. provisional patent application Ser. No. 62/460,349, filed Feb. 17, 2017, and entitled "Applied Artificial Intelligence Technology for Performing Natural Language Generation (NLG) Using Composable Communication Goals and Ontologies to Generate Narrative Stories", the entire disclosures of each of which are incorporated herein by reference.

This patent application is related to (1) U.S. patent application Ser. No. 15/897,350, filed Feb. 15, 2018, and entitled "Applied Artificial Intelligence Technology for Determining and Mapping Data Requirements for Narrative Stories to Support Natural Language Generation (NLG) Using Composable Communication Goals", now U.S. Pat. No. 10,585,983, (2) U.S. patent application Ser. No. 15/897,359, filed Feb. 15, 2018, and entitled "Applied Artificial Intelligence Technology for Story Outline Formation Using Composable Communication Goals to Support Natural Language Generation (NLG)", now U.S. Pat. No. 10,755,053, (3) U.S. patent application Ser. No. 15/897,364, filed Feb. 15, 2018, and entitled "Applied Artificial Intelligence Technology for Runtime Computation of Story Outlines to Support Natural Language Generation (NLG)", now U.S. Pat. No. 10,572,606, (4) U.S. patent application Ser. No. 15/897,373, filed Feb. 15, 2018, and entitled "Applied Artificial Intelligence Technology for Ontology Building to Support Natural Language Generation (NLG) Using Composable Communication Goals", now U.S. Pat. No. 10,719,542, and (5) U.S. patent application Ser. No. 15/897,381, filed Feb. 15, 2018, and entitled "Applied Artificial Intelligence Technology for Interactive Story Editing to Support Natural Language Generation (NLG)", now U.S. Pat. No. 10,713,442, the entire disclosures of each of which are incorporated herein by reference.

INTRODUCTION

There is an ever-growing need in the art for improved natural language generation (NLG) technology that harnesses computers to process data sets and automatically generate narrative stories about those data sets. NLG is a subfield of artificial intelligence (AI) concerned with technology that produces language as output on the basis of some input information or structure, in the cases of most interest here, where that input constitutes data about some situation to be analyzed and expressed in natural language. Many NLG systems are known in the art that use template approaches to translate data into text. However, such conventional designs typically suffer from a variety of shortcomings such as constraints on how many data-driven ideas can be communicated per sentence, constraints on variability in word choice, and limited capabilities of analyzing data sets to determine the content that should be presented to a reader.

As technical solutions to these technical problems in the NLG arts, the inventors note that the assignee of the subject patent application has previously developed and commercialized pioneering technology that robustly generates narrative stories from data, of which a commercial embodiment is the QUILL™ narrative generation platform from Narrative Science Inc. of Chicago, IL Aspects of this technology are described in the following patents and patent applications: U.S. Pat. Nos. 8,374,848, 8,355,903, 8,630,844, 8,688,434, 8,775,161, 8,843,363, 8,886,520, 8,892,417, 9,208,147, 9,251,134, 9,396,168, 9,576,009, 9,697,197, 9,697,492, and 9,720,890 and U.S. patent application Ser. No. 14/211,444 (entitled "Method and System for Configuring Automatic Generation of Narratives from Data", filed Mar. 14, 2014), Ser. No. 14/570,834 (entitled "Automatic Generation of Narratives from Data Using Communication Goals and Narrative Analytics, filed Dec. 15, 2014), Ser. No. 15/253,385 (entitled "Applied Artificial Intelligence Technology for Using Narrative Analytics to Automatically Generate Narratives from Visualization Data, filed Aug. 31, 2016), and 62/382,063 (entitled "Applied Artificial Intelligence Technology for Interactively Using Narrative Analytics to Focus and Control Visualizations of Data", filed Aug. 31, 2016); the entire disclosures of each of which are incorporated herein by reference.

The inventors have further extended on this pioneering work with improvements in AI technology as described herein.

For example, the inventors disclose how AI technology can be used in combination with composable communication goal statements and an ontology to facilitate a user's ability to quickly structure story outlines in a manner usable by a narrative generation system without any need to directly author computer code.

Moreover, the inventors also disclose that the ontology used by the narrative generation system can be built concurrently with the user composing communication goal statements. Further still, expressions can be attached to objects within the ontology for use by the narrative generation process when expressing concepts from the ontology as text in a narrative story. As such, the ontology becomes a re-usable and shareable knowledge-base for a domain that can be used to generate a wide array of stories in the domain by a wide array of users/authors.

The inventors further disclose techniques for editing narrative stories whereby a user's editing of text in the narrative story that has been automatically generated can in turn automatically result in modifications to the ontology and/or a story outline from which the narrative story was generated. Through this feature, the ontology and/or story outline is able to learn from the user's edits and the user is alleviated from the burden of making further corresponding edits of the ontology and/or story outline.

Through these and other features, example embodiments of the invention provide significant technical advances in the NLG arts by harnessing AI computing to improve how narrative stories are generated from data sets while alleviating users from a need to directly code and re-code the narrative generation system, thereby opening up use of the AI-based narrative generation system to a much wider base of users (e.g., including users who do not have specialized programming knowledge).

BRIEF DESCRIPTION OF THE DRAWINGS

FIGS. 8A-H depict example embodiments for use in an NLG component of FIG. 6D.

FIGS. 14A-D illustrate an example of how a communication goal statement can include subgoals that drive the narrative generation process.

DETAILED DESCRIPTION OF EXAMPLE EMBODIMENTS

The example embodiments described herein further extend and innovate on the pioneering work described in the above-referenced and incorporated U.S. Pat. Nos. 9,576,009, 9,697,197, 9,697,492, and 9,720,890, where explicit representations of communication goals are used by AI technology to improve how NLG technology generates narratives from data. With example embodiments described herein, AI technology is able to process a communication goal statement in relation to a data set in order to automatically generate narrative text about that data set such that the narrative text satisfies a communication goal corresponding to the communication goal statement. Furthermore, innovative techniques are disclosed that allow users to compose such communication goal statements in a manner where the composed communication goal statements exhibit a structure that promotes re-usability and robust story generation.

Figure 1A:
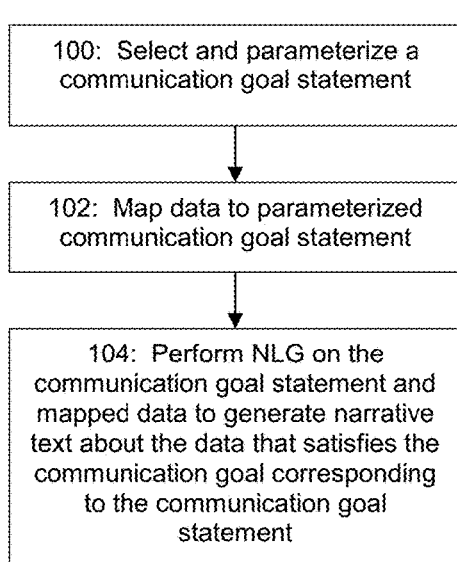
FIGS. 1A-B and 2 depicts various process flows for example embodiments.

FIG. 1A depicts a process flow for an example embodiment. At step 100, a processor selects and parameterizes a communication goal statement. The processor can perform this step in response to user input as discussed below with respect to example embodiments. The communication goal statement can be expressed as natural language text, preferably as an operator in combination with one or more parameters, as elaborated upon below.

At step 102, a processor maps data within the data set to the parameters of the communication goal statement. The processor can also perform this step in response to user input as discussed below with respect to example embodiments.

At step 104, a processor performs NLG on the parameterized communication goal statement and the mapped data. The end result of step 104 is the generation of narrative text based on the data set, where the content and structure of the narrative text satisfies a communication goal corresponding to the parameterized communication goal statement.

Figure 1B:
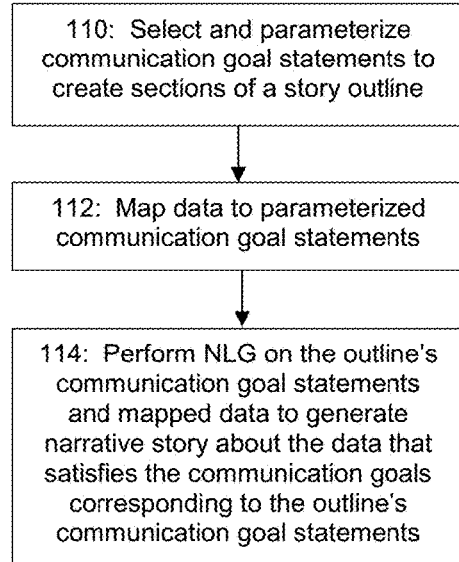

While FIG. 1A describes a process flow that operates on a communication goal statement, it should be understood that multiple communication goal statements can be composed and arranged to create sections of an outline for a story that is meant to satisfy multiple communication goals. FIG. 1B depicts an example process flow for narrative generation based on multiple communication goal statements. At step 110, multiple communication goal statements are selected and parameterized to create sections of a story outline. At step 112, a processor maps data within a data set to these communication goal statements as with step 102 (but for multiple communication goal statements). Step 114 is likewise performed in a manner similar to that of step 104 but on the multiple communication goal statements and the mapped data associated therewith. The end result of step 114 is a narrative story about the data set that conveys information about the data set in a manner that satisfies the story outline and associated communication goals.

It should be understood that steps 102 and 104, as well as steps 112 and 114, need not be performed in lockstep order with each other where step 102 (or 112) maps all of the data before the system progresses to step 104 (or step 114). These steps can be performed in a more iterative manner if desired, where a portion of the data is mapped at step 102 (or step 112), followed by execution of step 104 (or step 114) on that mapped data, whereupon the system returns to step 102/112 to map more data for subsequent execution of step 104/114, and so on.

Furthermore, it should be understood that a system that executes the process flows of FIG. 1A and/or 1B may involve multiple levels of parameterization. For example, not only is there parameterization in the communication goals to build story outlines, but there can also be parameterization of the resulting story outline with the actual data used to generate a story, as explained hereinafter with respect to example embodiments.

Figure 2:
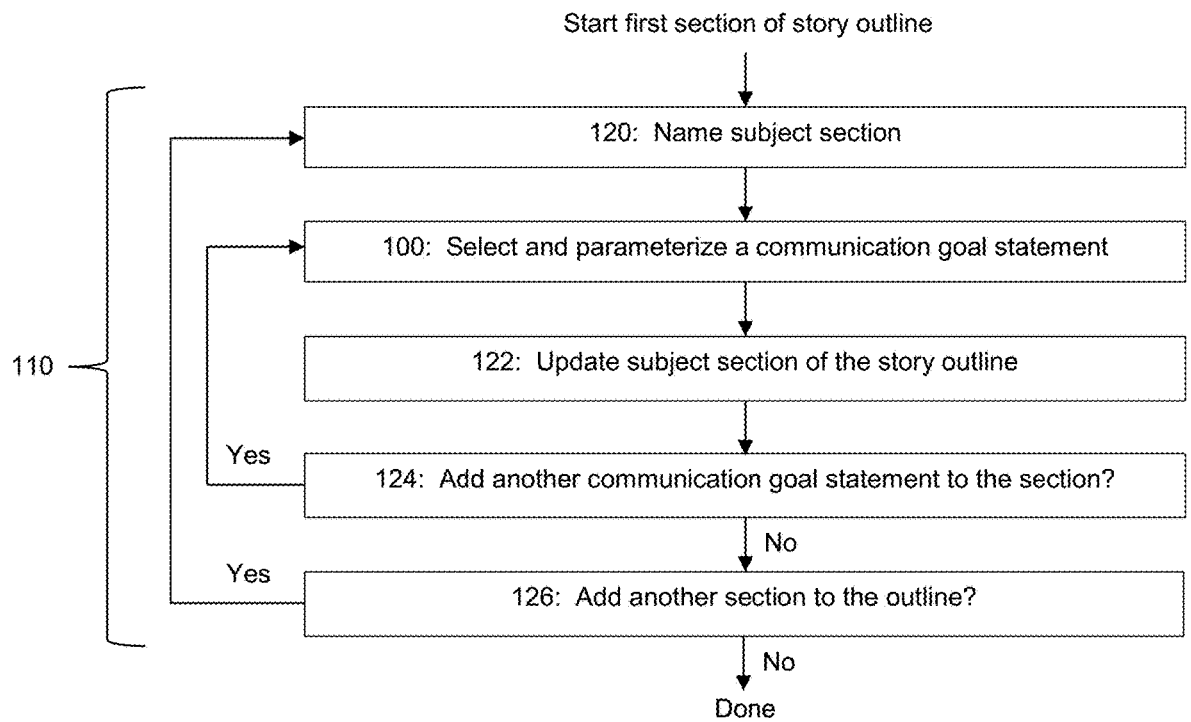

FIG. 2 depicts an example process flow that shows how a story outline can be composed as part of step 110. The process flow of FIG. 2 can be performed by a processor in response to user input through a user interface. To begin the process, a name is provided for a section (step 120). Within this section, step 100 is performed to define a communication goal statement for the subject section. At step 122, the section is updated to include this communication goal statement. The process flow then determines whether another communication goal statement is to be added to the subject section (step 124). If so, the process flow returns to steps 100 and 122. If not, the process flow proceeds to step 126. At step 126, the process flow determines whether another section is to be added to the story outline. If so, the process flow returns to step 120. Otherwise, the process flow concludes and the story outline is completed. Thus, through execution of the process flow of FIG. 2, a processor can generate a story outline comprising a plurality of different sections, where each section comprises one or more communication goal statements. This story outline in turn defines the organization and structure of a narrative story generated from a data set and determines the processes required to generate such a story.

The previous example shows how an outline can be built by adding sections and parameterizing goals completely from scratch. The user is generally not expected to start from scratch, however. A narrative generation system instance will generally include a library of prebuilt components that users can utilize to more easily and quickly build out their outline. The narrative generation system's library provides access to previously parameterized and composed goals, subsections, sections, and even fully defined outlines. These re-usable components come fully parameterized, but can be updated or adjusted for the specific project. These changes are initially isolated from the shared library of components.

Components from the system's shared library can be used in two ways. First, a new project can be created from an entire project blueprint providing all aspects of a project already defined. This includes sample data, data views, the ontology, outline, sections, parameterized goals, and data mappings. Second, a user can pull in predefined components from the system's library ad hoc while building a new project. For example, when adding a section to an outline, the user can either start from scratch with an empty section or use a predefined section that includes a set of fully parameterized goals.

The system's library of components can be expanded by users of the platform through a mechanism that enables users to share components they have built. Once a component (outline, ontology, section, etc.) is shared, other users can then use them from the system's library in their own projects.

Figure 3A:
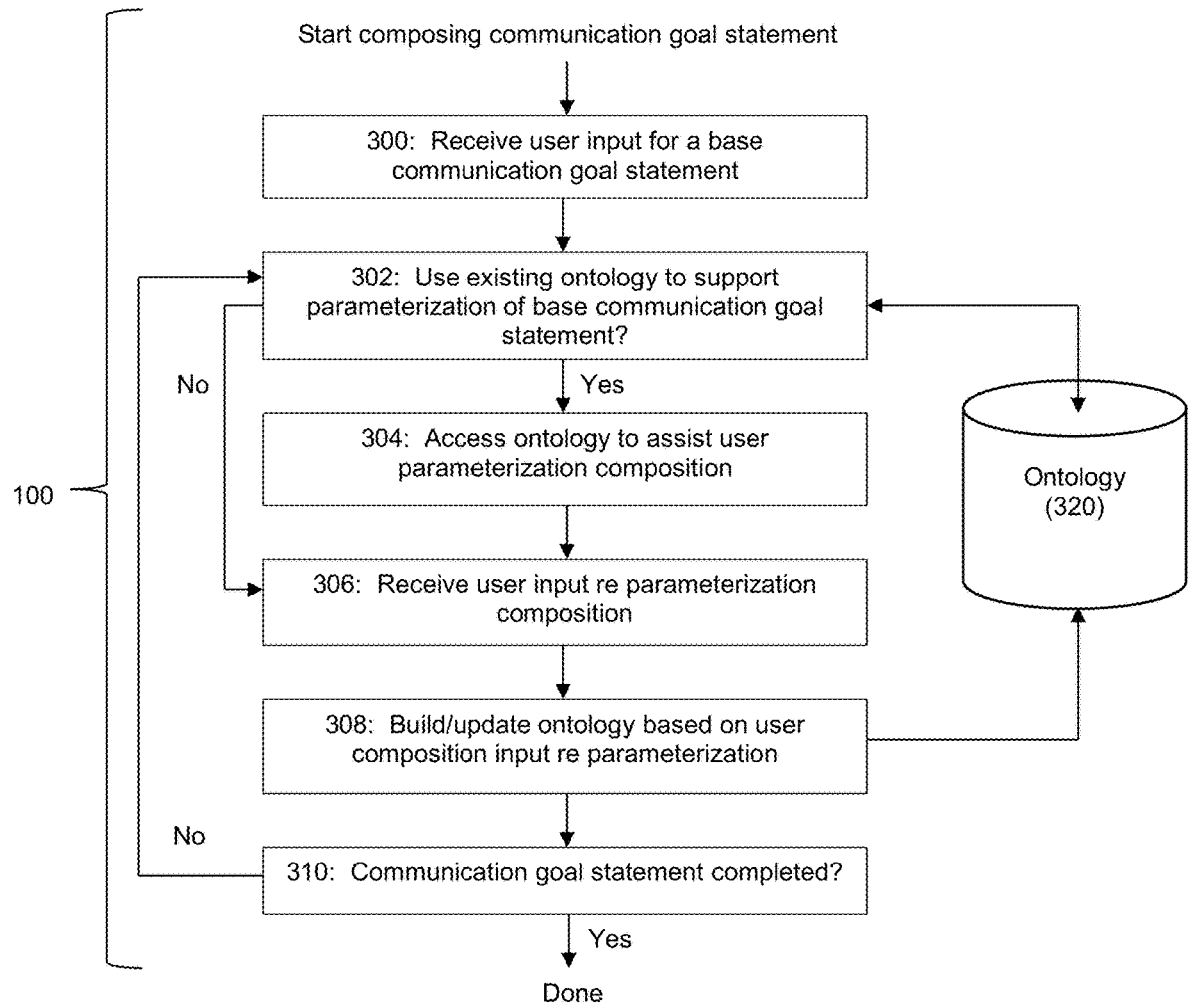
FIG. 3A depicts an example process flow for composing a communication goal statement.
Figure 4A:
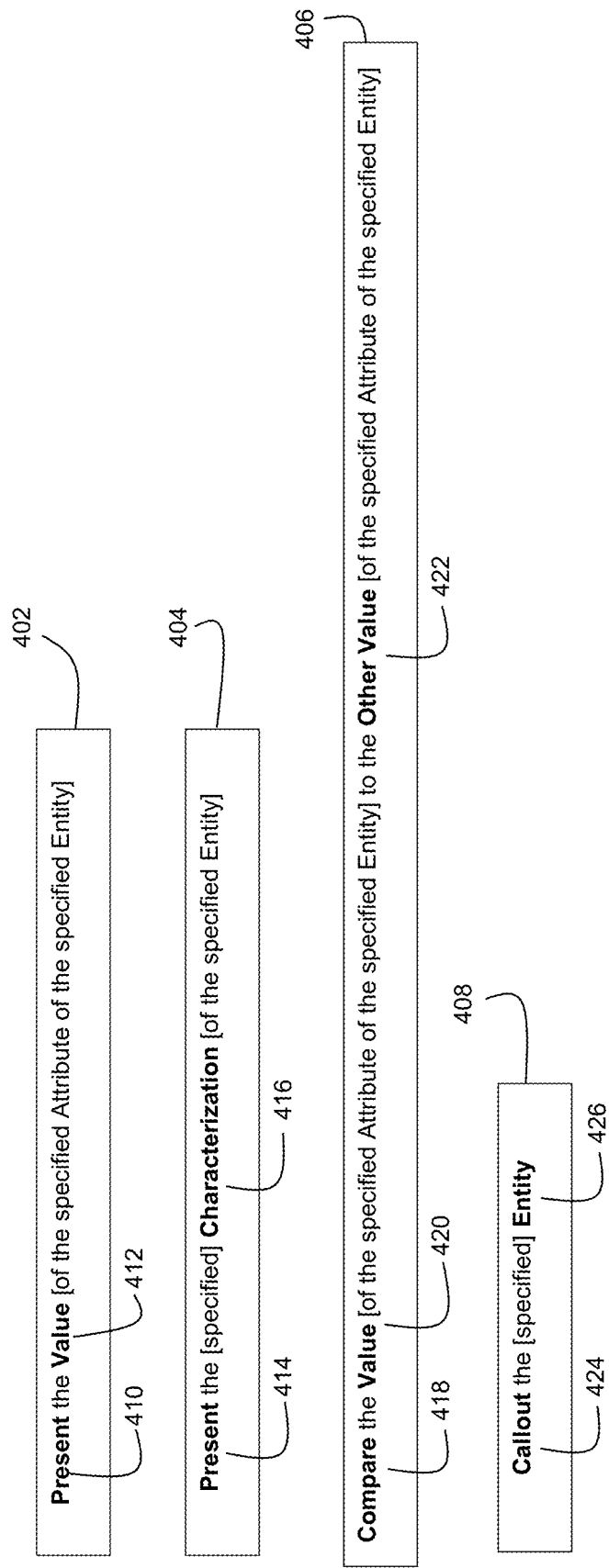
FIG. 4A depicts examples of base communication goal statements.

Composable Communication Goal Statements:

FIG. 3A depicts an example process flow for composing a communication goal statement, where the process flow of FIG. 3A can be used to perform step 100 of FIGS. 1A and 2 (see also step 110 of FIG. 1B). The process flow of FIG. 3A can be performed by a processor in response to user input through a user interface. The process flow begins at step 300 when the processor receives user input that indicates a base communication goal statement. The base communication goal statement serves as a skeleton for a parameterized and composed communication goal and may comprise one or more base goal elements that serve to comprise the parameterized and composed communication goal statement. Base goal elements are the smallest composable building blocks of the system out of which fully parameterized communication goal statements are constructed. Internal to the system, they are structured objects carrying necessary information to serve as the placeholders for parameters that are to be determined during the composition process. Communication goal statements are displayed to the user in plain language describing the goal's operation and bound parameters. In an example embodiment, the base communication goal statement is represented to a user as an operator and one or more words, both expressed in natural language, and where operator serves to identify a communication goal associated with the base communication goal statement and where the one or more words stand for the base goal elements that constitute parameters of the parameterized communication goal statement. FIG. 4A depicts examples of base communication goal statements as presented to a user that can be supported by an example embodiment.

As shown by FIG. 4A, base communication goal statement 402 is "Present the Value" where the word "Present" serves as the operator 410 and "Value" serves as the parameter placeholder 412. The operator 410 can be associated with a set of narrative analytics (discussed below) that define how the AI will analyze a data set to determine the content that is to be addressed by a narrative story that satisfies the "Present the Value" communication goal. The parameter placeholder 412 is a field through which a user specifies an attribute of an entity type to thereby define a parameter to be used as part of the communication goal statement and subsequent story generation process. As explained below, the process of parameterizing the parameter placeholders in the base communication goal statements can build and/or leverage an ontology that represents a knowledge base for the domain of the story generation process.

Figure 4B:
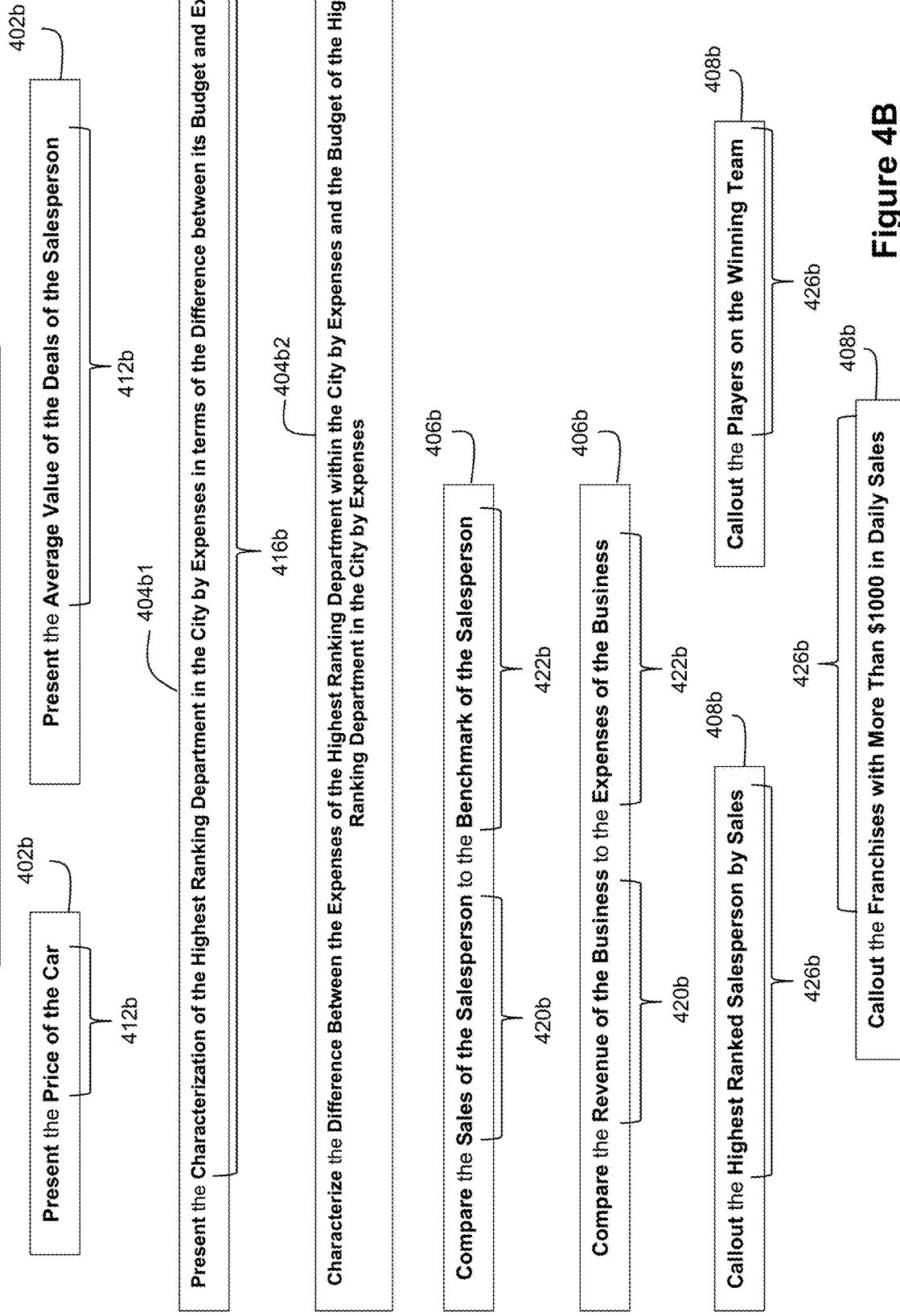
FIG. 4B depicts examples of parameterized communication goal statements corresponding to the base communication goal statements of FIG. 4A.

As shown by FIG. 4B, another example of a base communication goal statement is base communication goal statement 404, which is expressed as "Present the Characterization", but could also be expressed as "Characterize the Entity". In these examples, "Present" (or "Characterize") can serve as operator 414 can "Characterization" (or "Entity") can serve as a parameter placeholder 416. This base communication goal statement can be used to formulate a communication goal statement geared toward analyzing a data set in order to express an editorial judgment about data within the data set.

As shown by FIG. 4B, another example of a base communication goal statement is base communication goal statement 406, which is expressed as "Compare the Value to the Other Value", where "Compare" serves as operator 418, "Value" serves as a parameter placeholder 420, and "Other Value" serves as parameter placeholder 422. The "Compare" operator 418 can be associated with a set of narrative analytics that are configured to compute various metrics indicative of a comparison between the values corresponding to specified attributes of specified entities to support the generation of a narrative that expresses how the two values compare with each other.

Another example of a base communication goal statement is "Callout the Entity" 408 as shown by FIG. 4A. In this example, "Callout" is operator 424 and "Entity" is the parameter placeholder 426. The "Callout" operator 424 can be associated with a set of narrative analytics that are configured to compute various metrics by which to identify one or more entities that meet a set of conditions to support the generation of a narrative that identifies such an entity or entities in the context of these conditions.

It should be understood that the base communication goal statements shown by FIG. 4A are just examples, and a practitioner may choose to employ more, fewer, or different base communication goal statements in a narrative generation system. For example, additional base communication goal statements could be employed that include operators such as "Review", "Analyze", "Explain", "Predict" etc. to support communication goal statements associated with communication goals targeted toward such operators. An example structure for a base "Review" communication goal statement could be "Review the [timeframe interval] [attribute] of [the entity] over [timeframe]". An example structure for a base "Explain" communication goal statement could be "Explain the [computed attribute] of [the entity] in [a timeframe]".

The system can store data representative of a set of available base communication goal statements in a memory for use as a library. A user can then select from among this set of base communication goal statements in any of a number of ways. For example, the set of available base communication goal statements can be presented as a menu (e.g., a drop down menu) from which the user makes a selection. As another example, a user can be permitted to enter text in a text entry box. Software can detect the words being entered by the user and attempt to match those words with one of the base communication goal statements as would be done with auto-suggestion text editing programs. Thus, as a user begins typing the character string "Compa . . . ", the software can match this text entry with the base communication goal statement of "Compare the Value to the Other Value" and select this base communication goal statement at step 300.

Returning to FIG. 3A, the process flow at steps 302-306 operates to parameterize the base communication goal statement by specifying parameters to be used in place of the parameter placeholders in the base communication goal statement. One of the technical innovations disclosed by the inventors is the use of an ontology 320 to aid this part of composing the communication goal statement. The ontology 320 is a data structure that identifies the types of entities that exist within the knowledge domain used by the narrative generation system to generate narrative stories in coordination with communication goal statements. The ontology also identifies additional characteristics relating to the entity types such as various attributes of the different entity types, relationships between entity types, and the like.

Step 302 allows a user to use the existing ontology to support parameterization of a base communication goal statement. For example, if the ontology 320 includes an entity type of "Salesperson" that has an attribute of "Sales", a user who is parameterizing base communication goal statement 402 can cause the processor to access the existing ontology 320 at step 304 to select "Sales of the Salesperson" from the ontology 320 at step 306 to thereby specify the parameter to be used in place of parameter placeholder 412 and thereby create a communication goal statement of "Present the Sales of the Salesperson".

Also, if the existing ontology 320 does not include the parameters desired by a user, step 306 can operate by a user providing user input that defines the parameter(s) to be used for parameterizing the communication goal statement. In this situation, the processor in turn builds/updates the ontology 320 to add the parameter(s) provided by the user. For example, if the ontology 320 did not already include "Sales" as an attribute of the entity type "Salesperson", steps 306-308 can operate to add a Sales attribute to the Salesperson entity type, thereby adapting the ontology 320 at the same time that the user is composing the communication goal statement. This is a powerful innovation in the art that provides significant improvement with respect to how artificial intelligence can learn and adapt to the knowledge base desired by the user for use by the narrative generation system.

At step 310, the processor checks whether the communication goal statement has been completed. If so, the process flow ends, and the user has composed a complete communication goal statement. However, if other parameters still need to be specified, the process flow can return to step 302. For example, to compose a communication goal statement from the base communication goal statement 406 of "Compare the Value to the Other Value", two passes through steps 302-308 may be needed for the user to specify the parameters for use as the Value and the Other Value.

FIG. 4B shows examples of parameterized communication goal statements that can be created as a result of the FIG. 3A process flow. For example, the base communication goal statement 402 of FIG. 4A can be parameterized as communication goal statement 402 ("Present the Price of the Car", where the parameter placeholder 412 has been parameterized as parameter 412*b*, namely "Price of the Car" in this instance, with "Price" being the specified attribute of a "Car" entity type). Similarly, the base communication goal statement 402 of FIG. 4A could also be parameterized as "Present the Average Value of the Deals of the Salesperson", where the parameter placeholder 412 has been parameterized as parameter 412*b*, namely "Average Value of the Deals of the Salesperson" in this instance).

FIG. 4B also shows examples of how base communication goal statement 404 can be parameterized (see relatively lengthy "Present the Characterization of the Highest Ranking Department in the City by Expenses in terms of the Difference Between its Budget and Expenses" statement 404*b*1 where the specified parameter 404*b*1 is the "Characterization of the Highest Ranking Department in the City by Expenses in terms of the Difference Between its Budget and Expenses"; see also its substantially equivalent in the form of statement 404*b*2).

Also shown by FIG. 4B are examples of parameterization of base communication goal statement 406. A first example is the communication goal statement 406*b* of "Compare the Sales of the Salesperson to the Benchmark of the Salesperson" where the specified parameter for "Value" 420 is "Sales of the Salesperson" 420*b* and the specified parameter for "Other Value" 422 is "Benchmark of the Salesperson" 422*b*. A second example is the communication goal statement 406*b* of "Compare the Revenue of the Business to the Expenses of the Business" where the specified parameter for "Value" 420 is "Revenue of the Business" 420*b* and the specified parameter for "Other Value" 422 is "Expenses of the Business" 422*b*.

Also shown by FIG. 4B are examples of parameterization of base communication goal statement 408. A first example is the communication goal statement 408*b* of "Callout the Highest Ranked Salesperson by Sales" where the specified parameter for "Entity" 426 is the "Highest Ranked Salesperson by Sales" 426*b*. A second example is the communication goal statement 408*b* of "Callout the Players on the Winning Team" where the specified parameter for "Entity" 426 is "Players on the Winning Team" 426*b*. A third example is the communication goal statement 408*b* of "Callout the Franchises with More than $1000 in Daily Sales" where the specified parameter for "Entity" 426 is "Franchises with More than $1000 in Daily Sales" 426*b*.

As with the base communication goal statements, it should be understood that a practitioner may choose to employ more, fewer, or different parameterized communication goal statements in a narrative generation system. For example, a parameterized Review communication goal statement could be "Review the weekly cash balance of the company over the year", and a parameterized Explain communication goal statement could be "Explain the profit of the store in the month".

Figure 3B:
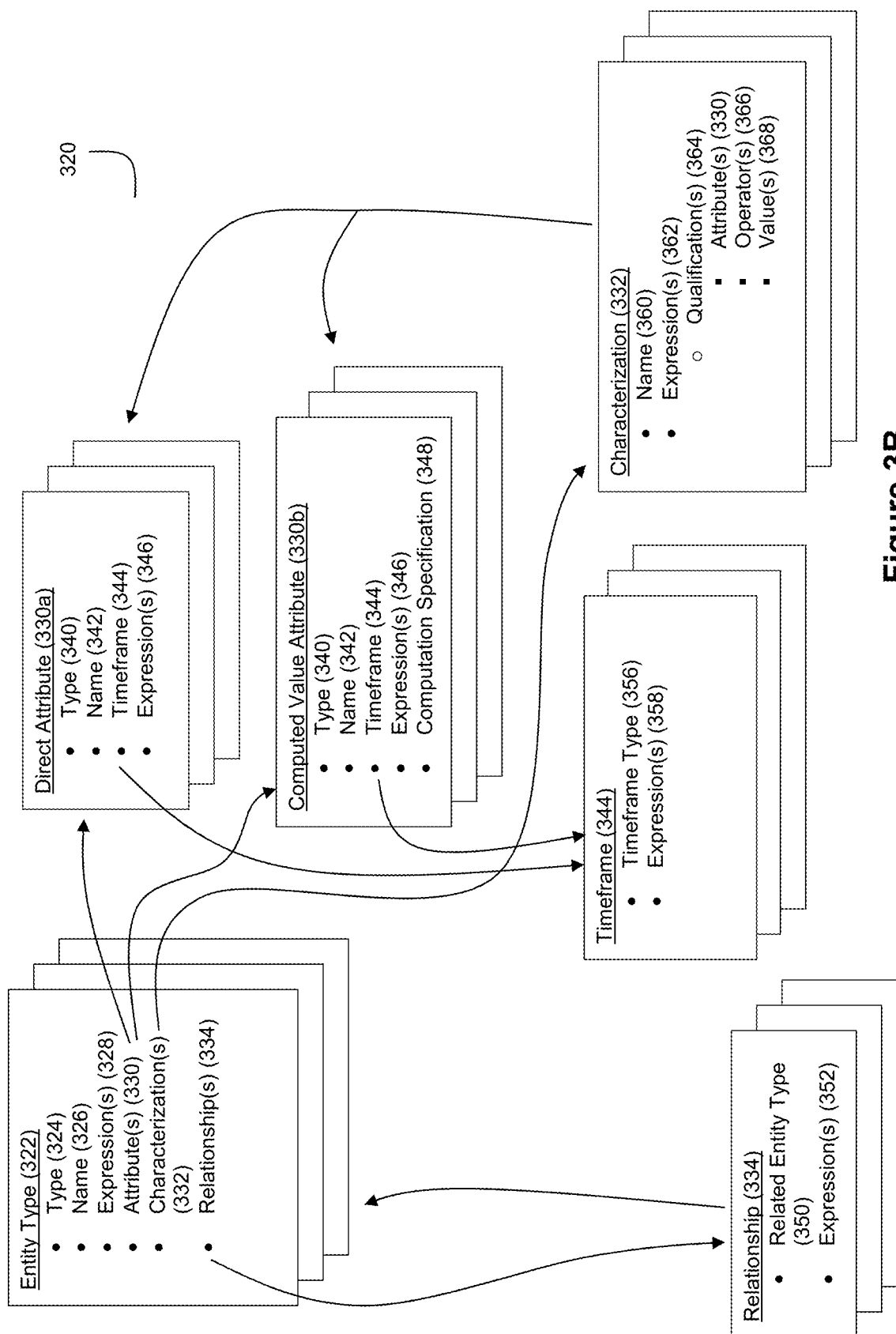
FIG. 3B depicts an example ontology.

Ontology Data Structure:

FIG. 3B depicts an example structure for ontology 320. The ontology 320 may comprise one or more entity types 322. Each entity type 322 is a data structure associated with an entity type and comprises data that describes the associated entity type. An example of an entity type 322 would be a "salesperson" or a "city". Each entity type 322 comprises metadata that describes the subject entity type such as a type 324 (to identify whether the subject entity type is, e.g., a person, place or thing) and a name 326 (e.g., "salesperson", "city", etc.). Each entity type 322 also comprises one or more attributes 330. For example, an attribute 330 of a "salesperson" might be the "sales" achieved by a salesperson. Additional attributes of a salesperson might be the salesperson's gender and sales territory.

Attributes 330 can be represented by their own data structures within the ontology and can take the form of a direct attribute 330a and a computed value attribute 330b. A direct attribute 330a is an attribute of an entity type that can be found directly within a data set (e.g., for a data set that comprises a table of salespeople within a company where the salespeople are identified in rows and where the columns comprise data values for information such as the sales and sales territory for each salesperson, the attribute "sales" would be a direct attribute of the salesperson entity type because sales data values can be found directly within the data set). A computed value attribute 330b is an attribute of an entity type that is derived in some fashion from the data set. Continuing with the example above, a direct attribute for the salesperson entity type might be a percentage of the company's overall sales that were made by the salesperson. This information is not directly present in the data set but instead is computed from data within the data set (e.g., by summing the sales for all salespeople in the table and computing the percentage of the overall sales made by an individual salesperson).

Both the direct attributes 330a and computed value attributes 330b can be associated with metadata such as a type 340 (e.g., currency, date, decimal, integer, percentage, string, etc.), and a name 342. However, computed value attributes 330b can also include metadata that specifies how the computed value attribute is computed (a computation specification 348). For example, if a computed value attribute 330b is an average value, the computation specification 348 can be a specification of the formula and parameters needed to compute this average value.

Each entity type 322 may also comprise one or more characterizations 332. For example, a characterization 332 of a "salesperson" might be a characterization of how well the salesperson has performed in terms of sales (e.g., a good performer, an average performer, a poor performer). Characterizations can be represented by their own data structures 332 within the ontology. A characterization 332 can include metadata such as a name 360 (e.g., sales performance). Also, each characterization 332 can include a specification of the qualifications 364 corresponding to the characterization. These qualifications 364 can specify one or more of the following: (1) one or more attributes 330 by which the characterization will be determined, (2) one or more operators 366 by which the characterization will be determined, and (3) one or more value(s) 368 by which the characterization will be determined. For example, a "good performer" characterization for a salesperson can be associated with a qualification that requires the sales for the salesperson to exceed a defined threshold. With such an example, the qualifications 364 can take the form of a specified attribute 330 of "sales", an operator 366 of "greater than", and a value 368 that equals the defined threshold (e.g., $100,000).

Each entity type 322 may also comprise one or more relationships 334. Relationships 334 are a way of identifying that a relationship exists between different entity types and defining how those different entity types relate to each other. Relationships can be represented by their own data structures 334 within the ontology. A relationship 334 can include metadata such as the related entity type 350 with respect to the subject entity type 322. For example, a "salesperson" entity type can have a relationship with a "company" entity type to reflect that the salesperson entity type belongs to a company entity type. The ontological objects (e.g., entity types 322, direct attributes 330a, computed value attributes 330b, characterizations 332, and relationships 334) may also comprise data that represents one or more expressions that can be used to control how the corresponding ontological objects are described in narrative text produced by the narrative generation system.

For example, the entity type 322 can be tied to one or more expressions 328. When the narrative generation process determines that the subject entity type needs to be described in narrative text, the system can access the expression(s) 328 associated with the subject entity type to determine how that entity type will be expressed in the narrative text. The expression(s) 328 can be a generic expression for the entity type 322 (e.g., the name 326 for the entity type, such as the name "salesperson" for a salesperson entity type), but it should be understood that the expression(s) 32 may also or alternatively include alternate generic names (e.g., "sales associate") and specific expressions. By way of example, a specific expression for the salesperson entity type might be the name of a salesperson. Thus, a narrative text that describes how well a specific salesperson performed can identify the salesperson by his or her name rather than the more general "salesperson". To accomplish this, the expression 328 for the salesperson can be specified indirectly via a reference to a data field in a data set (e.g., if the data set comprises a table that lists sales data for various sales people, the expression 328 can identify a column in the table that identifies each salesperson's name). The expression(s) 328 can also define how the subject entity type will be expressed when referring to the subject entity type as a singular noun, as a plural noun, and as a pronoun.

The expression(s) 346 for the direct attributes 330a and computed value attributes 330b can take a similar form as and operate in a manner similar to the expression(s) for the entity types 322; likewise for the expression(s) 362 tied to characterizations 332 (although it is expected that the expressions 362 will often include adjectives and/or adverbs in order to better express the characterization 332 corresponding to the subject entity type 322). The expression(s) 352 for relationships 334 can describe the nature of the relationship between the related entity types so that this relationship can be accurately expressed in narrative text if necessary. The expressions 352 can typically take forms such as "within" (e.g., a "city" entity type within a "state" entity type, "belongs to" (e.g., a "house" entity type that belongs to a "person" entity type, "is employed by" (a "salesperson" entity type who is employed by a "company" entity type), etc.

Figure 3C:
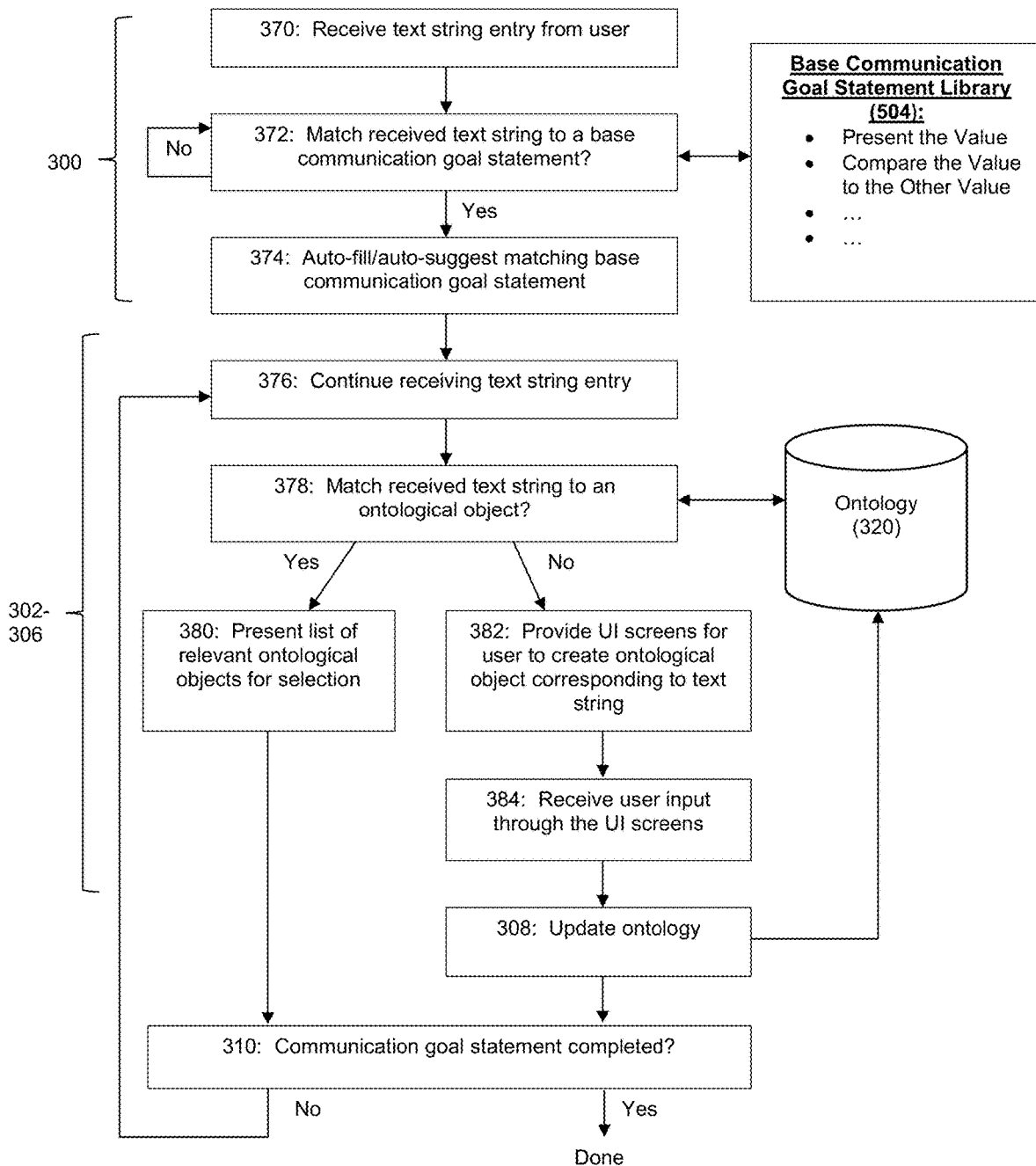
FIG. 3C depicts an example process flow for composing a communication goal statement while also building an ontology.

Another ontological object can be a timeframe 344. In the example of FIG. 3B, timeframes 344 can be tied to direct attributes 330a and/or computed value attributes 330b. A direct attribute 330a and/or a computed value attribute 330b can either be time-independent or time-dependent. A timeframe 344 can define the time-dependent nature of a time-dependent attribute. An example of a time-dependent attribute would be sales by a salesperson with respect to a data set that identifies each salesperson's sales during each month of the year. The timeframe 344 may comprise a timeframe type 356 (e.g., year, month, quarter, hour, etc.) and one or more expressions(s) 358 that control how the subject timeframe would be described in resultant narrative text. Thus, via the timeframe 344, a user can specify a timeframe parameter in a communication goal statement that can be used, in combination with the ontology 320, to define a specific subset of data within a data set for consideration. While the example of FIG. 3B shows timeframes 344 being tied to direct attributes 330a and computed value attributes 330b, it should be understood that a practitioner might choose to make timeframes 344 only attachable to direct attributes 330a. Also, a practitioner might choose to make timeframes 344 also applicable to other ontological objects, such as characterizations 332, entity types 322, and/or even relationships 334. As indicated in connection with FIG. 3A, users can create and update the ontology 320 while composing communication goal statements. An example embodiment for such an ability to simultaneously compose communication goal statements and build/update an ontology is shown by FIG. 3C. At step 370, the system receives a text string entry from a user (e.g., through a text entry box in a user interface (UI)). As indicated, this text entry can be a natural language text entry to facilitate ease of use by users. Alternative user interface models such as drag and drop graphical user interfaces or structured fill in the blank templates could also be used for this purpose.

At step 372, the processor attempts to match the received text string to a base communication goal statement that is a member of a base communication goal statement library 504 (see FIG. 4A). This matching process can be a character-based matching process where the processor seeks to find a match on an ongoing basis as the user types the text string. Thus, as a user types the string "Comp", the processor may be able to match the text entry to the "Compare the Value to the Other Value" base communication goal statement. Based on this matching, the system can auto-fill or auto-suggest a base communication goal statement that matches up with the received text entry (step 374). At this point, the system can use the base communication goal statement as a framework for guiding the user to complete the parameterization of the communication goal statement.

At step 376, the system continues to receive text string entry from the user. At step 378, the processor attempts to match the text string entry to an object in ontology 320. Is there is a match (or multiple matches), the system can present a list of matching ontological objects for user selection (step 380). In this fashion, the system can guide the user to define parameters for the communication goal statement in terms of objects known within ontology 320. However, if the text string does not match any ontological objects, the system can provide the user with an ability to create a new object for inclusion in the ontology (steps 382-384). At step 382, the system provides the user with one or more UIs through which the user creates object(s) for inclusion in ontology 320 (e.g., defining an entity type, attribute, characterization, relationship, and/or timeframe). At step 384, the system receives the user input through the UI(s) that define the ontological objects. The ontology can thus be updated at step 308 in view of the text string entered by a user that defines a parameter for the communication goal statement.

If step 310 results in a determination that the communication goal statement has not been completed, the process flow returns to step 376 as the user continues entering text. Otherwise, the process flow concludes after step 310 if the communication goal statement has been fully parameterized (see FIG. 4B for examples of parameterized communication goal statements).

Figure 3D:
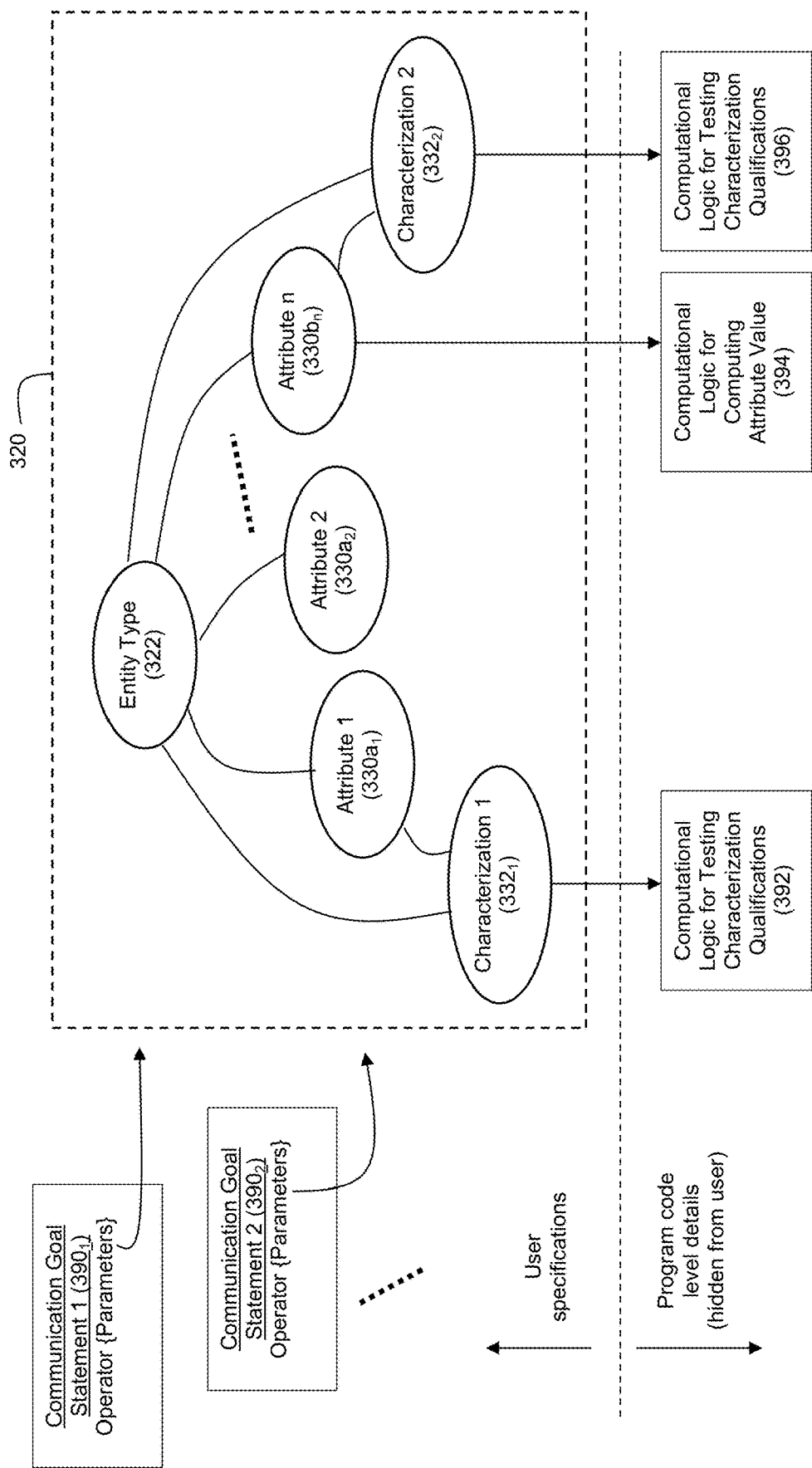
FIG. 3D depict an example of how communication goal statements can relate to an ontology and program code for execution by a process as part of a narrative generation process.

Through the use of composable communication goal statements and ontology 320, example embodiments are capable of generating a robust array of narrative stories about data sets that satisfy flexibly-defined communication goals without requiring a user to directly author any program code. That is, a user need not have any knowledge of programming languages and does not need to write any executable code (such as source code) in order to control how the narrative generation platform automatically generates narrative stories about data sets. To the extent that any program code is manipulated as a result of the user's actions, such manipulation is done indirectly as a result of the user's higher level compositions and selections through a front end presentation layer that are distinct from authoring or directly editing program code. Communication goal statements can be composed via an interface that presents them in natural language as disclosed herein, and ontologies can similarly be created using intuitive user interfaces that do not require direct code writing. FIG. 3D illustrates this aspect of the innovative design. In an example embodiment, communication goal statements 390 (e.g., 3901 and 3902) are composed by a user using an interface that presents the base goal elements as natural language text where one or more words represent the goal operators and one or more words serve to represent the parameters as discussed above. These parameters, in turn, map into ontology 320 and thus provide the constraints necessary for the narrative generation platform to appropriately determine how to analyze a data set and generate the desired narrative text about the data set (described in greater detail below). Hidden from the user are code-level details. For example, a computed value attribute (such as $330b_n$) is associated with parameterized computational logic 394 that will be executed to compute its corresponding computed value attribute. Thus, if the computed value attribute $330b_n$ is an average value of a set of data values, the computational logic 394 can be configured to (1) receive a specification of the data values as input parameters, (2) apply these data values to a programmed formula that computes an average value, and (3) return the computed average value as the average value attribute for use by the narrative generation platform. As another example, computational logic 392 and 396 can be configured to test qualifications for corresponding characterizations $332_1$ and $332_2$ respectively. The data needed to test the defined qualifications can be passed into the computational logic as input parameters, and the computational logic can perform the defined qualification tests and return an identification of the determined characterization for use by the narrative generation platform. Similar computational logic structures can leverage parameterization and the ontology 320 to perform other computations that are needed by the narrative generation platform.

The inventors also disclose that the ontology 320 can be re-used and shared to generate narrative stories for a wide array of users. For example, an ontology 320 can be built that supports generation of narrative stories about the performance of retail businesses. This ontology can be re-used and shared with multiple users (e.g., users who may have a need to generate performance reports for different retail businesses). Accordingly, as ontologies 320 are created for different domains, the inventors envision that technical value exists in maintaining a library of ontologies 320 that can be selectively used, re-used, and shared by multiple parties across several domains to support robust narrative story generation in accordance with user-defined communication goals.

Figure 5:
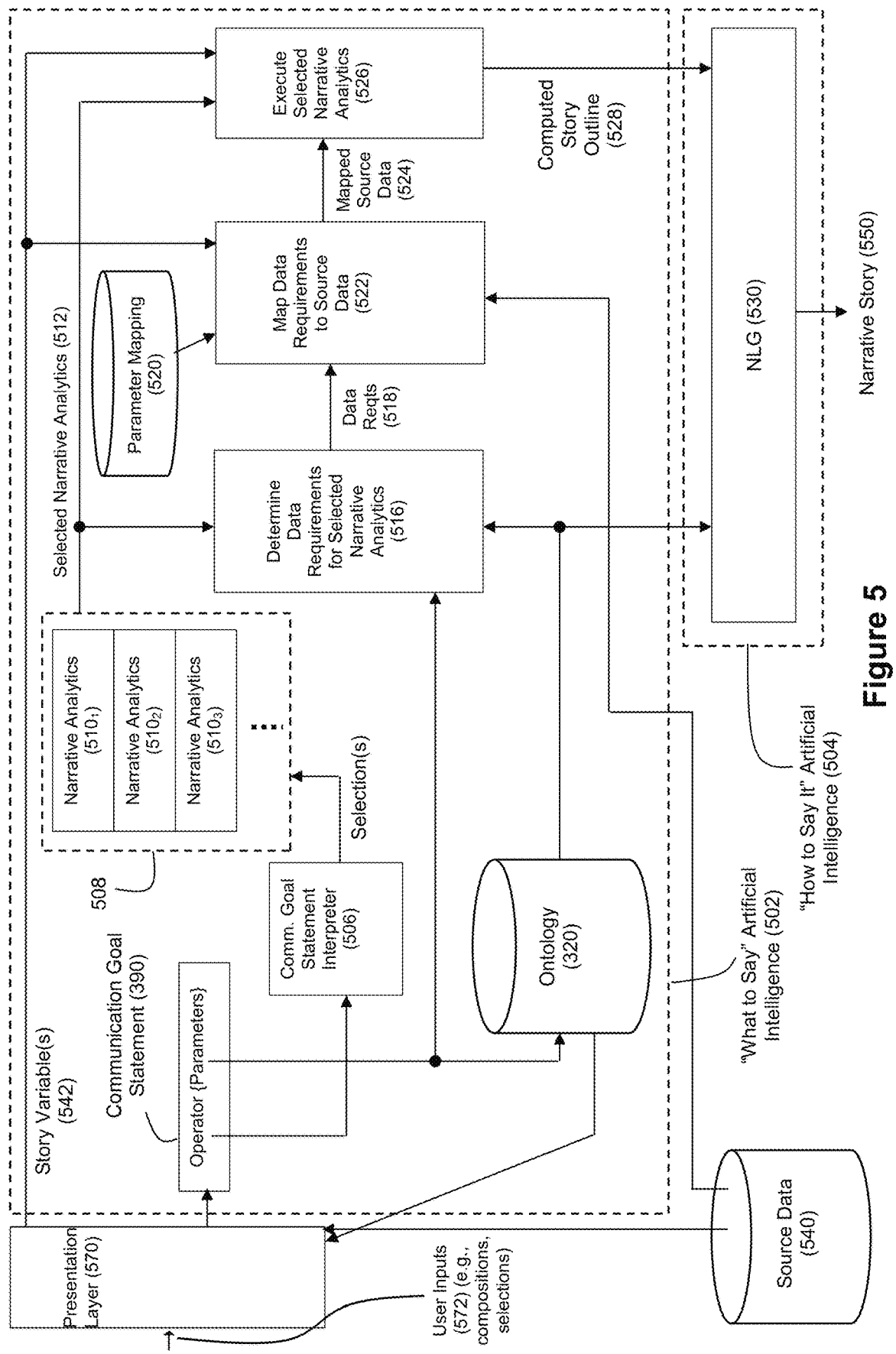
FIG. 5 depicts a narrative generation platform in accordance with an example embodiment.

Example Narrative Generation Architecture Using Composed Communication Goal Statements:

FIG. 5 depicts a narrative generation platform in accordance with an example embodiment. An example embodiment of the narrative generation platform can include two artificial intelligence (AI) components. A first AI component 502 can be configured to determine the content that should be expressed in a narrative story based on a communication goal statement (which can be referred to as "what to say" AI 502). A second AI component 504 can be configured to perform natural language generation (NLG) on the output of the first AI component 502 to produce the narrative story that satisfies the communication goal statement (where the AI component 504 can be referred to as "how to say it" AI 504).

Figure 15:
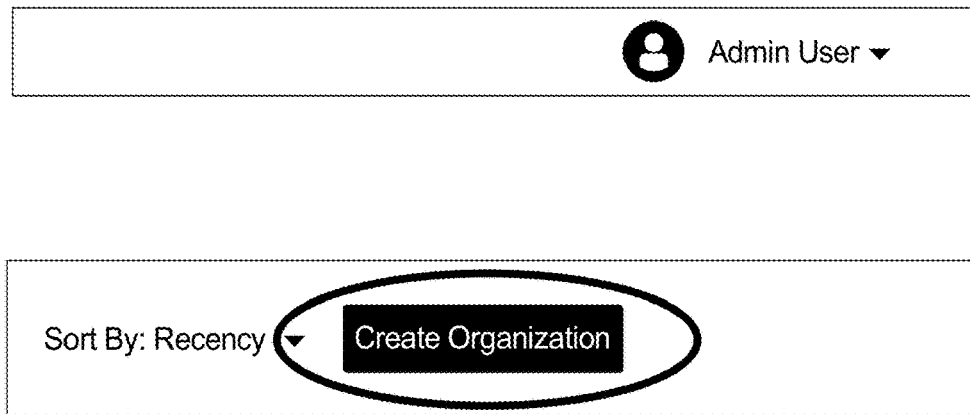
FIGS. 15-286 illustrate example user interfaces for using an example embodiment to support narrative generation through composable communication goal statements and ontologies.
Figure 286:
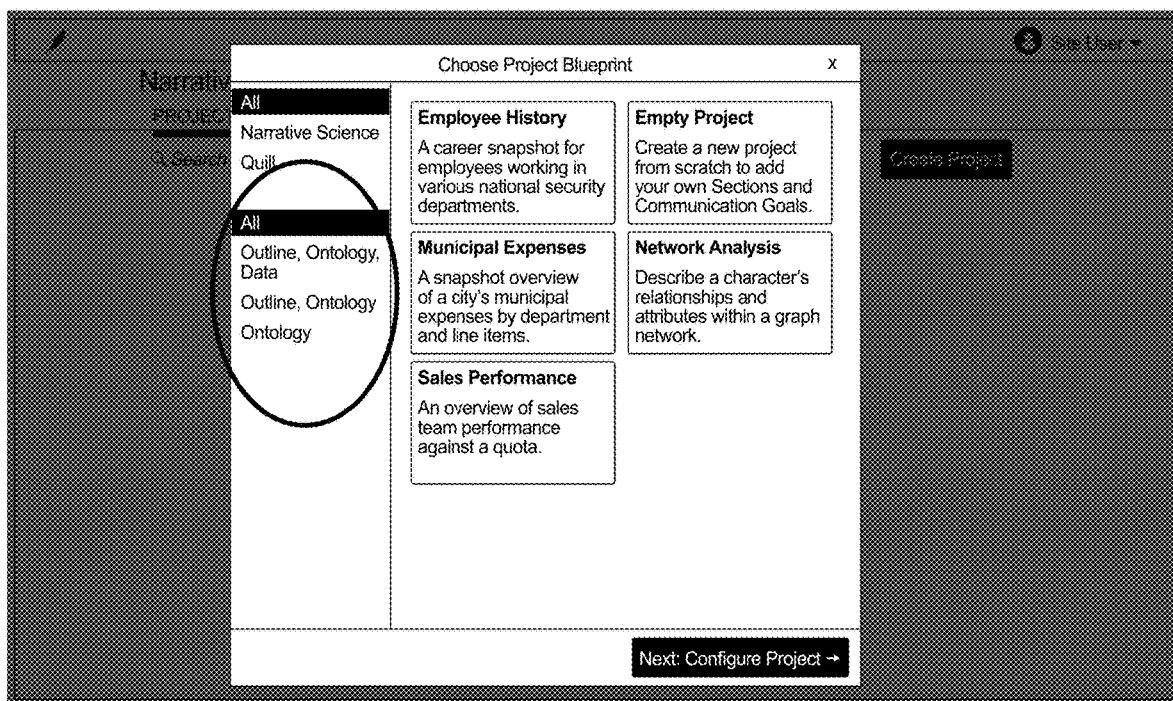

The platform can also include a front end presentation layer 570 through which user inputs 572 are received to define the composed communication goal statement 390. This presentation layer 570 can be configured to allow user composition of the communication goal statement 390 using natural language inputs. As mentioned herein, it can also employ structured menus and/or drag/drop features for selecting elements of a communication goal statement. Examples of various user interfaces that can be used by the presentation layer 570 are shown in FIGS. 15-286 and further described in Appendix A. As can be seen from these sample UIs, the presentation layer 570 can also leverage the ontology 320 and source data 540 to facilitate its user interactions.

The "what to say" AI 502 can be comprised of computer-executable code resident on a non-transitory computer-readable storage medium such as computer memory. The computer memory may be distributed across multiple memory devices. One or more processors execute the computer code in cooperation with the computer memory. AI 502 operates on a composed communication goal statement 390 and ontology 320 to generate a computed story outline 528.

AI 502 includes a communication goal statement interpreter 506, which is configured to process and interpret the communication goal statement 390 to select a set of narrative analytics that are to be used to analyze a data set about which the narrative story will be generated. The computer memory may include a library 508 of narrative analytics 510 (e.g., 510₁, 510₂, 510₃, . . . ). The narrative analytics 510 may take the form of parameterized computer code that performs analytical operations on the data set in order to facilitate a determination as to what content should be included in the narrative story so that the communication goal(s) corresponding to the communication goal statement 390 are satisfied. Examples of narrative analytics 510 can be the computational logic 392, 394, and 396 shown in FIG. 3D.

AI 502 can maintain a mapping that associates the various operators that may be present in communication goal statements (e.g., "Present", "Compare", etc.) to a sequence or set of narrative analytics that are to be performed on data in order to support the data analysis needed by the platform to generate narrative stories that satisfy the communication goal statement 390. Thus, the "Compare" operator can be associated with a set of narrative analytics that do simple difference (a−b), absolute difference (abs(a−b)), or percent difference ((b−a)/b). In an example embodiment, the mapping can also be based on the parameters that are included in the communication goal statement 390. The mapping can take the form of a data structure (such as a table) that associates operators (and possibly also parameters) with sets of narrative analytics 510 from library 508. Interpreter 506 can then read and interpret the communication goal statement 390 to identify the operator included in the communication goal statement, access the mapping data structure to map the identified operator to its corresponding set of narrative analytics 510, and select the mapped narrative analytics. These selected narrative analytics 512 in turn drive downstream operations in AI 502.

AI 502 can also include computer code 516 that is configured to determine the data requirements that are needed by system to generate a narrative story in view of the selected narrative analytics 512 and the parameters that are included in the communication goal statement 390. This code 516 can walk through the selected narrative analytics 512, the communication goal statement 390, and ontology 320 to identify any parameters and data values that are needed during execution of the selected narrative analytics 512. For example, the communication goal statement 390 may include parameters that recite a characterization of an entity. Computer code 390 can identify this characterization in the communication goal statement and access the ontology 320 to identify the data needed to evaluate the characterization of the subject entity such as the attribute(s) 330 and value(s) 368 needed for the subject characterization 332 in ontology 320. The ontology 320 can then be further parsed to determine the data requirements for the subject attribute(s) needed by the subject characterization 332, and so on until all data requirements for the communication goal statement 390 and selected narrative analytics 512 are determined. This ultimately yields a set of data requirements 518 that define the data needed by AI 502 in order to support the data analysis used to determine the content to be expressed in the narrative story. In situations where the input to AI 502 comprises multiple communication goal statements 390 in a story outline, code 516 can be configured to walk through the outline to assemble a list of the data requirements for all of the communication goal statements in the outline.

Once the data requirements 518 have been determined, the AI 502 can execute computer code 522 that maps those data requirements 522 to source data 540. (This can be done either in a "batch" model wherein all the data requirements are determined first, and the code to map those to source data is executed; or it can be done individually for each data requirement either as needed or as the other information necessary to make the determination becomes available.) The source data 540 serves as the data set from which the narrative story will be generated. Source data 540 can take the form of data in a database, data in spreadsheet files, or other structured data accessible to AI 502. Computer code 522 can use a data structure 520 (such as a table) that associates parameters from the data requirements to parameters in the source data to perform this mapping. For example, consider a scenario where the communication goal statement is "Present the Sales of the Salesperson". The data requirements 518 for this communication goal statement may include a parameter that corresponds to the "sales" attribute of a salesperson. The source data 540 may include a data table where a column labeled as "Amount Sold ($)" identifies the sales amount for each salesperson in a company. The parameter mapping data structure 520 can associate the "Sales" parameter from the data requirements 518 to the "Amount Sold ($)" column in the source data 540 so that AI 502 accesses the proper data. This parameter mapping data structure 520 can be defined by an author when setting up the system, as discussed hereinafter. The output of computer code 522 can be a set of mapped source data 524 for use by the selected narrative analytics 512.

Computer code 522 can also map data requirements to source data using story variable(s) 542. For example, the communication goal statement 390 might be "Compare the Sales of Salesperson "John Smith" to the Benchmark of the Salesperson". The mapped source data 524 can identify where in the source data the sales and benchmark for salespeople can be found. If the source data 540 includes sales data for multiple salespeople (e.g., rows in a data table correspond to different sales people while columns in the data table correspond to sales amounts and benchmarks for salespeople), the selection of a particular salesperson can be left as a story variable 542 such that the parameter mapping data structure 520 does not identify which specific row to use as the salesperson and instead identifies the salesperson data requirement as a story variable. When a user composes the communication goal statement such that "John Smith" is expressed in the statement where the salesperson parameter is located, the computer code 522 can use "John Smith" in the communication goal statement 390 as the story variable 542 that governs the selection of which row of source data 540 should be used. Similarly, the benchmark parameter might be expressed as a story variable 542. For example, the source data 540 may not include a benchmark field, but the composed communication goal statement might express a number to be used as the benchmark. In such a situation, this number could be a story variable 542 used by the system.

FIGS. 34 and 213-225 described below with reference to Appendix A, depict example GUIs through which a user can map the determined data requirements for a story outline to source data and story variables. These GUIs can be configured to list each data requirement in association with a user input mechanism through which the user can identify where in the source data a data requirement can be found (and whether a data requirement is to be parameterized as a story variable). As explained in Appendix A with respect to an example embodiment, the source data can take a number of forms, such as tabular data and document-based data, and the data requirements GUIs can be configured to accommodate both types. FIGS. 226-243 and their supporting description in Appendix A, further describe how source data can be managed in an example embodiment of the system.

AI 502 can also include computer code 526 that executes the selected narrative analytics 512 using the mapped source data 524 (and potentially any story variable(s) 542) to produce a computed story outline 528. The narrative analytics 512 specifies at least four components: the input parameters (e.g., an entity to be ranked, a metric it is to be ranked by, and a group in which it is to be ranked); the code that will execute the narrative analytics (i.e., that will determine the rank of the entity in the group according to the metric); the output parameters (i.e., the rank of the entity); and a statement form containing the appropriate input and output parameters that will form the appropriate statement for inclusion in the computed outline (in this case, rank (entity, metric, group, rankvalue)). The communication goal statement 390 can be associated with a general story outline that provides the basic structure for the narrative story to be generated. However, this general story outline will not be populated with any specific data—only general identifications of parameters. Through execution of the selected narrative analytics by computer code 526, this general story outline can be populated with specific data in the form of the computed story outline 528. For example, continuing with an example from above where the communication goal statement 390 is "Compare the Sales of Salesperson "John Smith" to the Benchmark of the Salesperson", the selected narrative analytics may include parameterized code that computes data indicative of the difference between John Smith's sales amount and the benchmark in both absolute terms (e.g., performing a subtraction between the sales amount and the benchmark) and as a percentage (e.g., dividing the subtracted difference by the benchmark and multiplying by 100). Code 526 executes these narrative analytics to compute data values for use in the story outline. These data values are then embedded as values for the parameters in the appropriate statement forms associated with the narrative analytics to produce statements for inclusion in the computed outline. The statement will be included in the computed outline as a new element of the section containing the communication goal for which it was computed, under the node representing that communication goal. Code 526 will progress through the execution of the selected narrative analytics using mapped source data 524 and story variable(s) 542 (if any) until all elements of the story outline have been populated with statements. Also associated with communication goals are characterizations that serve to express a characterization or editorialization of the facts reported in the statements in a manner that may have more narrative impact that just a reporting of the facts themselves. For example, rather than saying that an entity is ranked first, we might say that it is the best. (In another approach, these might be associated with sections rather than communication goals.) The characterizations associated with each communication goal are assessed with respect to the statements generated by the narrative analytics in response to that goal. This results in generating additional propositions or statements corresponding to those characterizations for inclusion in the computed outline in those cases when the conditions for those characterizations are met by the input statements. The characterizations are also linked to the statements which they characterize. The result of this process is a computed story outline 528 that serves to identify the content that is to be expressed in the narrative story.

The "how to say it" AI 504 can be comprised of computer-executable code resident on a non-transitory computer-readable storage medium such as computer memory. The computer memory may be distributed across multiple memory devices. One or more processors execute the computer code in cooperation with the computer memory. AI 504 employs NLG logic 530 to generate a narrative story 550 from the computed story outline 528 and ontology 320. As indicated above, objects in ontology 320 can be associated with expressions (e.g., expressions 328, 346, 352, 358, and 362) that can be used by NLG 530 to facilitate decision-making regarding the appropriate manner of expressing the content in the computed story outline 528. Thus, NLG 530 can access the ontology 320 when forming sentences from the computed story outline 528 for use in the narrative story 550. Example embodiments of NLG 530 are discussed below with reference to FIGS. 6D and 8A-H.

Once again, by leveraging predefined sets of parameterized narrative analytics 510, AI 502 is able to shield the low level program coding from users so that a user need only focus on composing communication goal statements 390 in a natural language in order to determine the content that is to be included in a narrative story. Further still, AI 504 also operates transparently to users so that a narrative story 550 can be generated from a composed communication goal statement 390 without requiring the user to directly write or edit program code.

Example Platform Operation

Figure 6A:
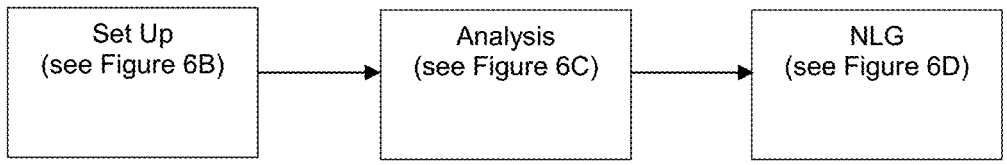
FIGS. 6A-D depict a high level view of an example embodiment of a platform in accordance with the design of FIG. 5.
Figure 6B:
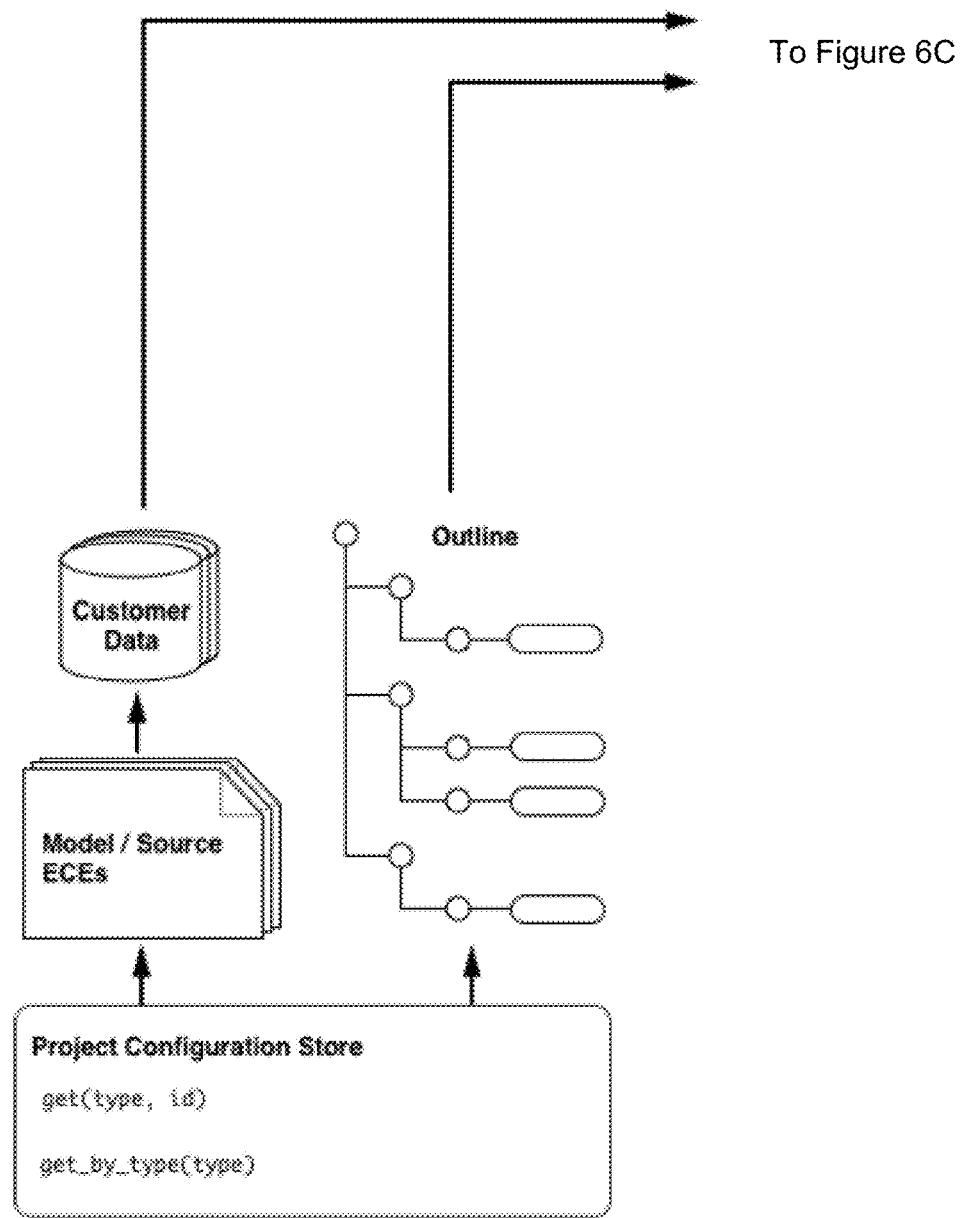
Figure 6C:
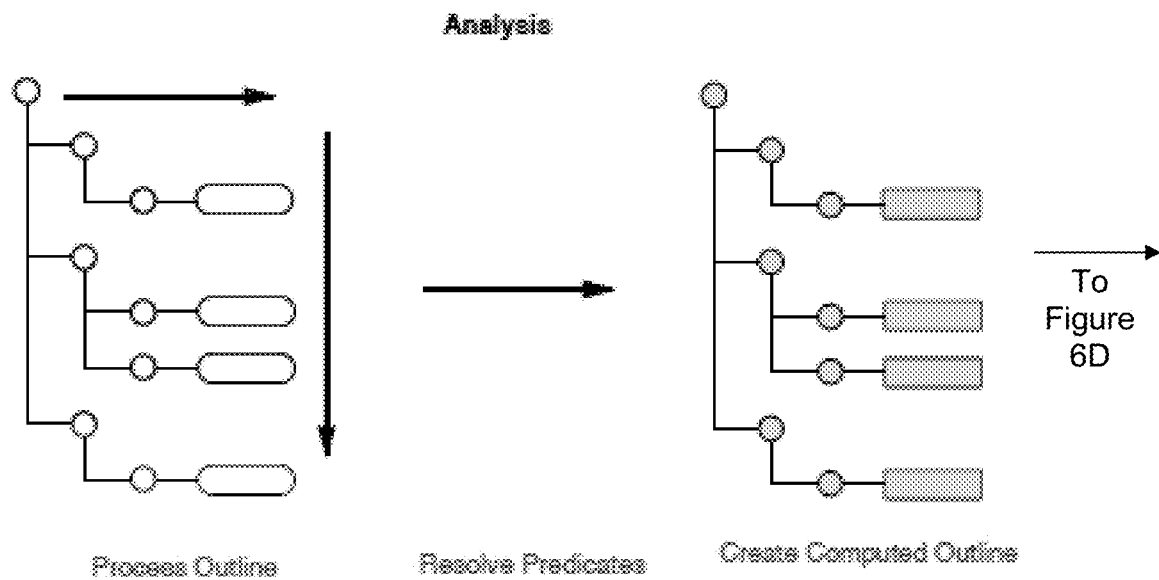
Figure 6D:
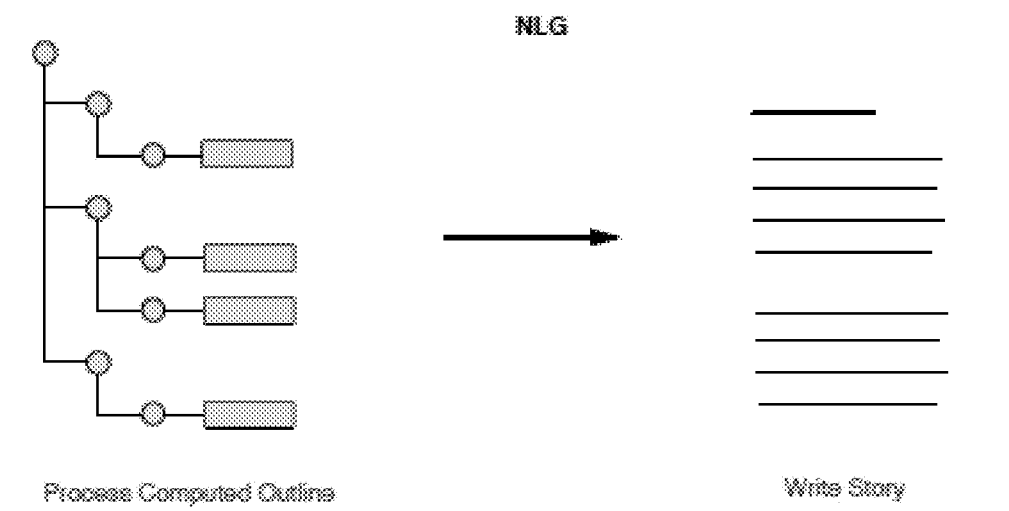

FIG. 6A depicts a high level view of an example embodiment of a platform in accordance with the design of FIG. 5. The narrative generation can proceed through three basic stages: setup (an example of which is shown by FIG. 6B), analysis (an example of which is shown by FIG. 6C), and NLG (an example of which is shown by FIG. 6D). The operation of the FIG. 6A embodiment can be described in the context of a simple example where the project has an outline with a single section and a single communication goal statement in that section. The communication goal statement can be "Present the sales of the salesperson". In this example, "salesperson" is an entity type in the ontology and it has an attribute of "sales". Also, the project has a single data view backed by a static file that contains the names and sales data for the salespeople.

During setup, the system loads the story configuration from a configuration store. The configuration store is a database where configurations are maintained in persistent form, managed, and versioned. The configuration for a story includes items representing the outline (sections, communication goals, and their components), the ontology (entity types, relationships, timeframe types), and data connectors (sources, data mappings). Once the configuration for the story is loaded into memory, the story outline is constructed, as shown in FIG. 6B. The story outline is a hierarchical organization of sections and communication goals (see FIG. 2). At this time, along with constructing the story outline, the connectors to the data sources are initialized. These will be used as needed during the story generation process to access the necessary data required by the narrative analytics specified in the outline. Specifically how this is accomplished can depend on whether the data is passed in via an API, in a static file managed by the system, or via a connection to a database.

Once the setup phase is complete, the outline can be used to govern the generation of a story. This is accomplished by traversing the outline and executing the analytics associated with each communication goal statement; and the results serve to parameterize the associated statement forms of the communication goal in order to generate the facts of the story (see FIG. 6C). These facts are then organized into the computed outline as described above.

When this generation process is invoked by a client, e.g., via an API request, the client provides certain values for parameters of the configuration. In this instance, for example, the story is about the sales of some particular salesperson. So the client may need to provide a unique identifier for the specific salesperson which can be interpreted via the mapping provided between parameters of the story outline and the data source to be used.

Figure 7:
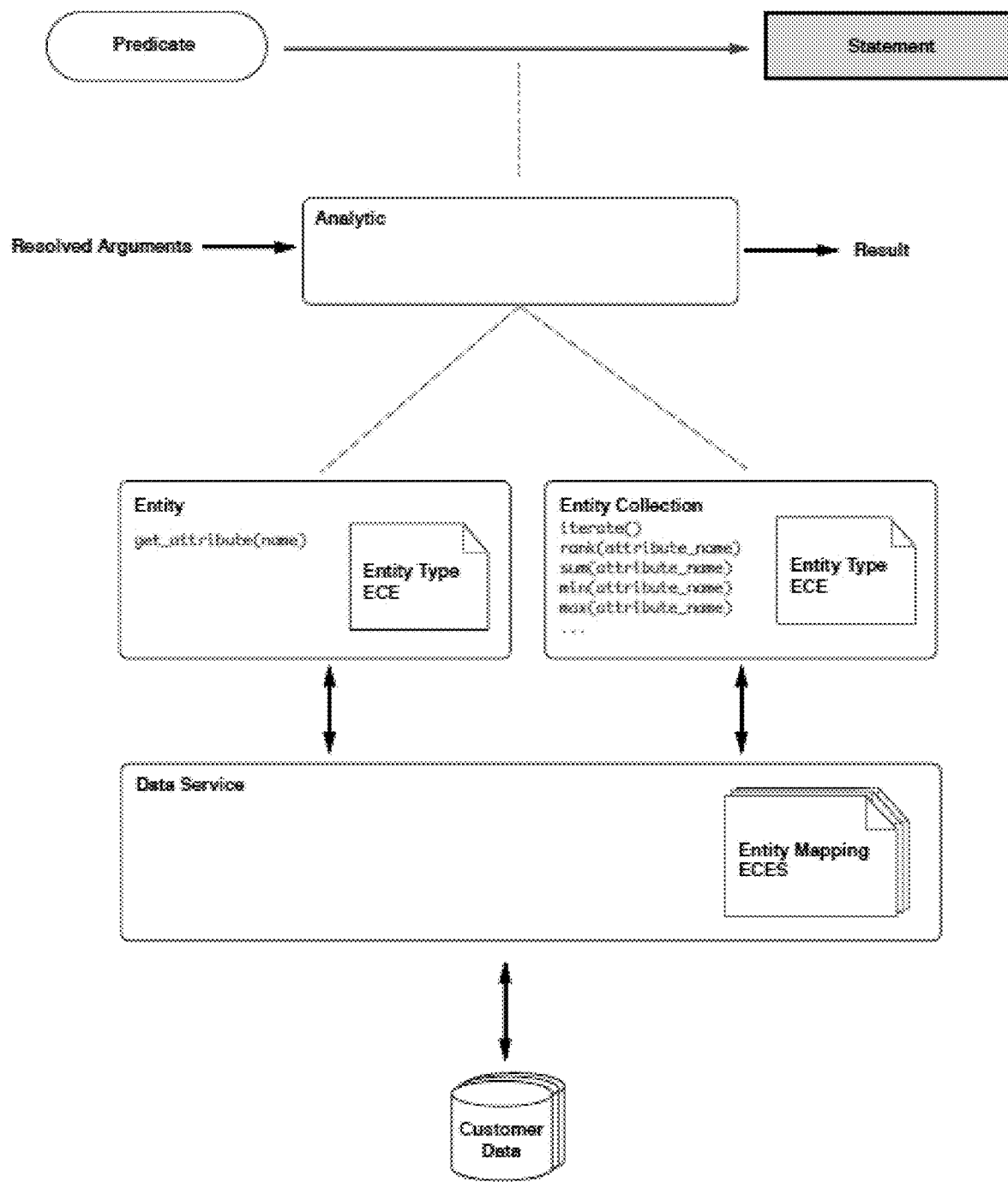
FIG. 7 depicts an example embodiment of an analysis component of FIG. 6C.

As shown by FIG. 7, the narrative analytics can access source/customer data through Entity and Entity Collection objects. These objects provide an interface based on the project ontology 320 and hide the source of the data from other components. These objects can use Entity Types, mappings from relevant Attributes of the Entity Types to data sources and specifiers (e.g., columns or column names in tables or databases, or keypaths in documents, etc.) as previously specified by the user during configuration, and data interfaces to access the actual relevant data. Some computations that comprise aspects of the narrative analytics, such as sorting and certain aggregations, can be handled by the data stores themselves (e.g., as database operations). The specific Entity objects provide methods to invoke these external operations, such as parameterizable database queries.

Continuing with the example, the single communication goal statement in this case, "Present the Sales of the Salesperson", is made up of two base communication goal statements, composed together by embedding one inside the other. The top level statement is AttributeOfEntity (AttributeName, <Entity>), and its Entity parameter is satisfied by the embedded statement EntityById (Id). EntityById is resolved first. This is computed by retrieving the entity's ID as provided by the client when invoking the generation process, e.g., via an API request. EntityById creates an (internal) Entity object corresponding to the (external) ID and returns that Entity object as its result. This internal Entity object is a new Entity of the appropriate Entity Type as specified in the configuration and with appropriate attributes as determined by the entity data mapping, in this instance, since we are talking about a Salesperson, relevant attributes of the Salesperson in question such as his or her name, gender, sales, office—whatever in fact the configuration specifies be retrieved or computed. This result is in the form of the embedded communication goal statement, namely, EntityById (Id, <Entity>); it is then, in turn, passed into the top-level AttributeOfEntity statement along with the attribute name "sales". The AttributeOfEntity analytic comprises code that takes the entity object and returns the corresponding value for that attribute of the entity as its result. The analytic looks up where to get the attribute data based on the entity data mappings provided during configuration, and retrieves the specific relevant attribute data from the client's data. The results for both of these are wrapped up in statement forms to produce statements as described above, and these statements are then added to the Computed Outline. In this specific case, as mentioned above, the statements are composed by one being embedded inside the other. The resulting compound statement added to the Computed Outline in this instance, fully parameterized, would look something as follows: AttributeOfEntity ('Sales', EntityByID ('1234', Salesperson1234), 15000).

FIG. 6D shows a high level view of NLG being performed on a computed outline in order to generate a narrative story. FIGS. 8A-8H elaborate on this NLG process.

As shown by FIG. 8A, the NLG process starts with the Computed Outline. Each phase of the NLG process walks through the Computed Outline and processes each computed statement form individually. Some stages look across multiple statements at once (such as Model Muting (see FIG. 8B) and Entity Referencing (see FIG. 8F), described below.

The first phase, Model Generation, converts the compound statements in the computed outline into NLGModel graphs, as shown by FIG. 8A. Model graphs are similar to the compound statement structures, but are structured specifically for constructing sentences. For example, dependencies between nodes in the model graph will represent where dependent clauses should be placed on the sentence. An NLGModel provides a mechanism for generating sentences, phrases, and words needed to produce a story. There is model type for each concept that needs to be expressed from authoring mapping to each individual type of statement included in the computed outline. Examples include attributes, values, units, entities, relationships, rankings, filters, and comparisons. The models produced from the statements in the computed outline are organized into a graph based on how the ideas are related to each other. The shape of the graph provides a method for the NLG system to handle phrase muting, clause placement, anaphora, and connectives.

For example, the statement for AttributeOfEntity ('Sales EntityByID ('1234', Salesperson1234), 15000) is converted into a model graph where the root is an EntityModel representing the Salesperson1234. The EntityModel has a dependent AttributeModel representing the Sales attribute since Sales is an attribute of that entity. The attribute Sales has a value of 15000 so a ValueModel representing 15000 is added as a dependent to the AttributeModel. Finally, the ValueModel has a UnitModel representing the type of value. In this case it is 'dollars'. This model graph now provides the structure needed for the NLG system to construct a sentence for this statement. This was a simple example. The more complicated the statement, the more complicated the model graph will be. The system can also combine multiple statements into a single big model graph assuming they are related somehow, for example each of them are about the same entity. This then allows the system to then express multiple sets of ideas in a single sentence. If the model graph is too big, ie. there are too many ideas to express in one sentence, it is split up into reasonably sized subgraphs that make up individual sentences.

After a model graph has been generated for each node, adjacent nodes are compared with each other to mute redundant facts. This can be referred to as Model Muting, as shown by FIG. 8B. Model Muting reduces redundant information from being expressed across sentences. Since the working example has only a single goal, there is only one node involved, and there will be nothing to mute in this phase with respect to the example. Say though, the goal also had a timeframe associated with it so instead it was "Present the sales in the month of the Sales Person" and an adjacent goal was "Present the sales in the month of the top ranking Sales Person by sales". Without muting these goals would express as, "In August of 1993, Joe had sales of $15000. In August of 1993, Bob, the best seller, had sales of $430000". The timeframe "In August of 1993" is redundant between these two sentences and will be dropped in the second sentence resulting in language of "In August of 1993, Joe had sales of $15000. Bob, the best seller, had sales of $430000".

Figure 8C:
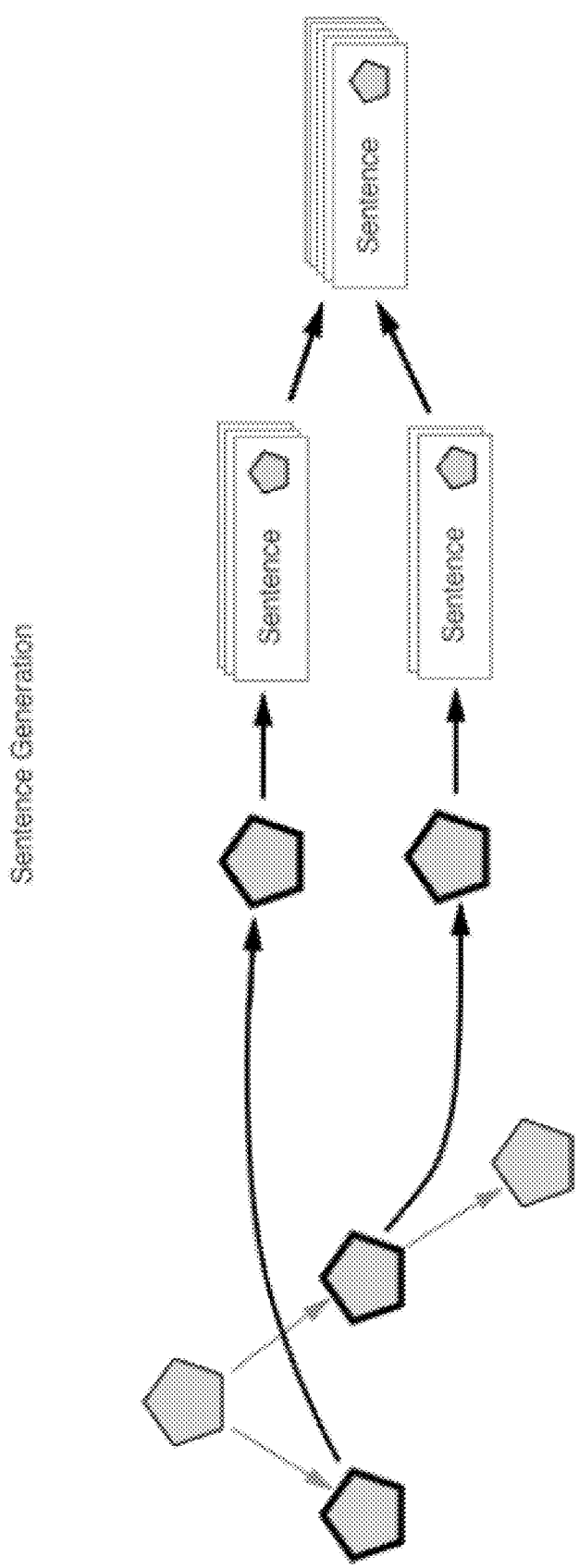
Figure 8D:
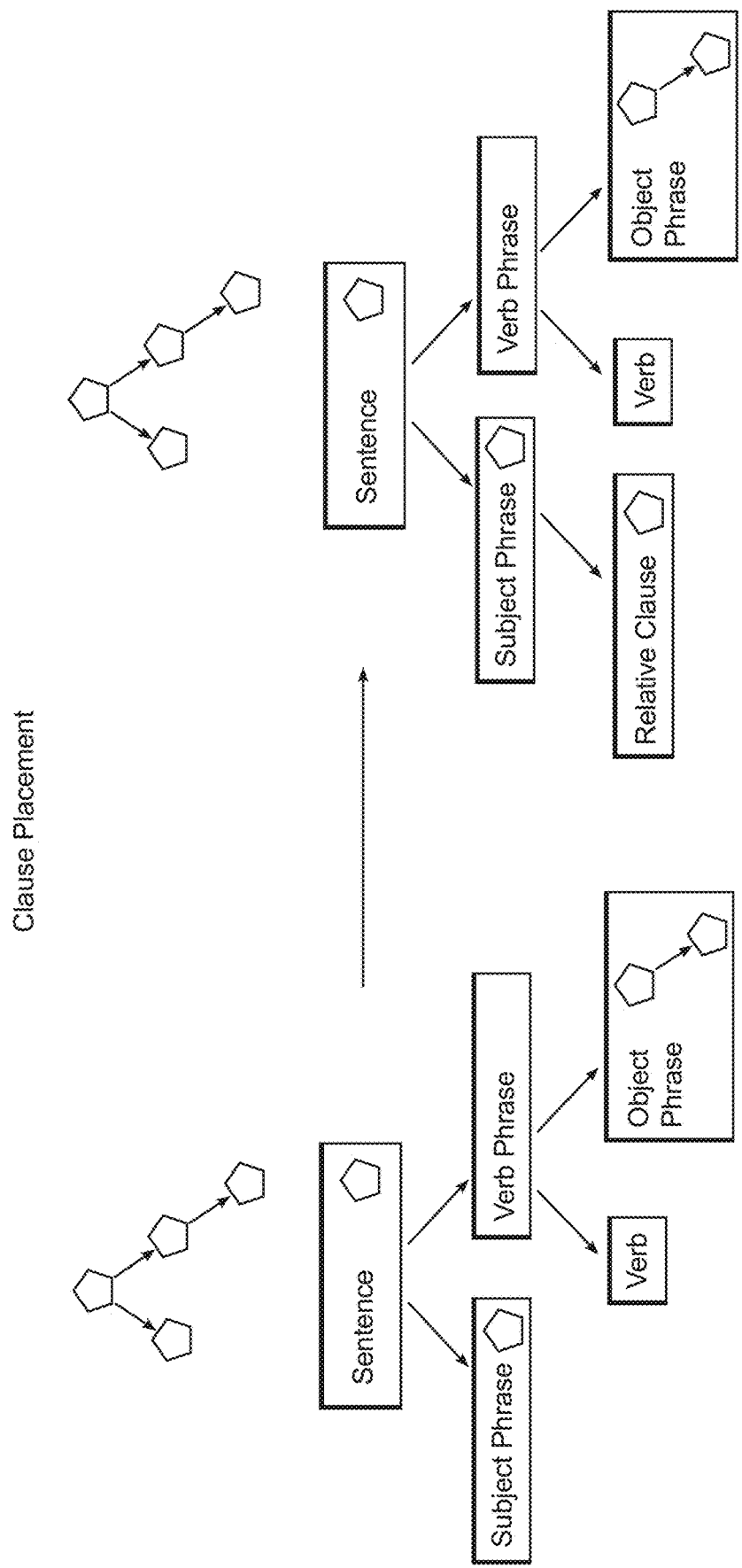
Figure 8F:
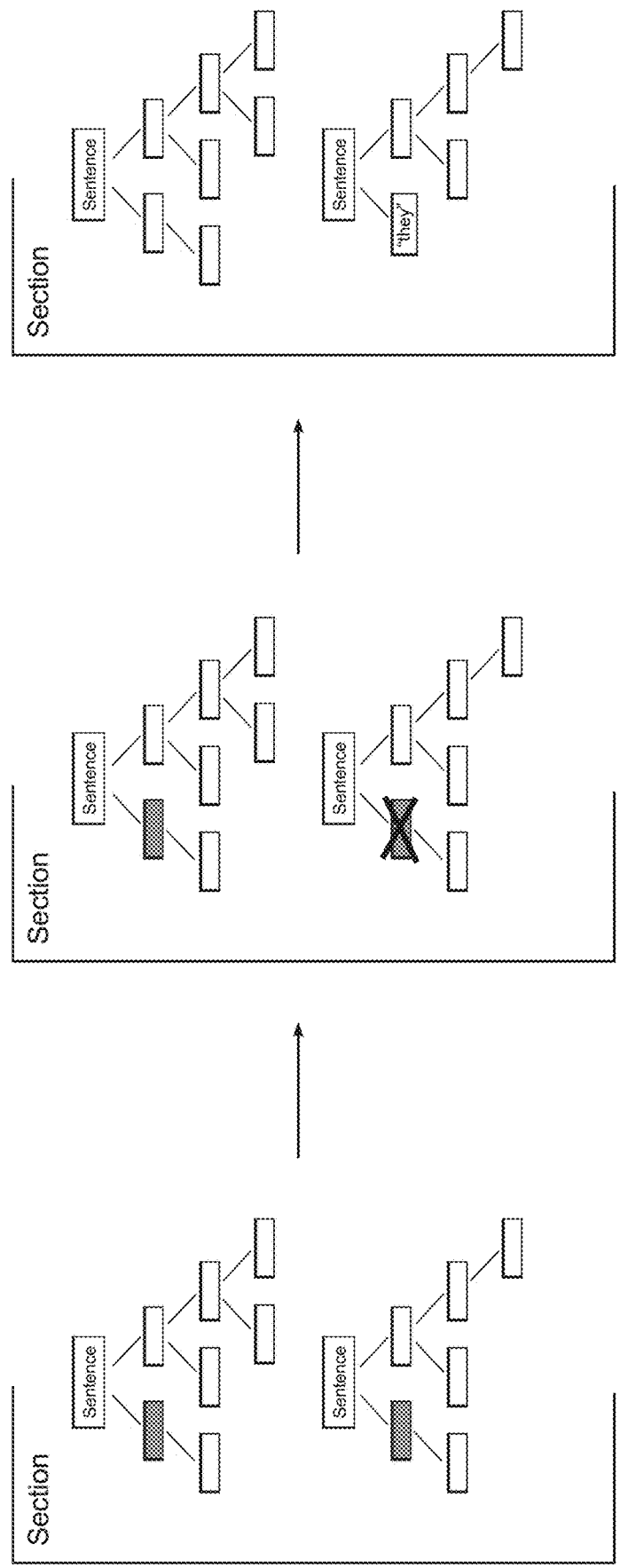
Figure 8G:
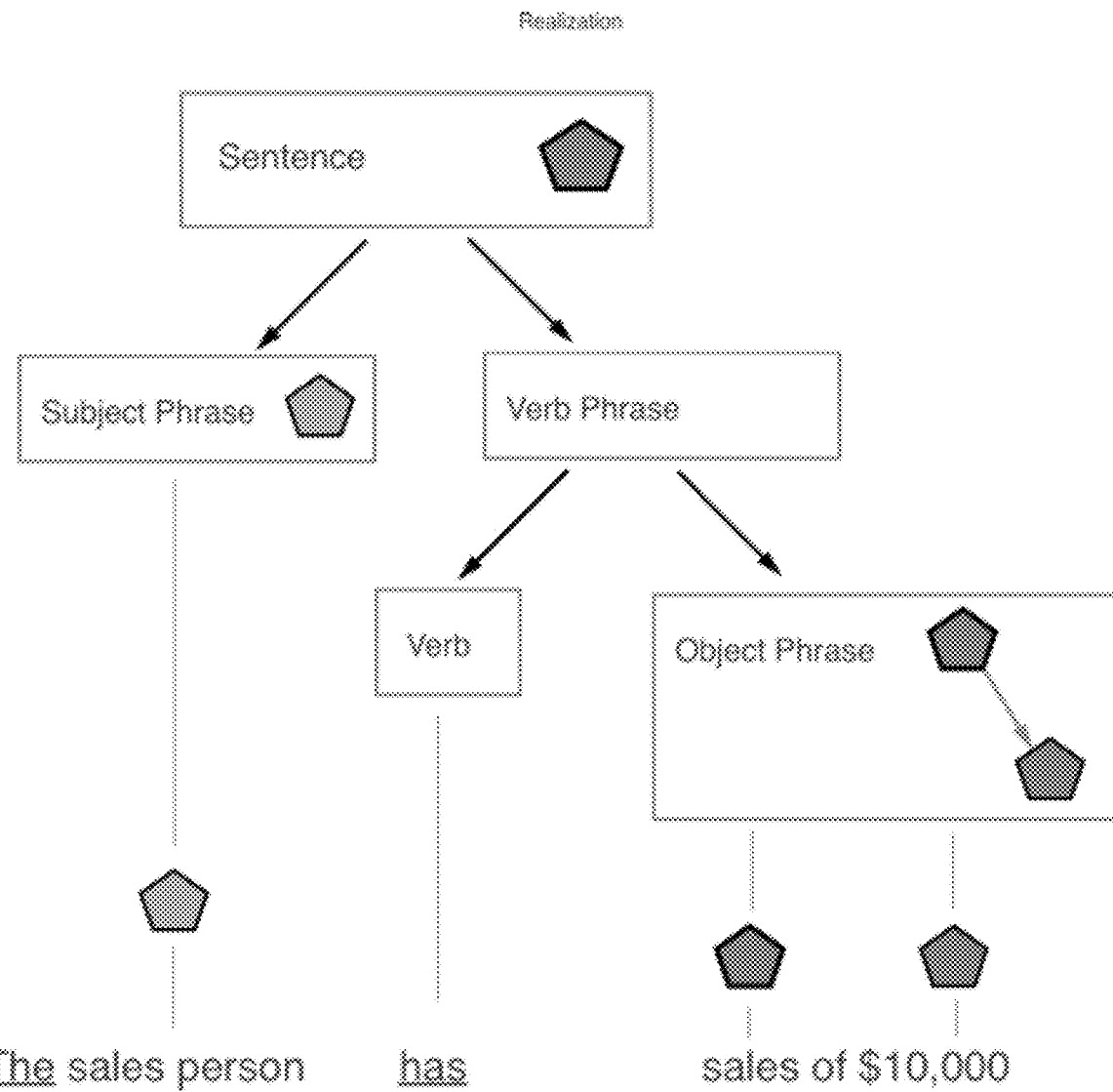
Figure 8H:
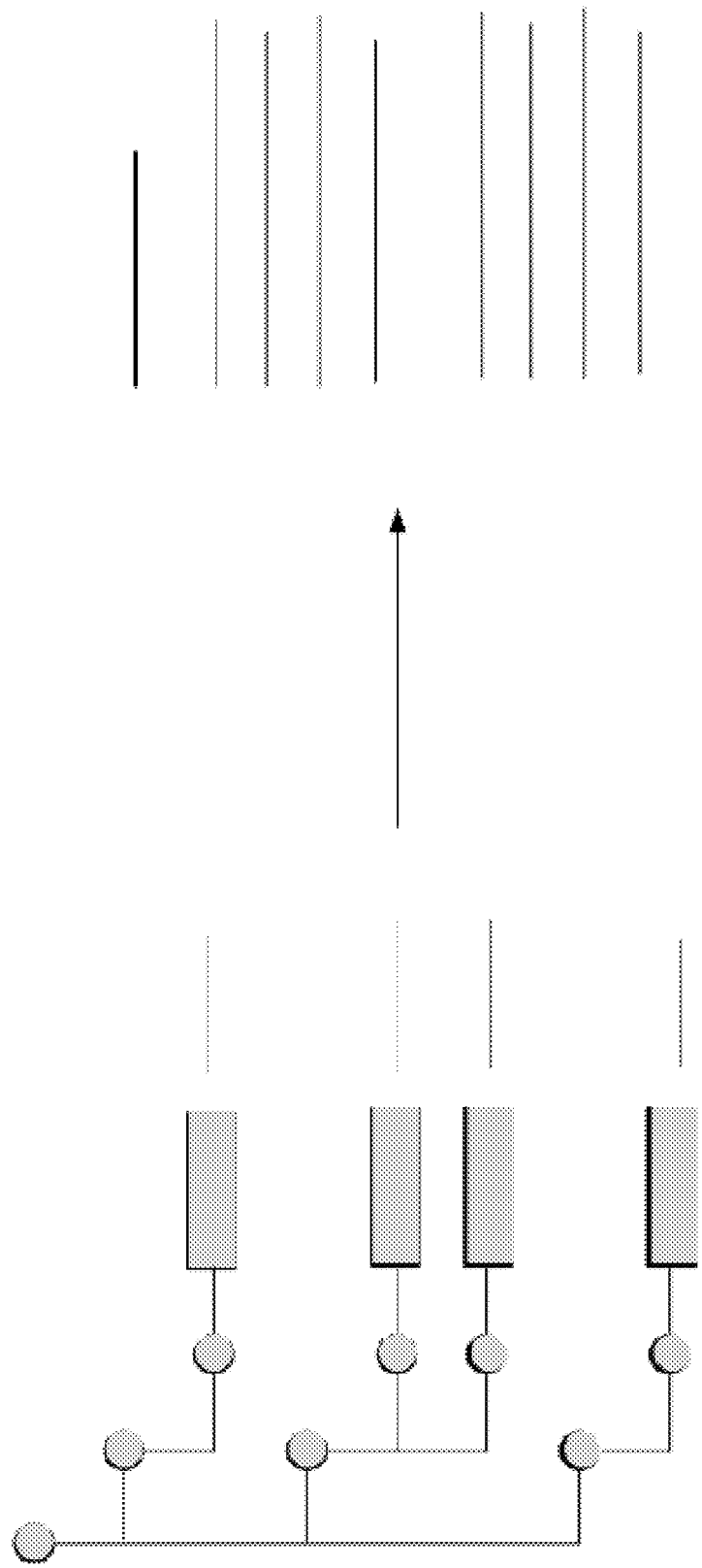

Next, sentences are generated based on each model graph during Sentence Generation as shown by FIG. 8C. The base of the sentence is generated first. It is the core subject/verb/object constituents of a sentence. Initially this will not have expressed all of the models in the graph (those will be added later as clauses). Not all models in the graph can generate base sentences, but multiple models can add to the set of possible sentences for a node. Sentences almost always come from preferences set by the user in the ontology 320 through things like attribute expressions, rank expressions, and/or relationship expressions. The sentences generated in this phase will be built upon, and later one of these sentences will be picked to be used in the narrative story.

Continuing with the working example, only the Attribute model can generate sentences for this model graph. It will generate them based on the attribute expressions configured by the user for "sales". Let's suppose the user configured three options: "the salesperson had sales of $100", "the salesperson sells $100", and "the salesperson's sales are $100". The Attribute model would generate three sentences, one for each of these options.

After the base sentences have been generated, the models not expressed in that base sentence are then expressed as clauses on the sentence. This can be referred to as Clause Placement (see FIG. 8D). Depending on where the unexpressed models are in the model graph, they will be placed as phrases on the sentence attached to the noun representing the model in the graph they are dependents of. This is done for each sentence from the list of sentences produced by the sentence generation phase. Clauses are generated similarly to how sentences were generated in the previous phase based on the user's expression preferences within the ontology.

In our example, there are no extra models that need to be added as clauses. However, to illustrate how the clause placement phase would work, let's say that the goal was actually "Present the sales of the salesperson working in the city." A sentence from the Relationship model would be "Sally sells in Chicago." This leaves the Attribute/Value/Unit models still needing to be expressed. The Attribute model can produce clauses for these. Based on the attribute expression configuration, it would generate clauses of "who has sales of $1000" or "who has sold $1000". These would be added as a relative clause to "Sally" giving a complete sentence of "Sally, who has sales of $1000, sells in Chicago" (as one of the sentences among the several available permutations).

The next phase is Sentence Selection (see FIG. 8E). At this point, complete sentences have been built, and the system needs to pick one for use in the narrative story. The Sentence Selection phase can take into consideration several factors when selecting sentences. For example, the selected sentence should (1) correctly convey the intent of the goal, (2) only express what is necessary, and (3) prefer patterns that generally sound better. With these criteria, the system will likely be still left with more than one valid sentence. At this point, the system can choose from the remaining sentences that provide the best variability of expression. In an example embodiment, with all factors being equal, the system can randomly select a sentence from among the qualifying sentences. In our example, based on the goal, all three sentences are equally valid, so the system will randomly choose one to include in the final story. At the conclusion of the Sentence Selection phase, a sentence will have been selected for each node in the outline.

At this point, the system seeks to improve fluidity by looking across the nodes in the outline. At this stage, referred to as Entity Referencing (see FIG. 8F), nodes in the same section that repeat entities will be replaced with pronouns. The pronoun used will depend on the type of entity being replaced. If the base entity type is a Person and gender is available, the system will use gendered pronouns (e.g., he/she), otherwise it will use a non-gendered pronoun (e.g., they).

In our example, since there is only a single goal there would be no pronoun replacement. If instead there were two adjacent goals in the same section (e.g., "Present the sales of the salesperson" and "Present the title of the salesperson", a pronoun would be used for the second sentence, resulting in the language "Sally had sales of $10000. She had the title VP of Sales."

At this point, the sentences have been finalized. The next thing to do is ensure that the sentences are grammatically correct. This phase can be referred to as Realization (see FIG. 8G). To perform realization, the system adds articles (definite—"the"—and indefinite—"a/an"), conjugates verbs, and adds punctuation. After realization, the system has the final language for use in the story.

Wrapping up the example, the realized sentence ends up being "Sally has sales of $10,000." To get to that, the verb "has" was conjugated into present tense because the lack of a timeframe. The system can be configured to assume the timeframe is "now" in cases where no timeframe is specified in the communication goal statement. Also, the Realization phase inspects "sales" and determines that it was plural so an indefinite article was not needed. Finally, "Sally" is determined to be a name proper noun, which accordingly means that a definite article is not needed before "Sally".

As a last step, which can be referred to as Document Generation (see FIG. 8H), the system puts the realized language into a formatted document. Examples of suitable formats can include HTML, Microsoft Word documents, and JSON. The system returns the formatted document to the client.

Ontology Building:

FIGS. 9-13 depict example process flows that show how the ontology 320 can be built in response to user input, including user input during the process of composing communication goal statements. Appendix A included herewith is a user guide for an example narrative generation platform, where the user guide shows examples of GUI screens that demonstrate how the ontology 320 can be built in response to user input.

Figure 9:
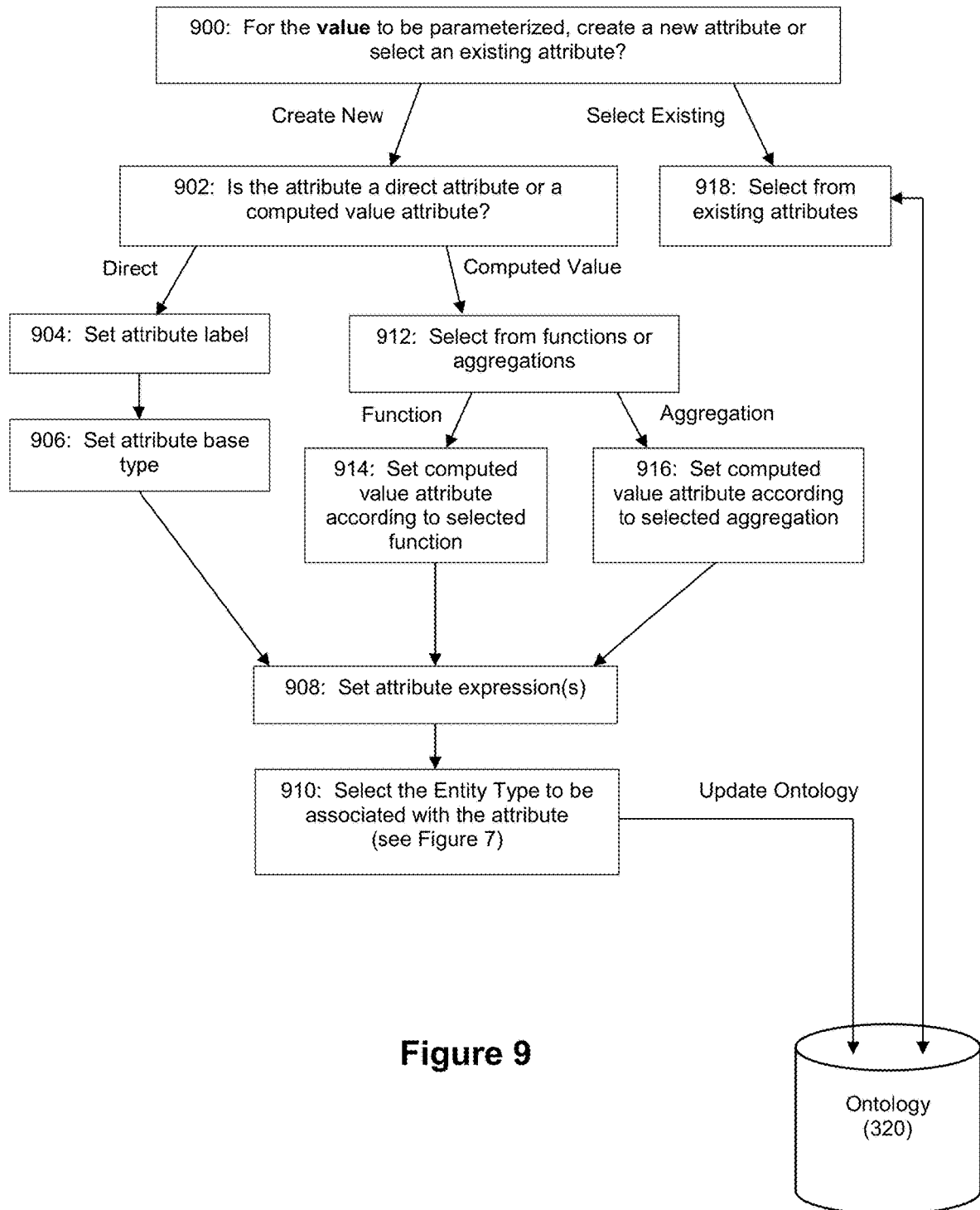
FIG. 9 depicts an example process flow for parameterizing an attribute.

FIG. 9 depicts an example process flow for parameterizing a value in a communication goal statement, which relates to the attribute objects in the ontology 320. It should be understood that the order of many of the steps in this process flow could be changed if desired by a practitioner. At step 900, the processor determines in response to user input whether a new attribute should be created for the value to be parameterized or whether an existing attribute should be used. Appendix A depicts example GUI screens that can assist the user as part of this process (see, e.g., FIG. 152 et seq.). If an existing attribute is to be used, the system can access the ontology 320 to provide the user with a list of attributes available for selection by the user. The user can select an existing attribute from this list (step 918). The system can also use string matching technology to match any characters entered by a user through the GUI to existing attributes in the ontology 320. Upon detecting a match or partial match, the system can then suggest an existing attribute for selection.

If a new attribute is to be created for the value, the process flow proceeds to step 902. At step 902, the process flow makes a decision as to whether the new attribute should be a direct attribute or a computed value attribute.

If a direct attribute is to be created, the process flow proceeds to step 904. At step 904, the processor defines a label for the attribute in response to user input. This label can serve as the name for the attribute (e.g., "sales"—see FIG. 47). Next, at step 906, the processor defines a base type for the attribute in response to use input. Examples of base types for attributes can include currency, date, decimal, integer, percentage, and string. FIG. 48 shows an example GUI screen through which a user can set the type for the subject attribute.

Next, at step 908, the processor defines the expression(s) that are to be associated with the subject attribute. Through specification of one or more expressions for the subject attribute, the user can provide the system with a number of options for expressing the attribute in words when rendering a narrative story.

At step 910, the processor selects the entity type for the subject attribute in response to user input. FIGS. 49-54 show example GUI screens for step 910. Step 910 is further elaborated upon with reference to FIG. 11 discussed below.

Figure 159:
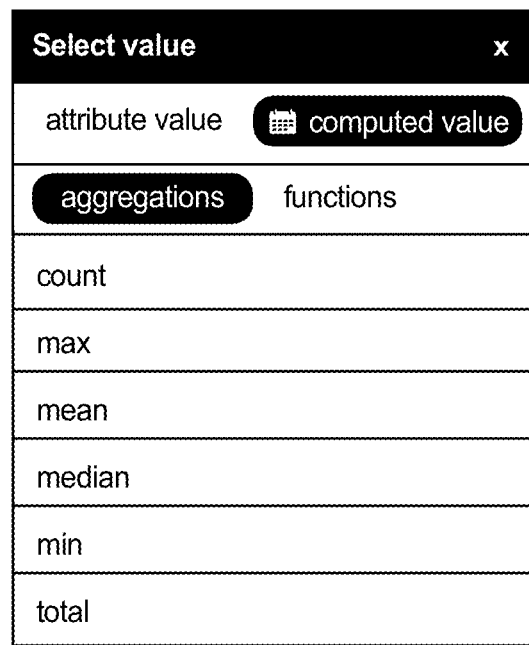
Figure 160:
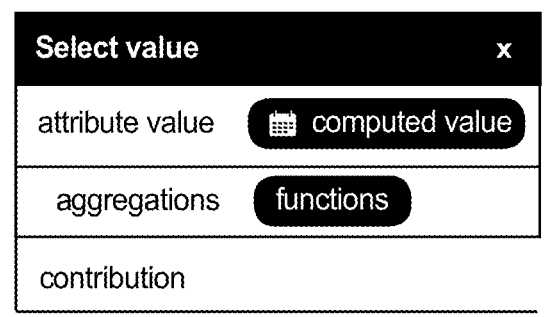

If step 902 results in a determination that a computed value attribute is to be created, the process flow proceeds to step 912 from step 902. At step 912, the system presents the user with a choice of making the computed value attribute a function or an aggregation (step 912). If a function is selected at step 912, the process flow proceeds to step 914 where the processor sets the computed value attribute according to the user-selected function. If an aggregation is selected at step 912, the process flow proceeds to step 916 where the processor sets the computed value attribute according to the user-selected aggregation. Examples of available aggregations can include count, max, mean, median, min, range, and total. These aggregations can be associated with corresponding parameterized computational logic (see FIG. 3D) that is programmed to compute the desired aggregation. An example of an available function is a contribution function, which evaluates how much a component contributes to an aggregate. However, it should be understood that other functions can be available through the system. For example, additional functions could include a multiplication, a division, a subtraction, standard deviation, a first derivative, and a second derivative. FIGS. 159-160, described in greater detail below in Appendix A, illustrate some example GUI screens through which a user can define computed value attributes.

After the attribute has been defined via the process flow of FIG. 9, the ontology 320 can be updated by adding the details for attribute 330 to ontology 320.

It should be understood that additional operations can be included in the attribute definition process flow if desired by a practitioner. For example, if a practitioner wishes to attach timeframe details to attributes, a timeframe definition process flow can be added to the FIG. 9 process flow.

Figure 10:
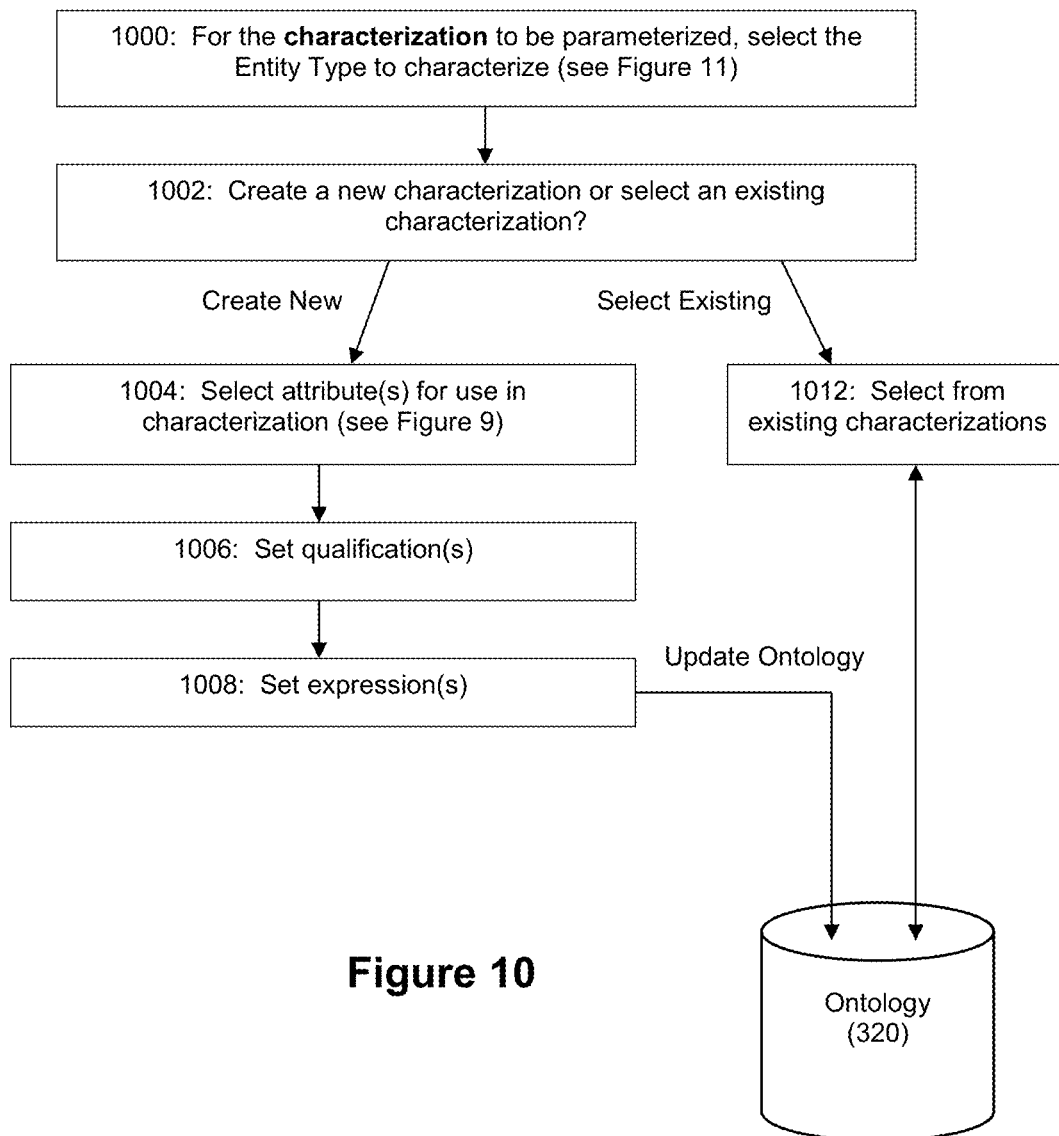
FIG. 10 depicts an example process flow for parameterizing a characterization.
Figure 11:
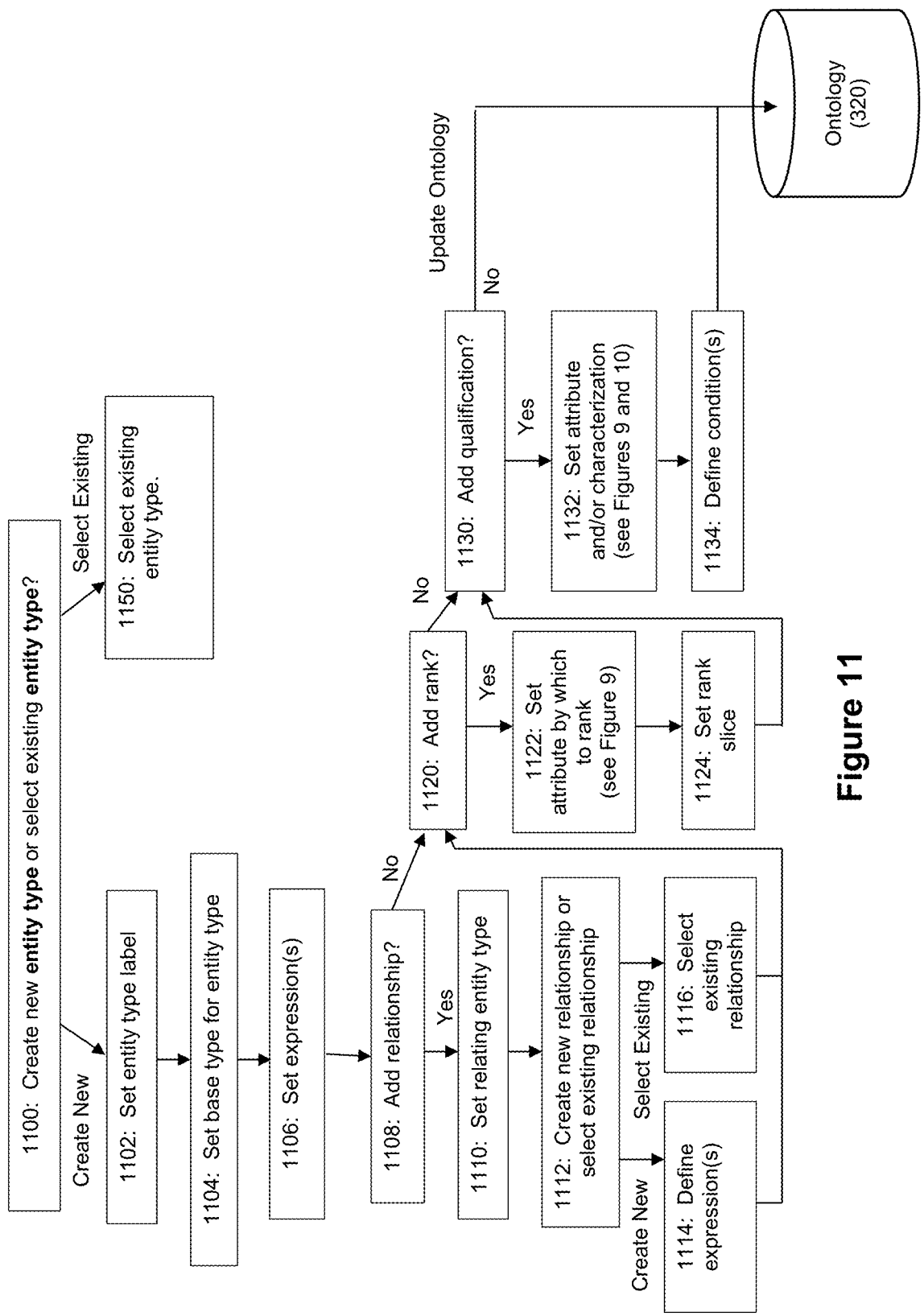
FIG. 11 depicts an example process flow for parameterizing an entity type.

FIG. 10 depicts an example process flow for parameterizing a characterization object in a communication goal statement and ontology. Characterizations 332 are editorial judgments based on defined qualifications that determine the language used when certain conditions are met. Through a characterization 332, a user is able to associate descriptive language with an entity type based on the nature of one or more attributes of that entity type. At step 1000, the processor selects the entity type to be characterized in response to user input. FIG. 11 provides an example process flow that elaborates on how the entity type can be defined.

At step 1002, the system determines whether the user wants to create a new characterization or select an existing characterization. This step can be performed in a manner similarly to step 900 in FIG. 9, but for characterizations rather than attributes. If an existing characterization is desired, the system can make a selection of an existing characterization in response to user input at step 1012. However, if a new characterization is desired, the process flow proceeds to step 1004.

At step 1004, the user selects the attribute(s) for use in the characterization. If the attribute needs to be defined, the process flow of FIG. 9 can be followed. For example, if the characterization 332 is meant to characterize the performance of a salesperson in terms of sales by the salesperson, step 1004 can result in the user selecting the attribute "sales" as the attribute by which the characterization will be determined.

At step 1006, the user sets the qualification(s) by which to evaluate the characterization. For example, these qualifications can be a series of thresholds by which the values of the sales attribute are judged (e.g., the characterization changes based on whether the sales amount are above or below a threshold of $10,000). Multiple thresholds can be defined for a characterization, which would then yield more than two potential outcomes of a characterization (e.g., three or more tiers of characterization outcomes). Also, the qualifications need not be defined in terms of fixed thresholds. The thresholds can also be flexibly defined in terms of direct attributes and/or computed value attributes (for example, a salesperson can be characterized as a satisfactory salesperson if the sales attribute for the subject salesperson has a value that exceeds the value of the benchmark attribute for the subject salesperson; as another example, a salesperson can be characterized as an above-average salesperson if the sales attribute for the subject salesperson has a value that exceeds the average value of the sales attributes for the all of the salespeople within a company). As part of defining the qualifications, step 1006 can also involve the user specifying the operators by which to judge qualifications. Examples of operators may include "greater than", "less than", "greater than or equal to", "equals", etc.

At step 1008, the user sets the expression(s) for the subject characterization. These expressions can then be used by the NLG process when articulating the subject characterization in a narrative story. For example, in a characterization relating to the performance of a salesperson in terms of sales, expressions such as "star performer", "outperformed", "high performer" etc. can be used in situations where the sales exceeded the highest threshold, while expressions such as "laggard", "poor performer", "struggled", etc. can be used in situations where the sales were below the lowest threshold.

FIGS. 65-68, 134-149, and 192-197 depict example GUIs through which a user can provide inputs for the process flow of FIG. 10. Upon the completion of the FIG. 10 process flow, the system can update the ontology 320 to add the details for the defined characterization 332. It should be understood that additional operations can be included in the characterization definition process flow if desired by a practitioner. For example, if a practitioner wishes to attach timeframe details to characterization, a timeframe definition process flow can be added to the FIG. 10 process flow.

FIG. 11 depicts an example process flow for parameterizing an entity type in a communication goal statement and ontology. Entity types are how the system knows what to talk about with respect to a communication goal statement. An entity type is a primary object in the ontology which has particular attributes (e.g., a department (entity type) has expenses (attribute). An entity is a specific instance of an entity type, with data-driven values for each attribute (e.g., John Smith is a specific instance of a salesperson entity type, and this entity has a specific data value for the sales attribute of a salesperson entity type). Ontology 320 may include more than one entity type.

At step 1100, the processor decides, in response to user input, whether to create a new entity type or select an existing entity type. This step can be performed while a user is composing a communication goal statement. If step 1100 results in a determination that an existing entity type is to be used, the process flow can proceed to step 1150 where an existing entity type is selected.

If step 1100 results in a determination that a new entity type is to be created, the process flow proceeds to step 1102. At step 1102, the user provides a label for the entity type. This label can be used as the entity type's name (e.g., a "salesperson" entity type). Next, at step 1104, the user sets a base type for the subject entity type. Examples of available base types to choose from can include person, place, thing, and event. However, it should be understood that more, fewer, and/or different base types can be used. The specified base type can be used by the AI logic to inform decision-making about the types of pronouns that can be used to express the subject entity type, among other expressive qualities for the entity type.

At step 1106, the user sets one or more expressions in relation to the subject entity type. These expressions provide the NLG process with a variety of options for expressing the entity type in a story.

The FIG. 11 process flow can also include options for attaching a number of additional features to entity types.

For example, a relationship can be added to the subject entity type at steps 1108-1116. At step 1110, the user identifies the entity type to which the subject entity type is to be related. If the relating entity type does not exist, the process flow of FIG. 11 can be recursively invoked to create the relating entity type. An example of a relating entity type might be a "company" entity type with respect to a subject entity type of "salesperson". Steps 1112-1116 operate to define the nature of the relationship between the subject entity type and the relating entity type. At step 1112, the process flow determines whether the user wants to create a new relationship or select an existing relationship. If create new is selected at step 1112, the process flow proceeds to step 1114 where the user provides an expression for the new relationship (e.g., the relating expression can be "employed by" to relate the subject entity type of "salesperson" to the relating entity type of "company" (thus, the "salesperson" is "employed by" the "company"). Multiple expressions may be provided at step 1114 to provide variability during story rendering. For example, the expressions "works for", "is a member of", "belongs to" might be used as alternative expressions for the relationship between the "salesperson" entity type and the "company" entity type. If select existing is selected at step 1112, the process flow proceeds to step 1116 where a user can be presents with a list of existing relationship expressions known to the system or within the ontology. The user can then select one or more of these expressions to define the nature of the relationship between the subject entity type and the relating entity type.

Another example of a feature that can be added to an entity type is a rank. Steps 1120-1124 describe how a rank can be attached to an entity type. The rank feature provides the AI with a mechanism for notionally identifying entities to be discussed in a narrative story even if the user does not know in advance which specific entities are to be discussed. For example, a user may want the system to generate a story about the 3 top ranked salespeople in terms of sales, but does not know a priori who these salespeople are. The rank feature attached to the salesperson entity type allows for a user to easily compose a communication goal statement that can be used by the AI to generate an appropriate narrative story. At step 1122, the user sets the attribute by which the subject entity type is to be ranked. For example, if salespeople are to be ranked by sales, the user can specify the sales attribute at step 1122. The FIG. 9 process flow can be followed to specify the subject attribute for ranking. At step 1124, the user sets a rank slice for the rank feature. The rank slice defines a depth for the rank feature with respect to the subject entity type. If the rank slice is set to 1, only the top ranked entity would be applicable. If the rank slice is set to n, the n highest rank entities would be returned.

Another example of a feature that can be added to an entity type is a qualification. Steps 1130-1134 describe how a qualification can be attached to an entity type. Similarly to the rank feature, the qualification feature provides the AI with a mechanism for notionally identifying entities to be discussed in a narrative story even if the user does not know in advance which specific entities are to be discussed. For example, a user may want the system to generate a story about the salespeople who have 10 years of more of experience or who have been characterized as star performers in terms of sales, but does not know a priori who these salespeople are. The qualification feature attached to the salesperson entity type allows for a user to easily compose a communication goal statement that can be used by the AI to generate an appropriate narrative story. At step 1132, the user sets the attribute 330 and/or characterization 332 that will be used to filter/qualify the subject entity type. For example, if the user wants the story to focus on salespeople with at least 10 years of experience, the user can specify a "years worked" or "start date" attribute at step 1132. The FIG. 9 process flow can be followed to specify the subject attribute for qualification. If a user wants to specify a characterization at step 1132, the FIG. 10 process flow can be followed in order to specify a characterization of qualification. At step 1134, the user defines condition(s) for the qualification. For example, if a "years worked" attribute is set as the qualification and the user wants to qualify salespeople based on 10 years of experience, the user can define the condition on the attribute as 10 years.

FIGS. 109-149 depict example GUIs through which a user can provide inputs for the process flow of FIG. 11. Upon the completion of the FIG. 11 process flow, the system can update the ontology 320 to add the details for the defined entity type 322. It should be understood that additional operations can be included in the entity type definition process flow if desired by a practitioner. For example, if a practitioner wishes to attach timeframe details to characterization, a timeframe definition process flow can be added to the FIG. 11 process flow. As another example, the FIG. 11 process flow can include branching options for adding an attribute to an entity type directly from the FIG. 11 process flow if desired. Similarly, the FIG. 11 process flow can also include branching options for adding a characterization to an entity type directly from the FIG. 11 process flow if desired.

Figure 12:
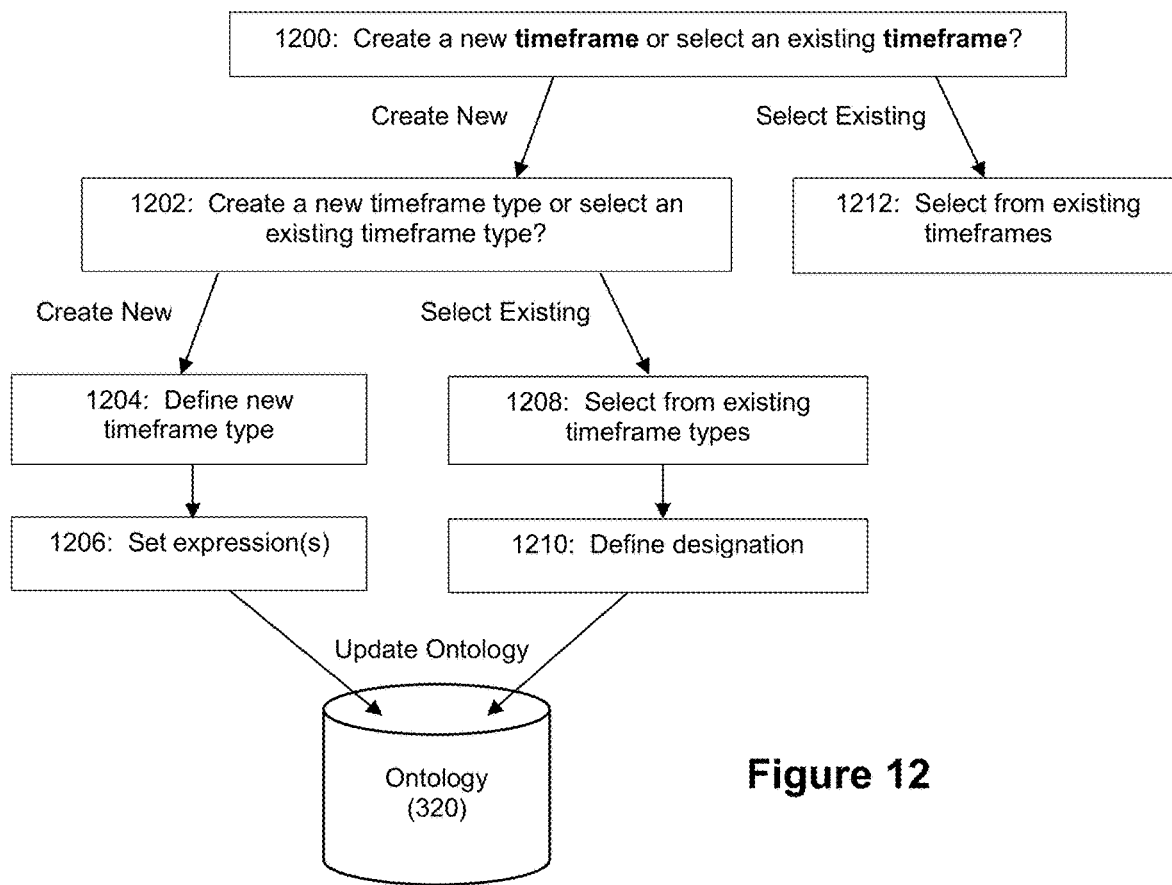
FIG. 12 depicts an example process flow for parameterizing a timeframe.

FIG. 12 depicts an example process flow for parameterizing a timeframe in a communication goal statement and ontology. A timeframe is a unit of time used as a parameter to constrain the values included in the expression of a communication goal statement or narrative story. Ontology 320 may include more than one timeframe.

At step 1200, the processor decides, in response to user input, whether to create a new timeframe or select an existing timeframe. This step can be performed while a user is composing a communication goal statement. If step 1200 results in a determination that an existing timeframe is to be used, the process flow can proceed to step 1212 where an existing timeframe is selected.

If step 1200 results in a determination that a new timeframe is to be created, the process flow proceeds to step 1202. At step 1202, the system determines whether the user wants to create a new timeframe type or select from among existing timeframe types. Examples of timeframe types include years, months, days, hours, etc.

If a new timeframe type is desired, the process flow proceeds to step 1204 where the user defines the timeframe type and step 1206 where the user sets the expression(s) for the timeframe type. The expression(s) provide the NLG process with a variety of options for expressing the timeframe in a story.

If an existing timeframe type is desired, the process flow proceeds to step 1208 where the user makes a selection from among existing timeframe types and step 1210 where the user defines a designation for the selected timeframe type. Through this designation, the user can define qualifications via a "when" statement or the like that defines time-based conditions (e.g., "the month of the year when the sales of the store were highest").

FIGS. 55-57, 80-81, 89, 95, 155-158, 180, and 189-191 depict example GUIs through which a user can provide inputs for the process flow of FIG. 12. Upon the completion of the FIG. 12 process flow, the system can update the ontology 320 to add the details for the defined timeframe 344.

Figure 13:
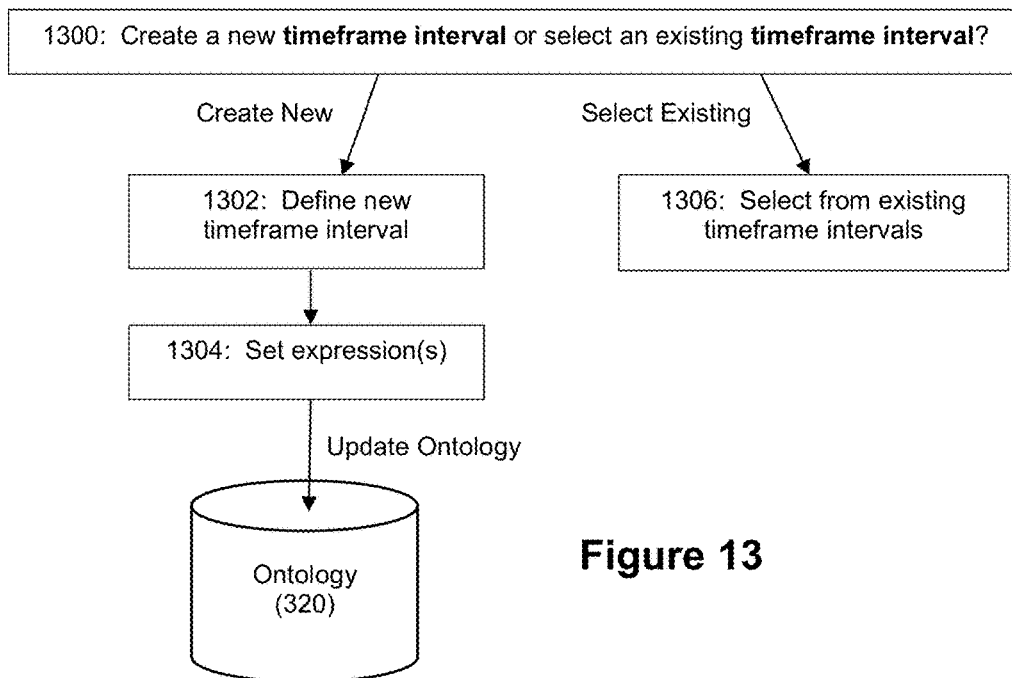
FIG. 13 depicts an example process flow for parameterizing a timeframe interval.

FIG. 13 depicts an example process flow for parameterizing a timeframe interval for use with a timeframe. The timeframe interval defines how the system should consider intervals of time within a timeframe (e.g., days of the month, weeks of the month, months of the year, quarters of the year, hours of the day, etc.). At step 1300, the processor decides, in response to user input, whether to create a new timeframe interval or select an existing timeframe interval. If step 1300 results in a determination that an existing timeframe interval is to be used, the process flow can proceed to step 1306 where an existing timeframe interval is selected. If step 1300 results in a determination that a new timeframe interval is to be created, the process flow proceeds to step 1302. At step 1302, the user defines the timeframe interval, and at step 1204 the user sets one or more expression(s) for the timeframe interval. The expression(s) provide the NLG process with a variety of options for expressing the timeframe interval in a story. Upon the completion of the FIG. 13 process flow, the system can update the ontology 320 to add the details for the defined timeframe interval.

As explained above, the ontology 320 defined via the process flows of FIGS. 9-13 can be leveraged by the AI in coordination with the composed communication goal statements to not only determine the content to be expressed in the narrative story but also to determine how that content should be expressed in the narrative story.

Subgoals within Communication Goal Statements:

The communication goal statements may be interpreted by the system to include a plurality of subgoals or related goals. Thus, in order for a narrative story to satisfy the communication goal associated with a communication goal statement, it may be desirable to the narrative story to first satisfy one or more subgoals related to the communication goal of the communication goal statement. An example of this is shown by FIGS. 14A-D. As shown by FIG. 14A, a communication goal statement 1400 may be associated with a parent or base communication goal. The interpreter 506 may be configured to interpret communication goal statement 1400 as being comprised of two or more communication goal statements 1402 and 1404, where these communication goal statements 1402 and 1404 are associated with subgoals relating to the parent/base goal. When the AI 502 seeks to determine the content for inclusion in the story, the interpreter 506 will process the communication goal statements 1402 and 1404 when generating the computed outline.

FIG. 14B shows an example of this. In this example, the base communication goal statement corresponding to the parent/base goal is "Compare Value 1 to Value 2" (see base communication goal statement 406). This base communication goal statement 406 can be comprised of a series of three base communication goal statements, each relating to subgoals of the parent/base goal. In this example, these three base communication goal statements are: (1) "Present Value 1" $402_1$, (2) "Present Value 2" $402_2$, and (3) "Characterize the Difference Between Value 1 and Value 2" 404. Thus, for the narrative story to accomplish the overall parent/base goal of comparing Value 1 to Value 2, it will be helpful for the narrative story to first present Values 1 and 2 and then provide a characterization of the difference between Values 1 and 2.

During the composition process, a user may parameterize the base communication goal statement 406 of FIG. 14B as shown by FIG. 14C. As shown by FIG. 14C, the parameterized communication goal statement 406b can read "Compare the Sales of the Salesperson during the Timeframe to the Benchmark of the Salesperson", where Value 1 is the "Sales of the Salesperson during the Timeframe" and Value 2 is the "Benchmark of the Salesperson". The interpreter 506 can be configured to interpret parameterized communication goal statement 406b for the purposes of story generation as the following three parameterized communication goal statements: (1) "Present the Sales of the Salesperson during the Timeframe" $402_1b$, (2) "Present the Benchmark of the Salesperson" $402_2b$, and (3) "Characterize the Difference Between the Sales of the Salesperson during the Timeframe and the Benchmark of the Salesperson" 404b. The system can then interact with ontology 320 to generate a narrative story as shown by FIG. 14D from these three parameterized communication goal statements. As can be seen by FIG. 14D, the NLG process created the first sentence of the narrative story in a compound form to satisfy the subgoals associated with the first two parameterized communication goal statements $402_1b$ and $402_2b$. The final sentence of the narrative story satisfies the subgoal associated with the third parameterized communication goal statement 404b. Overall, the narrative story satisfies the parent/base goal associated with parameterized communication goal statement 406b.

Figure 63:
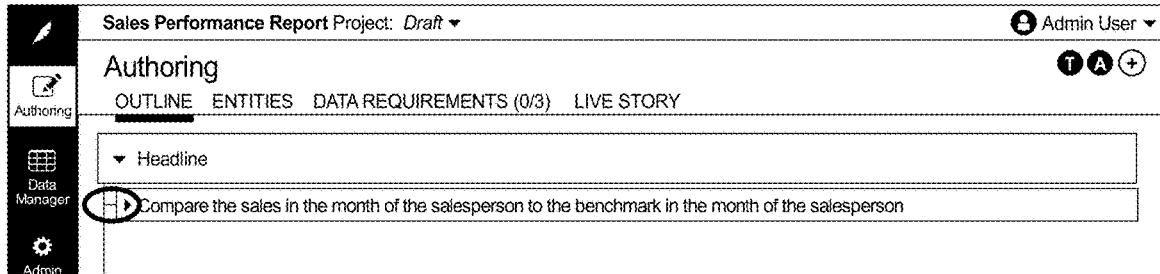
Figure 64:
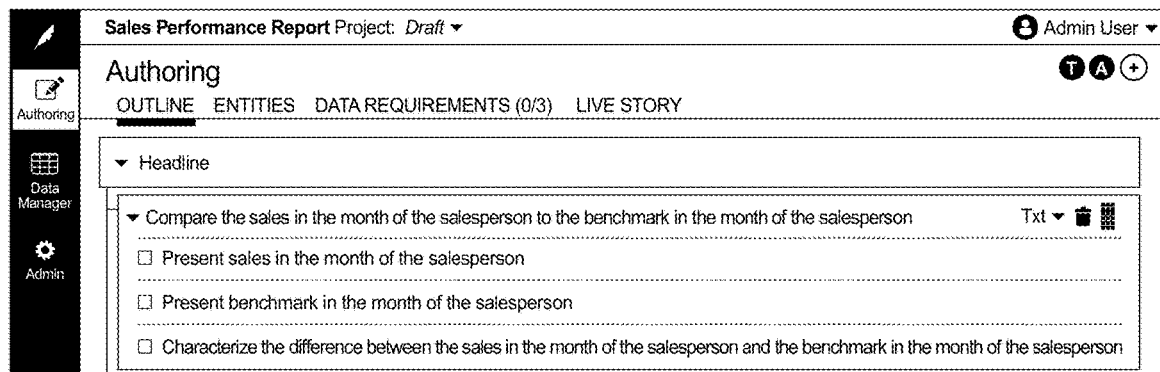
Figure 203:
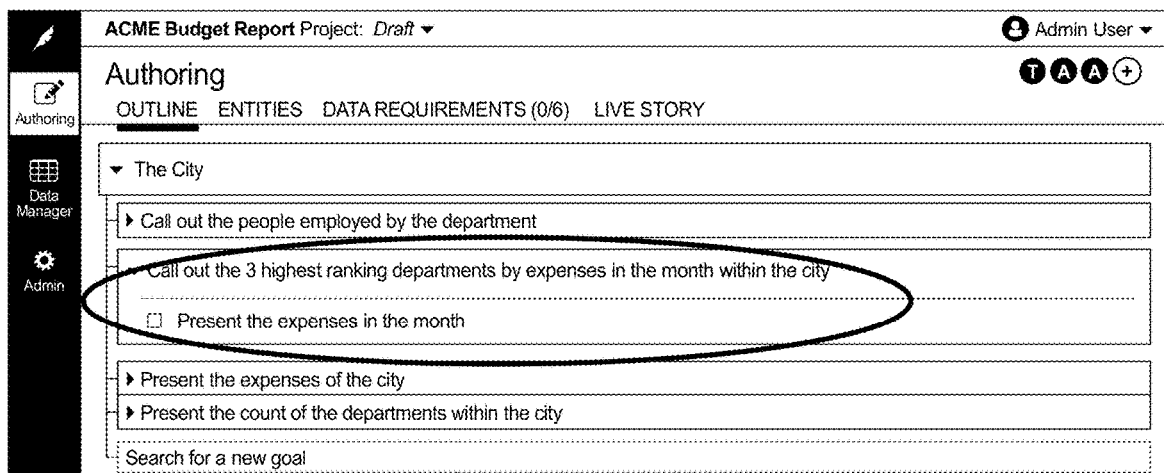

During the process of composing communication goal statements for use in the narrative generation process, the system can provide GUI screens to a user that allows the user to expand a communication goal statement to show communication goal statements associated with subgoals. Furthermore, the GUI can be configured to respond to user input to selectively opt in and opt out of which subgoals are to be included in the narrative generation process for a section of the story outline. Thus, if a user wants the story to include a headline or a title that is drawn from the "Compare" communication goal statement, a user can use a GUI to expand the "Compare" communication goal statement into statements for its constituent subgoals. For the headline/title, a user can choose to selectively opt out of the first two "Present" statements but retain the "Characterize" statement so that the headline/title is focused on a desired main point. Then, in the body of the narrative story, the user can selectively retain all of the constituent subgoals for the "Compare" statement so that the body of the narrative story provides the context for the comparison. FIGS. 63-64 and 203 depict example GUIs through which a user can expand a communication goal statement to view its related subgoals and selectively choose which of the subgoals will be used during the narrative generation process.

Live Story Editing:

Another innovative feature that may be included in a narrative generation platform is an editing feature whereby a user can use a story outline comprising one or more composed communication goal statements and an ontology to generate a narrative story from source data, where the narrative story can be reviewed and edited in a manner that results in automated adjustments to the narrative generation AI. For example, an author using the system in an editing mode can cause the system to generate a test narrative story from the source data using one or more composed communication goal statements and a related ontology. The author can then review the resulting test narrative story to assess whether the story was rendered correctly and whether any edits should be made. As an example, the author may decide that a different expression for an entity would work better in the story than the expression that was chosen by the system (e.g., the author may decide that a characterization expressed as "slow growth" in the narrative story would be better expressed as "sluggish growth"). The user can directly edit the text of the narrative story using text editing techniques (e.g., selecting and deleting the word "slow" and typing in the word "sluggish" in its place). Upon detecting this edit, the system can automatically update the ontology 320 to modify the subject characterization object 332 by adding "sluggish growth" to the expression(s) 364 for that characterization (and optionally removing the "slow growth" expression).

To accomplish this, words in the resultant test narrative story can be linked with the objects from ontology 320 that these words express. Further still, sentences and clauses can be associated with the communication goal statements that they serve. In this fashion, direct edits on words, clauses, and sentences by an author on the test narrative story can be traced back to their source ontological objects and communication goal statements.

Another example of an innovative editing capability is when an author chooses to re-order the sentences or paragraphs in the test narrative story. Given that sentences and paragraphs in the test narrative story can be traced back to communication goal statements in the story outline, the act of re-ordering sentences and/or paragraphs can cause the system to automatically re-order the communication goal statements in the story outline in accordance with the editing. Thus, consider a story outline that comprises Communication Goal Statement 1 followed by Communication Goal Statement 2 followed by Communication Goal Statement 3 that produces a narrative story comprising Sentence 1 (which is linked to Communication Goal Statement 1), followed by Sentence 2 (which is linked to Communication Goal Statement 2), followed by Sentence 3 (which is linked to Communication Goal Statement 3). If the user decides that the story would read better if Sentence 2 came before Sentence 1, the user can perform this edit in the live story editing mode of the system, and this edit can cause the system to automatically adjust the story outline to comprise Communication Goal Statement 2 followed by Communication Goal Statement 1 followed by Communication Goal Statement 3.

Similarly, if a user edits the narrative story by deleting a sentence, the system can automatically adjust the story outline by deleting the communication goal statement linked to that sentence.

Through the automated changes to the ontology 320 and/or story outline, the system can be able to quickly adjust its story generation capabilities to reflect the desires of the author. Thus, during a subsequent execution of the story generation process, the system can use the updated ontology 320 and/or story outline to control the narrative generation process.

FIGS. 244-266 and their supporting description in Appendix A describe aspects of such editing and other review features that can be included in an example embodiment of a narrative generation platform. Appendix A also describes a number of other aspects that may be included in example embodiments of a narrative generation platform.

While the invention has been described above in relation to its example embodiments, various modifications may be made thereto that still fall within the invention's scope. Such modifications to the invention will be recognizable upon review of the teachings herein.

APPENDIX A

This appendix describes a user guide for an example embodiment referred to as Quill, and it is organized into the following sections:
    A1: Introduction
        A1(i): What is Quill?
        A1(ii): What is NLG?
        A1(iii): How to use this Guide
    A2: Getting Started
        A2(i): Logging in
            A2(i)(a): Supported Browsers
            A2(i)(b): Hosted on-premises
        A2(ii): General Structure
            A2(ii)(a): Creating an Organization
            A2(ii)(b): Creating Users A2(iii): Creating Projects
  A2(iii)(a): Authoring
  A2(iii)(b): Data Manager
  A2(iii)(c): Project Administration
A3: Configure a Story from a Blueprint
  A3(i): Configure a Sales Performance Report
    A3(i)(a): Headline
    A3(ii)(b): Overview
    A3(iii)(c): Drivers
    A3(iv)(d): Adding Data
    A3(v)(e): Data Requirements
A4: Ontology Management
  A4(i): Entity Types and Expressions
    A4(i)(a): Entities Tab
    A4(i)(b): Creating an Entity Type
  A4(ii): Relationships
    A4(ii)(a): Creating a Relationship
  A4(iii): Characterizations
    A4(iii)(a): Entity Characterizations
    A4(iii)(b): Assessment Characterizations
  A4(iv): Attributes
    A4(iv)(a): Attribute Values
    A4(iv)(b): Computed Attributes
A5: Configure a Story from Scratch
  A5(i): The Outline
    A5(i)(a): Sections
      A5(i)(a)(1): Renaming a Section
      A5(i)(a)(2): Deleting a Section
      A5(i)(a)(3): Moving a Section
    A5(i)(b): Communication Goals
      A5(i)(b)(1): Creating a Communication Goal
        A5(i)(b)(1)(A): Entity Types
        A5(i)(b)(1)(B): Creating an Entity Type
        A5(i)(b)(1)(C): Creating a Relationship
        A5(i)(b)(1)(D): Characterizations
      A5(i)(b)(2): Deleting a Communication Goal
      A5(i)(b)(3): Moving a Communication Goal
      A5(i)(b)(4): Linked Goals
      A5(i)(b)(5): Related Goals (Subgoals)
      A5(i)(b)(6): Styling Communication Goals
      A5(i)(b)(7): Charts
    A5(i)(c): Data Requirements
      A5(i)(c)(1): Tabular Data
      A5(i)(c)(2): Document-Based Data
    A5(i)(d): Data Formatting
    A5(i)(e): Data Validation
A6: Data Management
  A6(i): Getting Data Into Quill
    A6(i)(a): Uploading a File
    A6(i)(b): Adding a Connection
A7: Reviewing Your Story
  A7(i): Live Story
    A7(i)(a): Edit Mode
      A7(i)(a)(1): Entity Expressions
      A7(i)(a)(2): Characterization Expressions
      A7(i)(a)(3): Language Guidance
    A7(i)(b): Review Mode
  A7(ii): Logic Trace
  A7(iii): Monitoring
A8: Managing Story Versions
  A8(i): Drafts and Publishing
  A8(ii): Change Log
A9: Writing Stories in Production
  A9(i): API
  A9(ii): Scheduling
A10: Sharing and Reuse
A11: Terminology
A12: Communication Goal Families
A13: Miscellaneous
  A13(i): Supported Chart Types
  A13(ii): Supported Document Structures
    A13(ii)(a): Single Document
    A13(ii)(b): Nested Documents
    A13(ii)(c): Unsupported Structures
  A13(iii): Styling Rules
  A13(iv): Using Multiple Data Views
  A13(v): Permission Structure The following sections can be read in combination with FIGS. 15-286 for an understanding of how the example embodiment of Appendix A can be used by users.

A1: Introduction

A1 (i): What is Quill?

Quill is an advanced natural language generation (Advanced NLG) platform that transforms structured data into narratives. It is an intelligent system that starts by understanding what the user wants to communicate and then performs the relevant analysis to highlight what is most interesting and important, identifies and accesses the required data necessary to tell the story, and then delivers the analysis in the most intuitive, personalized, easy-to-consume way possible—a narrative.

Quill is used to automate manual processes related to data analysis and reporting. Its authoring capabilities can be easily integrated into existing platforms, generating narratives to explain insights not obvious in data or visualizations alone.

A1 (ii): What is NLG?

Natural Language Generation (NLG) is a subfield of artificial intelligence (AI) which produces language as output on the basis of data input. Many NLG systems are basic in that they simply translate data into text, with templated approaches that are constrained to communicate one idea per sentence, have limited variability in word choice, and are unable to perform the analytics necessary to identify what is relevant to the individual reader.

Quill is an Advanced NLG platform that does not start with the data but by the user's intent of what they want to communicate. Unlike templated approaches that simply map language onto data, Quill performs complex assessments to characterize events and identify relationships, understands what information is especially relevant, learns about certain domains and utilizes specific analytics and language patterns accordingly, and generates language with the consideration of appropriate sentence length, structure, and word variability. The result is an intelligent narrative that can be produced at significant scale and customized to an audience of one.

A1 (iii): How to Use this Guide

Getting Started walks through how to log in to Quill and set up Organizations, Users, and Projects. It also provides an overview of the components of Quill.

Ontology Management is a high-level description of the conceptual elements stories in Quill are based on. This section will help you understand the building blocks of writing a story.

Configuring a Story from Scratch and Configuring a Story from a Blueprint talk through the steps of configuring a story in Quill. Jump to one of these sections if you want to learn the basics of using Quill.

Data Management contains the necessary information for setting up data in Quill, discussing the accepted formats and connections.

Reviewing Your Story discusses the tools available to review, edit, and monitor the stories you configure in Quill.

Managing Story Versions covers publishing stories and tracking changes made to projects.

Writing Stories in Production addresses administrative aspects of story generation, including setting up an API endpoint and scheduling story runs.

Sharing and Reuse goes through how to make components of a particular project available across projects.

Common Troubleshooting offers simple, easy-to-follow steps for dealing with common questions that arise when working in Quill.

The Terminology will help you understand the terminology used in this manual and throughout Quill, while the Communication Goal Families describes the available communication goals and how they relate to each other.

The Miscellaneous section presents an example of a state of Quill functionality.

A2: Getting Started

A2(i): Logging in

A2(i)(a): Supported Browsers

Quill is a web-based application that supports Firefox, versions 32 ESR and up, and all versions of Chrome. Logging in will depend on whether Narrative Science is hosting the application or Quill has been installed on-premises.

A2(i)(b): Hosted On-Premises

For on-premises installations of Quill, if you are an authenticated user, go to your custom URL to access Quill. You will be taken directly to your project dashboard. If you see an authentication error, contact your site administrator to be set up with access to Quill.

A2(ii): General Structure

Quill is made up of Organizations and Projects. An Organization is the base level of access in Quill. It includes Administrators and Members and is how Projects are grouped together. Projects are where narratives are built and edited. They exist within Organizations. Users exist at all levels of Quill, at the Site, Organization, and Project levels. Access privileges can be set on a per User basis and apply differently at the Site, Organization, and Project levels. (For more detail, refer to the Permissions Structure section of the Miscellaneous section)

A2(ii)(a): Creating an Organization

Creating an Organization is a Site Administrative privilege. At the time that Quill is installed, whether hosted by Narrative Science or on-premises, a Site Administrator is designated. Only a Site Administrator has the ability to create an Organization (see FIG. 15).

Figure 16:
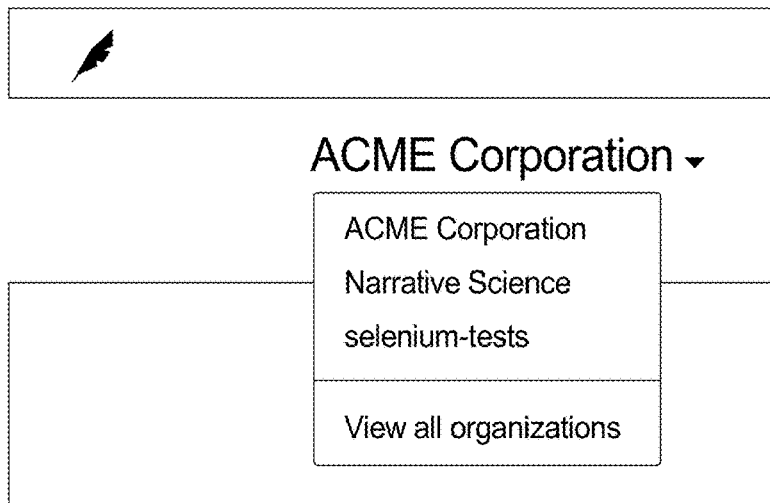

Site Administrators can add users, and users can only see the Organizations of which they are members. Site Administrators have access to all Organizations with the View All Dashboards option (see FIG. 16), but Organization Members do not.

Figure 17:
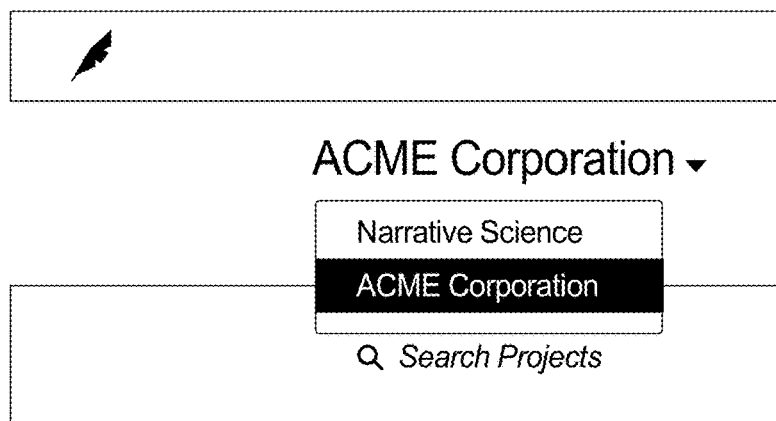

Members only see the Organizations they have access to in the Organization dropdown and can toggle between them there (see FIG. 17).

Site Administrators can use the Organization dropdown to switch between Organizations or from the Organizations page. Each Organization will have a dashboard listing Projects and People.

Figure 18:
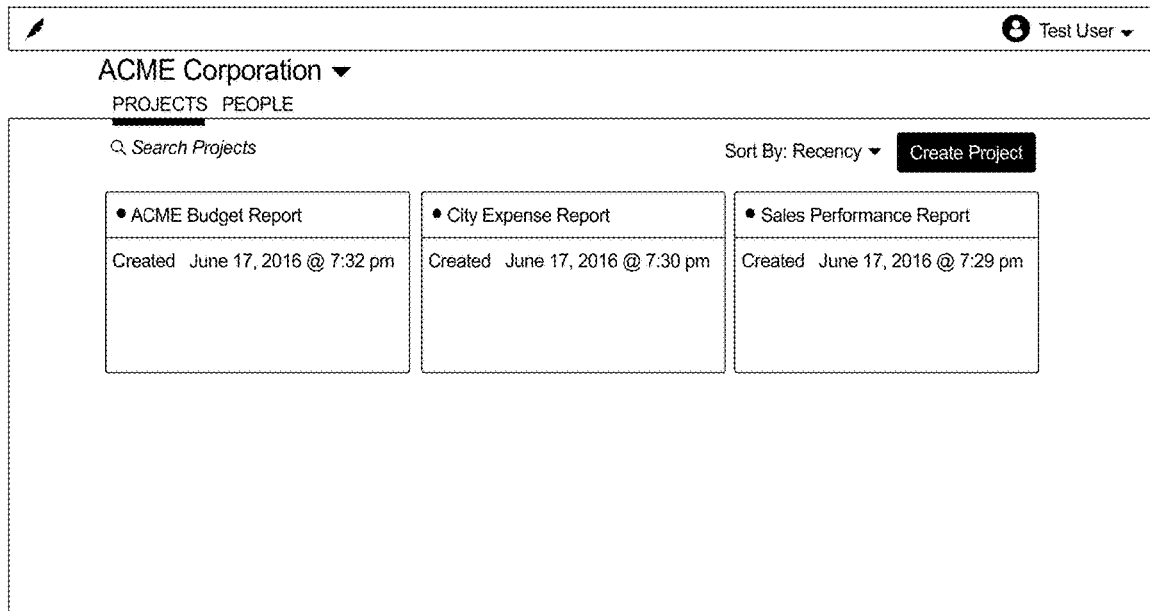

FIG. 18 shows where Organization Administrators and Members may create Projects, but only Organization Administrators may create Users. Both Organization Administrators and Members may add Users to Projects and set their permissions. For both Administrators and Members, Quill will show the most recent Organization when first opened.

A2(ii)(b): Creating Users

Figure 19:
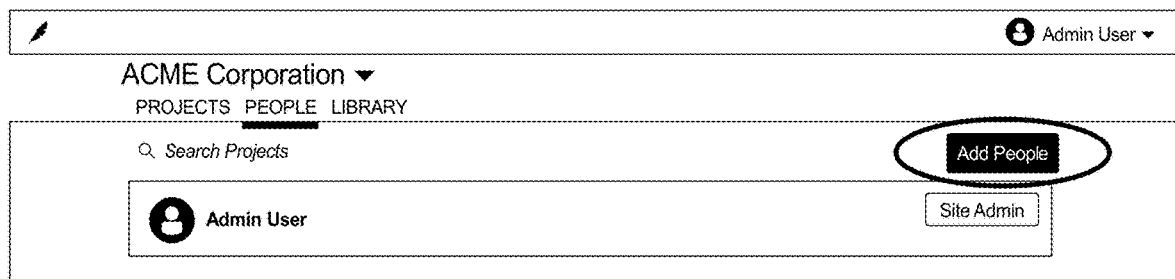
Figure 20:
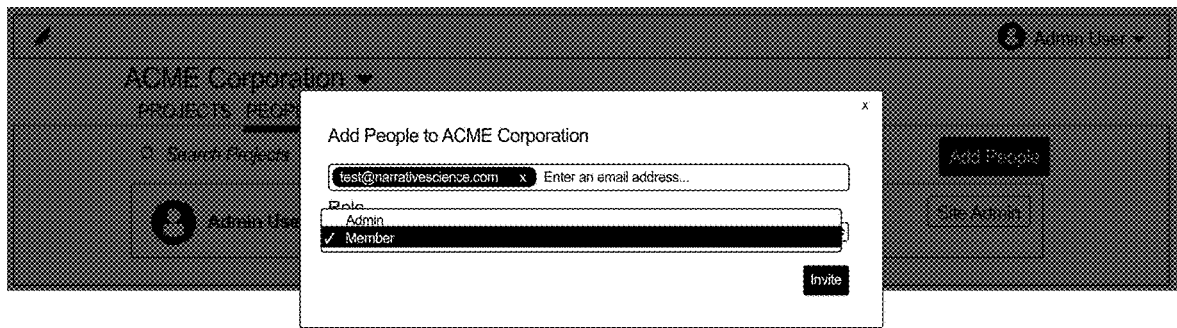

Only an Administrator (both Site or Organization) may create a User (see FIG. 19). Users can be added to Organizations as Administrators or Members (see FIG. 20).

Administrative privileges cascade through the structure of Quill. (See Permission Structure in the Miscellaneous section for more information.) That is to say, an Administrator at the Organization level has Administrative privileges at the Project level as well. The Project permissions of Members are set at the Project level.

Figure 21:
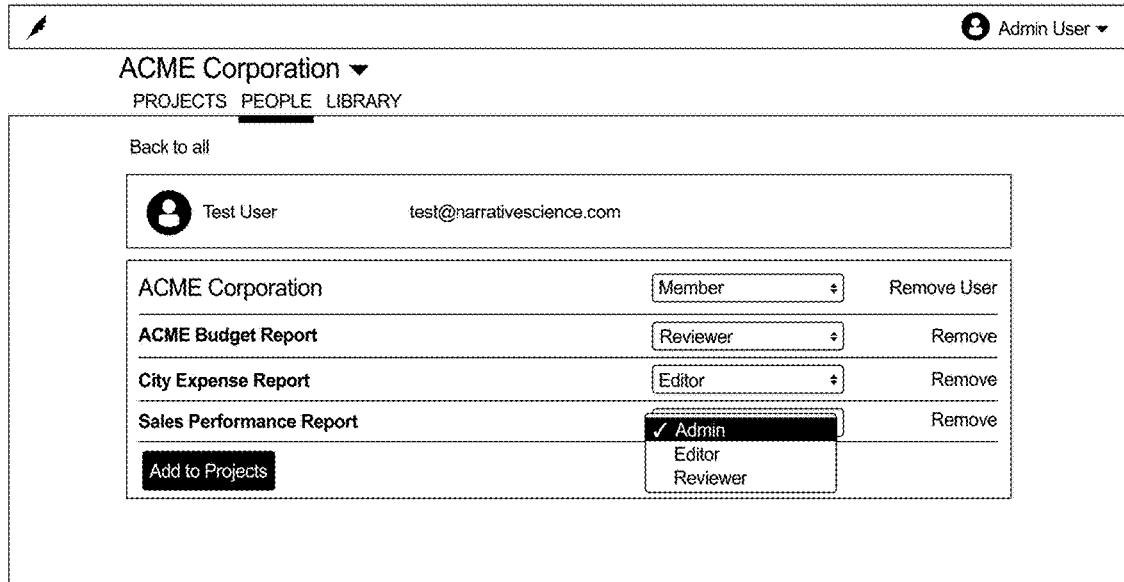

At the Project level, a user can be an Administrator, an Editor, or a Reviewer (see FIG. 21).

An Administrator on a Project has full access, including all aspects of Authoring, sharing, drafts and publishing, and the ability to delete the Project. An Editor has access to Authoring but cannot share, publish and create a new draft, or delete the Project. A Reviewer only has access to Live Story in Review Mode. A user's access to a Project can be edited on the People tab of the Organization dashboard.

A2(iii): Creating Projects

Figure 22:
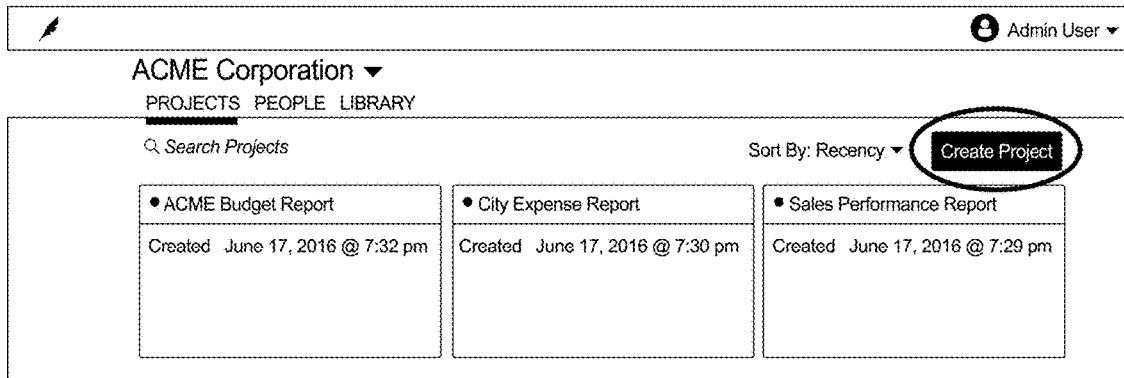

Both Administrators and Members can create Projects from the Organization dashboard (see FIG. 22).

Figure 23:
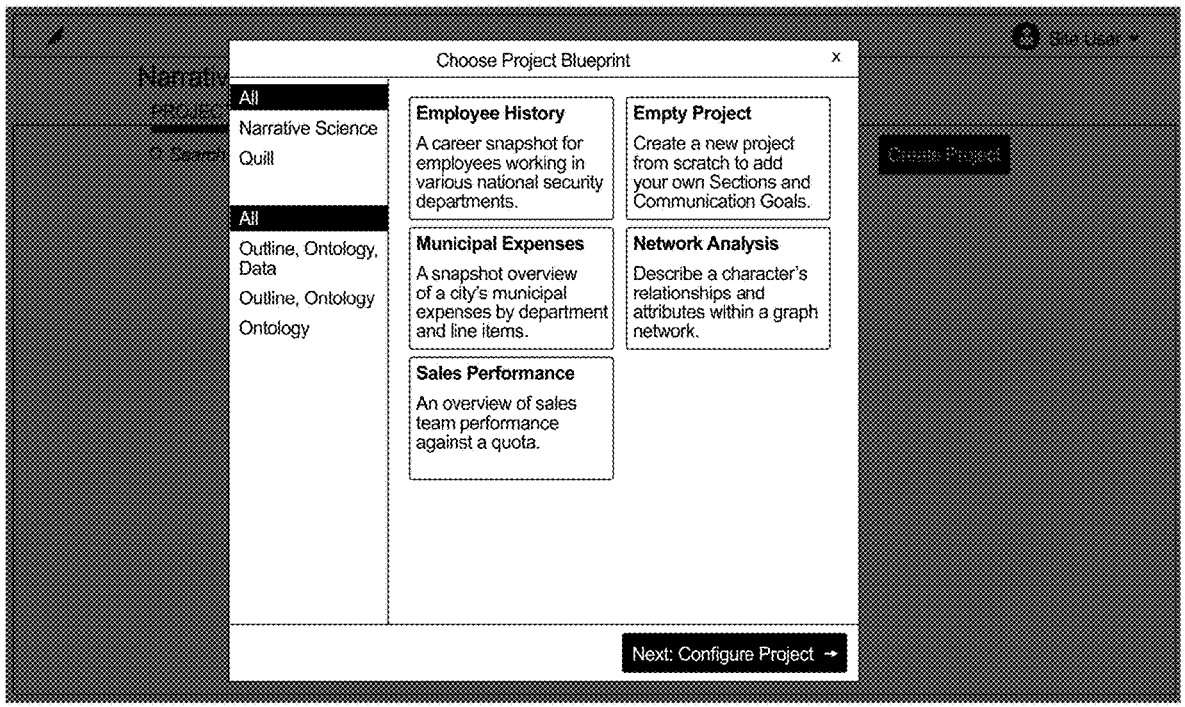

The creator of a Project is by default an Administrator. When creating a new Project, select from the list of blueprint options whether it will be an Employee History, Empty Project, Municipal Expenses, Network Analysis, or a Sales Performance report (see FIG. 23).

Figure 24:
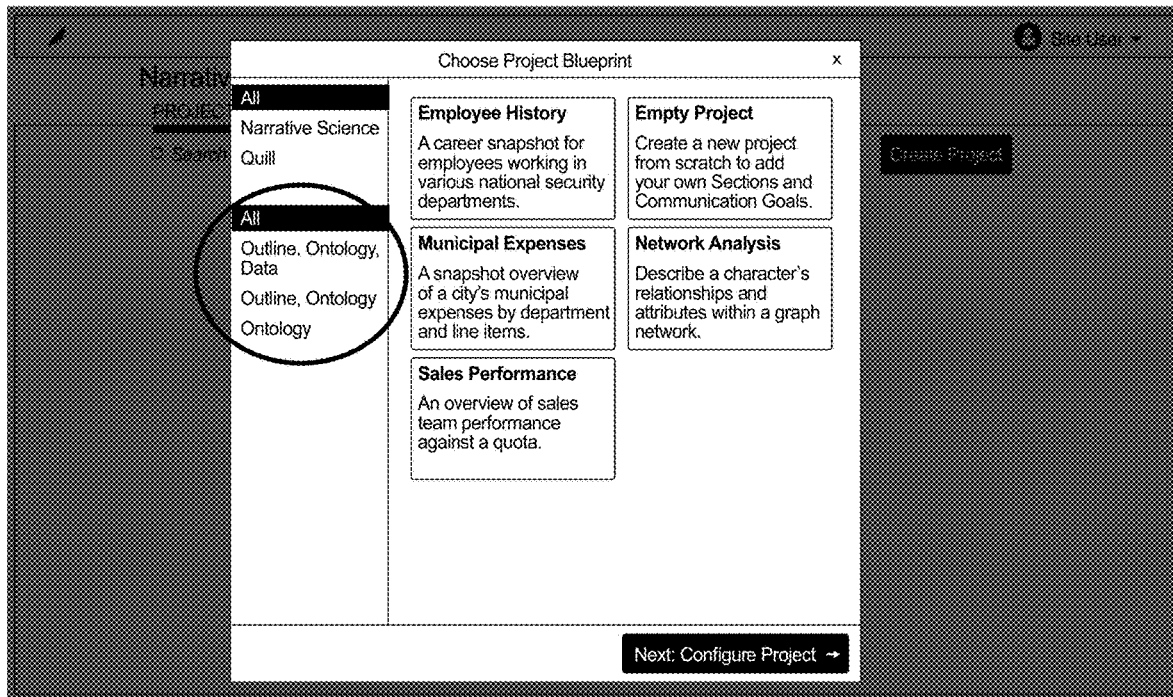

This is also where you can access shared components of existing projects which members of an Organization have elected to share for reuse by other Organization members. As shown by FIG. 24, you can filter them based on what parts of them have been shared: Outline, Ontology, and Data Sources; Outline and Ontology; and Outline. (Refer to the Sharing and Reuse section for additional information.)

Figure 25:
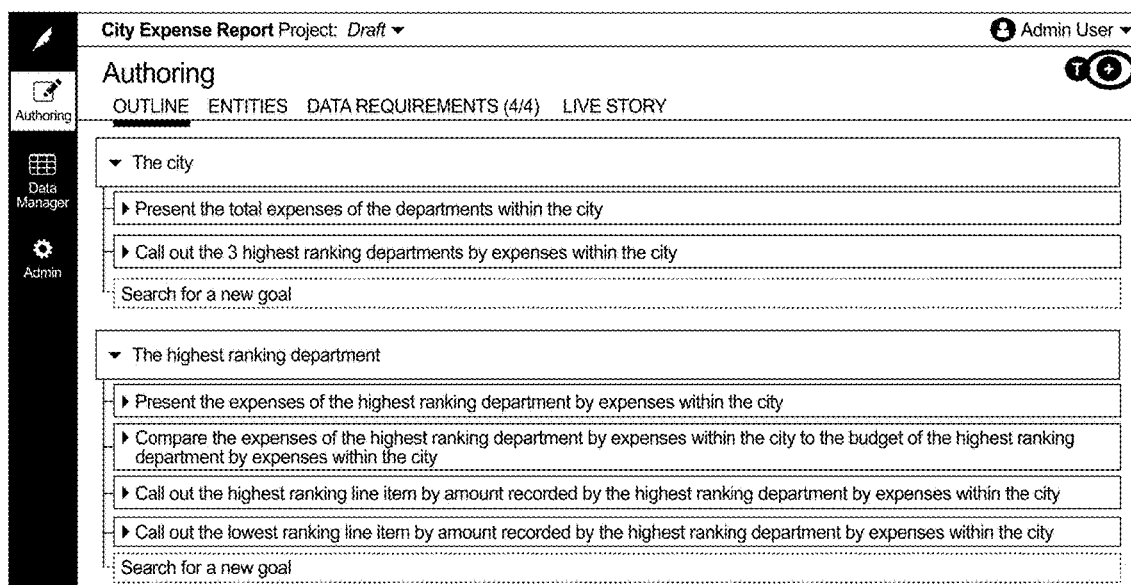

An Empty Project allows the user to configure a Project from the ground up, and a Sales Performance Report provides the framework to configuring a basic version of a sales performance report. A user can be added to a project by clicking the plus symbol within a project (see FIG. 25) and adding them by user name. To add a user to a Project, the user should be a member of the Organization.

Figure 26:
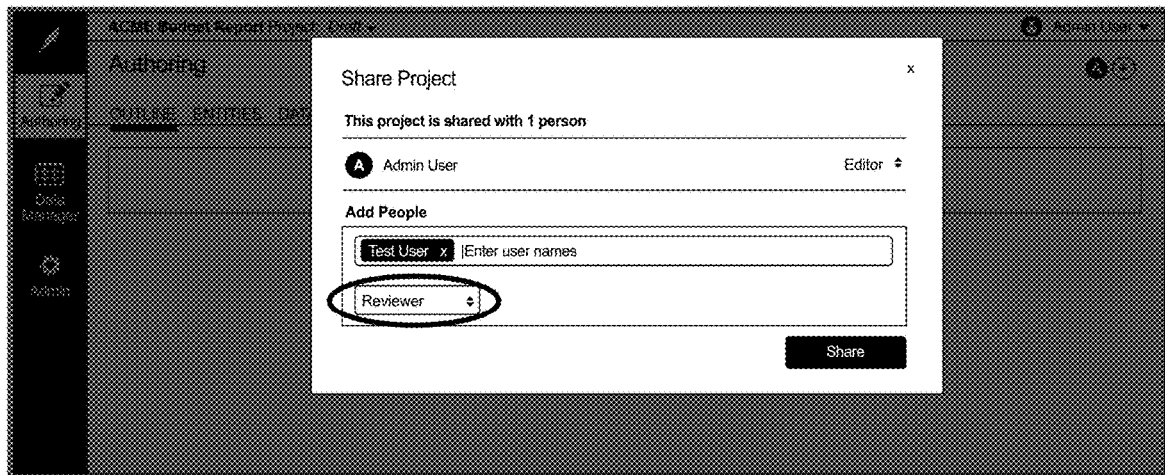

You can set Project level permissions using the dropdown menu (see FIG. 26).

Figure 27:
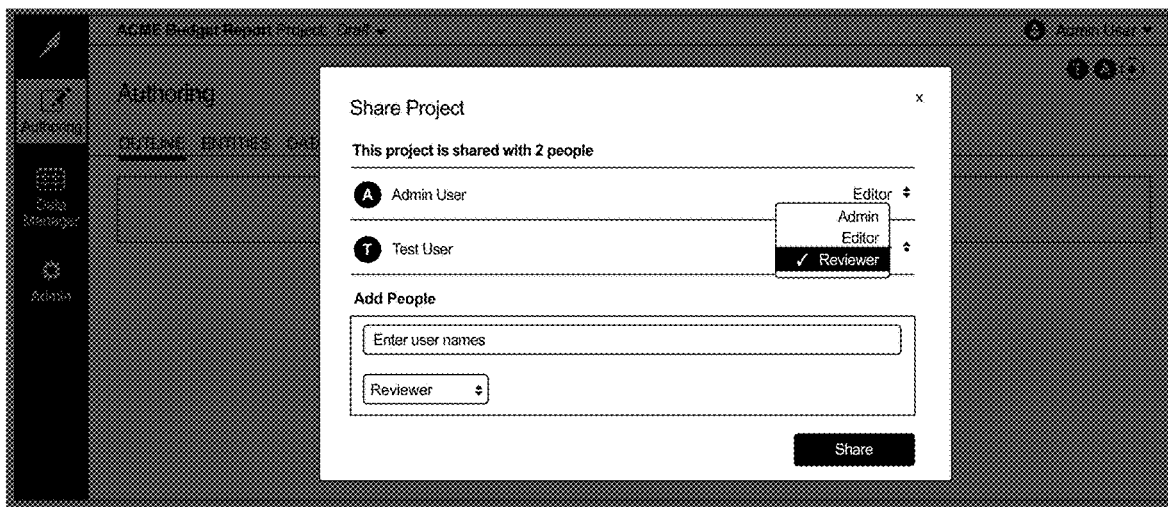

You can edit permissions and remove users here as well (see FIG. 27).

Figure 28:
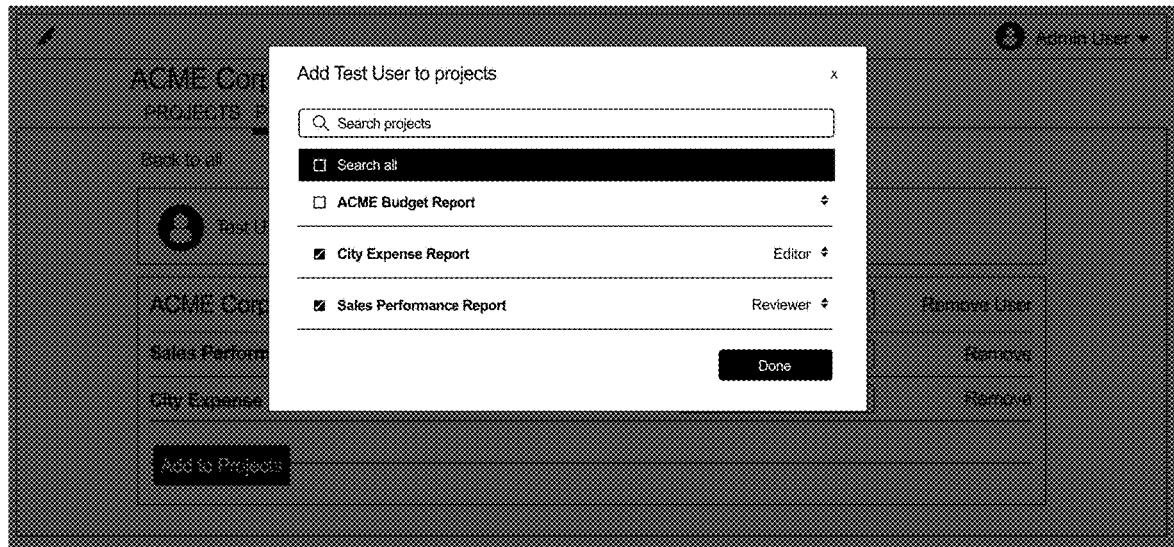

Users can also be added to Projects from the People tab of the Organization dashboard (see FIG. 28).

Figure 29:
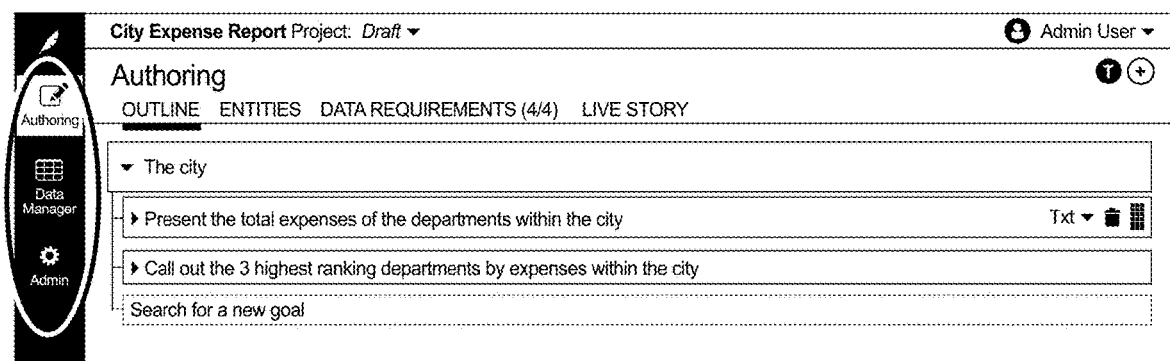

Each Project includes Authoring, a Data Manager, and Admin (see FIG. 29).

Authoring is where the narrative gets built and refined; the Data Manager is where the data for the story is configured; and Project Administration is where Monitoring, the Change Log, API documentation, Project Settings, and Scheduling are located.

A2(iii)(a): Authoring

Figures 30, 31:
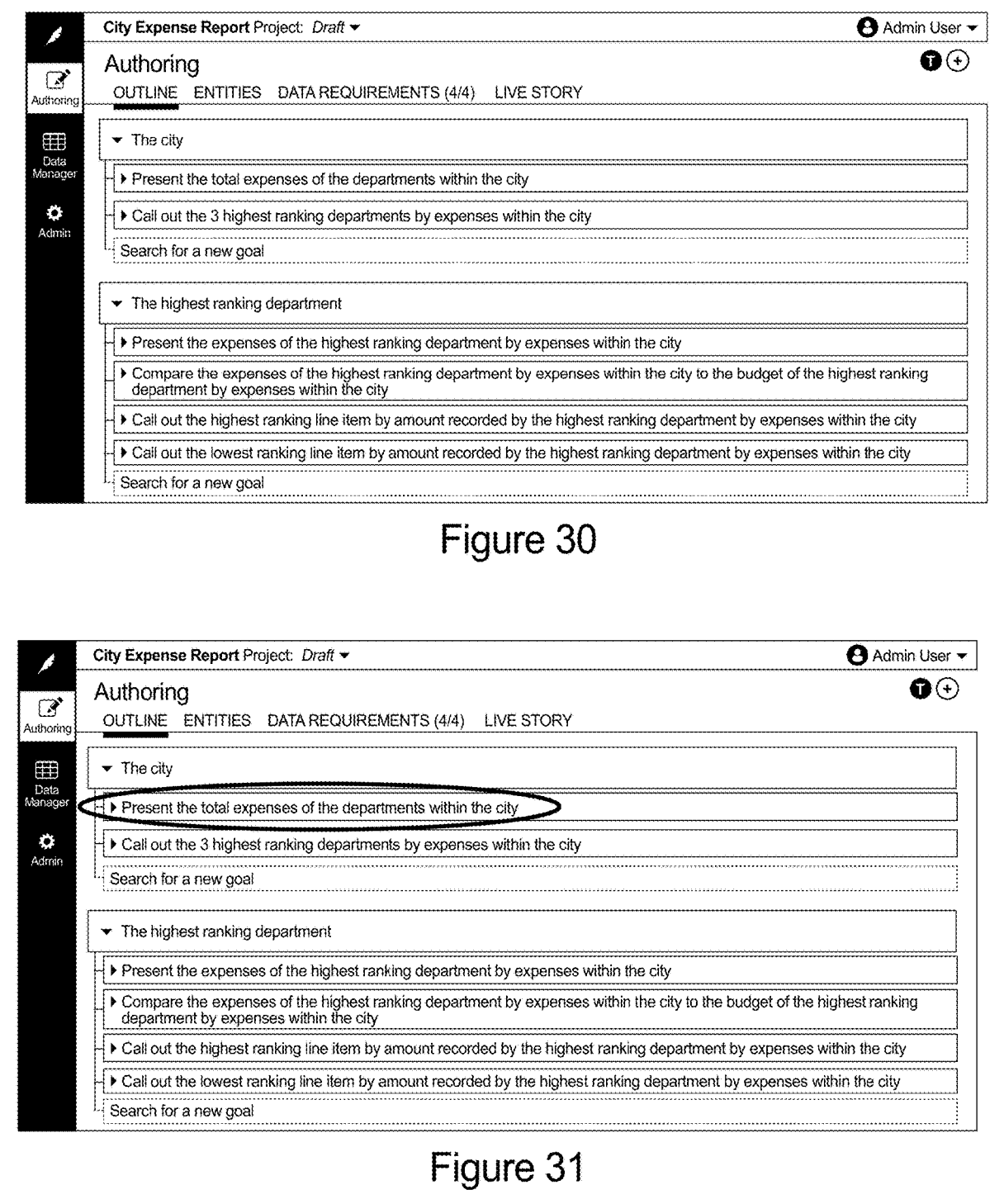

The main view in Authoring is the Outline, as shown by FIG. 30.

The Outline is where the narrative is built. Sections can be added to provide structure and organization to the story (see FIG. 31).

Figures 32, 33:
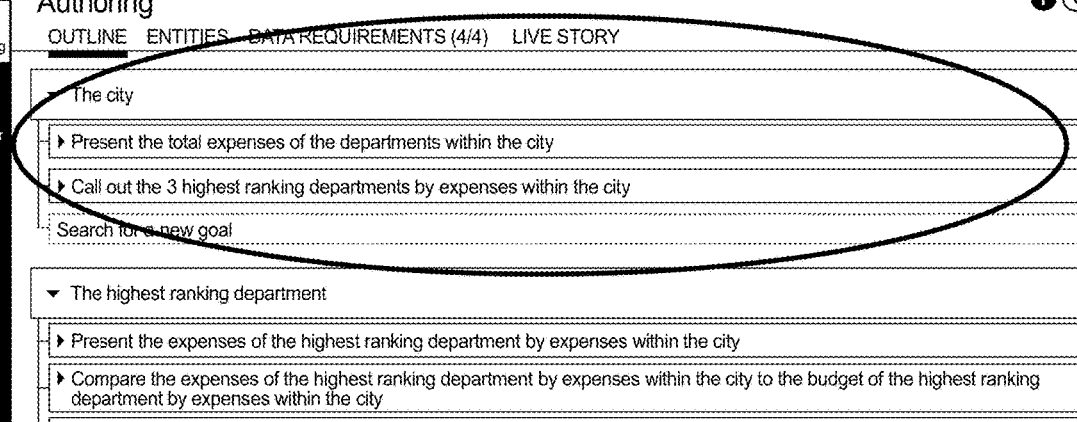

Communication Goals are then added to a Section (see FIG. 32).

Communication Goals are one of the main underpinnings of Quill. They are the primary building blocks a user interacts with to compose a story.

Authoring is also where Entities are managed (see FIG. 33).

An Entity is any primary "object" which has particular Attributes. It can be set to have multiple expressions for language variation within the narrative or have Relationships to other Entities for more complex representations. All of these things comprise an Ontology.

Data Requirements are how the data that supports a story is mapped to the various story elements.

Figure 34:

Based on the Communication Goals in the Outline, the Data Requirements tab will specify what data points it needs in order to generate a complete story (see FIG. 34).

Live Story is a means of reviewing and editing a story generated from the Outline.

It has two modes, Review mode and Edit mode. Review mode allows the user to see a complete narrative based on specific data parameters (see FIG. 35). Edit mode allows the user to make changes to the story (see FIG. 36).

Figure 37:
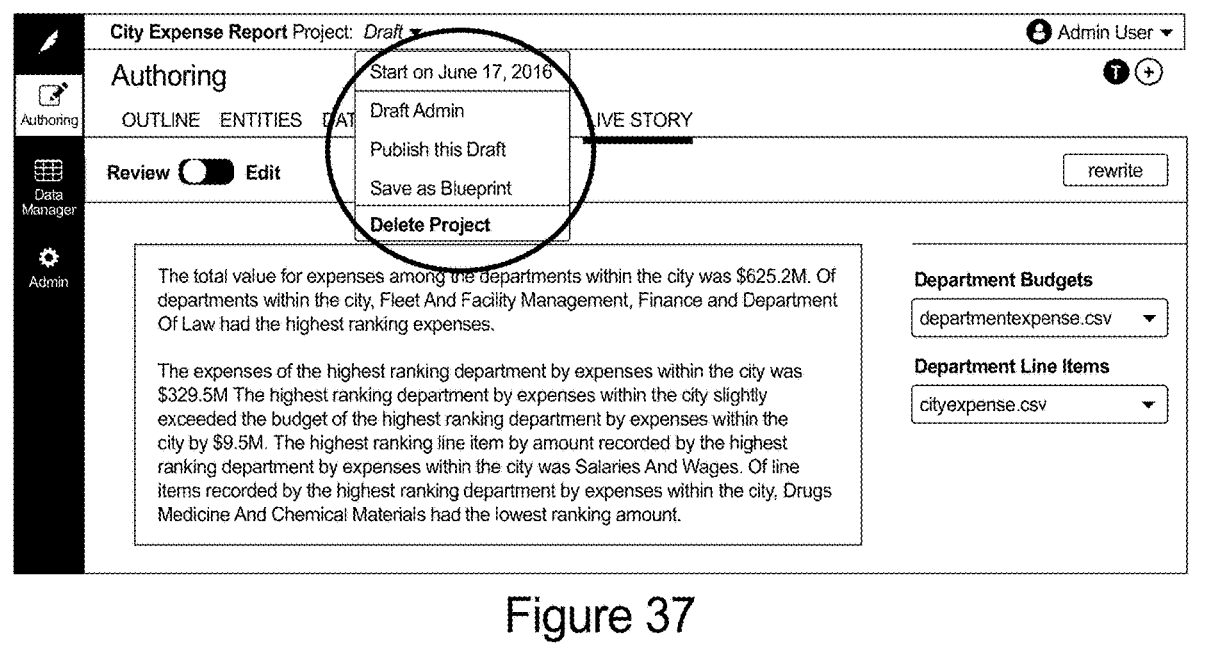

Drafts and Publishing are Quill's system of managing versions of your story (see FIG. 37).

This is how you publish your story configurations and keep a published version as read-only in order to request stories through the API or via the Scheduler. Each Project can only have one draft and one published version at a time.

A2(iii)(b): Data Manager

Figure 38:
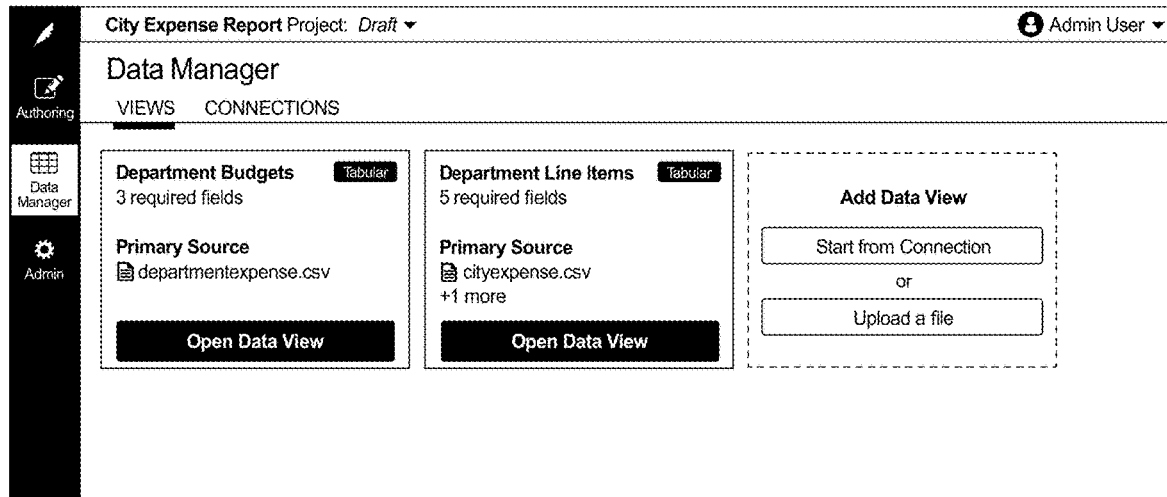
Figure 39:
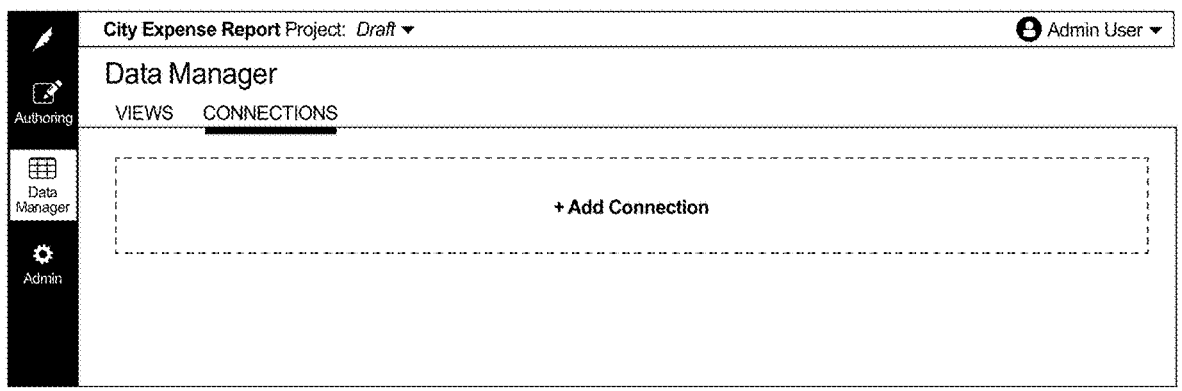

The Data Manager is the interface for adding the database connections or uploading the files that drive the story (see FIGS. 38 and 39).

A2(iii)(c): Project Administration

The Project Administration features of Quill are Monitoring, the Change Log, API documentation, Project Settings, and Scheduling. They are located in the Admin section of the Project.

Monitoring allows the user to see the status (success or failure) of generated stories (see FIG. 40). Stories run through the synchronous API or generated in Live Story will be listed here and can be filtered based on certain criteria (e.g. date, user).

The Change Log tracks changes made to the project (see FIG. 41).

Figure 42:
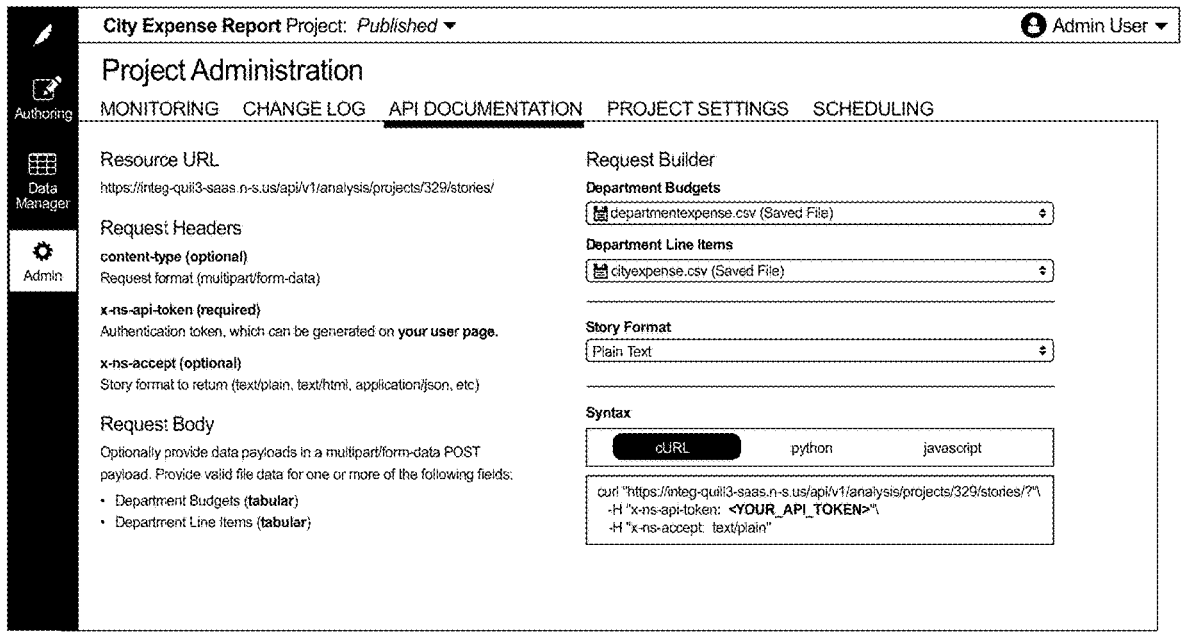

Quill supports on-demand story generation through synchronous API access (see FIG. 42).

Figure 43:
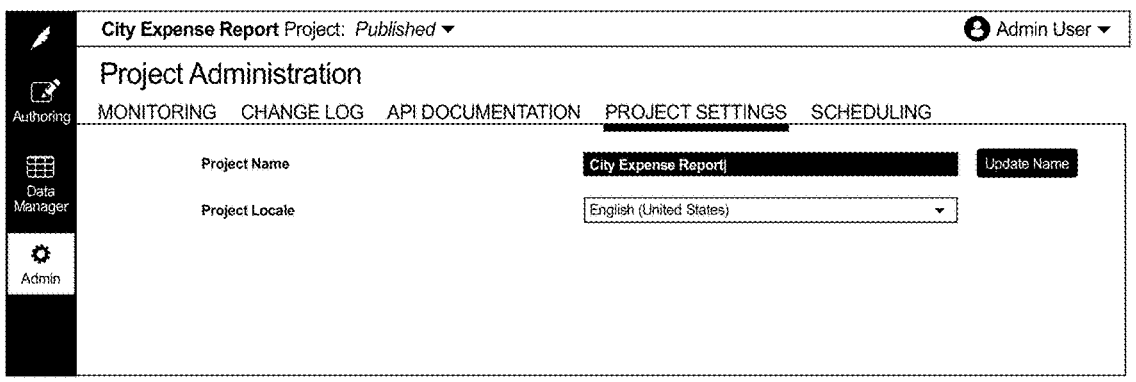

Project Settings are where you can change the name of the Project and set the project locale (see FIG. 43). This styles any currencies in your Project to the relevant locale (e.g. Japanese Yen).

Figure 44:
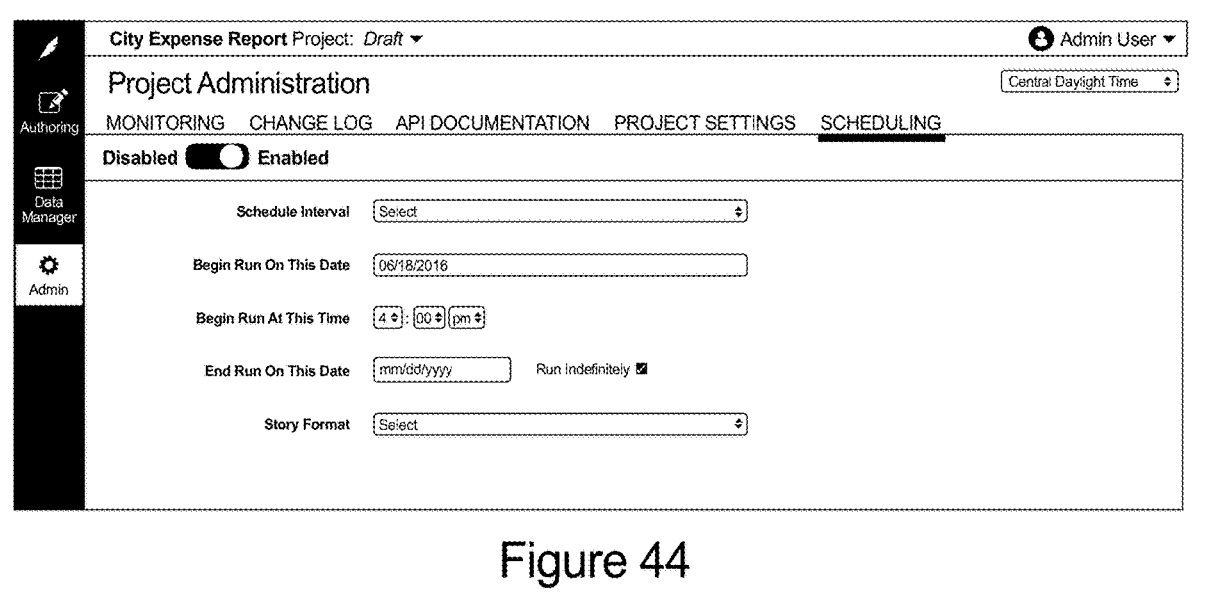

You can set your story to run at regular intervals in Scheduling (see FIG. 44).

A3: Configure a Story from a Blueprint

The benefit of configuring a story from a project blueprint is the ability to reuse Sections, Communication Goals, Data Views, and Ontology as a starting point. These blueprints are available in the Create Project screen as discussed in the Getting Started section.

A3(i): Configure a Sales Performance Report

Figures 45, 46:
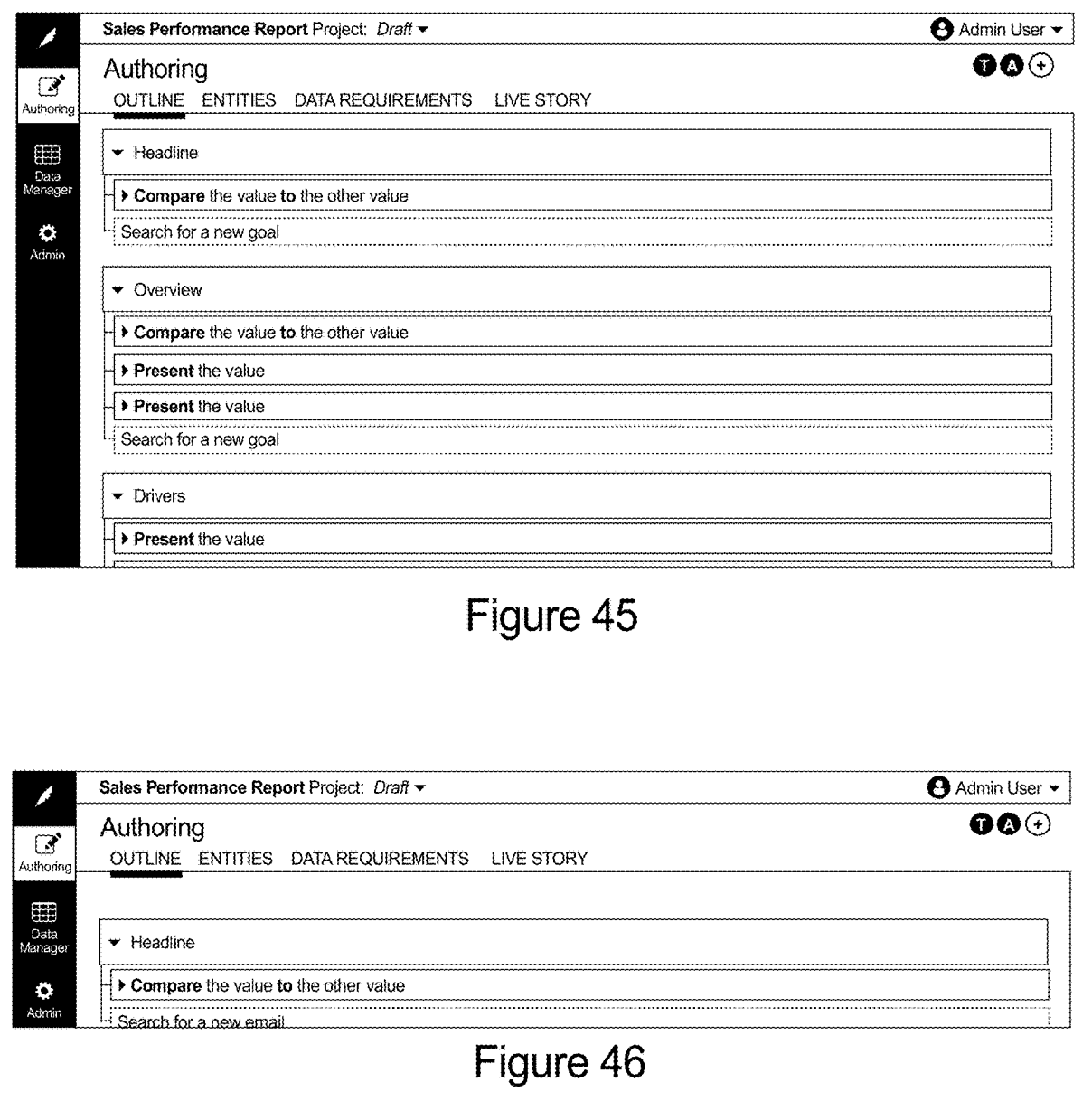

Select the Performance Project Blueprint and give your project a name. You can always change this later by going to Admin>Project Settings. After the project is created, you'll be taken to Authoring and presented with an Outline that has a "Headline", "Overview", and "Drivers" sections with associated Communication Goals within them (see FIG. 45).

A3(i)(a): Headline

To begin, set the Attributes in the Communication Goal in the Headline. Select "the value" (see FIG. 46) to open a sidebar on the right side of the screen.

Figure 47:
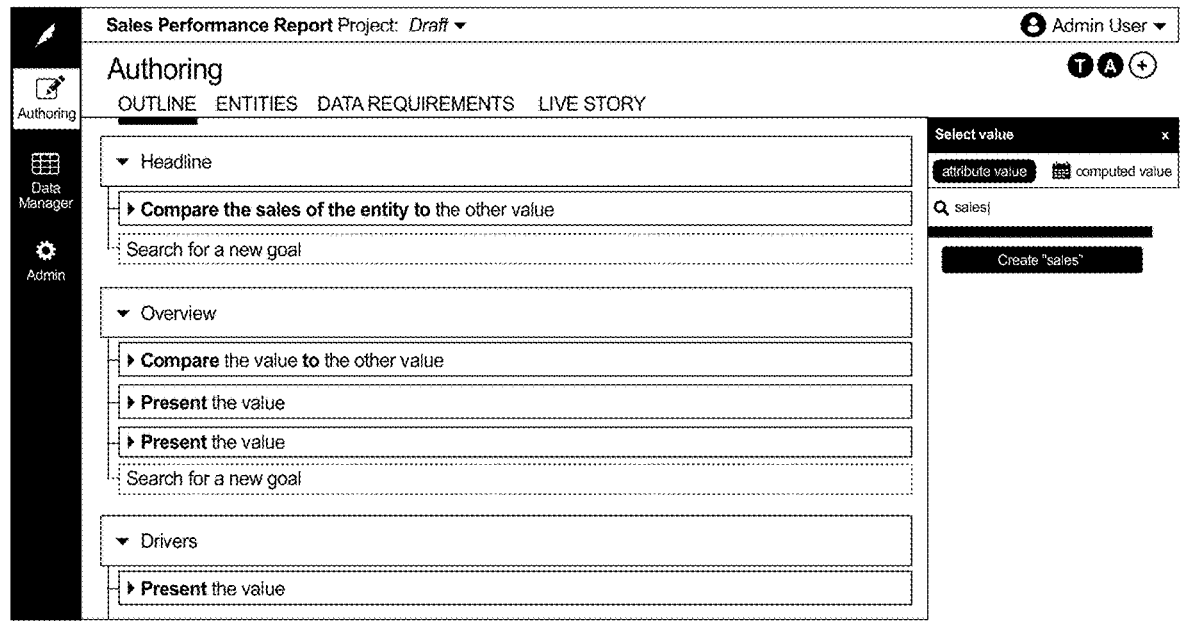
Figure 48:
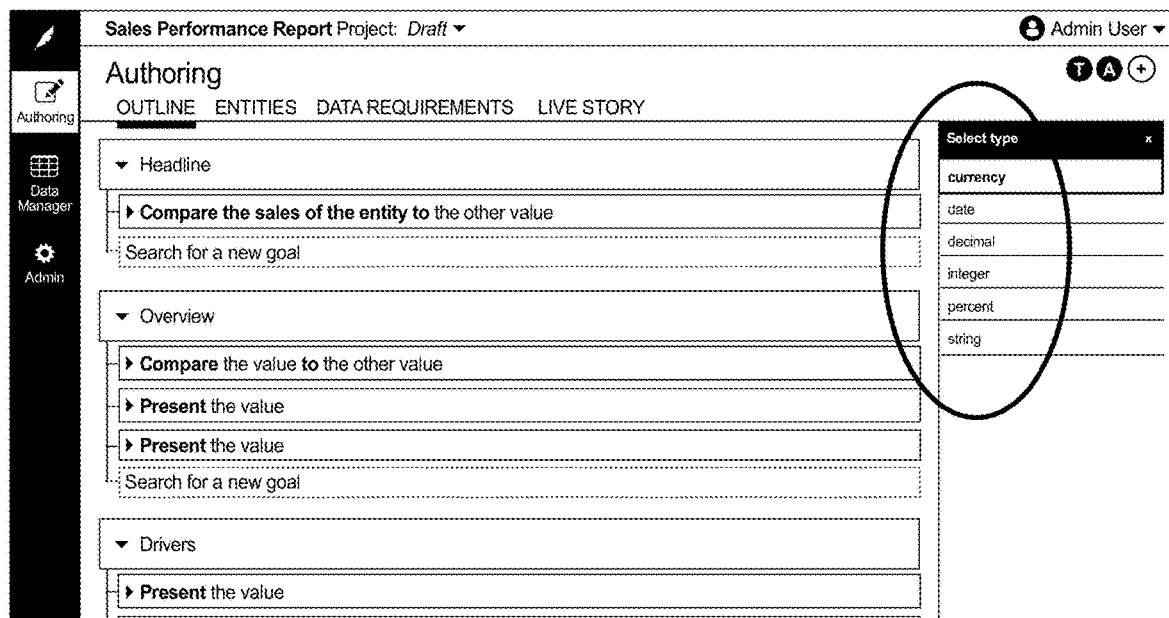
Figure 49:
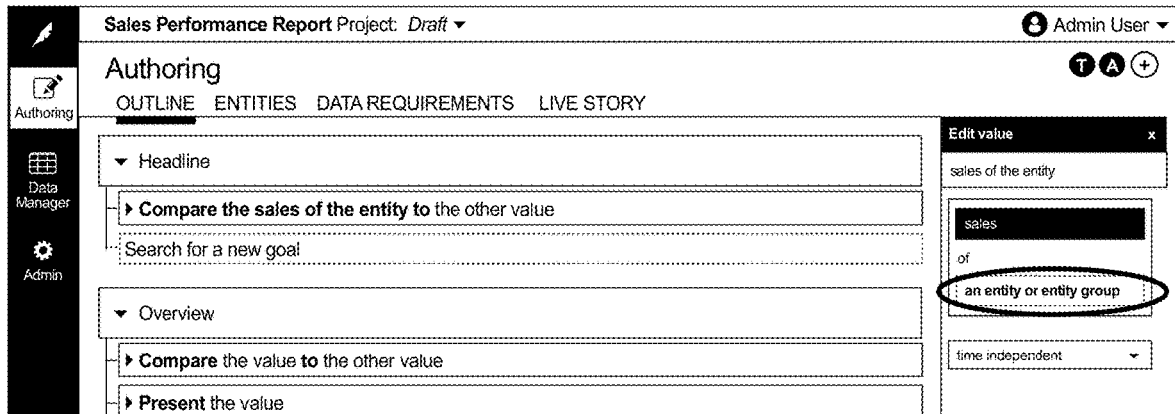

Create an Attribute by entering "sales" and clicking "Create "sales" (see FIG. 47).

Then specify "currency" from the list of Attribute types (see FIG. 48).

The next step in Attribute creation is to associate the Attribute with an Entity type. Since there are no existing Entity types in this blank Project, you'll have to create one (see FIG. 49).

Figure 50:
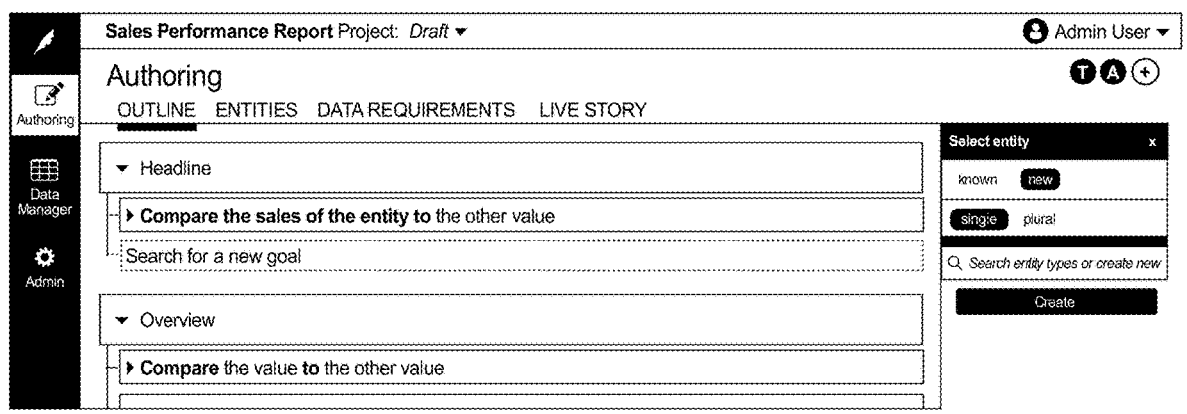

Click "an entity or entity group" to bring out the Entity type creation sidebar (see FIG. 50).

Figure 51:
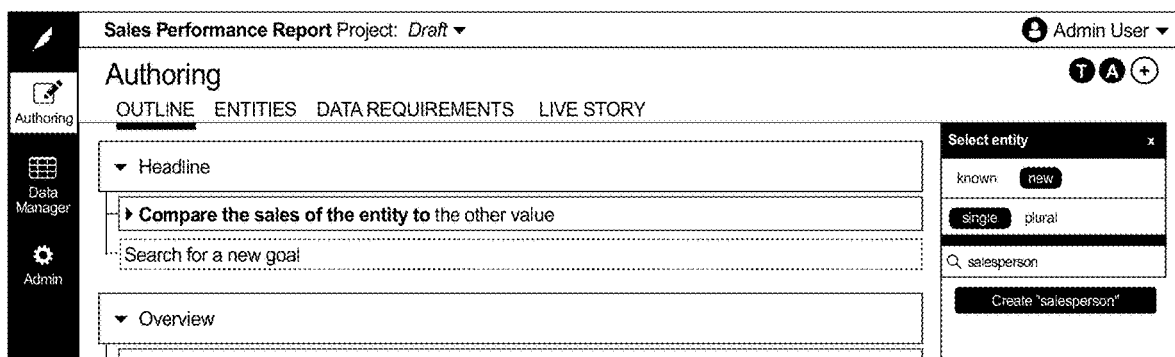

Name the Entity type "salesperson" and click to create "salesperson" (see FIG. 51).

Figure 52:
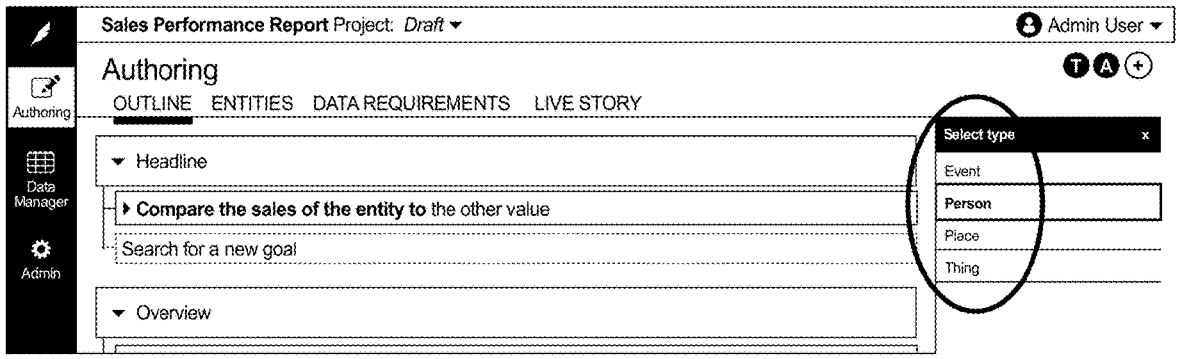
Figure 53:
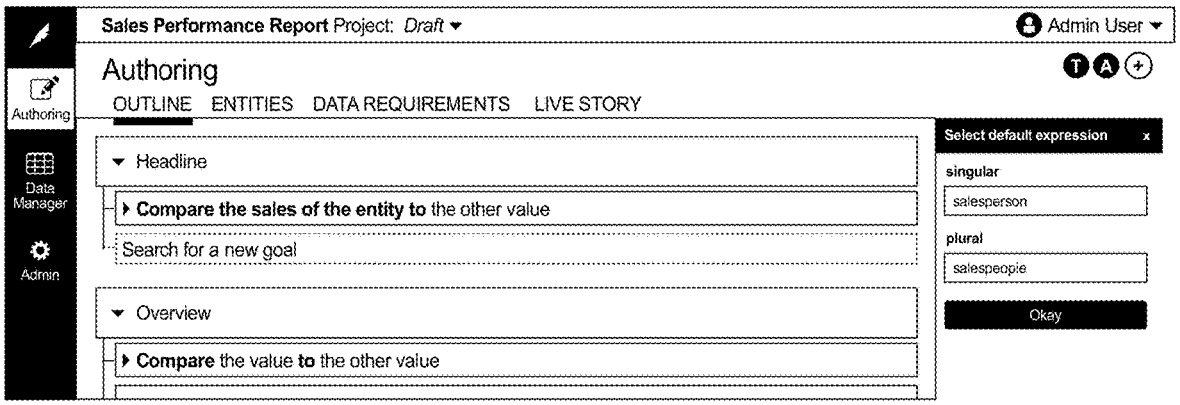

Set the base Entity type to Person (see FIG. 52).

Quill will make a guess at the singular and plural expressions of the Entity type. Make corrections as necessary and click "Okay" (see FIG. 53).

Figure 54:
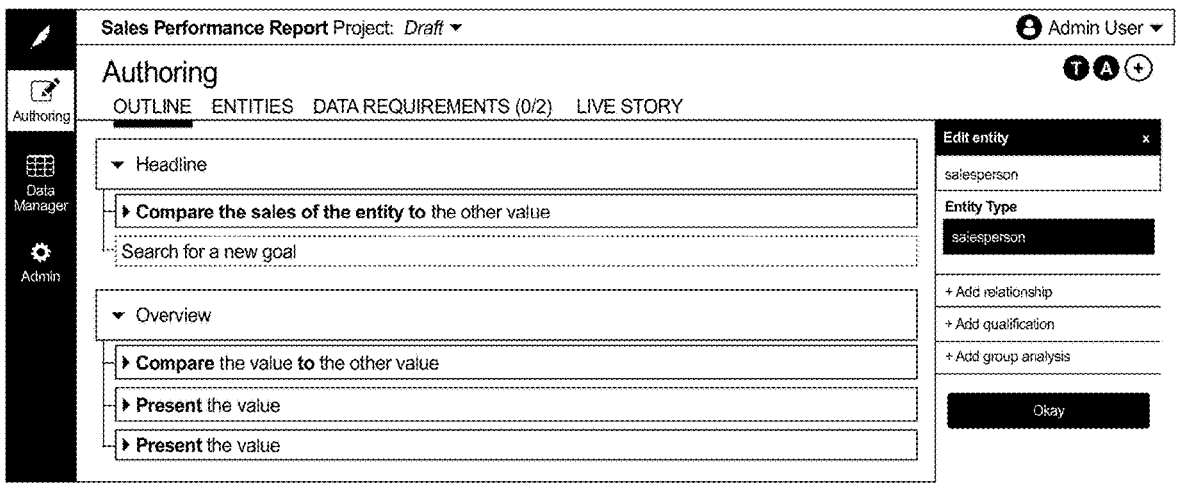

There are no designations on the Entity type you created, so click "Okay" to return to the Attribute editing sidebar (see FIG. 54). A designation modifies the Entity type to specify additional context such as relationships to other Entity types or group analysis.

Once an Entity type is created, it will be available for selection throughout the project. Additional Entity expressions can be added in the Entities tab (see Ontology Management).

Figure 55:
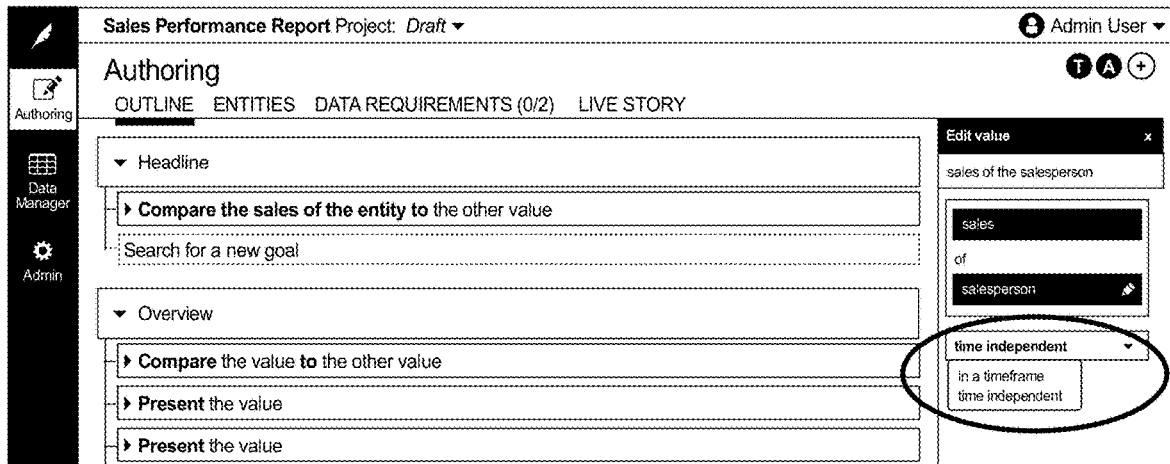

Next, you'll specify a Timeframe for the Attribute (see FIG. 55).

Figure 56:
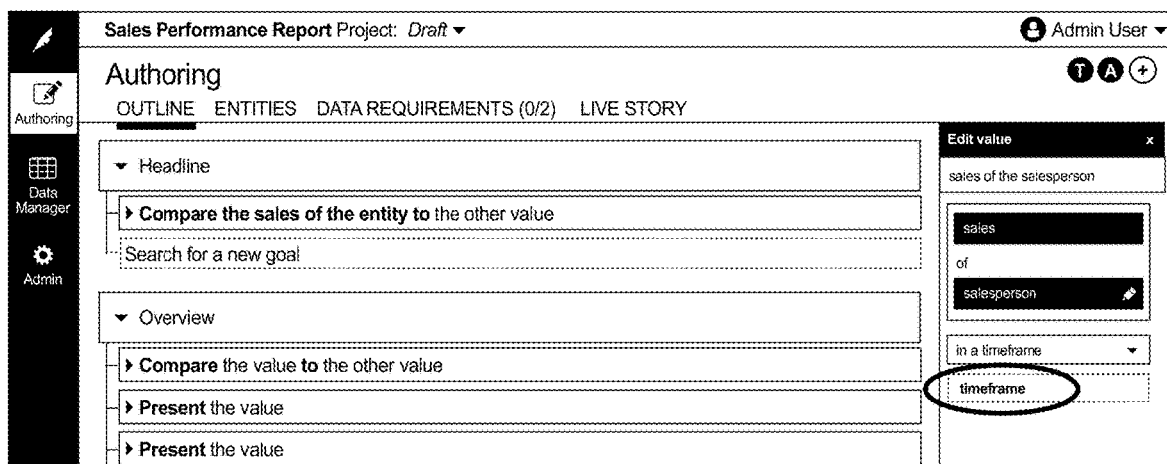
Figure 57:
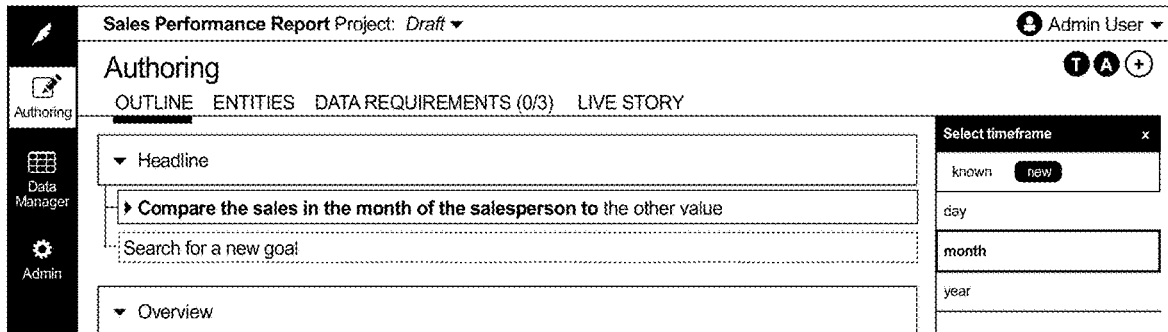

Click "Timeframe" to create a new Timeframe (see FIG. 56).

Figure 58:
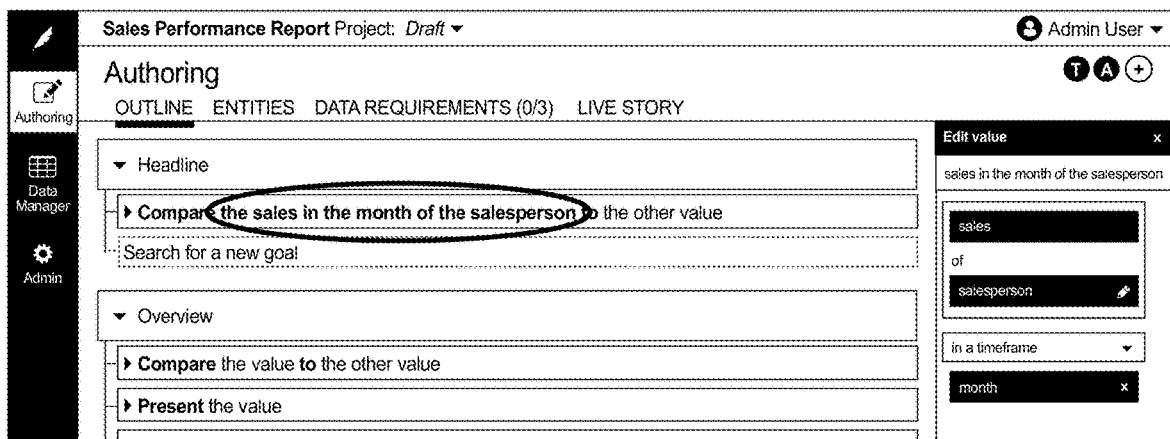

Choose Month (see FIG. 57) to complete the creation of the Attribute (see FIG. 58).

Figure 59:
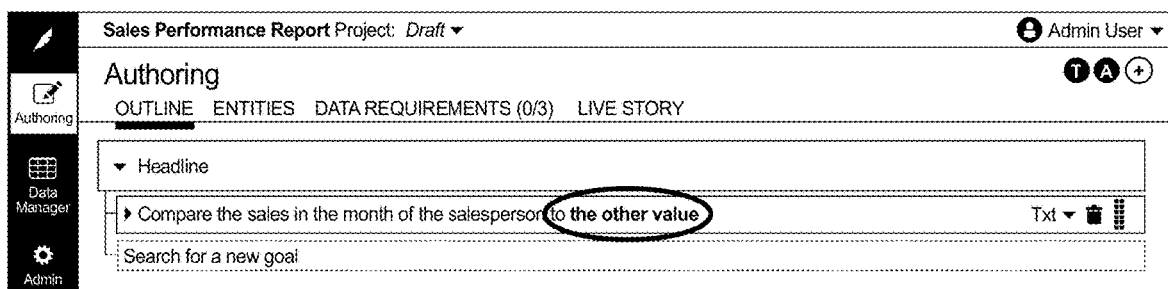

Click "the other value" to set another Attribute (see FIG. 59).

Figure 60:
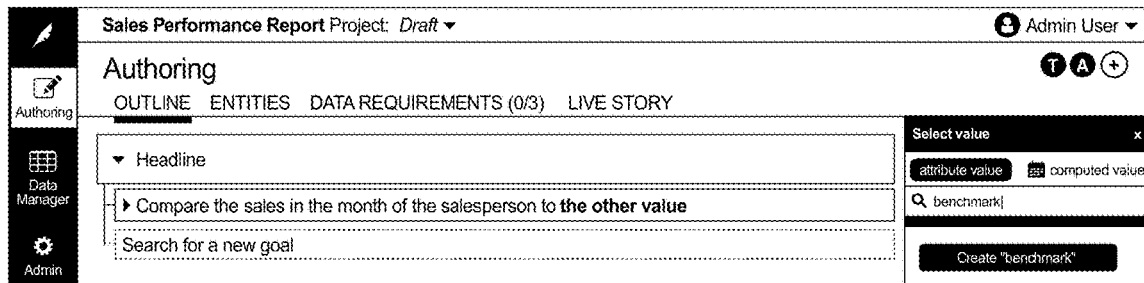
Figure 61:
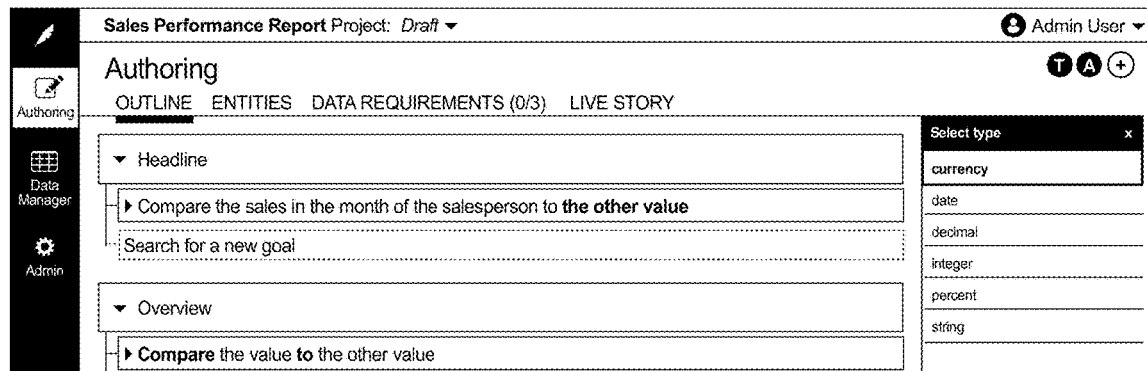

Name it "benchmark" (see FIG. 60) and set its type to "currency" (see FIG. 61).

Figure 62:
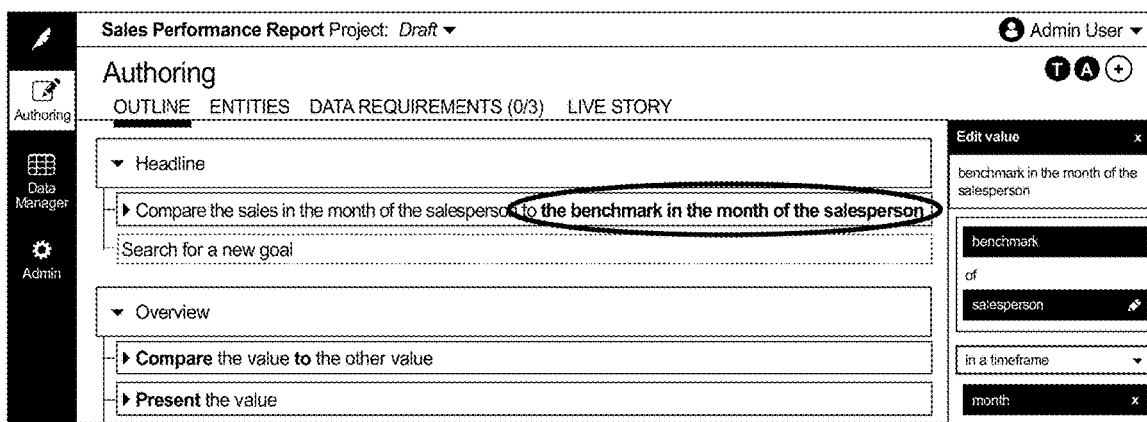

Associate it with the Entity type "salesperson" and set it to be in the "month" Timeframe (see FIG. 62).

Click on the arrow to the left of the Communication Goal in the headline section (see FIG. 63) to expose the list of related goals.

The bottom related goal is the Characterization (see FIG. 64).

Figure 65:
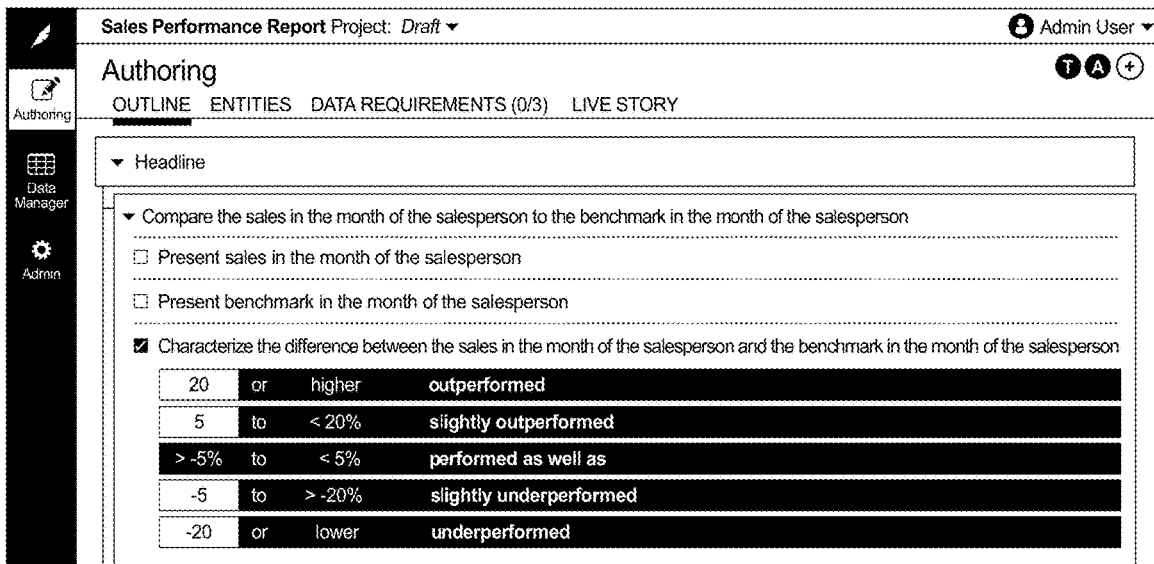

Check the box to opt in to the Characterization (see FIG. 65).

Quill has default thresholds to determine the comparative language for each outcome. Entering different values into the boxes (see FIG. 66), with each value being percentage comparisons calculated against your data view, can change these thresholds (see FIG. 67). As such, these comparisons are done against numerical Attribute Values. If a value is changed to be less than the upper bound or greater than the lower bound of a different outcome, Quill will adjust the values so that there is no overlap.

A3(ii)(b): Overview

Configure the first Communication Goal in the Overview section (see FIG. 68) using the same steps as for the Communication Goal in the Headline section.

Set the Attribute of the first "Present the value" Communication Goal to be "sales in the month of the salesperson," and the Attribute of the second "Present the value" Communication Goal to be "benchmark in the month of the salesperson" (see FIG. 69).

Figure 70:
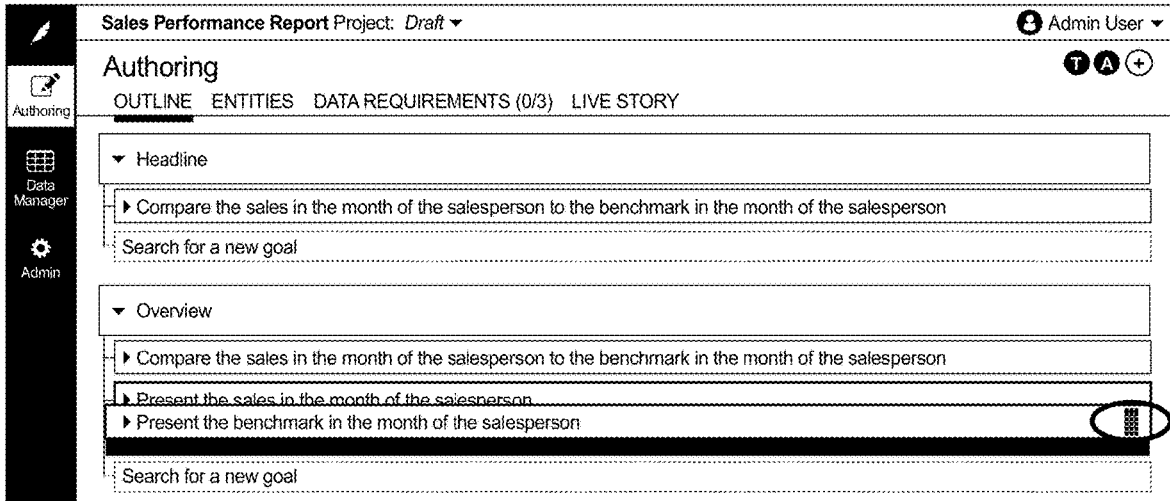
Figure 71:
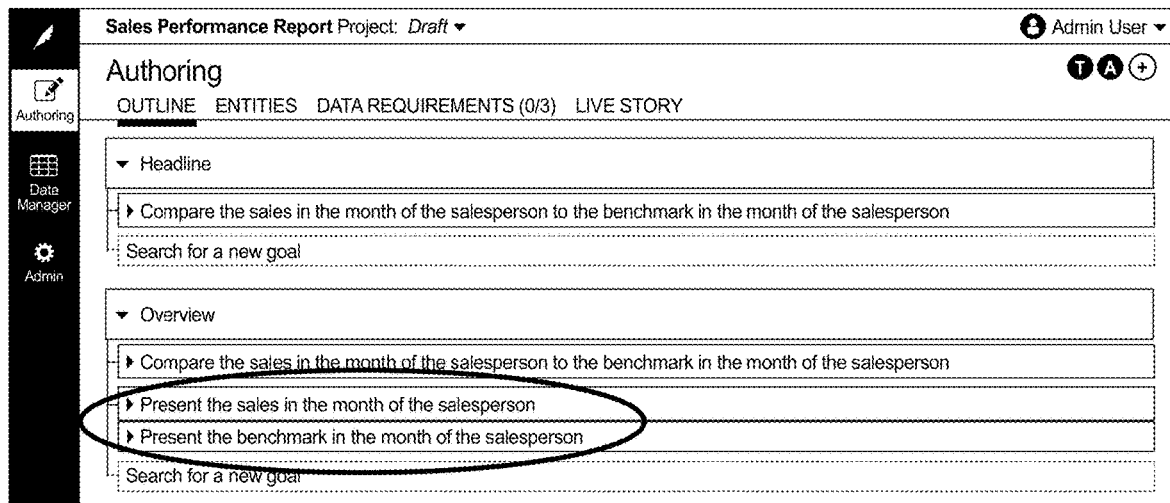

Link the two Present Communication Goals by dragging (using the gripper icon on the right side of the Communication Goal that is revealed when you hover your cursor over the Goal—see FIG. 70) "Present the benchmark in the month of the salesperson" to overlap "Present the sales in the month of the salesperson" (see FIG. 71).

A3(iii)(c): Drivers

Step One: Click "the value" in the first Communication Goal in the Drivers section to set the Attribute. Choose computed value in the Attribute creation sidebar and go into the functions tab in order to select "contribution" (see FIG. 72).

Figures 72, 73:
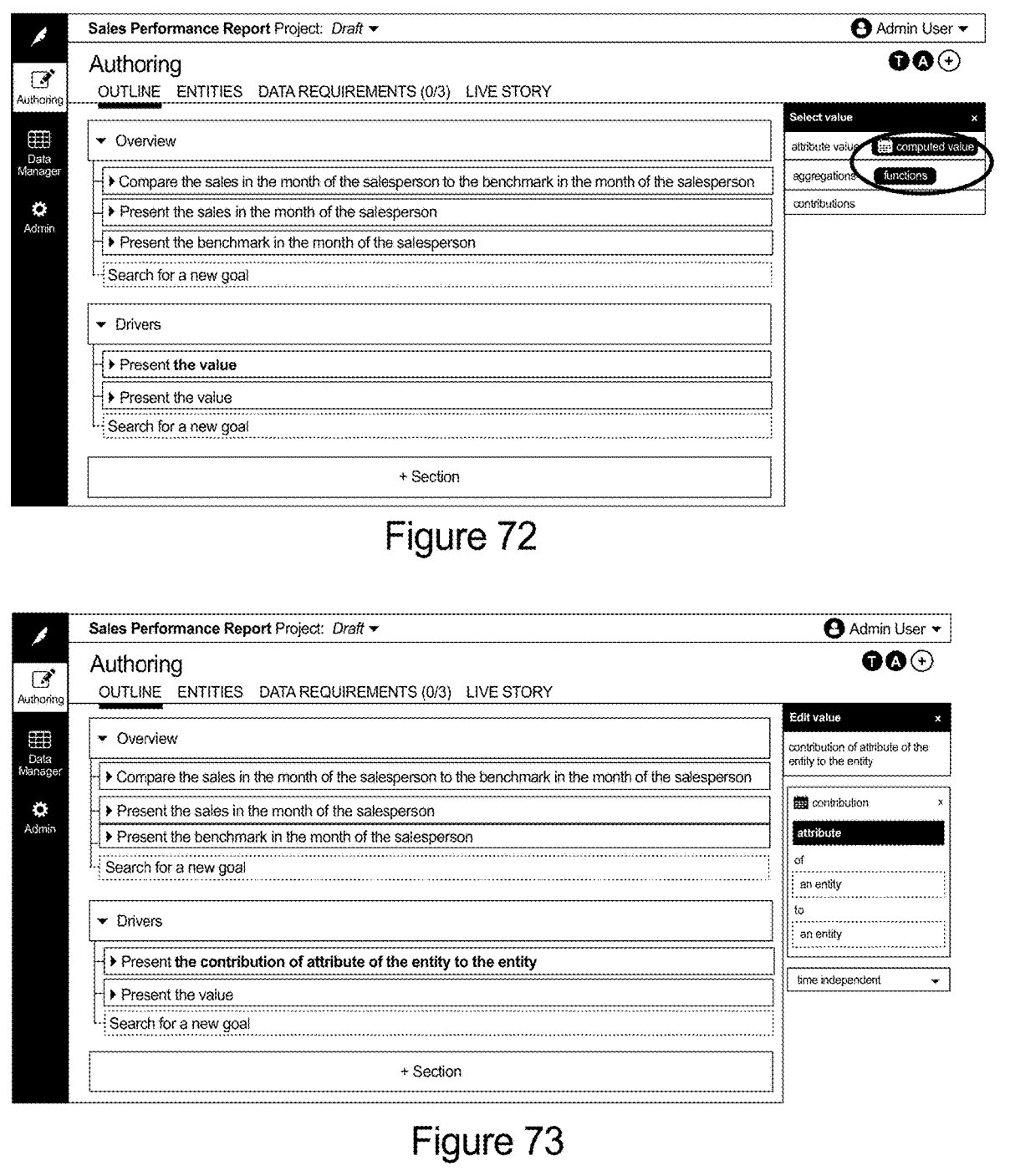
Figures 74, 75:
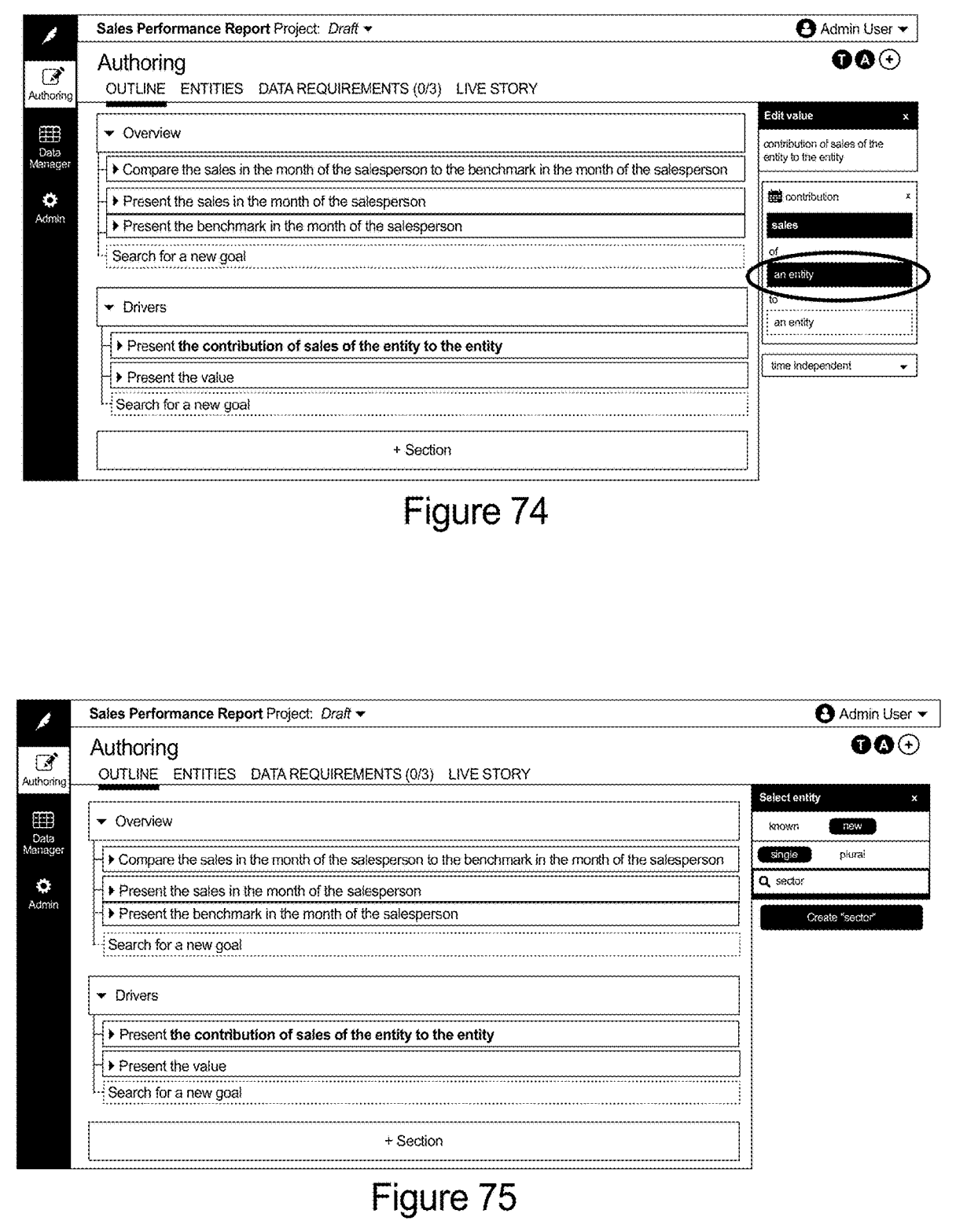

Set the Attribute to be "sales" (see FIGS. 73 and 74).

Click the first entity and create the new Entity type "sector" of type "Thing" (see FIG. 75).

Add a relationship (see FIG. 76) and set the related entity as "salesperson" (see FIG. 77).

Figures 78, 79:
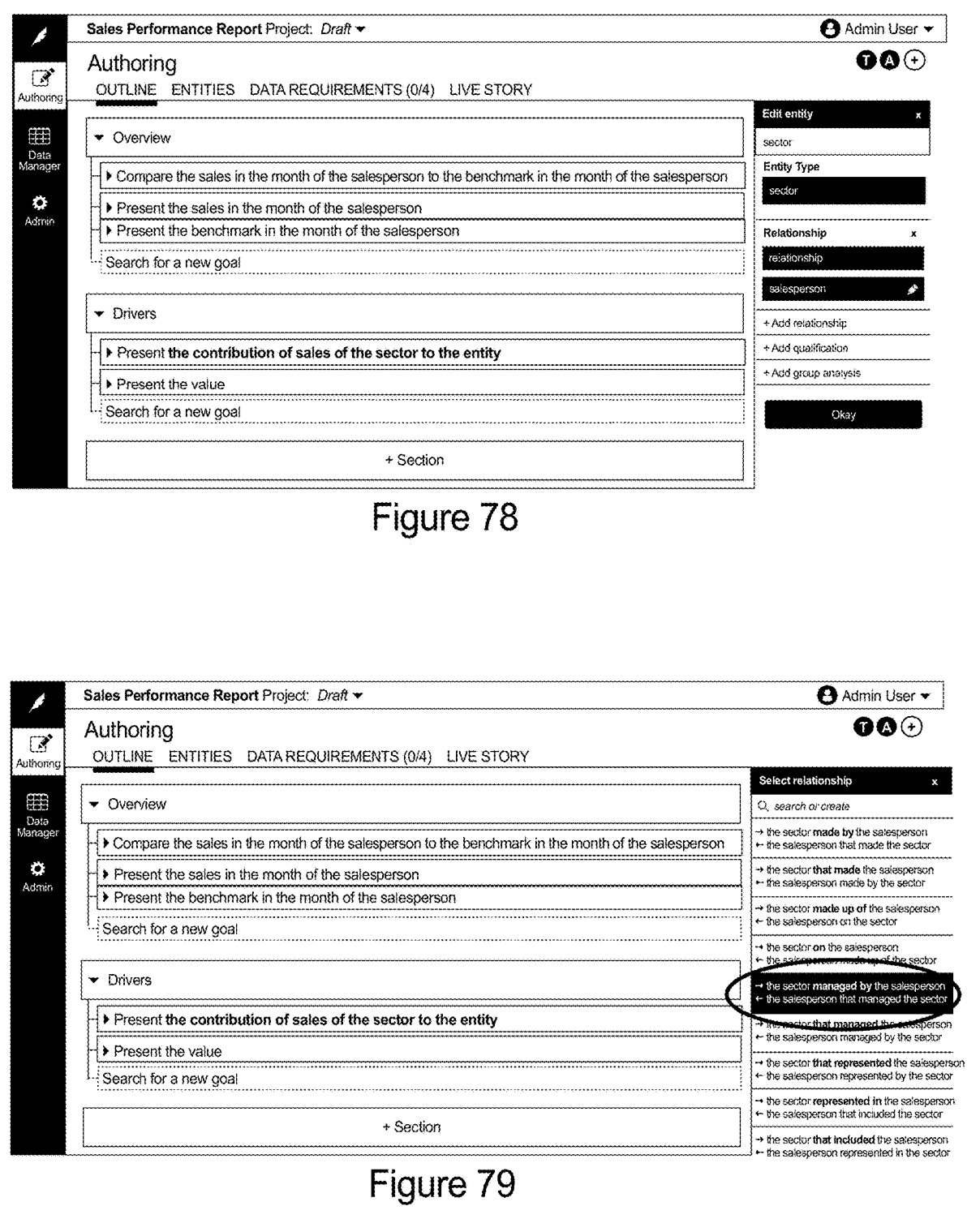

Set the relationship as "managed by" (see FIGS. 78 and 79).

Figures 80, 81:
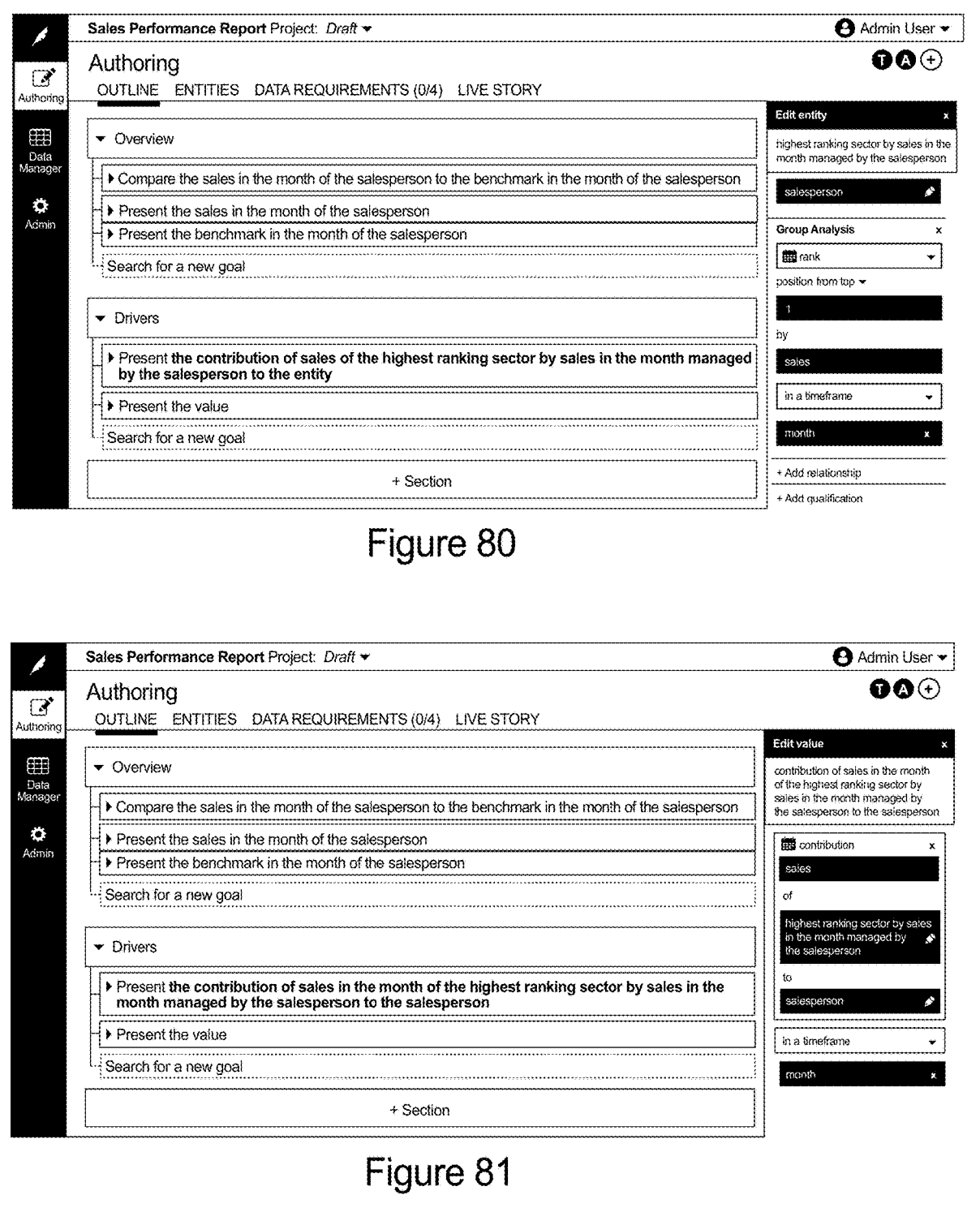

Add a group analysis and set the Attribute as "sales" and the Timeframe to "month" (see FIG. 80).

Set the second entity to "salesperson" and the timeframe to "month" (see FIG. 81).

Figures 82, 83:
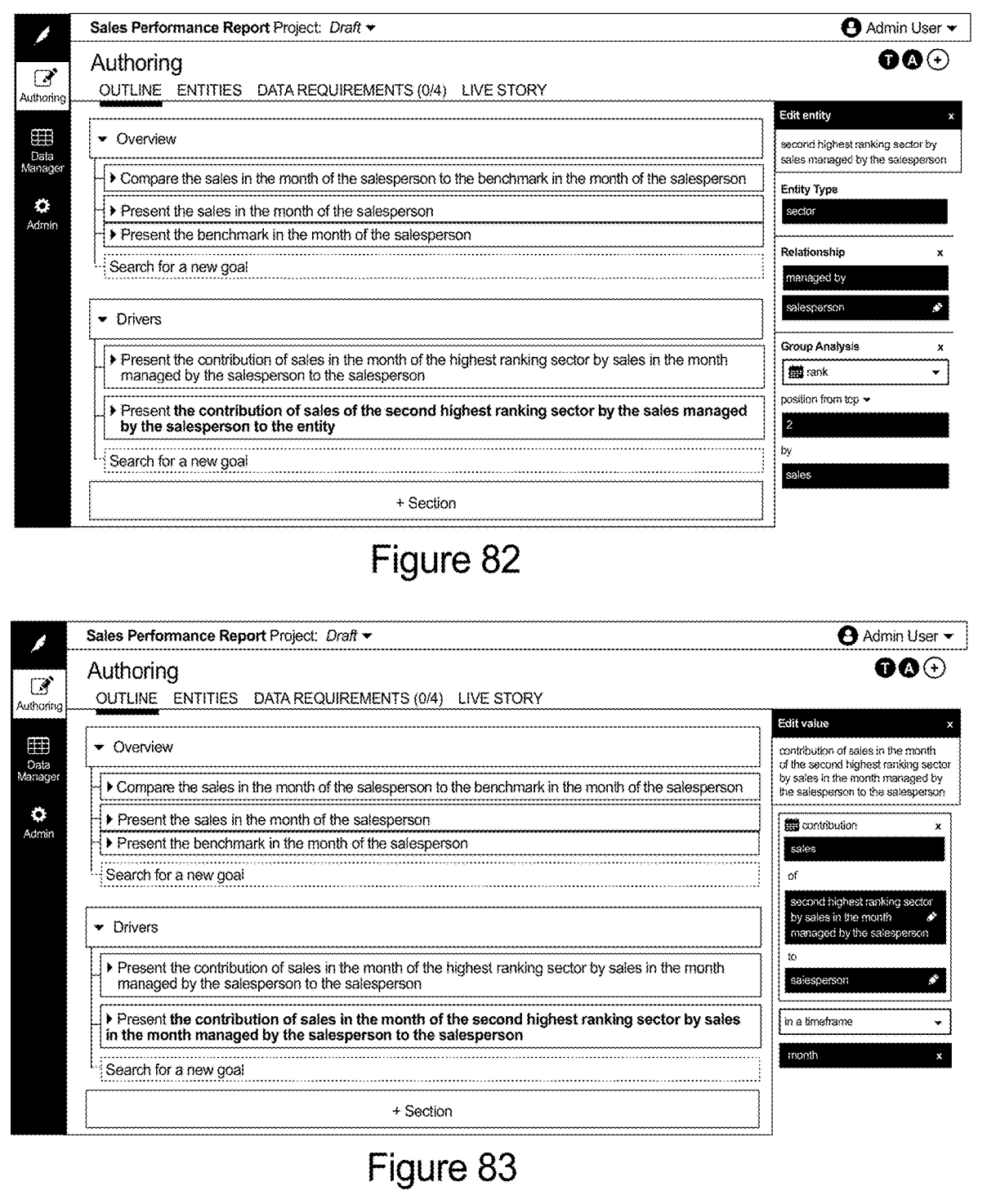

Step Two: Follow the steps as above to complete the second Communication Goal in the Drivers section but set the position from top to be 2 in the group analysis (see FIGS. 82-83).

Figure 84:
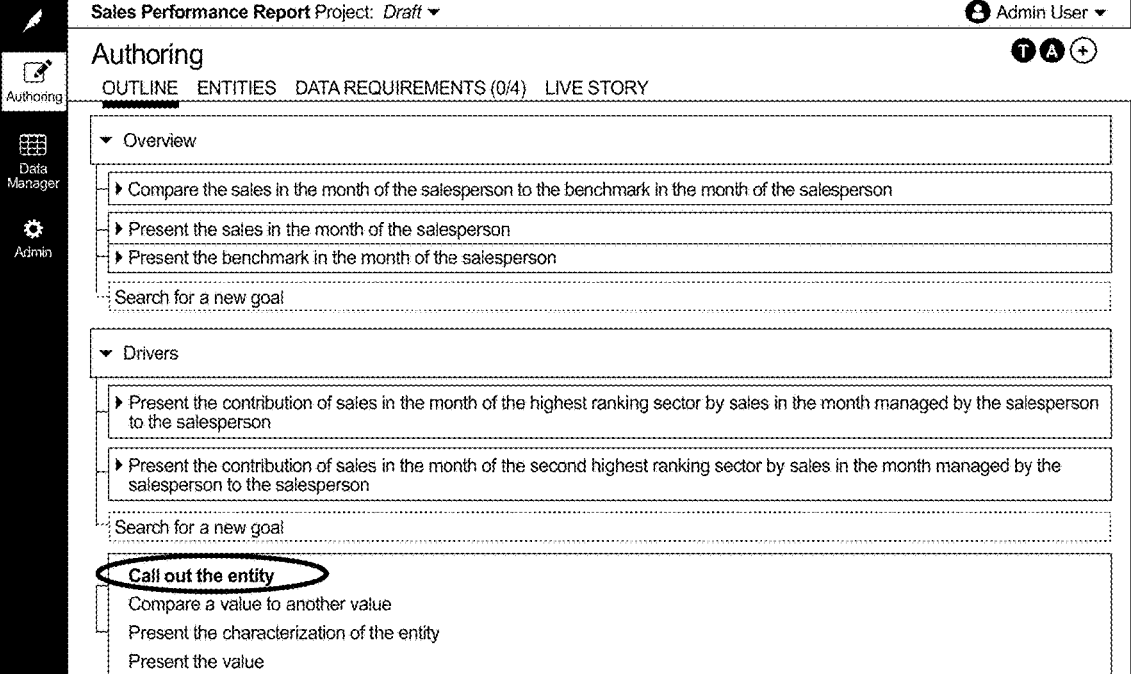

Step Three: Click into the "Search for a new goal" box and select "Call out the entity" (see FIG. 84).

Figure 85:
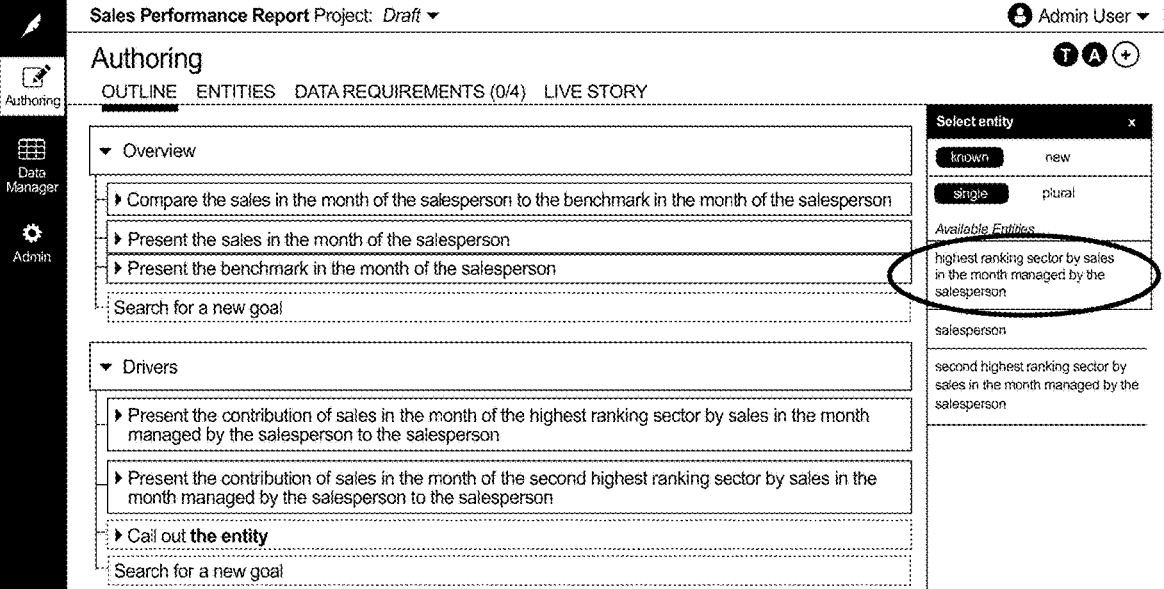

Set the entity to be "highest ranking sector by sales in the month managed by the "salesperson" (see FIG. 85).

Then move the goal by grabbing the gripper icon on the right side to the first position in the section (see FIG. 86).

Step Four: Create another Call out the entity Communication Goal (see FIG. 87).

Figures 88, 89:
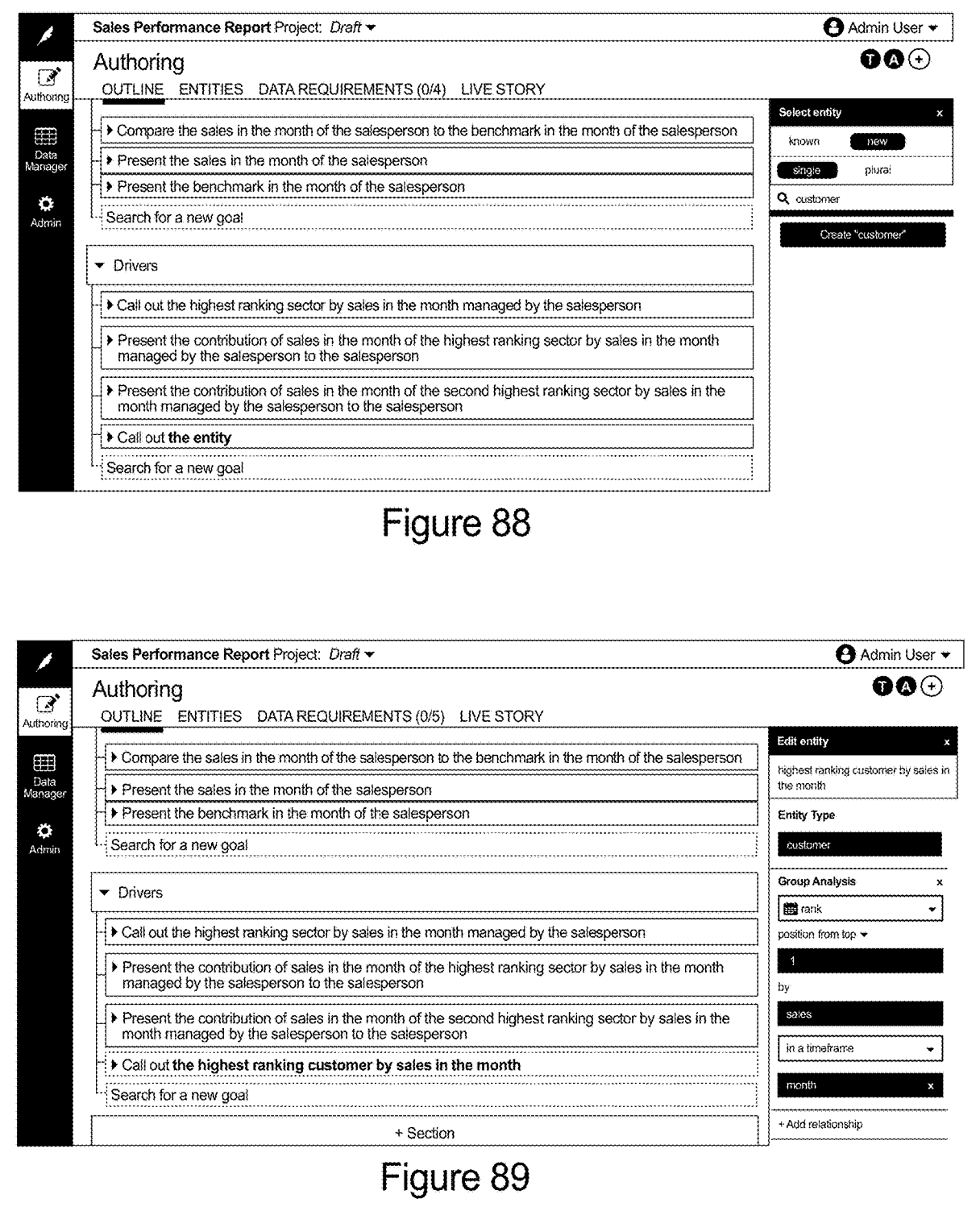

Create a new Entity type of "customer" and set the base entity type to "thing" (see FIG. 88).

Add a group analysis and set the Attribute to "sales" and the Timeframe to "month" (see FIG. 89).

Figures 90, 91:
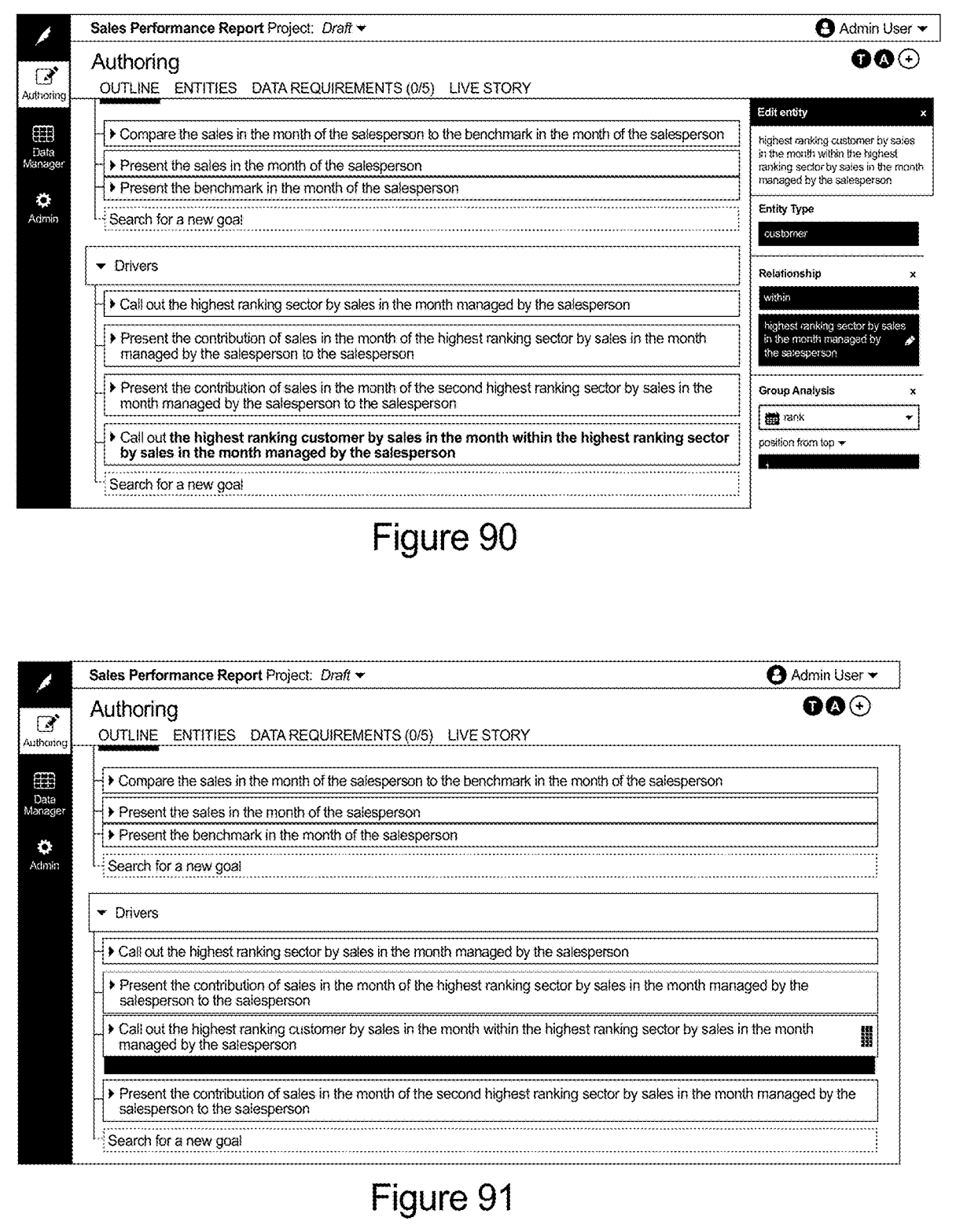

Then add a relationship and set the related entity to be "highest ranking sector by sales in the month managed by the salesperson" and choose the relationship "within" (see FIG. 90).

Then move it to the third position in the Drivers section, after the first Present goal (see FIG. 91).

Figure 92:
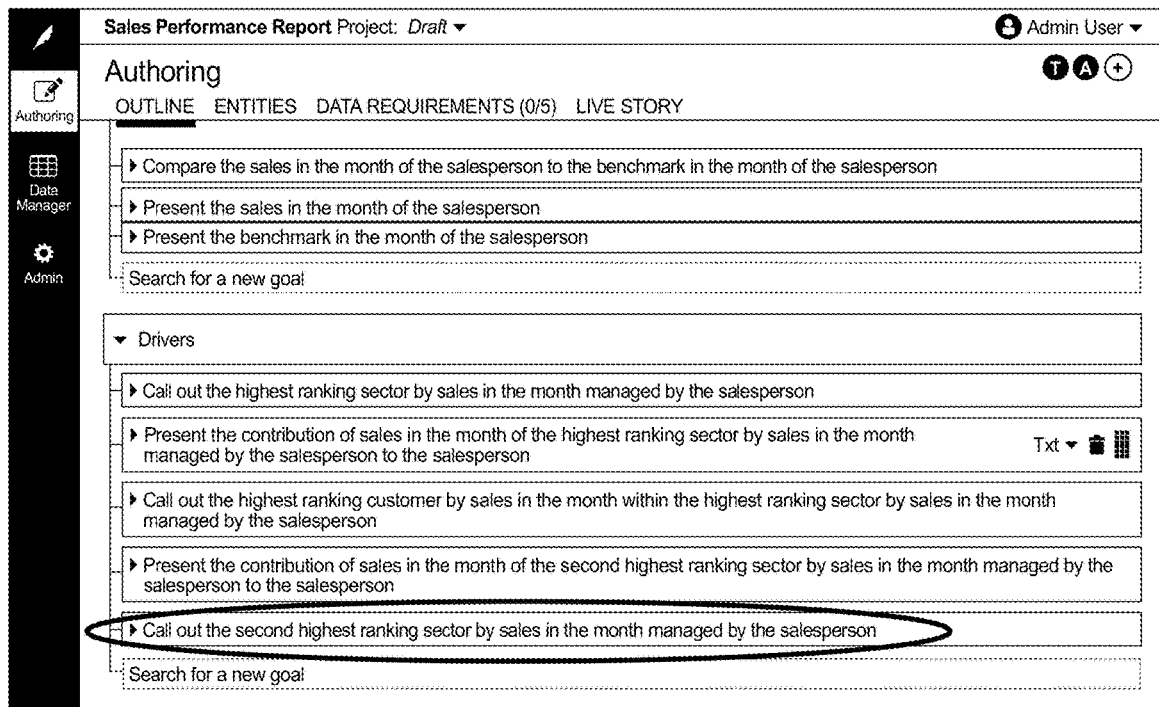

Step Five: Create another Call out the entity Communication Goal and set the entity to "second highest ranking sector by sales in the month managed by the salesperson" (see FIG. 92).

Figure 93:
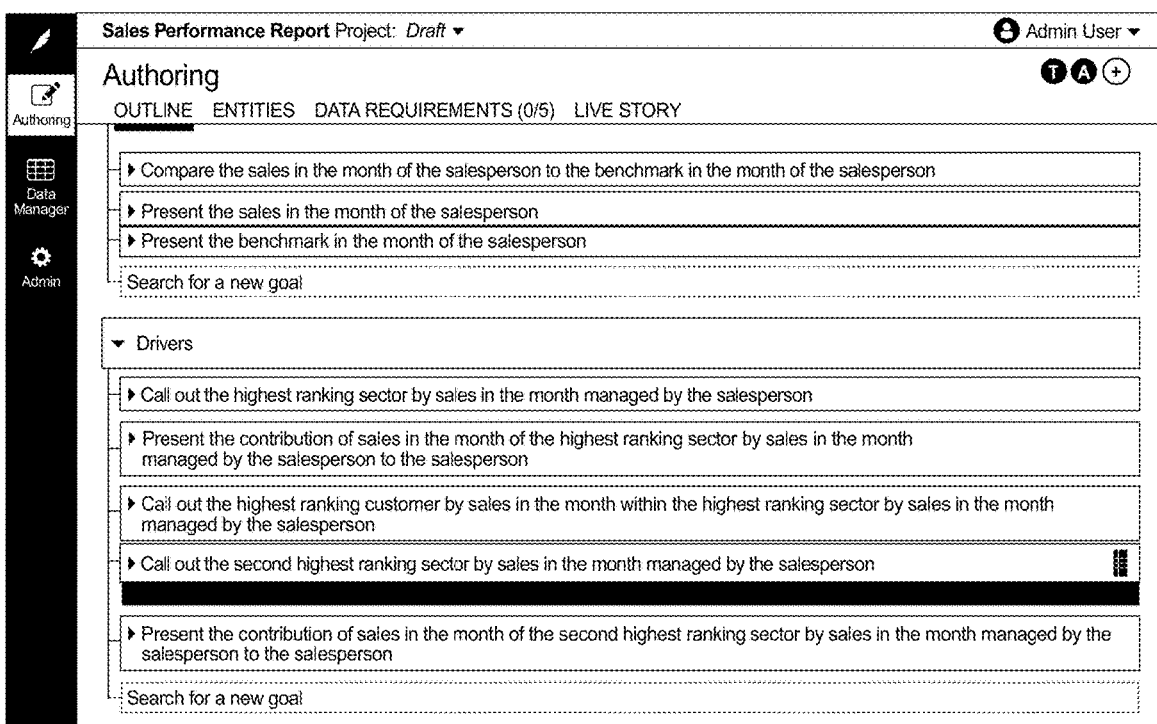

And move it to the fourth position in the Drivers section, before the second Present goal (see FIG. 93).

Step Six: Create another Call out the entity Communication Goal. Create a new entity type of customer following Step Four, but set the related entity to be "second highest ranking sector by sales in the month managed by the salesperson" (see FIG. 94).

Step Seven: Finally, create another Call out the entity Goal. Create a new plural Entity type of "regions" and set its type to be "place." Add a group analysis and set the number from top to "3," the Attribute to "sales," and the Timeframe to "month" (see FIG. 95).

Figures 96, 97:
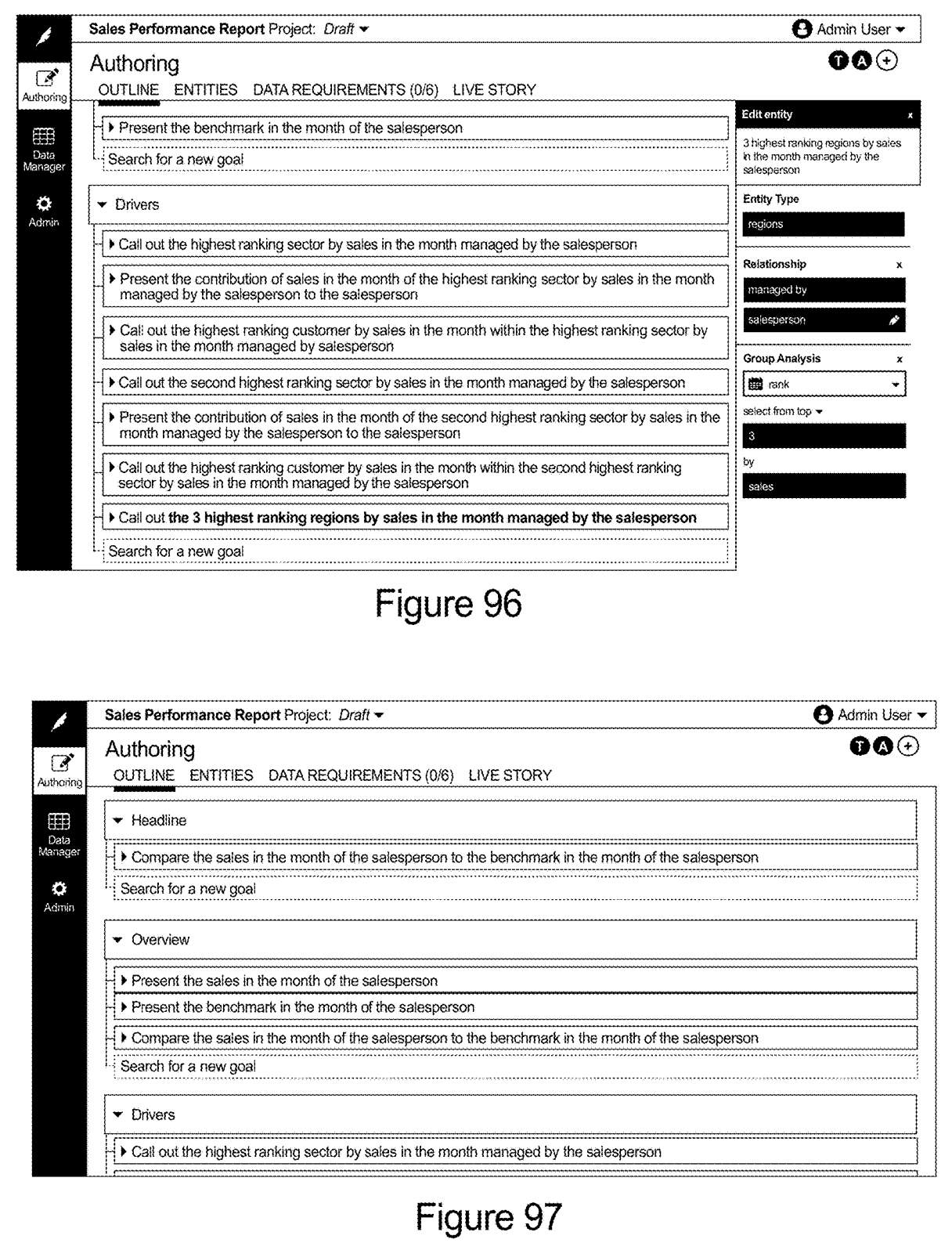

Then add a relationship, setting the related Entity type as "salesperson" and the relationship as "managed by" (see FIG. 96).

Figures 98, 99:
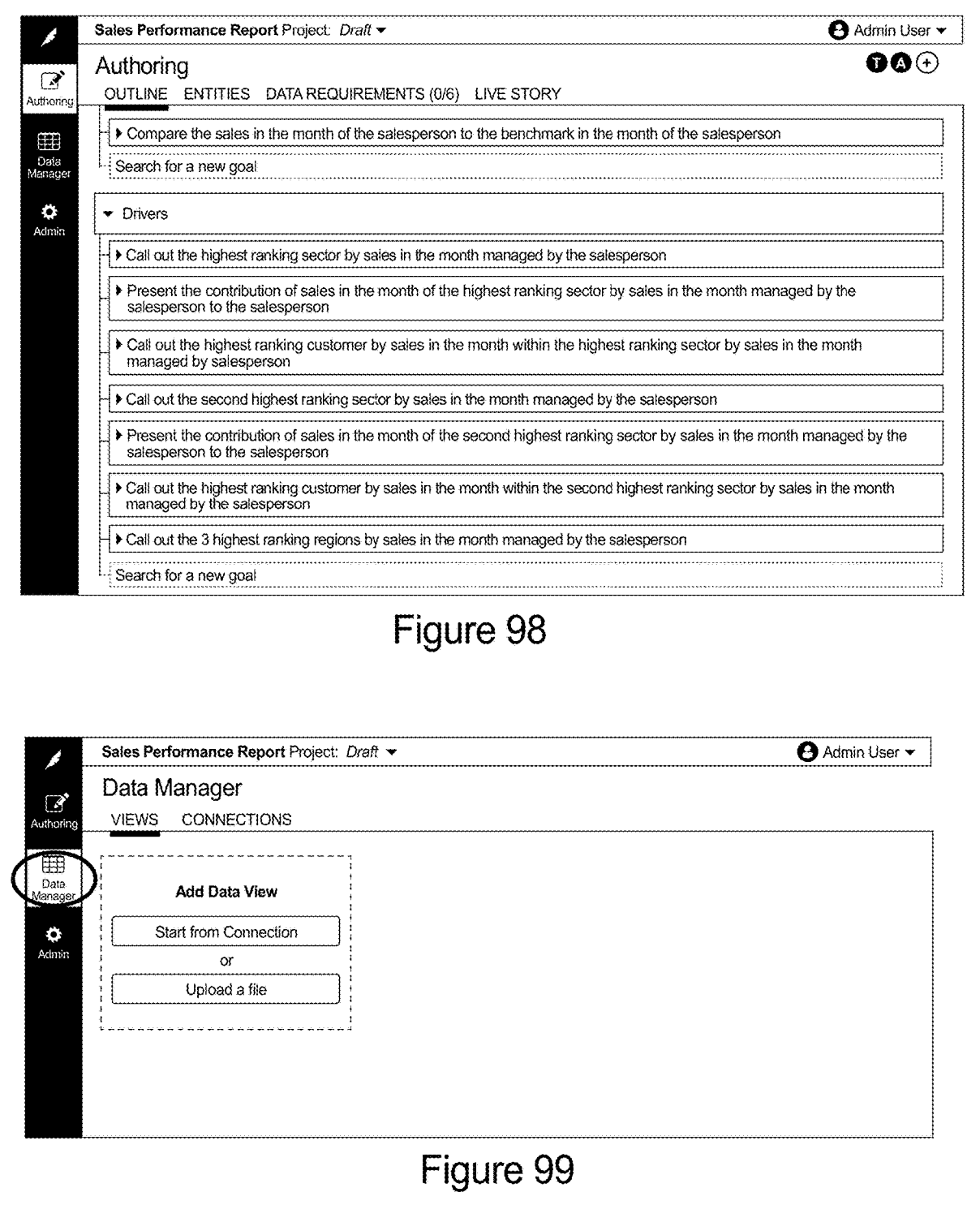

The completed outline should match FIGS. 97 and 98. Quill will update the "Data Requirements" tab with prompts asking for the information necessary to generate the story from that configuration.

A3(iv)(d): Adding Data

In order to complete the Data Requirements for the story, you add a Data Source to the Project. Go the Data Manager section of the Project to add a Data View (see FIG. 99).

Figures 100, 101:
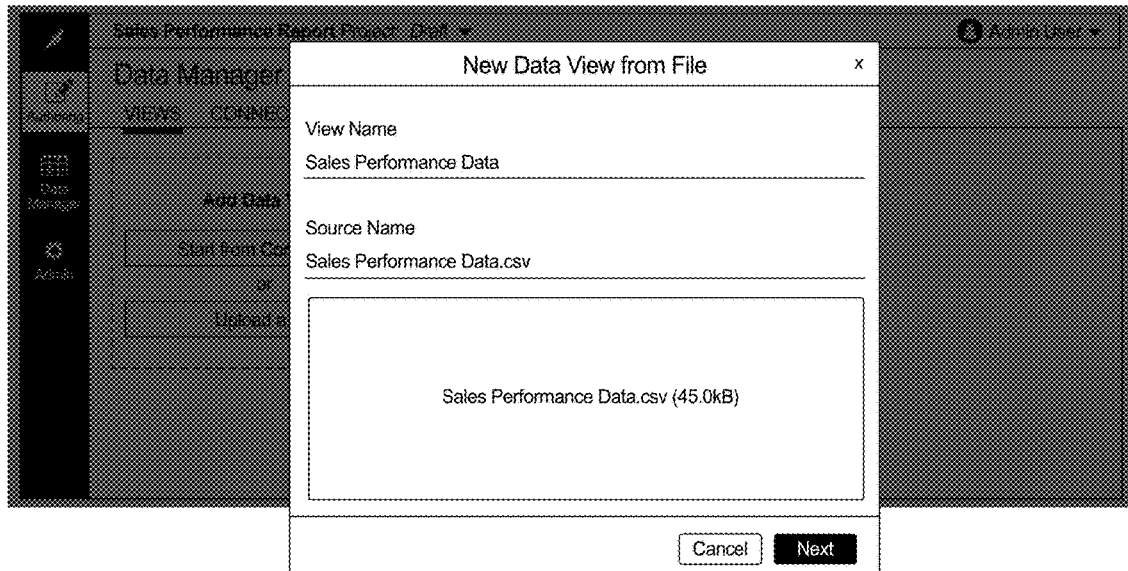
Figure 109:
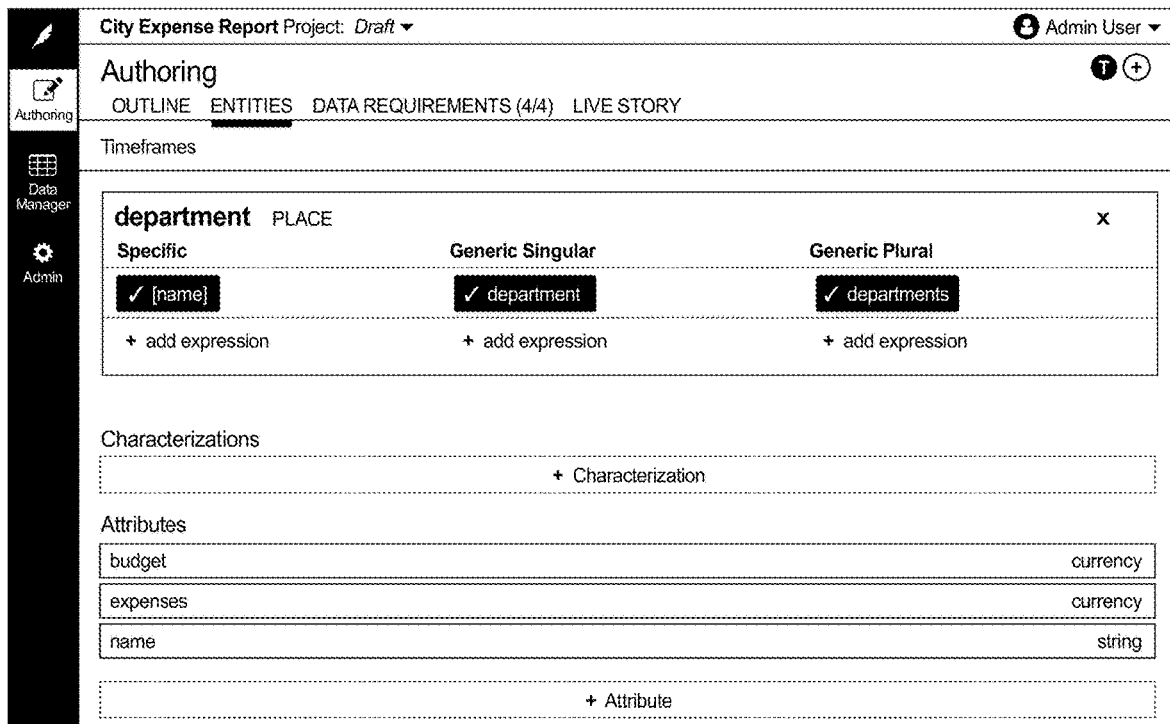
Figure 110:
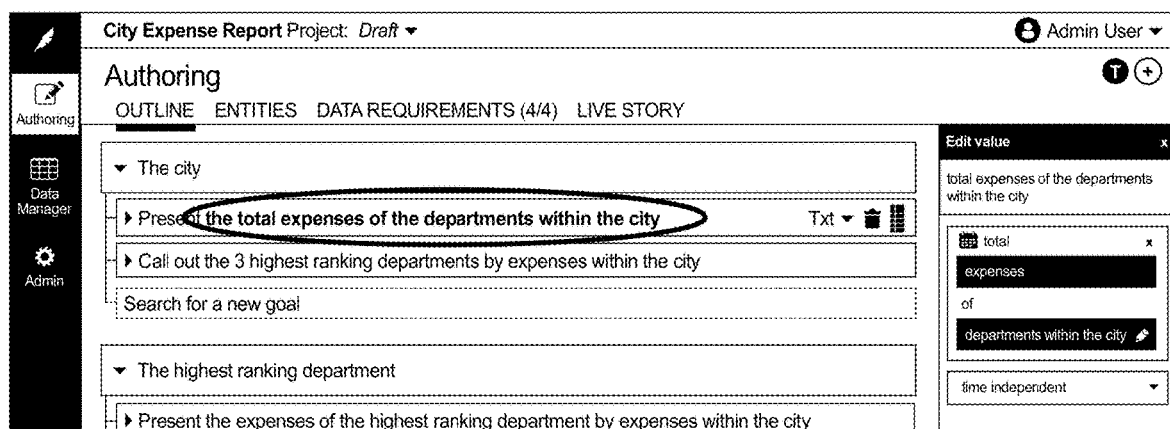

Choose to Upload a file and name the Data View (see FIG. 100). Upload the Sales Performance Data csv file that you were provided.

Once Quill has saved the Data View to the Project, you will be presented with the first few rows of the data (see FIG. 101).

A3(v)(e): Data Requirements

Figures 102, 103:
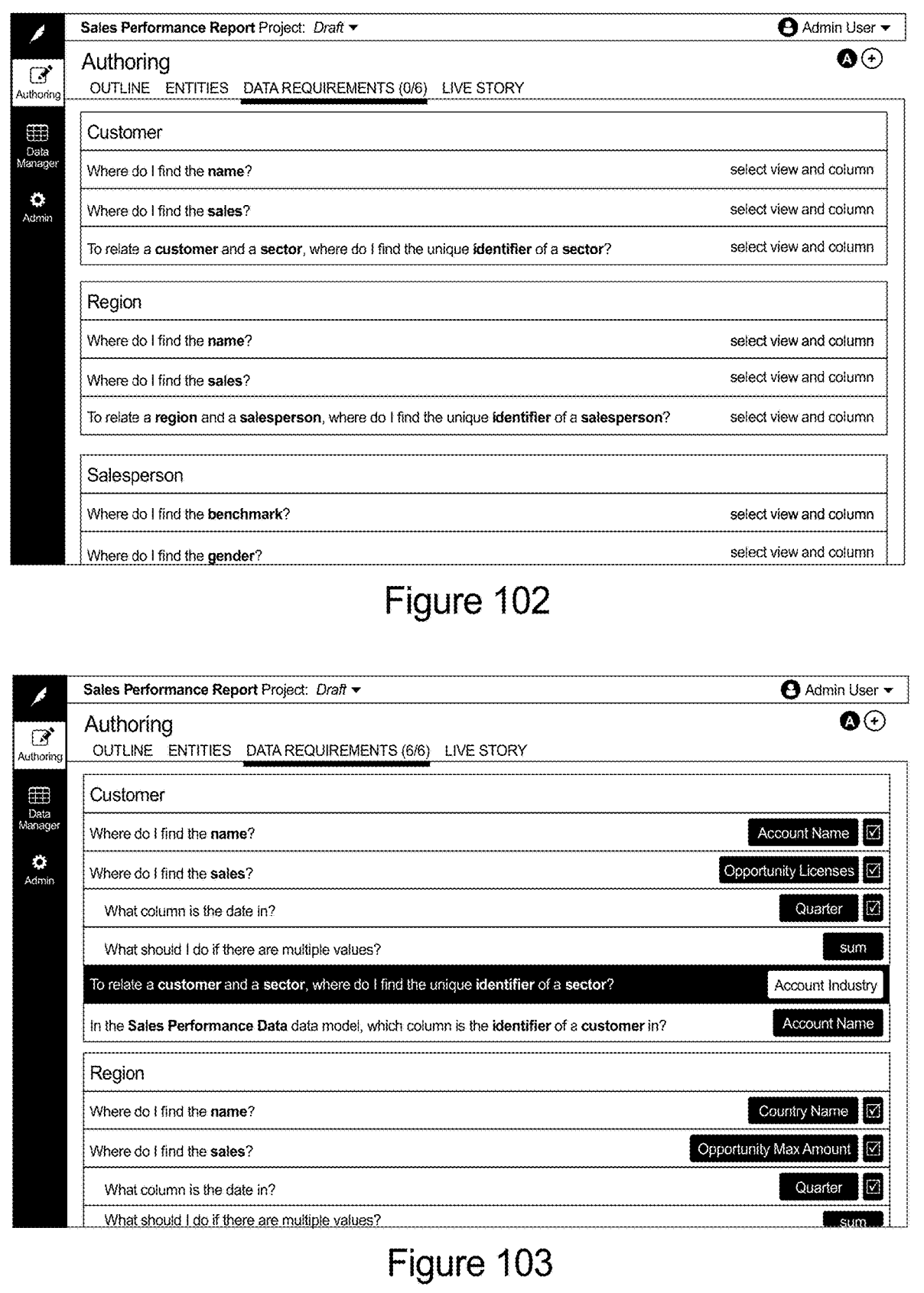

The Data Requirements will guide you through a series of questions to fill out the necessary parameters for Narrative Analytics and Communication Goals (see FIG. 102). Go to the Data Requirements tab in Authoring.

See the Data Requirements section of Configure a Story from Scratch for more detail. The completed Data Requirements can appear as shown by FIGS. 103-106.

Go to Live Story to see the story (see FIG. 107).

Figure 108:
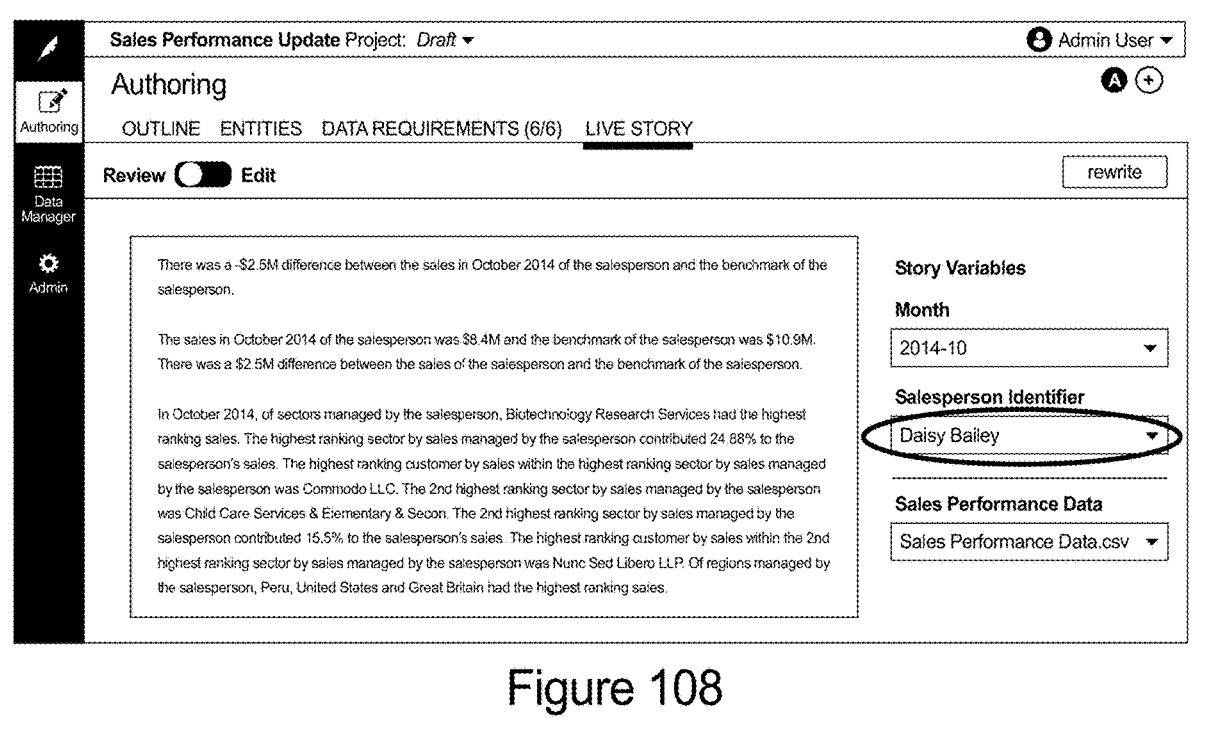

Toggles for "salesperson" (see FIG. 108) and "month" will show you different stories on the performance of an individual Sales Person for a given quarter.

A4: Ontology Management

A4(i): Entity Types and Expressions

Entity types are how Quill knows what to talk about in a Communication Goal. An Entity type is any primary "object" which has particular Attributes. An example is that a Department (entity type) has Expenses (Attribute)—see FIG. 109. An Entity is a specific instance of an Entity type, with data-driven values for each Attribute.

In other words, if you have an Entity type of Department, Quill will express a specific instance of a Department from your data, such as Transportation. Likewise, Expenses will be replaced with the numerical value in your data. Quill also allows you to create Entity and Attribute designations, such as departments managed by the top salesperson or total expenses for the department of transportation (see FIG. 110).

When you generate a story with such designations, Quill replaces them with the appropriate calculated values.

A4(i)(a): Entities Tab

Figure 111:
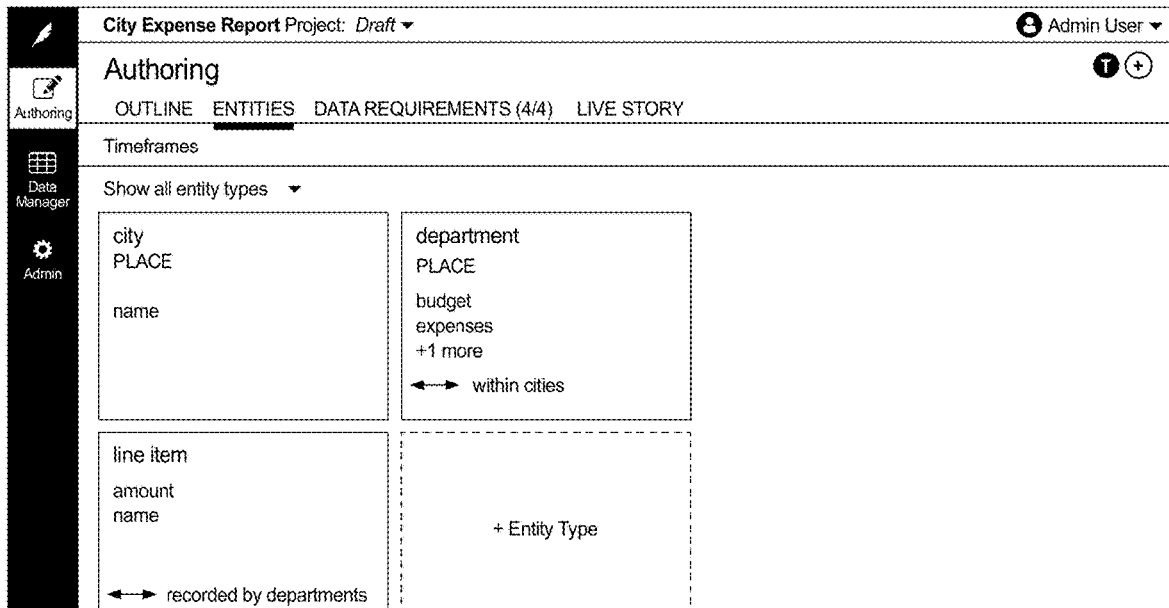

Entity types are managed in the Entities tab (see FIG. 111).

Figure 112:
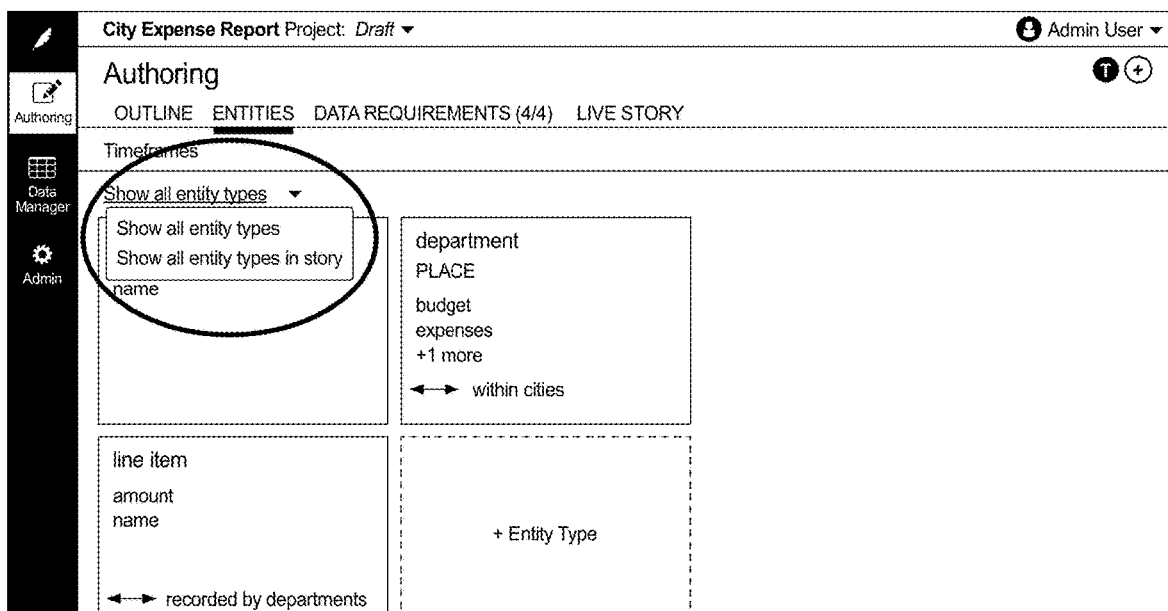
Figure 113:
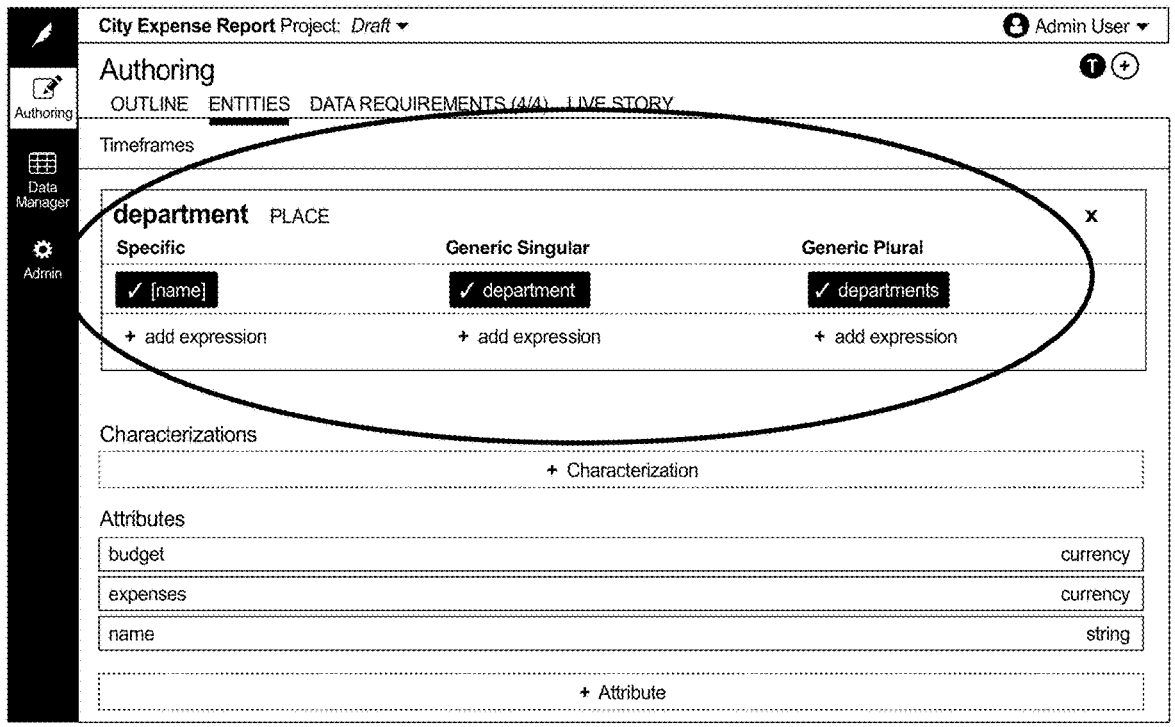
Figure 114:
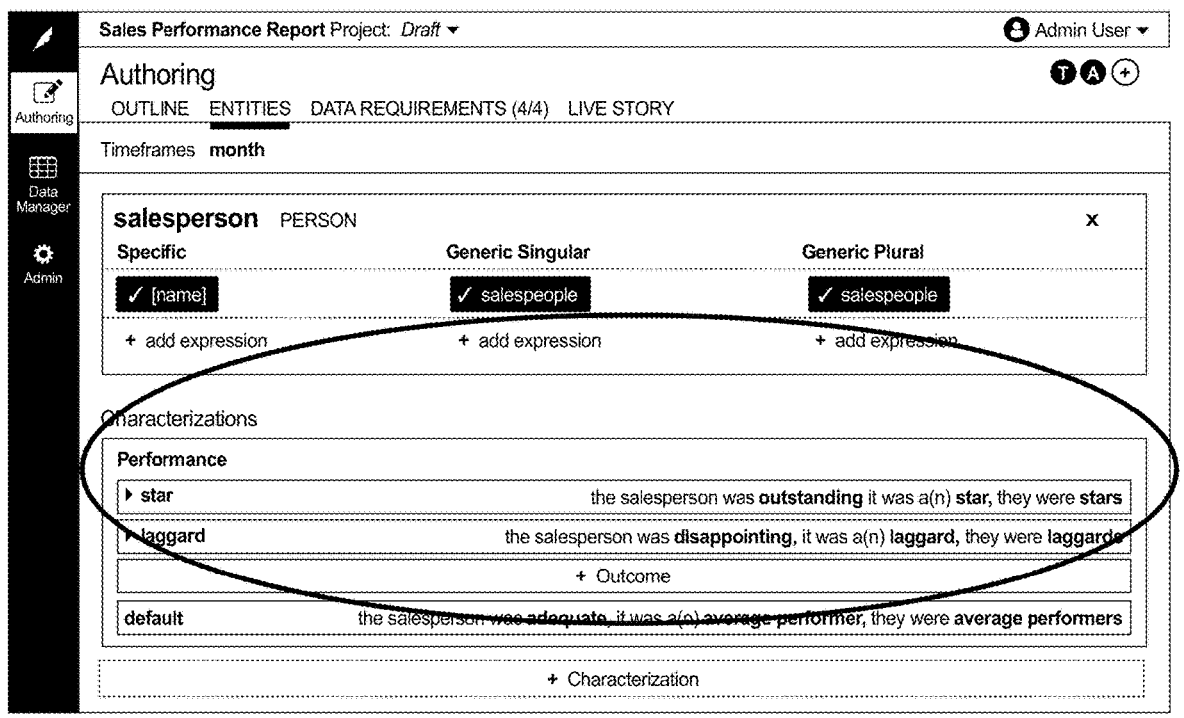
Figure 115:
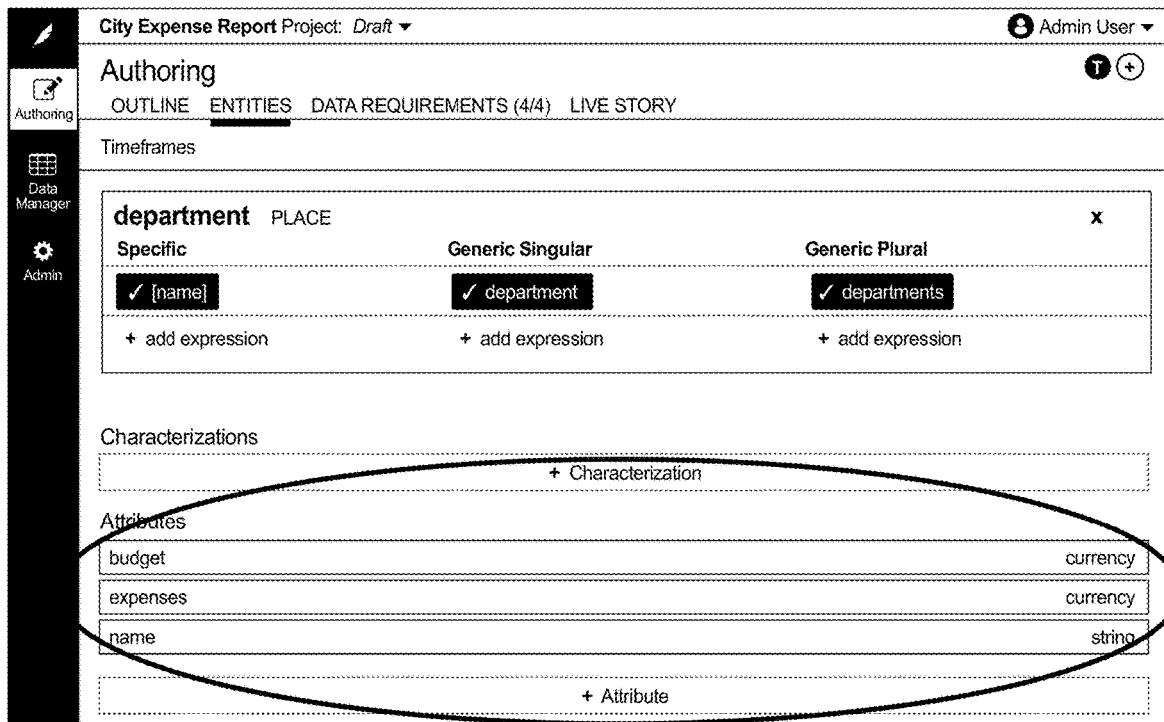
Figure 116:
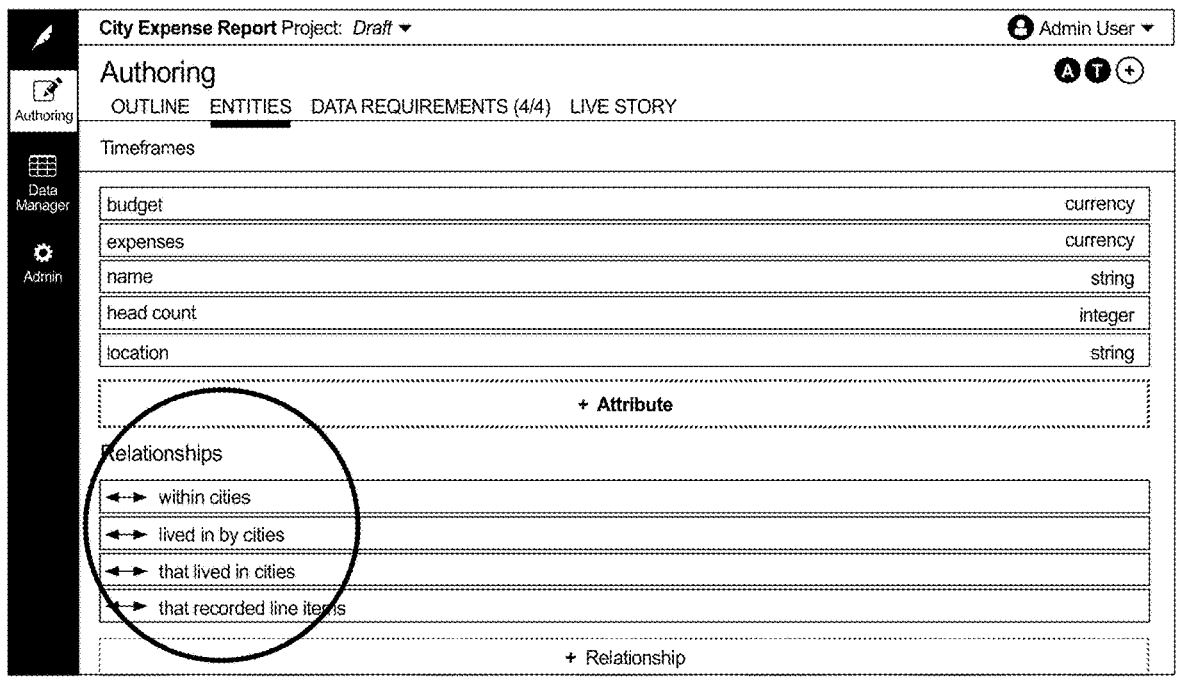
Figure 117:
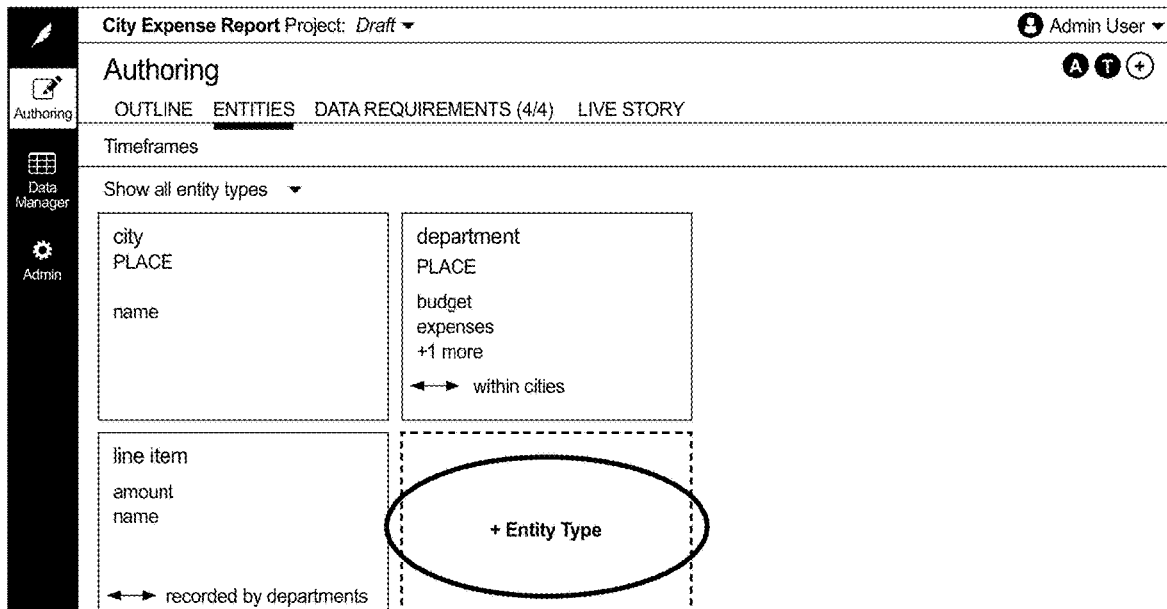

Quill defaults to showing all Entity types, but you can filter to only those that are in the story (see FIG. 112).

Clicking an Entity type tile allows you to view its details and edit it. Here, you can modify or add Entity expressions (see FIG. 113), edit or add Entity characterizations (see FIG. 114), add or edit Attributes associated with the Entity (see FIG. 115), and add Relationships (see FIG. 116).

A4(i)(b): Creating an Entity Type

Figure 118:
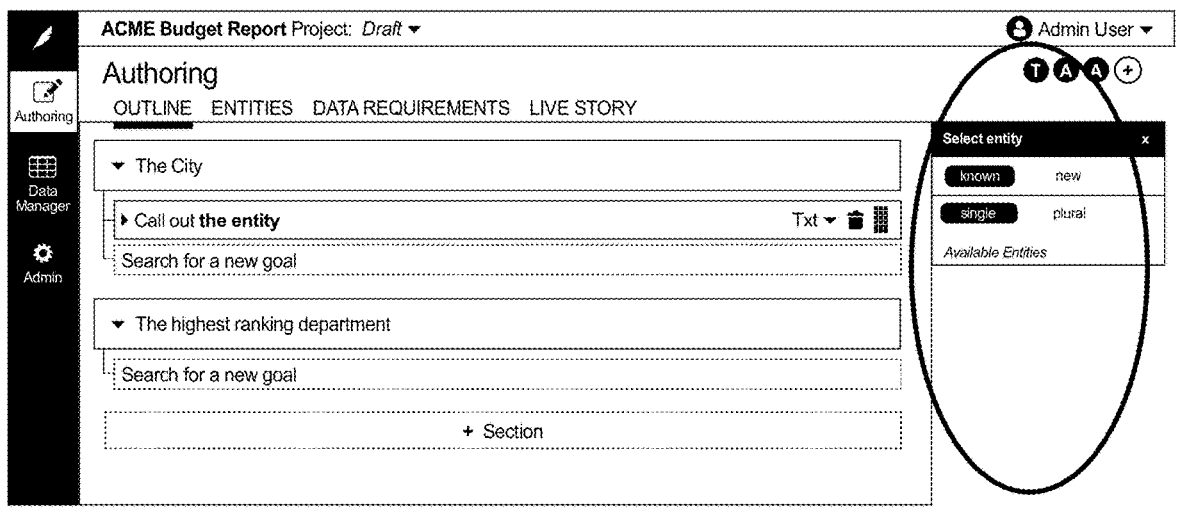

Entity types can be created from the Entities tab (see FIG. 117) or from the Outline (see FIG. 118).

Figure 119:
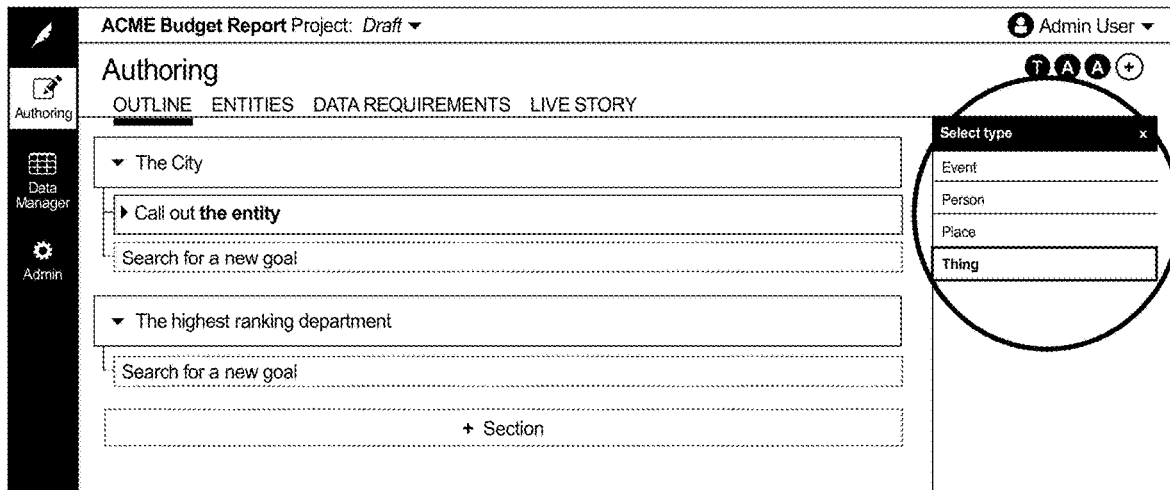
Figure 120:
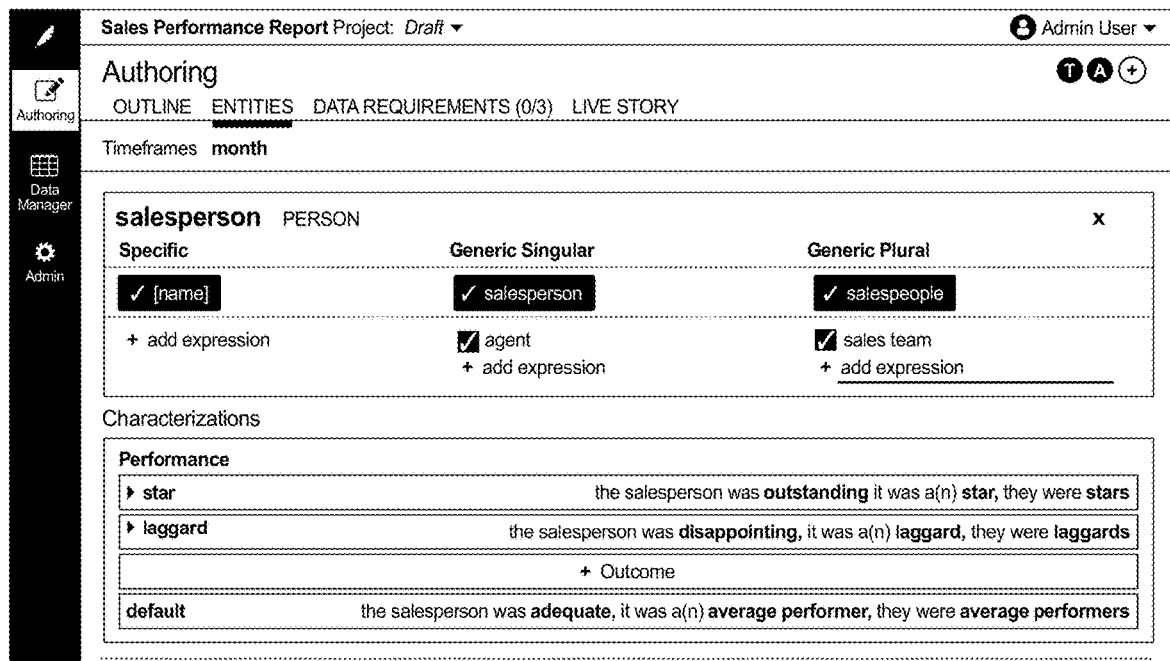

When you create an Entity type, you select its base Entity type from the options of Person, Place, Thing, or Event (see FIG. 119).

This gives Quill context for how to treat the Entity. In the case of the Person base Entity type, Quill knows to determine gender and supply an appropriate pronoun.

Entity types can have multiple expressions. These are managed in the Entities tab of a project (see FIG. 120).

Figures 121, 122:
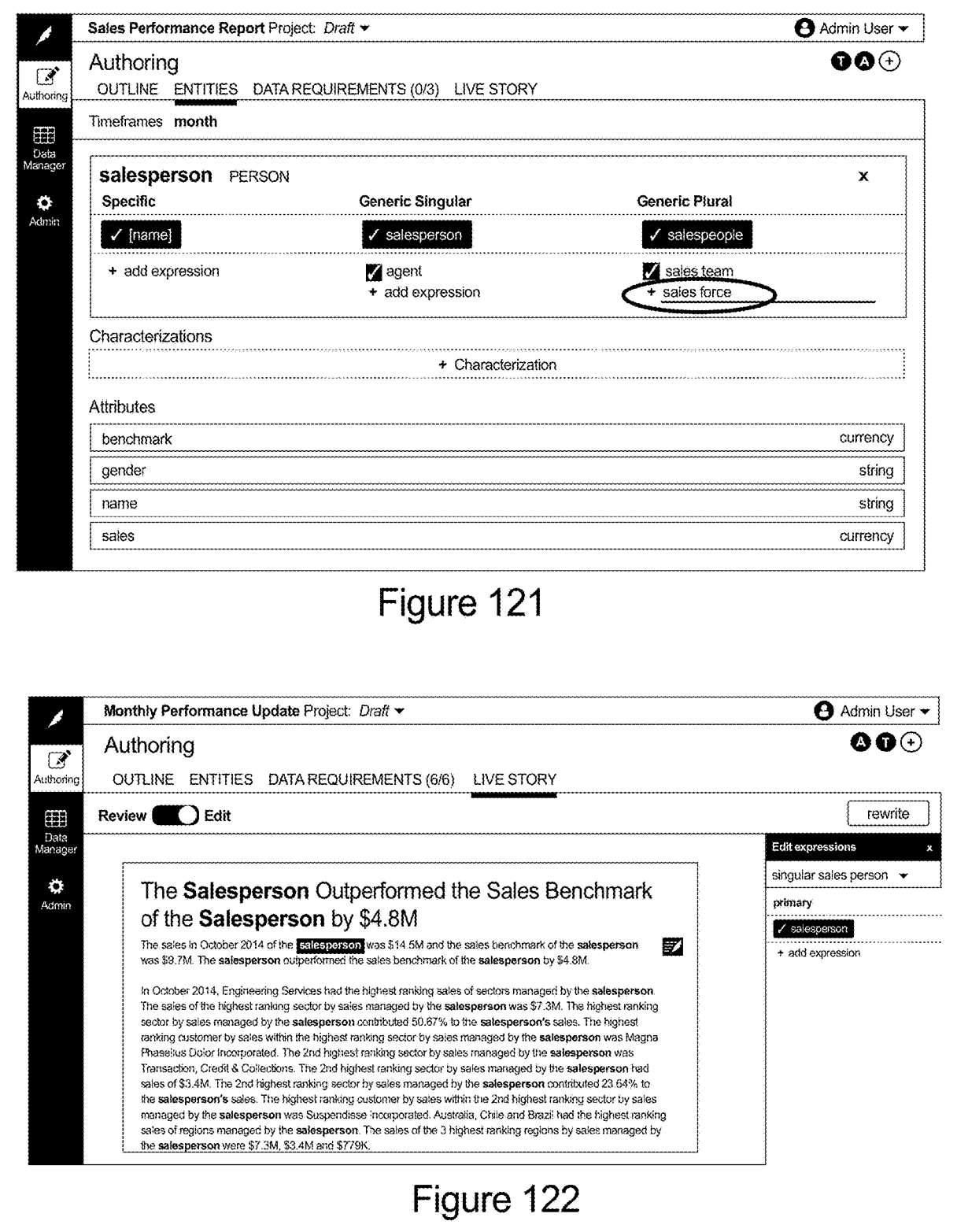

They can be added either from the Entities tab (see FIG. 121) or from Live Story (see FIG. 122).

To add expressions, open the details for an Entity type (by clicking on "salesperson," as shown above) and click in the text area next to the plus icon in the sidebar. Type in the expression you want associated with the Entity. You can add expressions for the Specific, Generic Singular, and Generic Plural instances of the Entity by clicking on the arrow dropdown in the sidebar to toggle between the expressions (see FIG. 123).

Figures 123, 124:
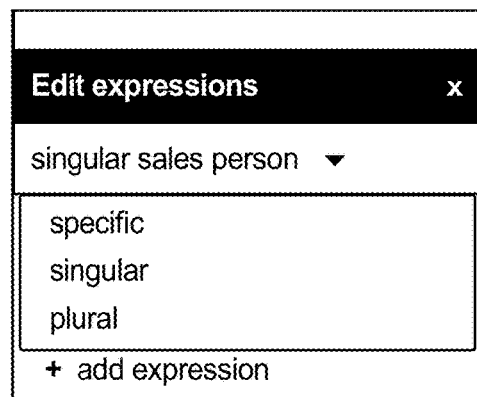
Figure 125:
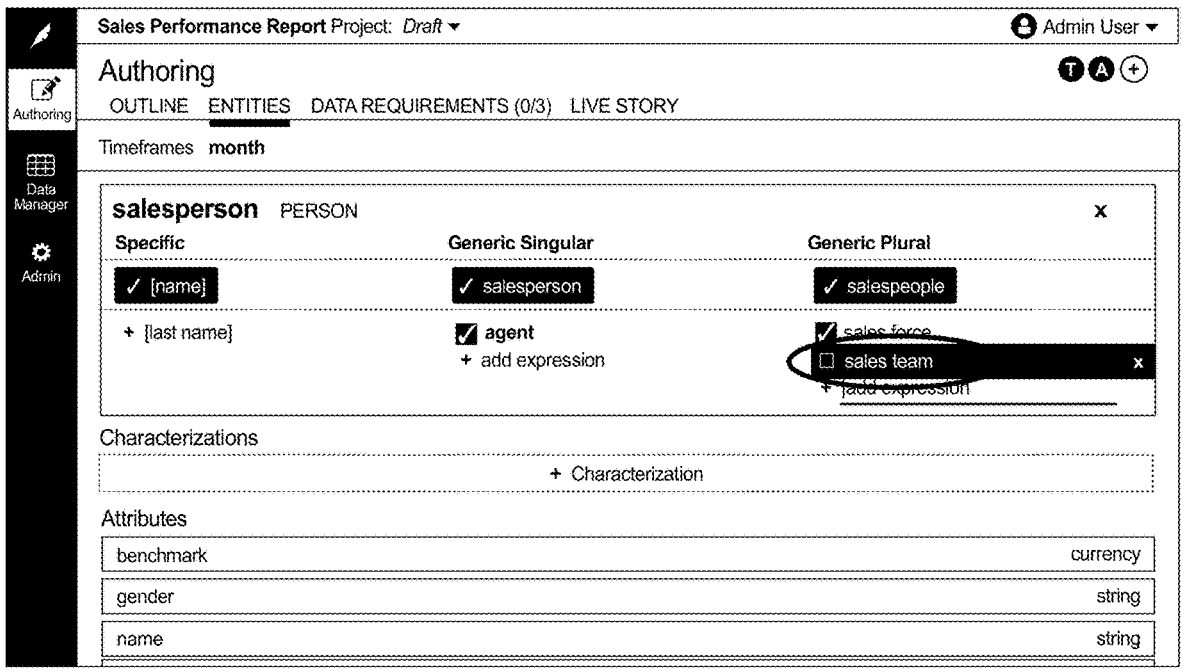
Figure 126:
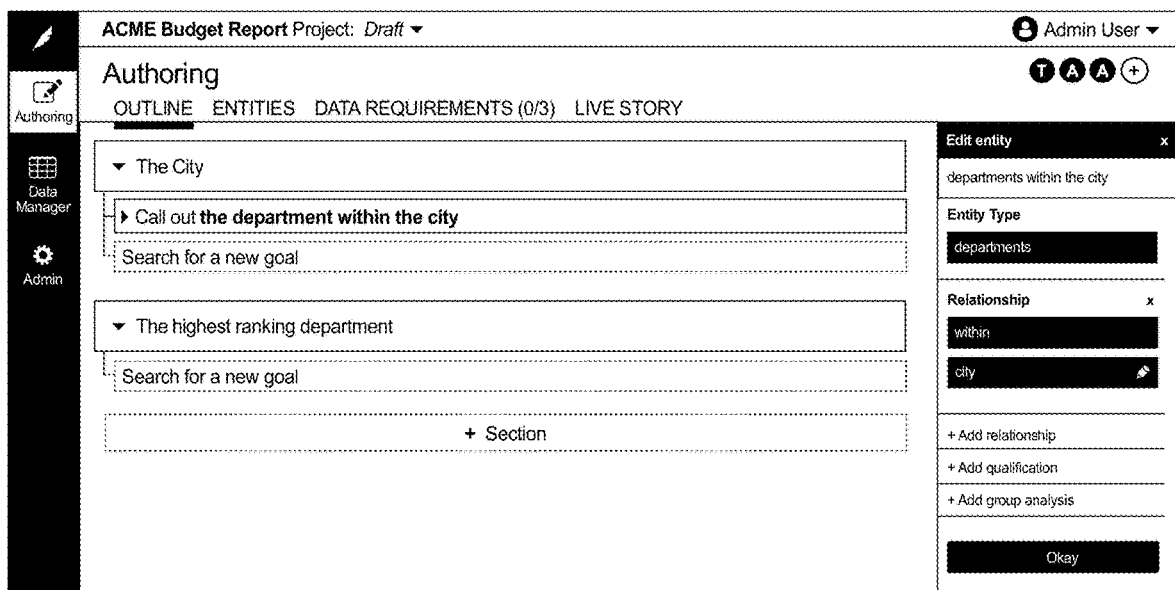
Figure 131:
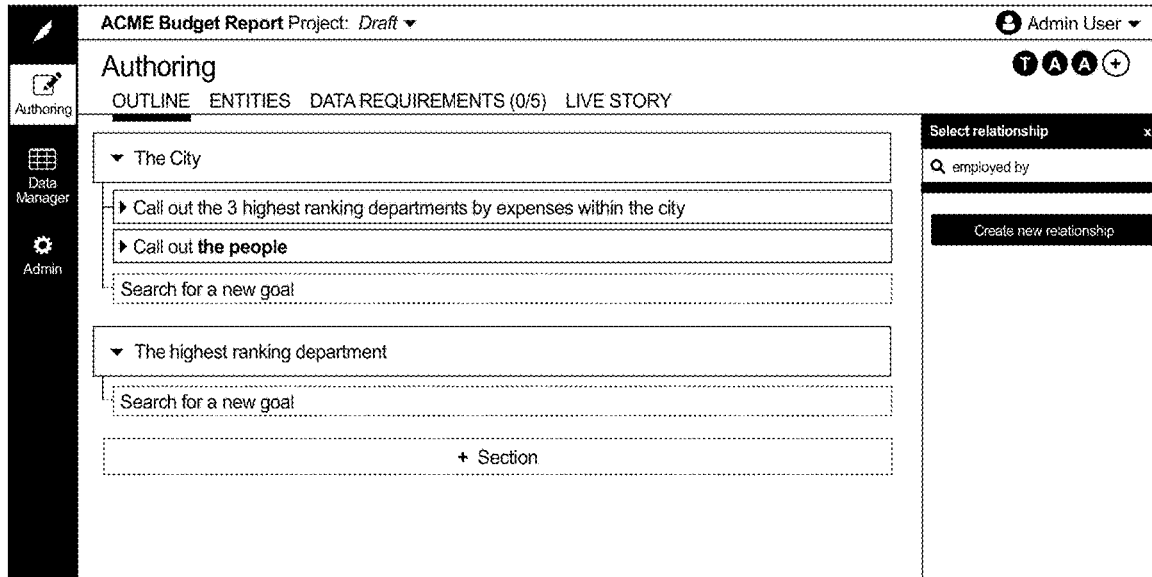
Figure 132:
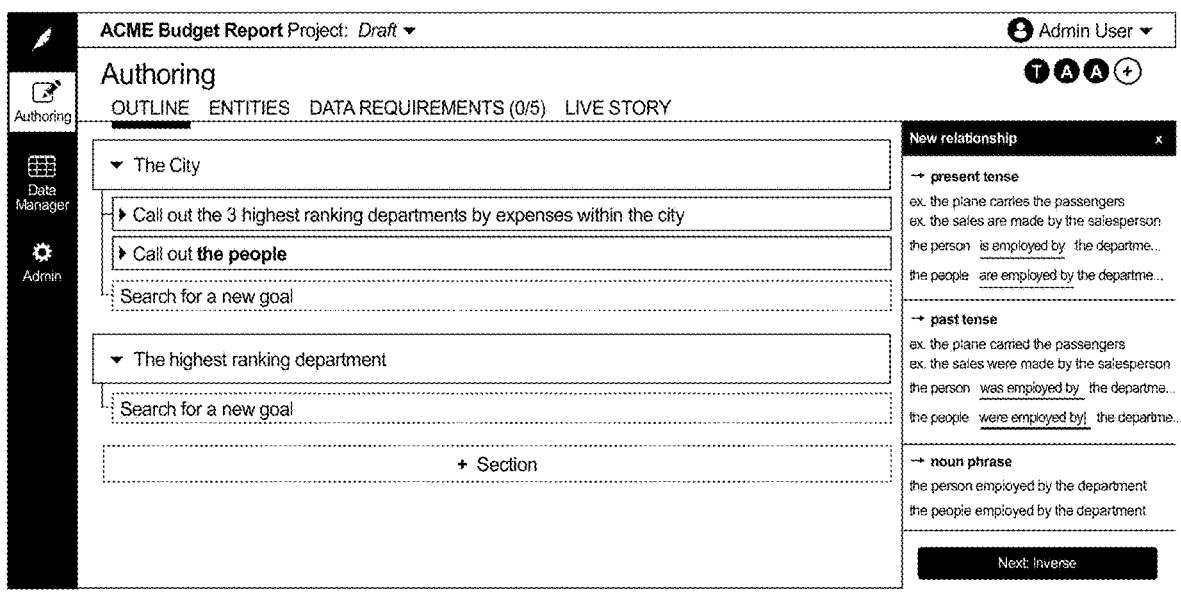
Figure 133:
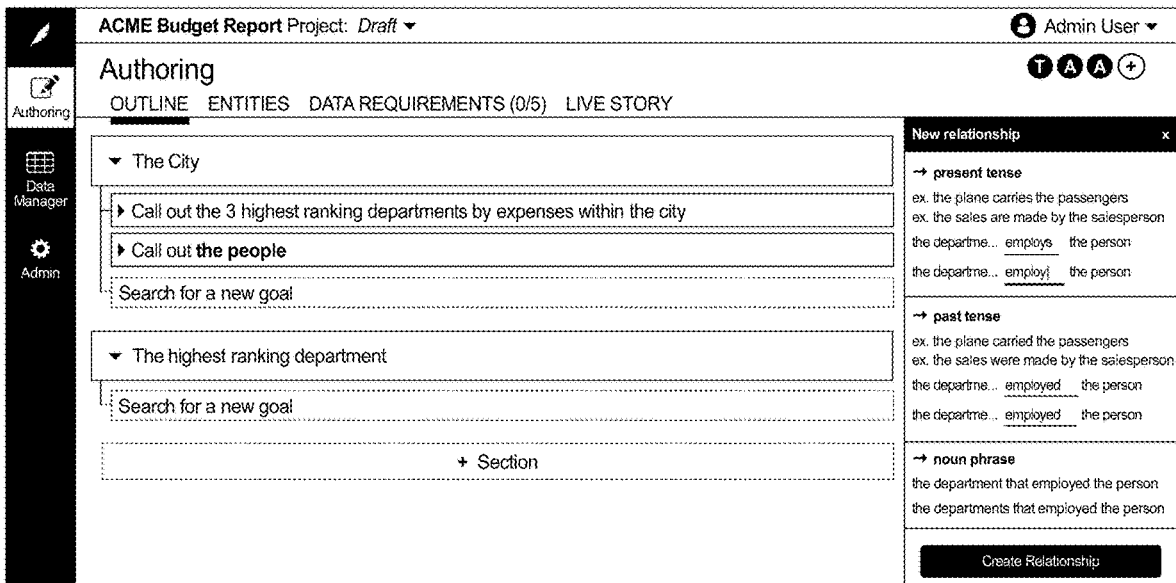
Figure 134:
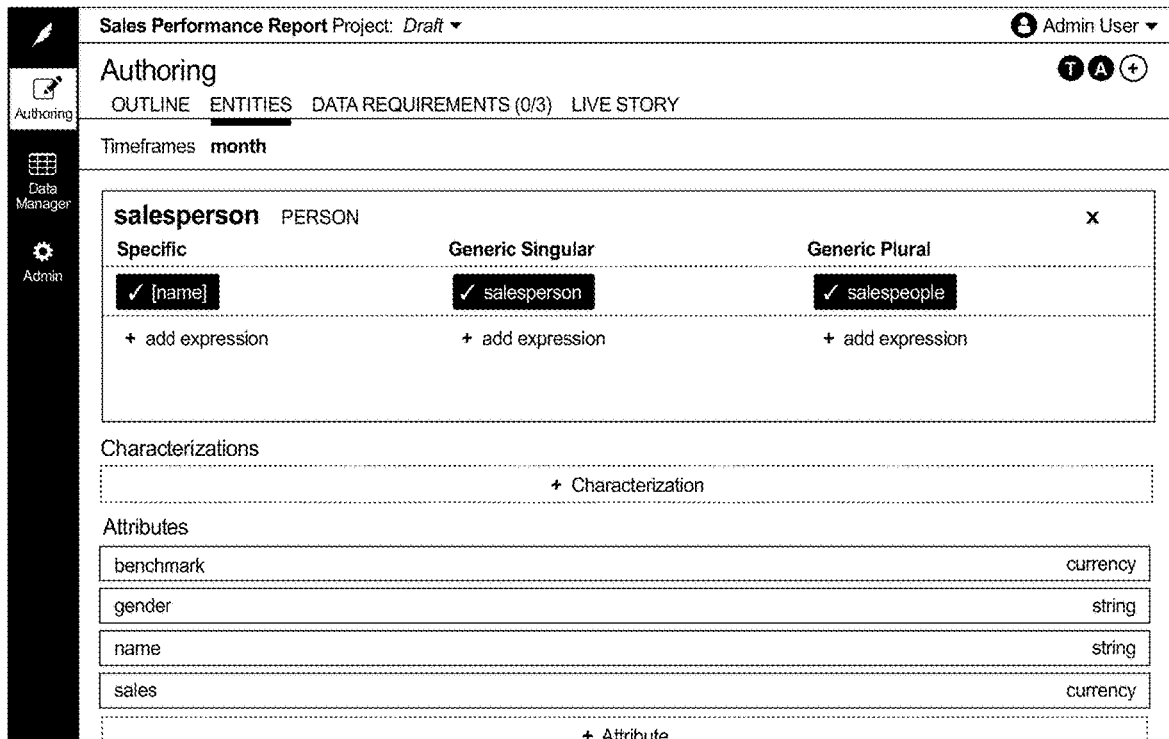

Attributes can be referenced in Specific entity expressions by setting the attribute name off in brackets. For example, if you would like the last name of the salesperson as an expression, set "last name" off in brackets as shown in FIG. 124.

You can also opt into and out of particular expressions. If you have multiple expressions associated with the Entity, Quill will alternate between them at random to add Variability to the language, but you can always uncheck the box to turn the expression off (see FIG. 125) or click on the x icon to remove it completely. You cannot opt out of whichever expression is set as the primary expression, but if you want to make one you've added the primary expression simply click and drag the expression to the top of the list.

A4(ii): Relationships

Entity types can be tied to each other through Relationships. For example, a City contains Departments, and Departments are within a City (see FIG. 126). Relationships are defined and created during Entity type creation in Authoring.

Figures 127, 128:
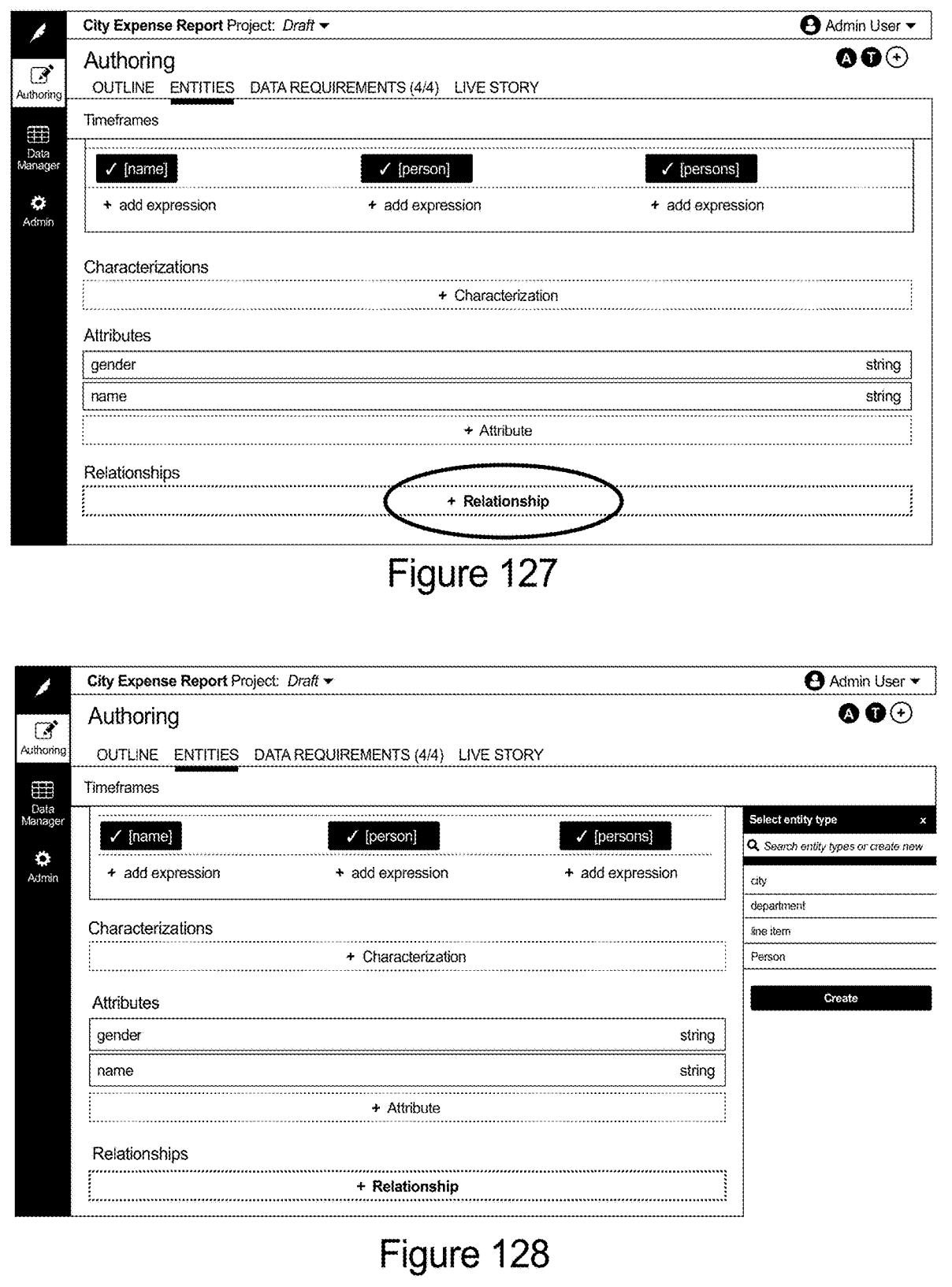
Figures 129, 130:
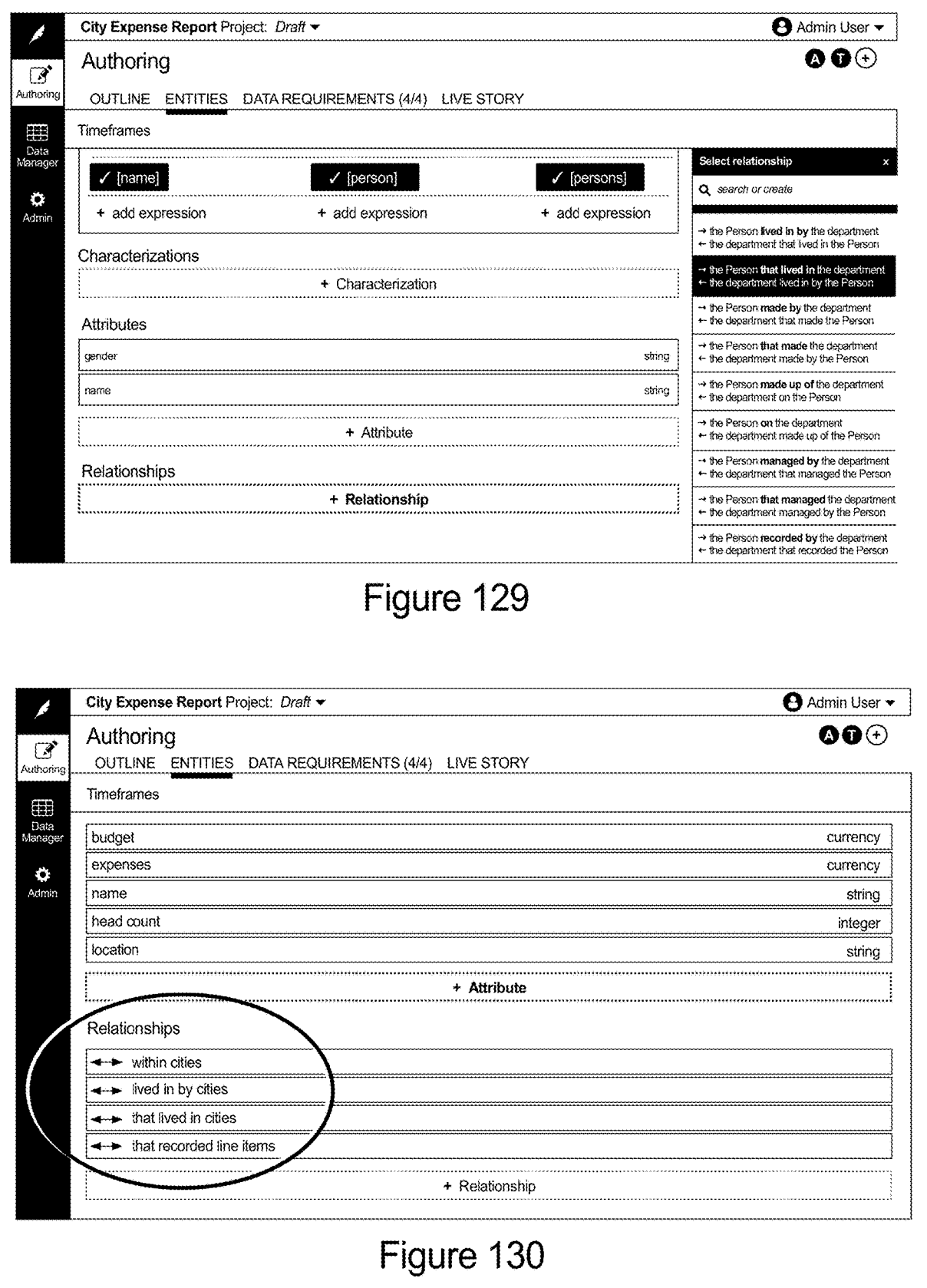

They can also be added to an existing Entity type by editing the Entity type in Authoring. FIG. 127 shows how a relationship can be added from the Entity type tile. FIG. 128 shows setting the related Entity type, and FIG. 129 shows choosing the relationships.

An Entity type can support multiple relationships. For example, Department has a relationship to City: "within cities"; and a relationship to Line Items: "that recorded line items" (see FIG. 130).

A4(ii)(a): Creating a Relationship

If the Relationships already set in Quill do not meet your needs, you can create your own. Type the relationship you want to create in the "search or create" textbox and click "Create new relationship" at the bottom of the sidebar (see FIG. 131).

After that, you will be taken through some steps that tell Quill how the new Relationship is expressed. Enter in the present tense and past tense forms of the Relationship, and Quill automatically populates the noun phrase that describes the relationship between the Entities (see FIG. 132).

Once you complete the steps for both directions of the relationship (see FIG. 133), Quill will apply the relationship to your Entity types and add the relationship to its library. You can use the Relationship again anywhere else in the project.

A4(iii): Characterizations

Characterizations are editorial judgments based on thresholds that determine the language used when certain conditions are met. Characterizations can be set on Entity types directly or when comparing Attributes on an Entity in a Communication Goal.

A4(iii)(a): Entity Characterizations

An Entity characterization allows you to associate descriptive language with an Entity type based on the performance of a particular Attribute. For example, you might want to characterize a Sales Person by her total sales (see FIG. 134).

Figure 135:
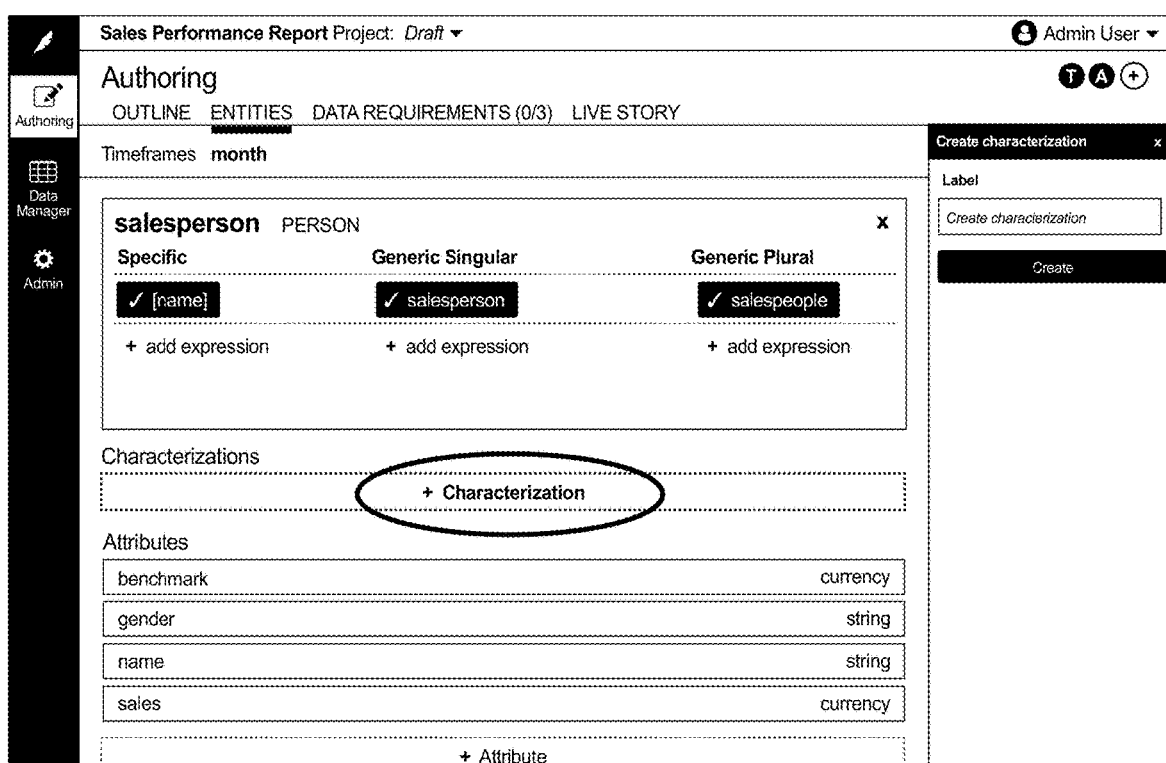
Figure 138:
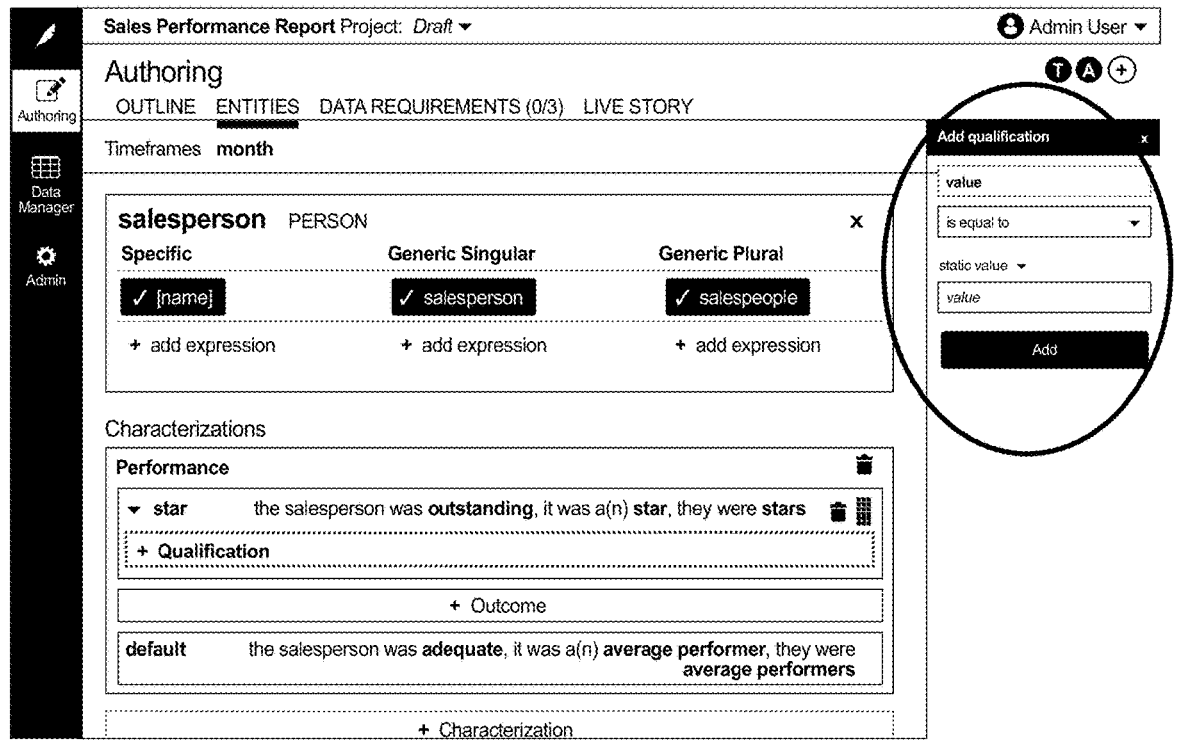
Figure 139:
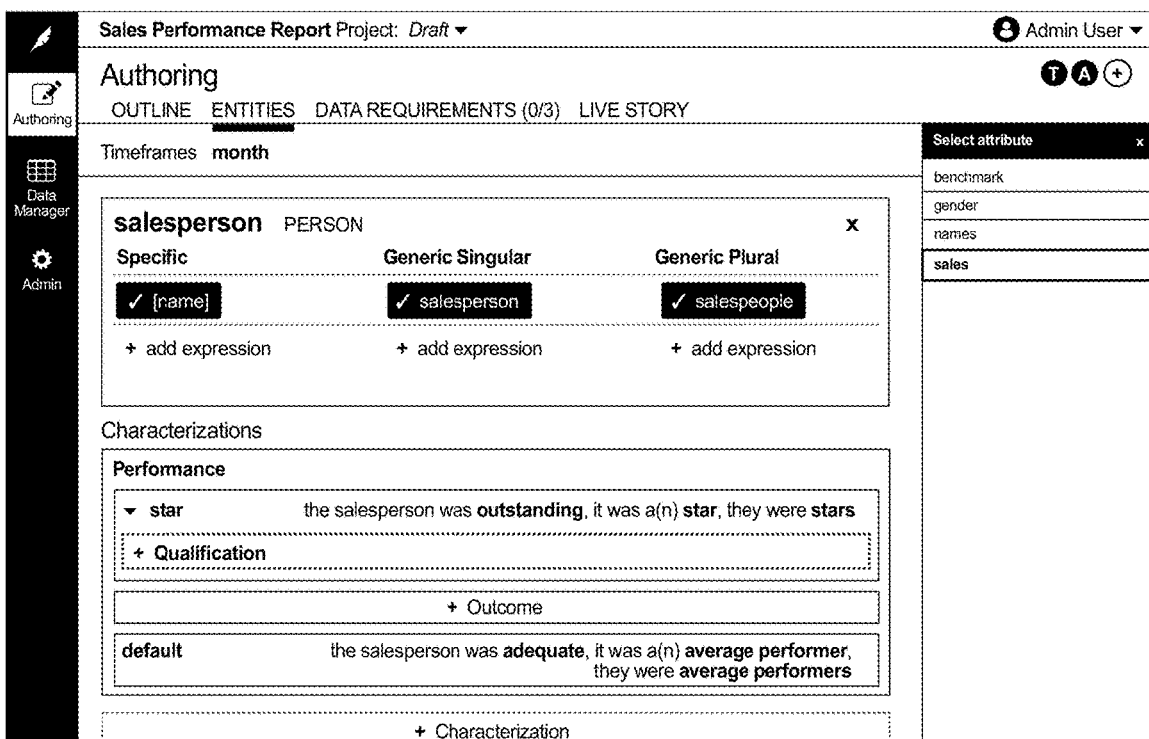

Click "+Characterization" to create a Characterization (see FIG. 135).

Once you've named and created the Characterization, you'll have to set the expressions for the Default outcome. Click the grey parts of speech to edit the expression in the sidebar (see FIG. 136).

Figures 136, 137:
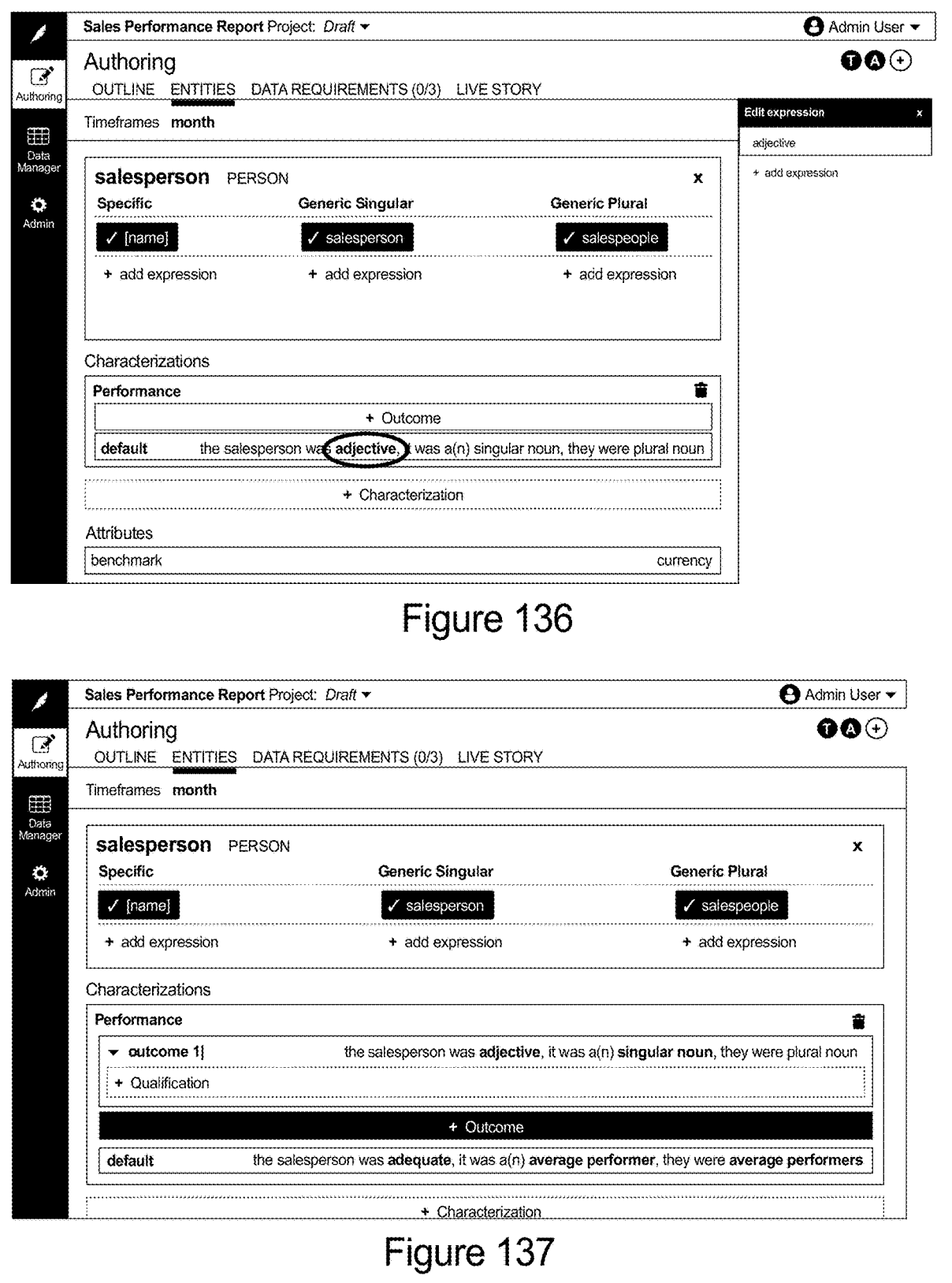

To add an Outcome, click "+Outcome" (see FIG. 137).

Change the Outcome label to describe the outcome. For this example, the Outcome label will be "Star" to reflect an exceptional sales performance. Again, edit the expressions by clicking on the grey parts of speech. In order for the outcome to be triggered under specific conditions, you need to add a Qualification (see FIG. 138).

Figures 140, 141:
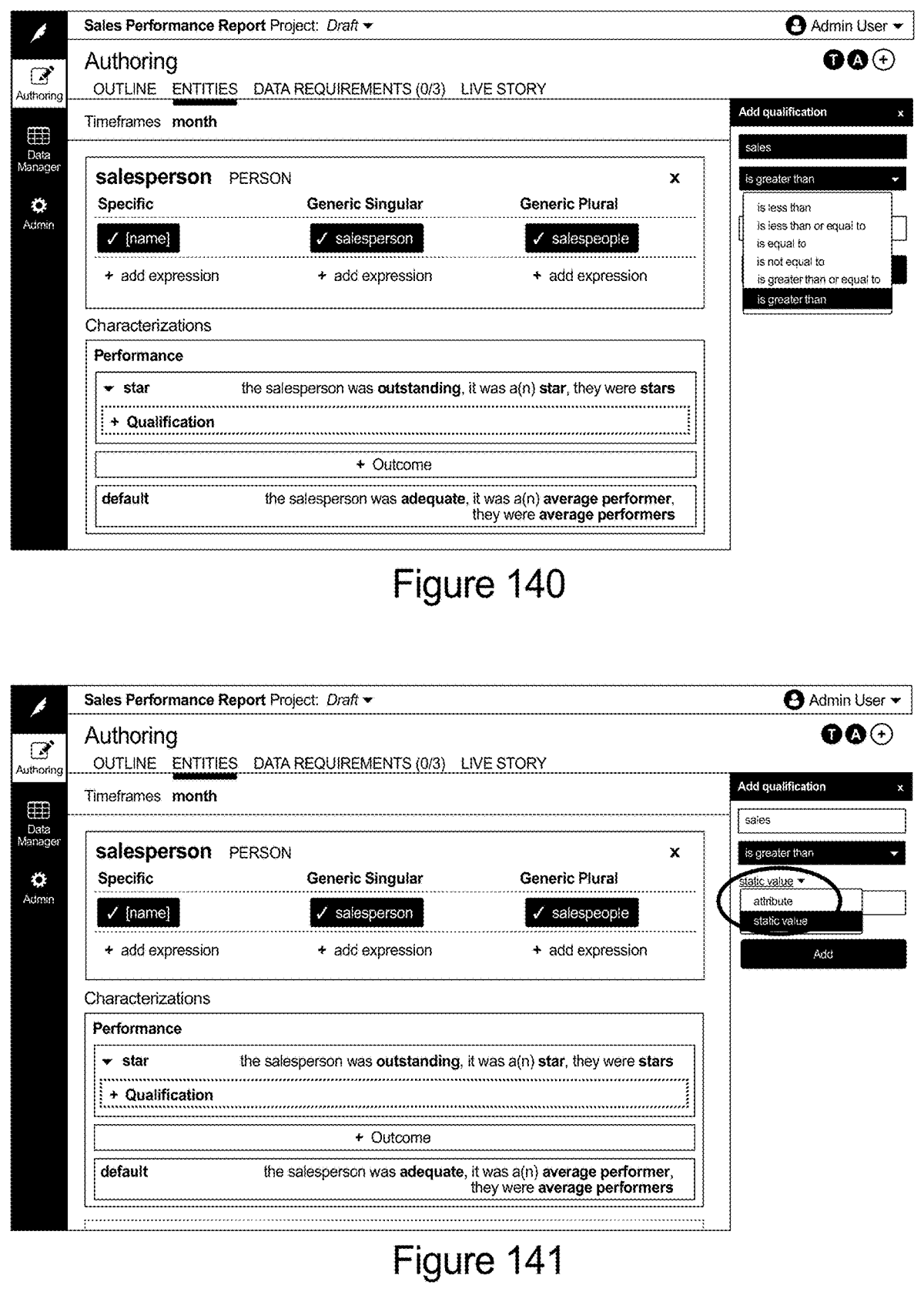

Click "+Qualification" to set the value to Sales (see FIG. 139) and the comparison as "greater than" (see FIG. 140).

You have a choice for comparing the value to an Attribute or a static value (see FIG. 141).

In this case, choose to keep it a static value and set the value to $10,000 (see FIG. 142).

Follow the same steps to create the lower bound outcome, setting the label as "laggard" and the static value to $1,000 (see FIG. 143).

Figure 144:
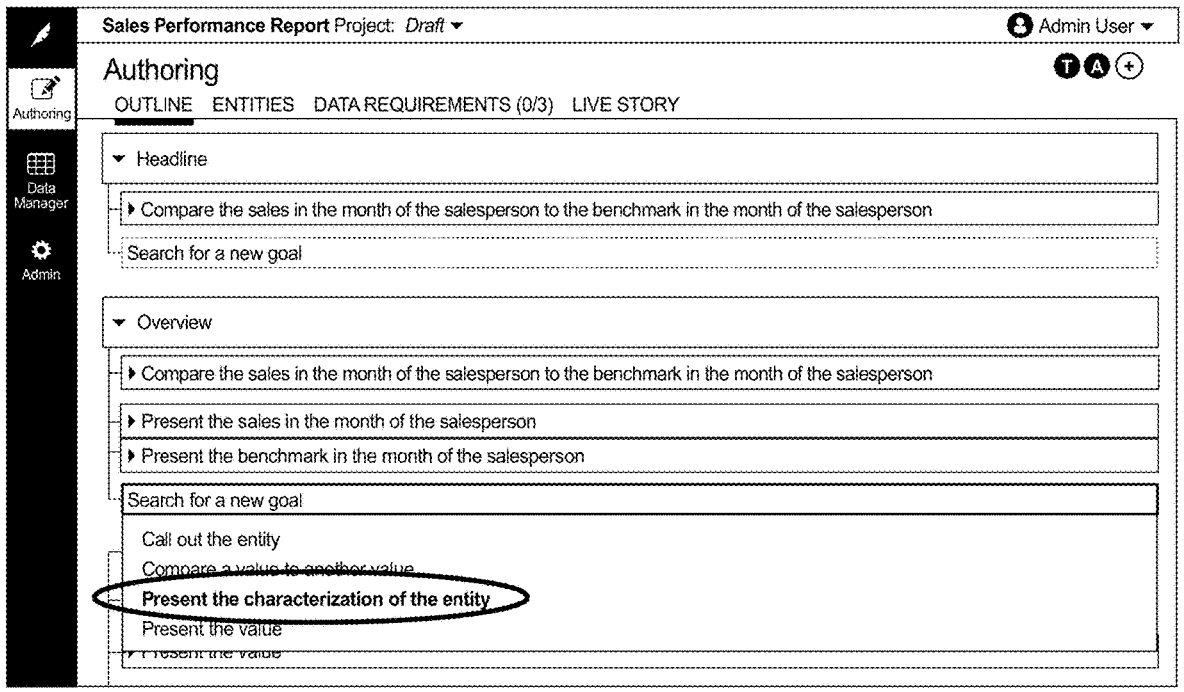

Once you have defined Characterizations on an Entity, you can include them in your story by using the Present the Characterization of the entity Communication Goal (see FIG. 144).

A4(iii)(b): Assessment Characterizations

Figure 145:
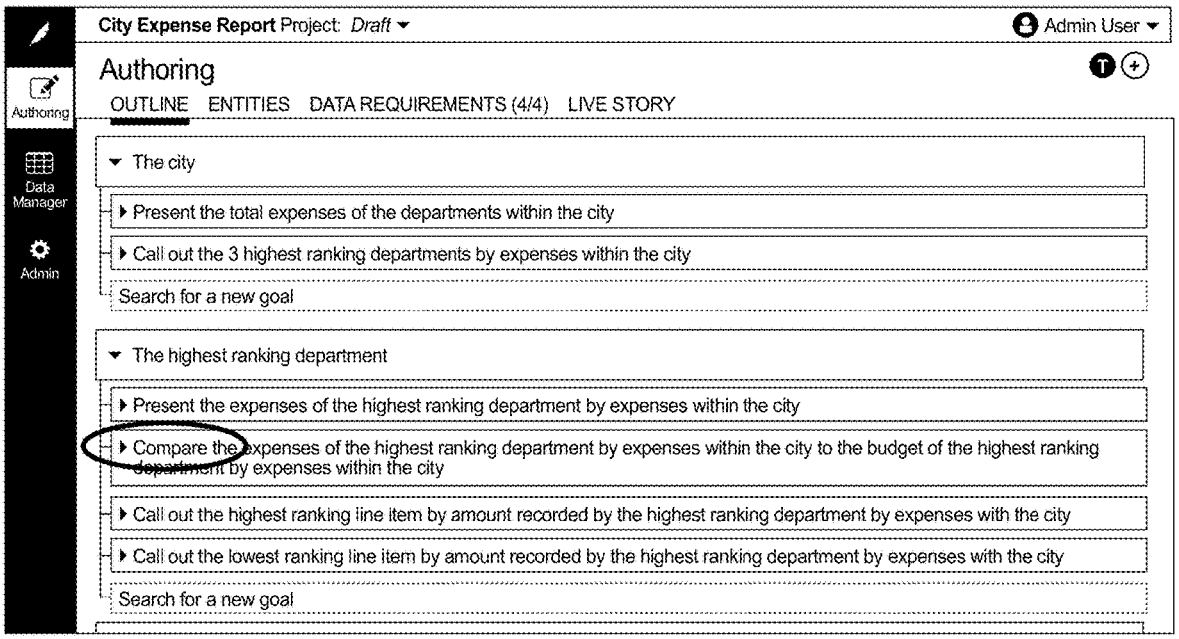

To set the characterizations on a comparative Communication Goal, expand the arrow to the left of the Communication Goal (see FIG. 145).

This exposes the list of available subgoals (see section below). At the bottom of this list is a goal to assess the difference between the attributes. Check the box to expose the thresholds applied to the comparison (see FIG. 146).

Quill has default thresholds to determine the comparative language for each outcome. These thresholds can be changed by entering different values into the boxes. If a value is changed to be less than the upper bound or greater than the lower bound of a different outcome, Quill will adjust the values so that there is no overlap (see FIG. 147).

There is also default language to correspond with each of the possible outcomes. This can also be changed to suit your particular needs and the tone of your story. Click on the green, underlined text to open a sidebar to the right where you can add additional expressions and set which expression you would like to be the primary characterization (see FIG. 148).

You can also opt into and out of particular expressions. However, in the example of Appendix A, you cannot opt out of whichever expression is set as the primary characterization. If you have multiple expressions associated with the outcome (see FIG. 149), Quill will alternate between them at random to add Variability to the language. These additional expressions will be tied to the specific Communication Goal where you added them and will not appear for others. You can also opt into and out of particular expressions, as well as delete them using the x. However, in the example of Appendix A, you cannot opt out of whichever expression is set as the primary expression.

Figure 150:
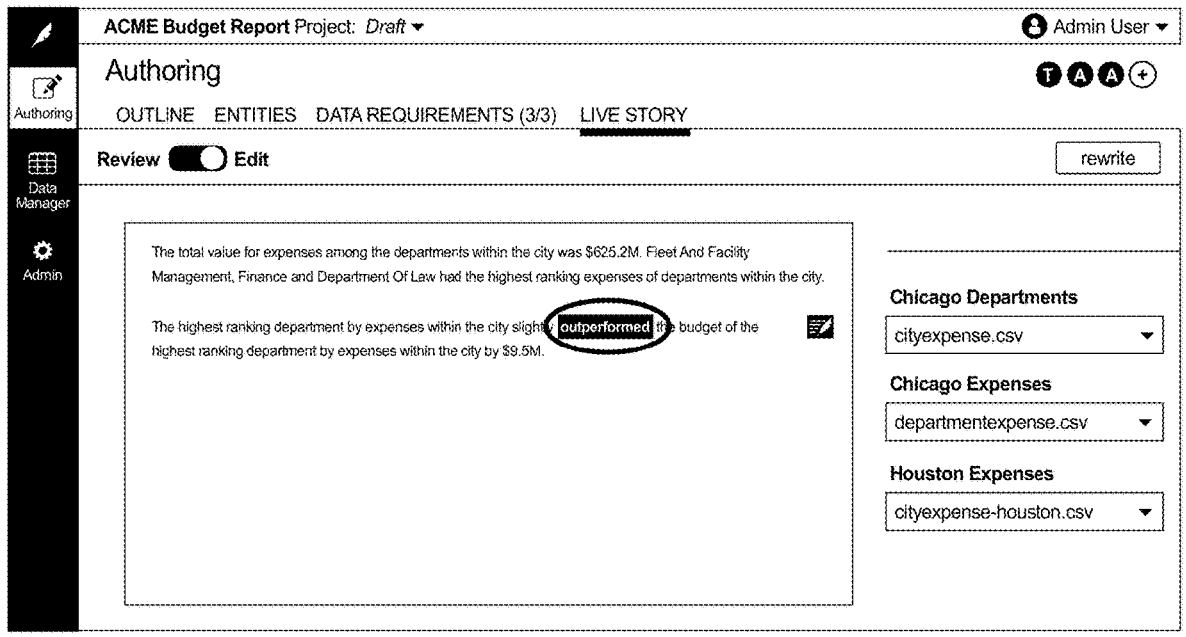
Figure 151:
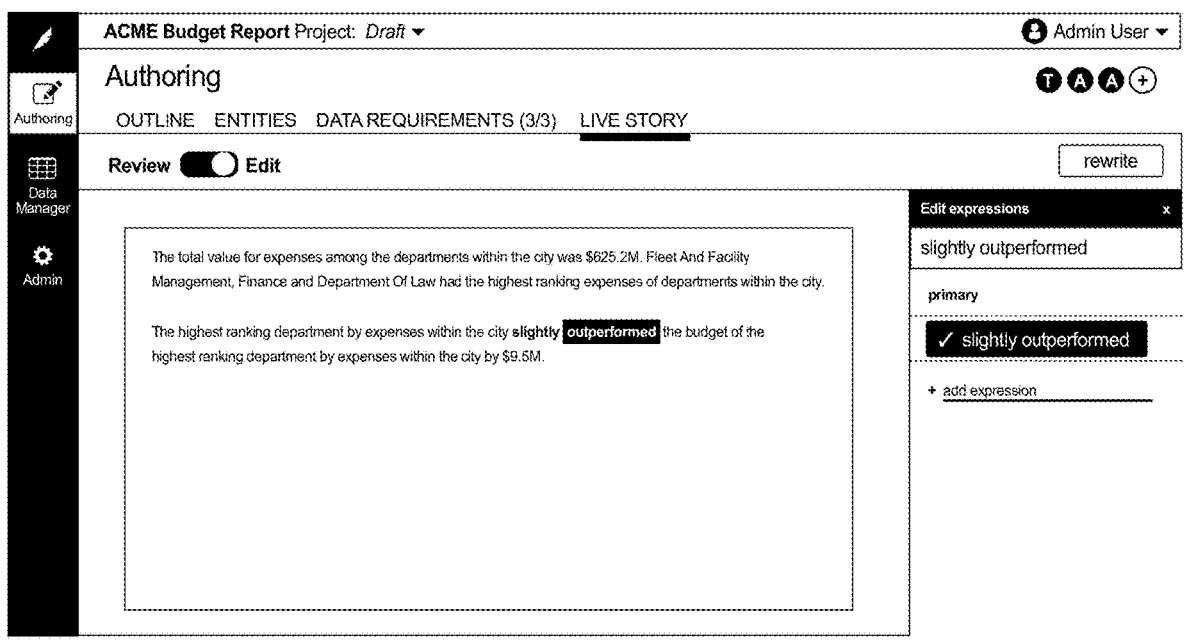

These expressions can also be edited in Edit mode in Live Story (see FIGS. 150 and 151).

A4(iv): Attributes

An Attribute is a data-driven feature on an Entity type. As described above, Quill will express a specified Attribute with the corresponding value in the data based on your Communication Goal. Quill also supports adding modifiers to attributes in order to perform calculations on the raw value in the data.

A4(iv)(a): Attribute Values

Figure 152:
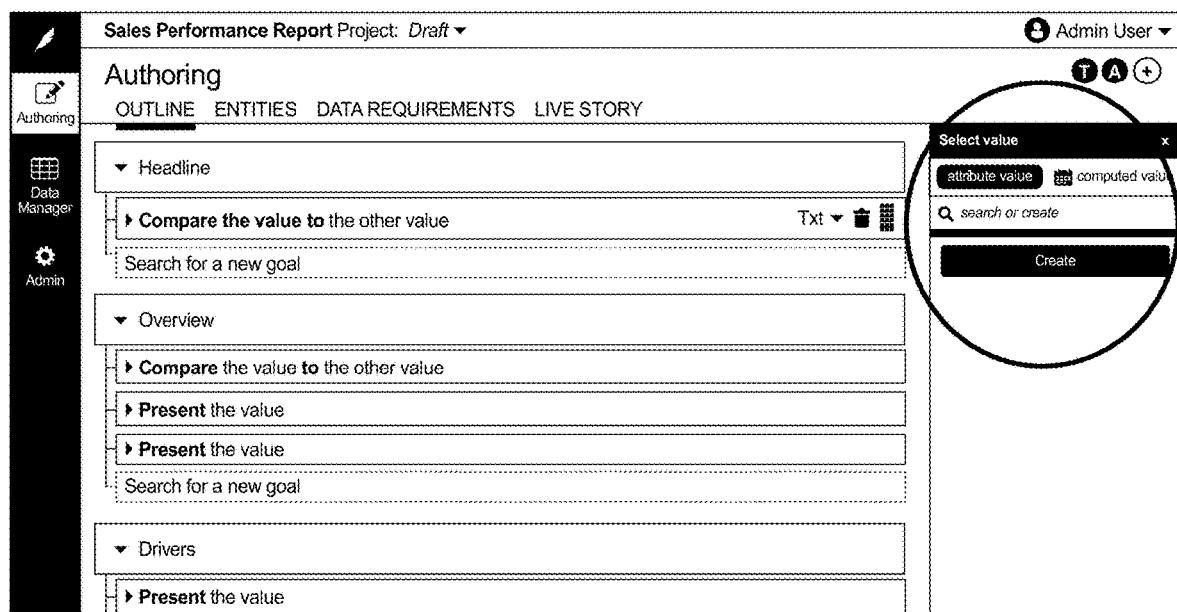
Figures 153, 154:
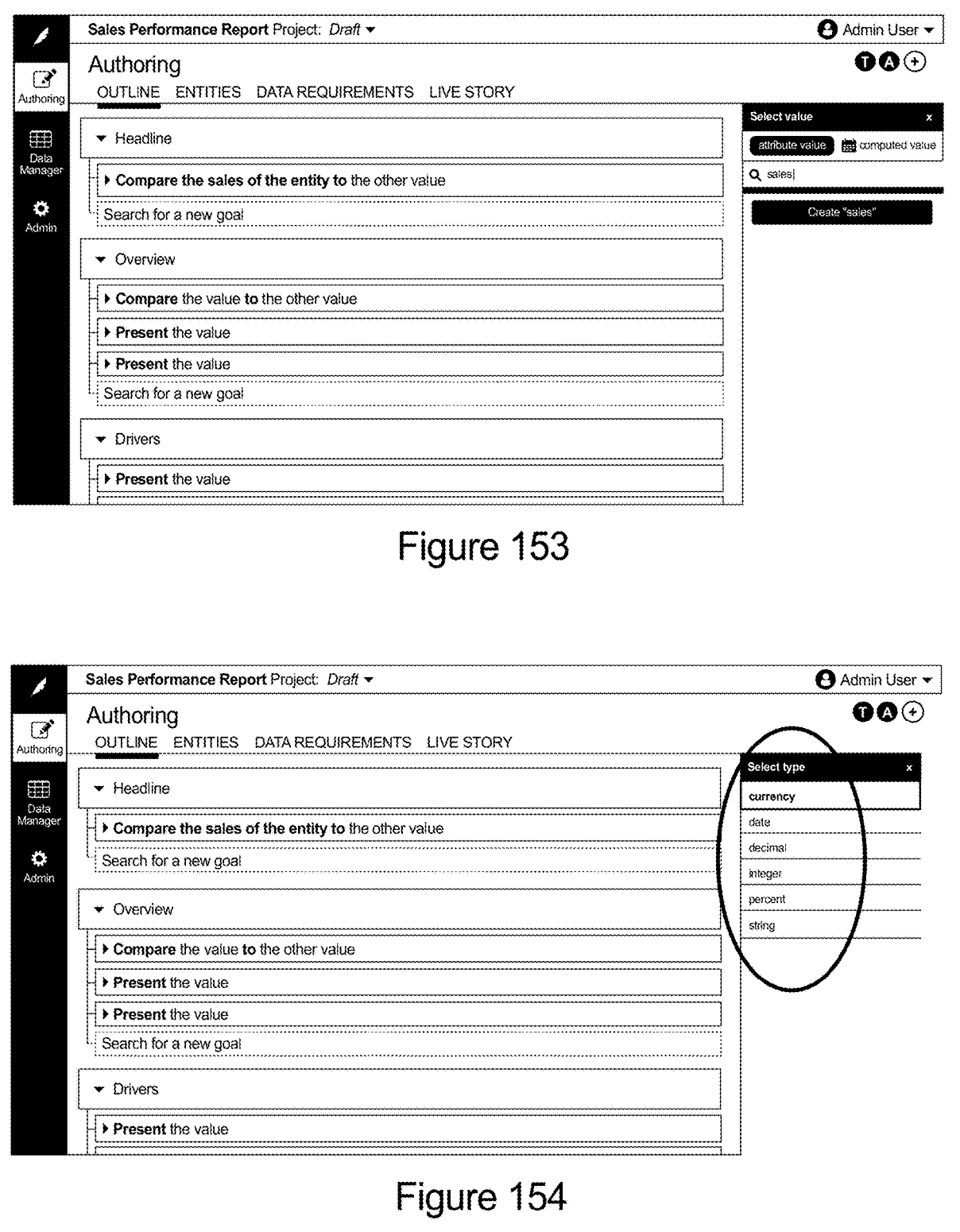
Figure 155:
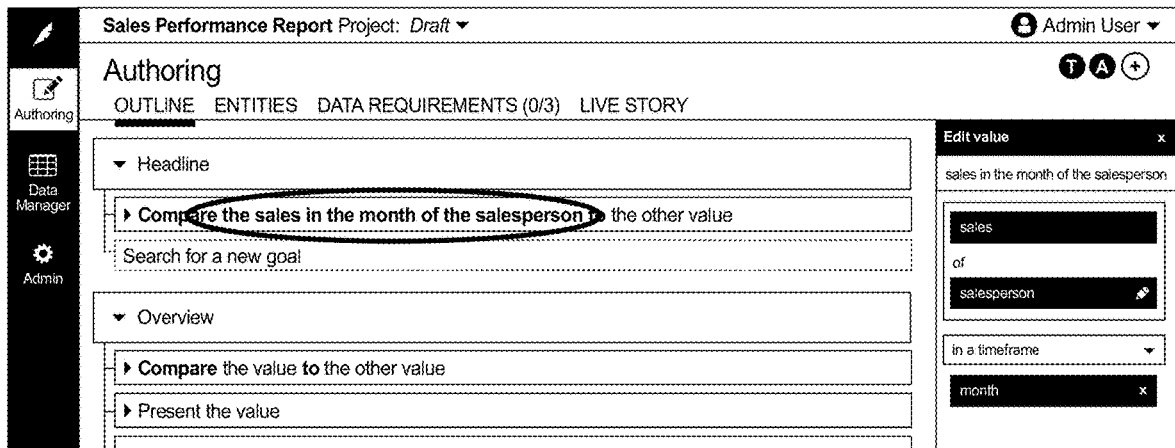

Attribute Values are those values that are taken directly from your data. In other words, no computations are performed on them. An example is the Name of the City. If there is a value in the data for the total expenses of the city, Quill pulls this value directly and performs no computations, unless a data validation rule is applied e.g. "If null, replace with Static Value." which is set in the Data Requirements when mapping the Outline's information needs to your Data View. FIG. 152 shows an attribute creation sidebar. FIG. 153 shows creating an attribute value in the attribute creation sidebar. FIG. 154 shows setting the type of an attribute in the attribute creation sidebar. FIG. 155 shows a completed attribute in a communication goal.

Figure 156:
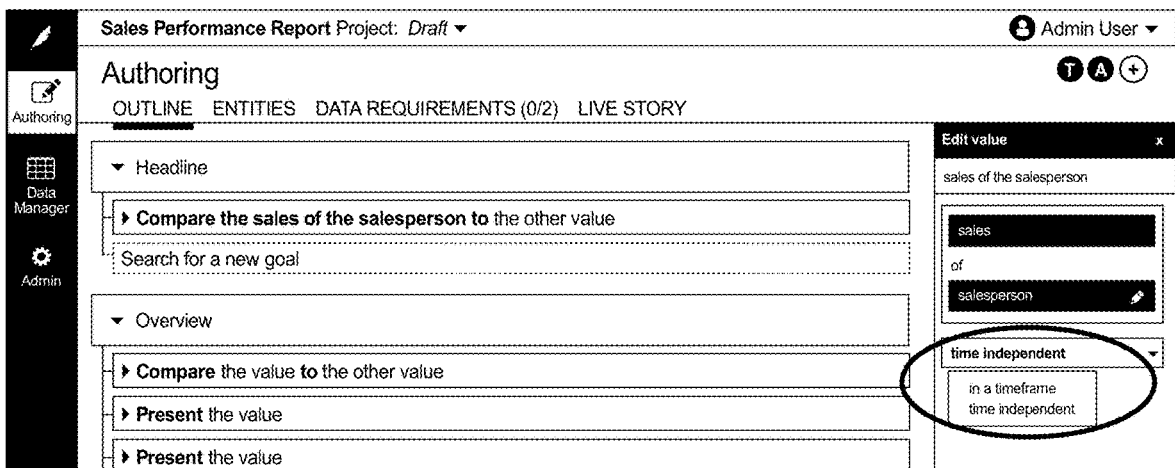
Figure 157:
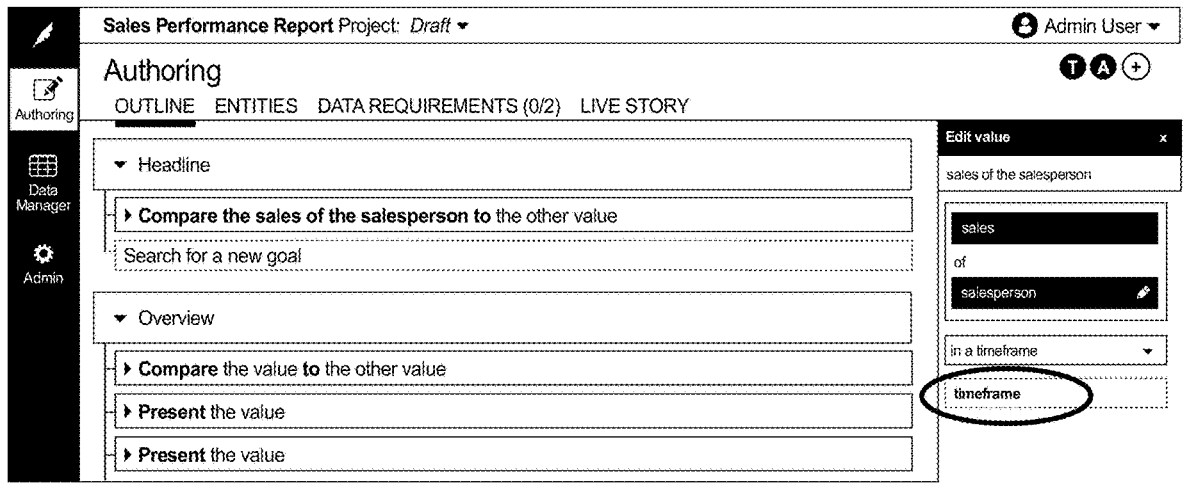
Figure 158:
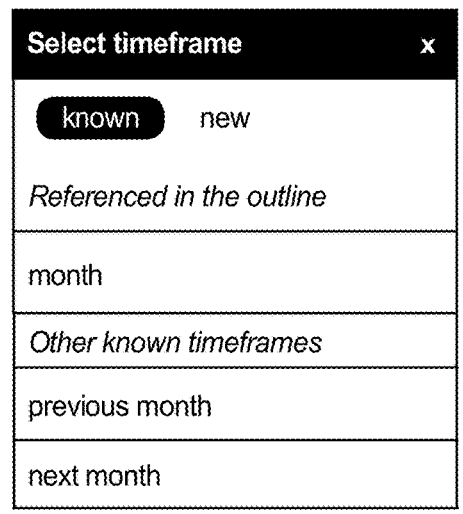

You also have the option of specifying a Timeframe (see FIGS. 156 and 157).

This allows you to restrict the window of analysis to a particular day, month, or year.

Create a new Timeframe by selecting one of those three options. Once you've done this, Quill also recognizes the "previous" and "next" instances of that Timeframe (see FIG. 158). In other words, if you create a day Timeframe, Quill will populate the list of known Timeframes with day, along with previous day and next day.

A4(iv)(b): Computed Attributes

On the other hand, if the total expenses of the city are calculated by taking the sum of the expenses for each department, Quill allows you to create a Computed Value. Computed Values allow you to compute new values from values in your data and use them for group analysis.

Computed Values can be aggregations or functions. Aggregations include count, max, mean, median, min, range, total (see FIG. 159).

In the example of Appendix A, current functions are limited to contribution, which evaluates how much of an aggregate a component contributed (see FIG. 160).

Computed Values can be created from Present or Callout Communication Goals. When you create the attribute you are presenting or using to filter the group of Entities, click into the Computed Value tab to access the list of aggregations and functions.

A5: Configure a Story from Scratch

Quill allows you to build a story based on an existing blueprint or entirely from the ground up. To build a story specific to your needs, choose to create a Blank Project Blueprint and name it.

A5(i): The Outline

Figure 161:
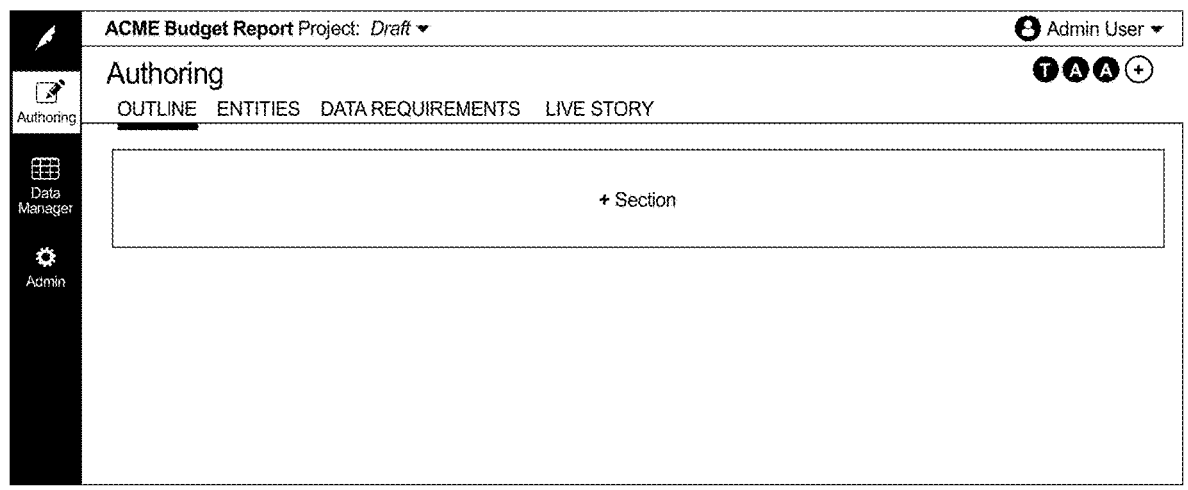

Once you've created your project, you'll be taken to the Outline (see FIG. 161).

The Outline is a collection of building blocks that define an overall Story. This is where you do the work of building your story.

A5(i)(a): Sections

Figure 162:
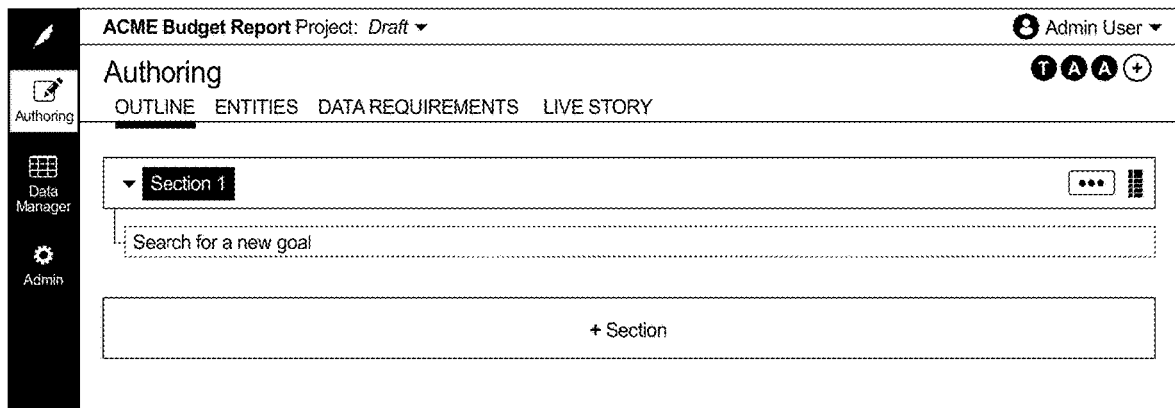

Create and name Sections to organize your story (see FIG. 162).

Once created, a Section can be renamed, deleted, or moved around within the outline. Sections are how Communication Goals are grouped together.

A5(i)(a)(1): Renaming a Section

Click the name of the Section and type in the new name.

A5(i)(a)(2): Deleting a Section

Figure 163:
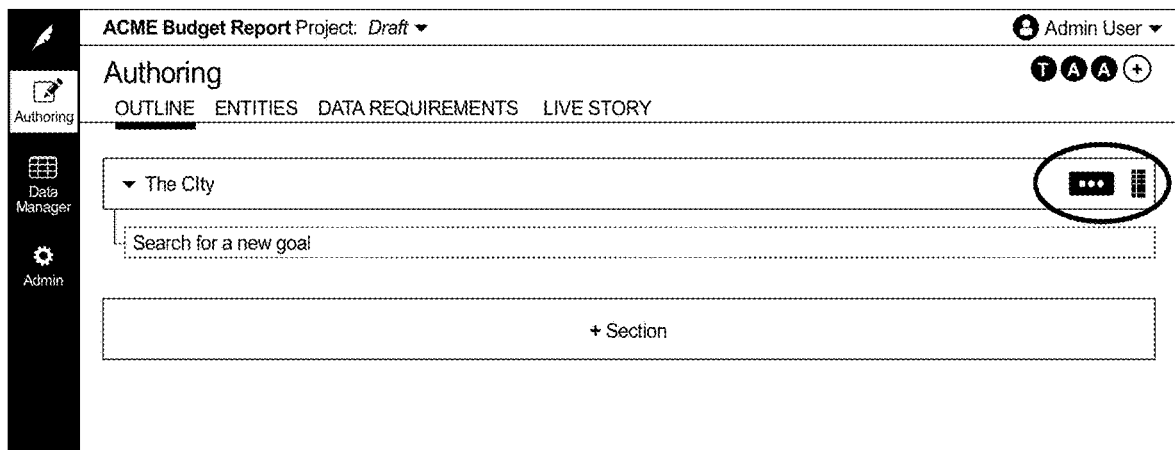

Hover your cursor over the Section you want to delete. On the right side, two icons will appear: an ellipses and a gripper icon (see FIG. 163).

Figure 164:
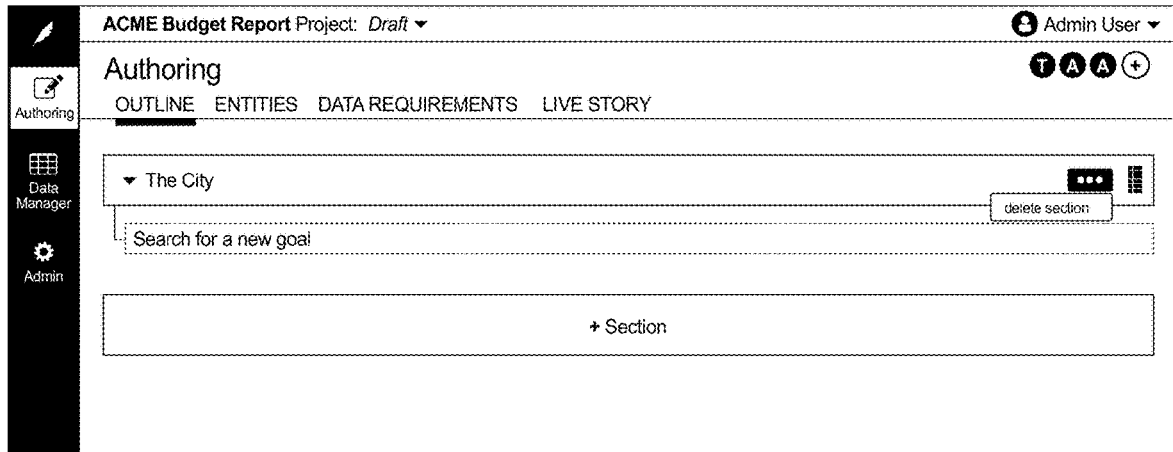

Click the ellipses to reveal the option to delete the Section (see FIG. 164).

If deleted the Section will disappear from the outline along with any Communication Goals it contains.

A5(i)(a)(3): Moving a Section

Figure 165:
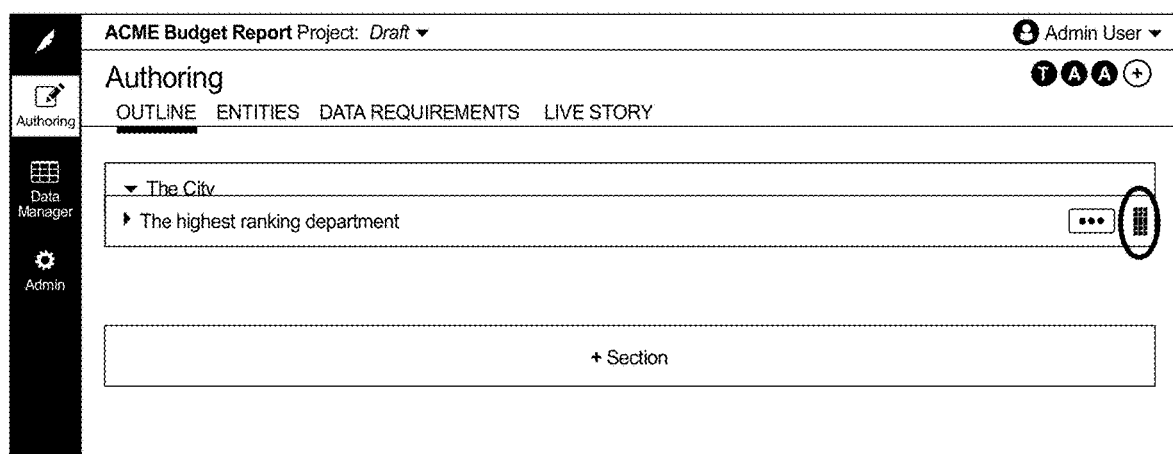

As above for deleting a Section, hover your cursor over the Section you want to move. Click and hold the gripper icon (see FIG. 165) to drag the Section where you want to move it and let go.

A5(i)(b): Communication Goals

Communication Goals provide a bridge between analysis of data and the production of concepts expressed as text. In other words, they are the means of expressing your data in language.

A5(i)(b)(1): Creating a Communication Goal

Figure 166:
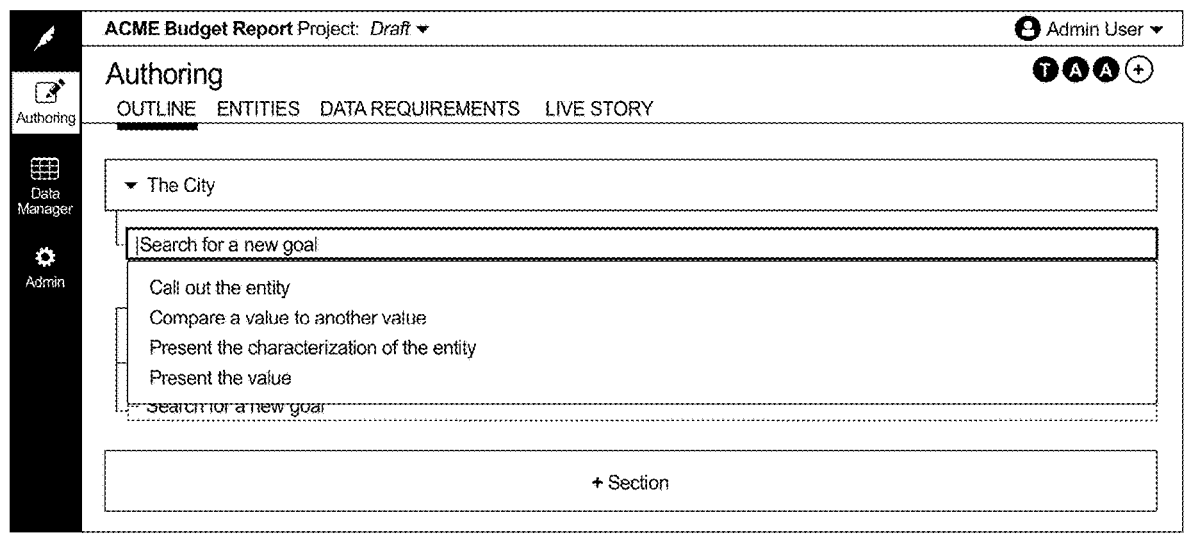

Click the text box where it says to Search for a new goal. Choose the Communication Goal you'd like to use (see FIG. 166).

A5(i)(b)(1)(A): Entity Types

Depending on the Communication Goal you choose, you will have to set the Entity type or types it is talking about. An Entity type is any primary "object" which has particular Attributes. An example is that a Department (Entity type) has Expenses (Attribute). An Entity is a specific instance of an Entity type, with data-driven values for each Attribute.

Figure 167:
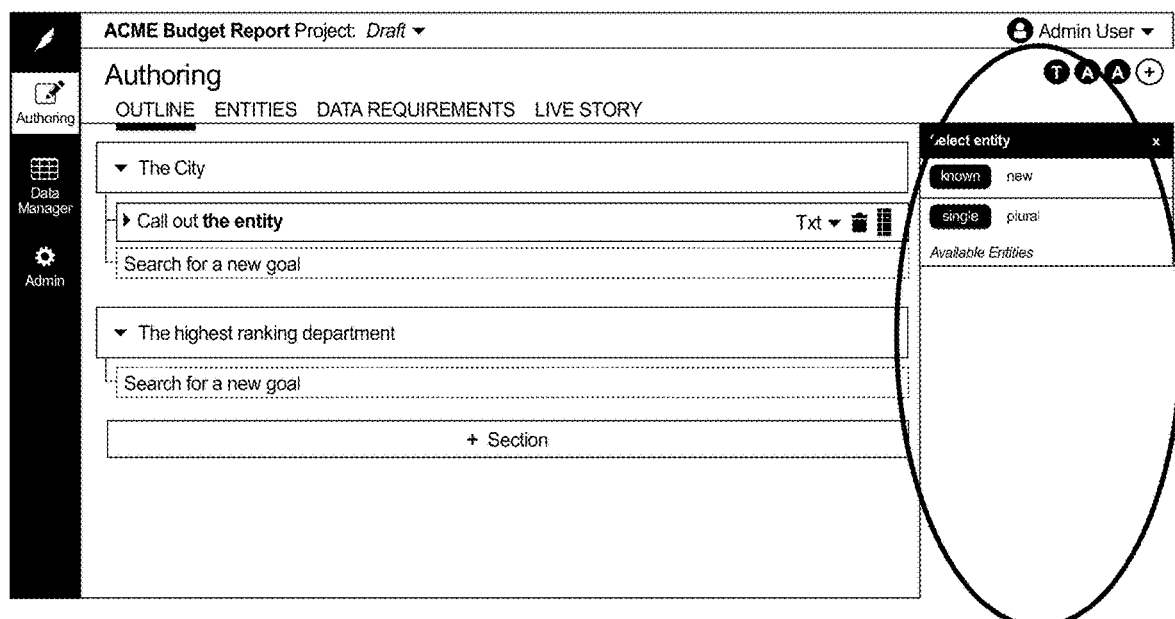

In the example of the Communication Goal "Call out the entity", the example embodiment for Quill of Appendix A requires that an Entity type be specified. What, in your data, would you like to call out? Click "the entity" in the Communication Goal to open a sidebar to the right (see FIG. 167).

Here you can select among Entity types that already exist or create a new one. Available entities include entities created from the outline or the entities tab (including any characterizations).

A5(i)(b)(1)(B): Creating an Entity Type

Figure 168:
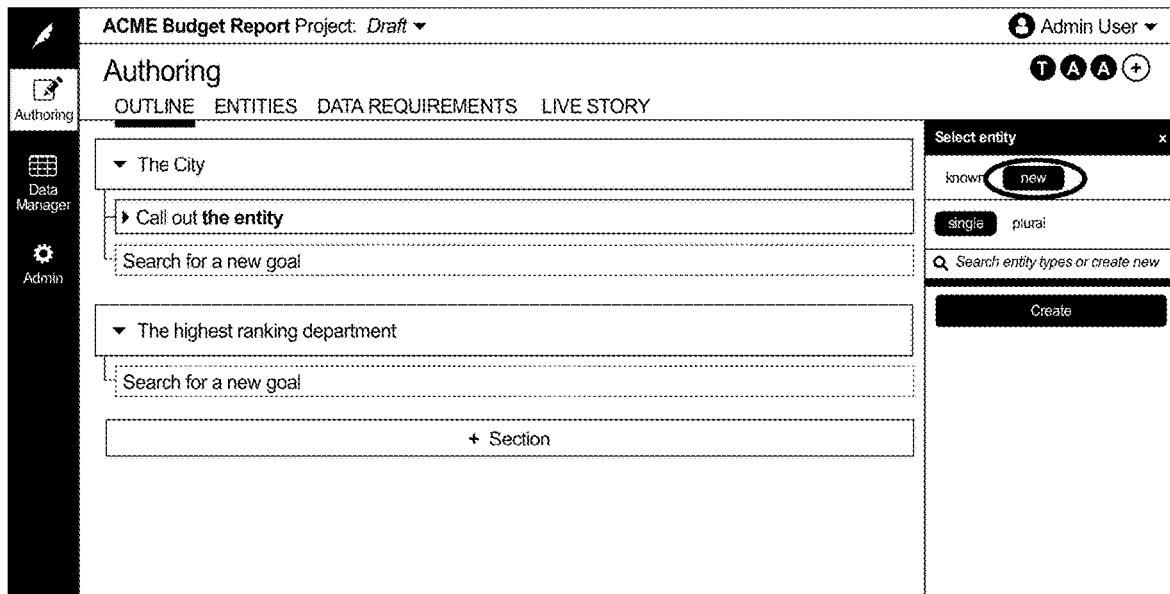
Figure 169:
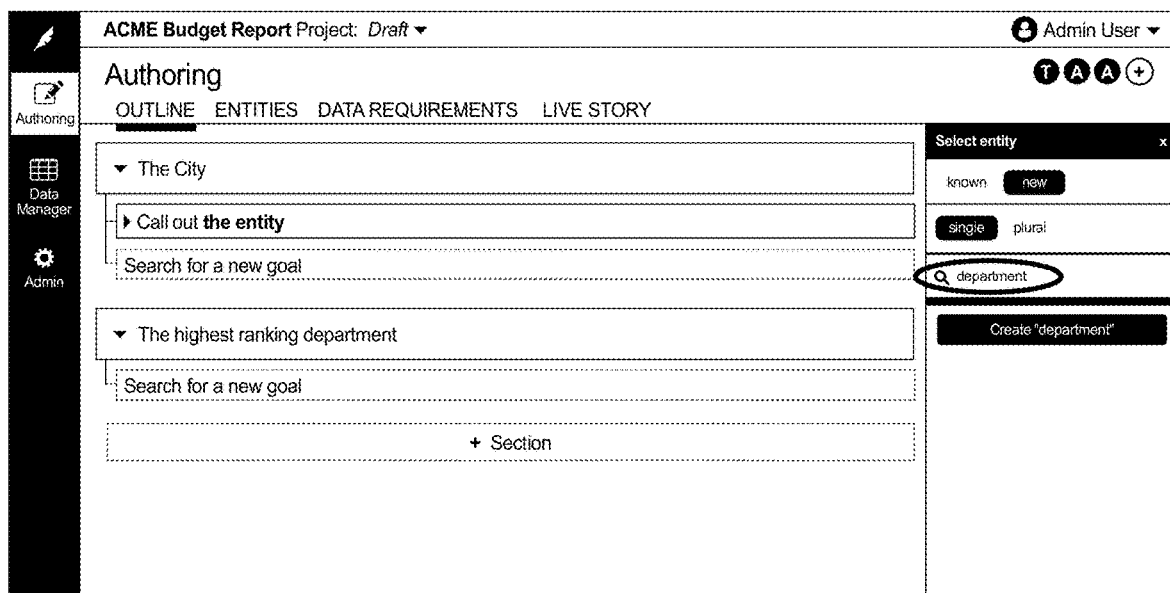
Figure 170:
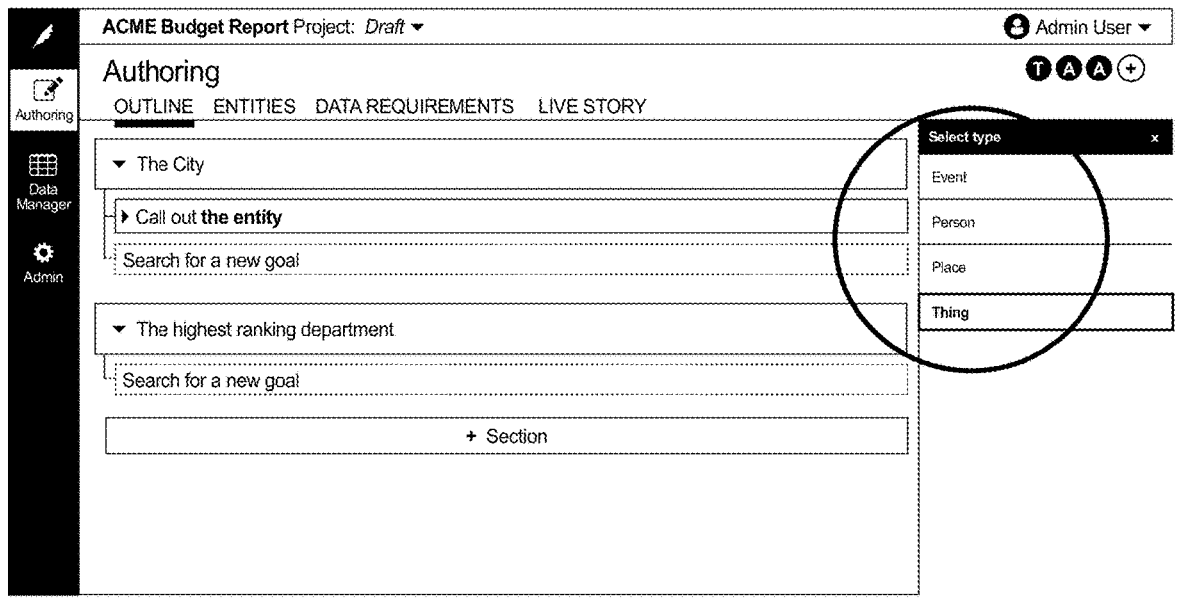
Figure 171:
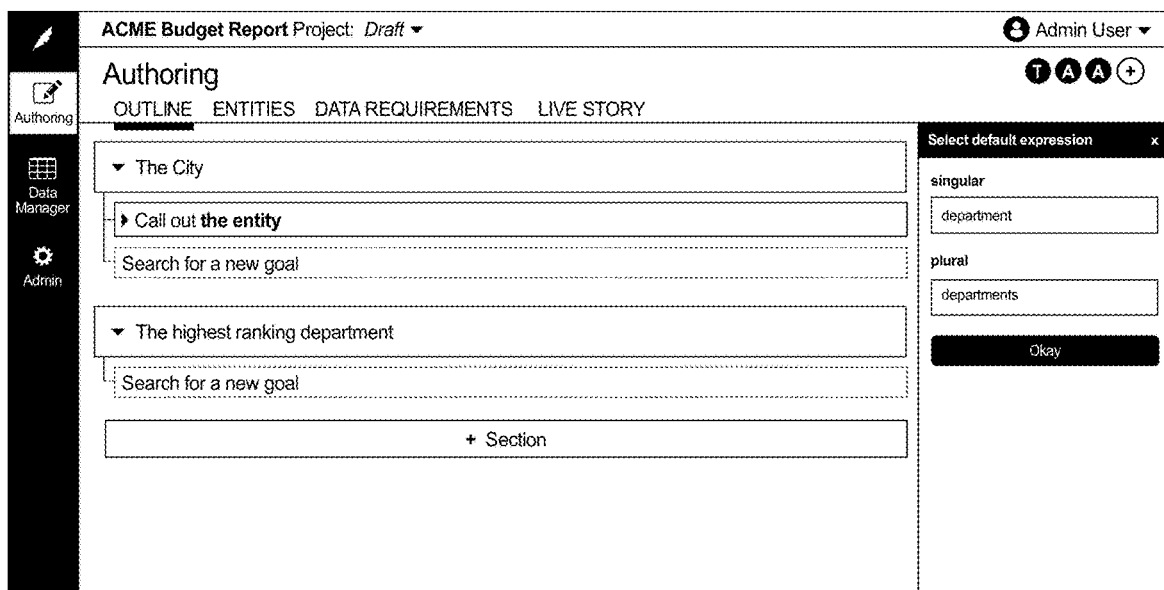
Figure 172:
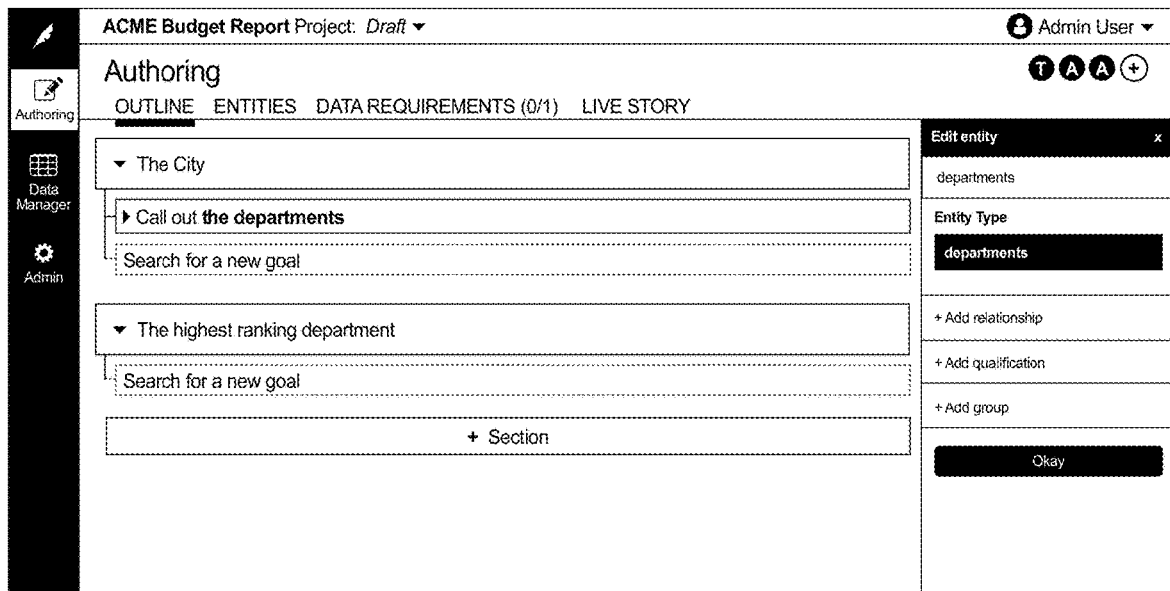

Click "new" in the Entity sidebar (see FIG. 168). Then choose from existing Entity types or create a new one. Set whether the Entity type is singular or plural (see FIG. 169). Once you have created the Entity type, you will be asked to set its base Entity type: Event, Person, Place, or Thing (see FIG. 170). Next, set the plural and singular expressions of the Entity type (see FIG. 171). Quill takes an educated guess at this, but you have the opportunity to make changes. Next you will designate any relationships, group analysis, or qualification pertaining to the Entity type (see FIG. 172).

Figure 173:
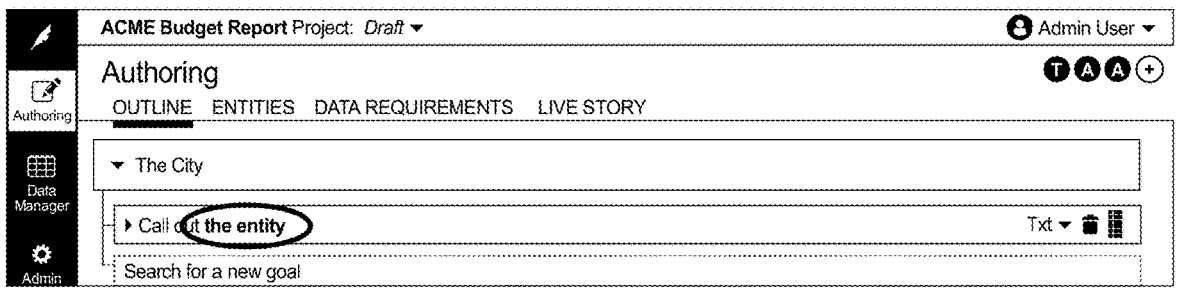
Figure 174:
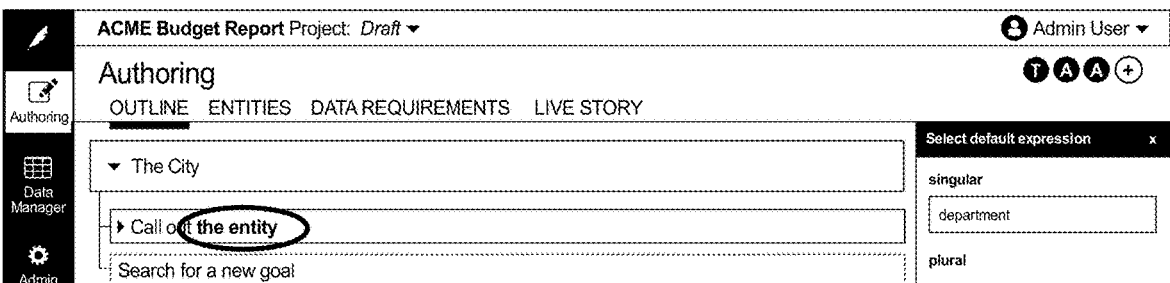
Figure 175:
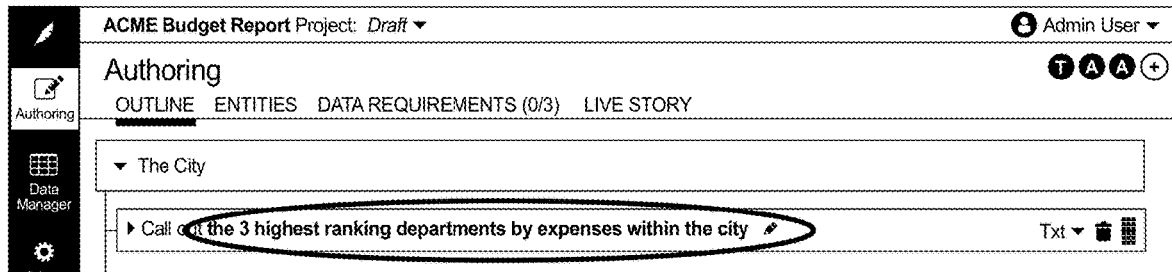

Quill lets you know the state of an Entity type, whether it is unset, in progress, or valid based on the appearance of the Entity type in the Communication Goal. The Entity type appears grey when unset (see FIG. 173), blue when being worked on (see FIG. 174), and green when valid (see FIG. 175).

Figure 176:
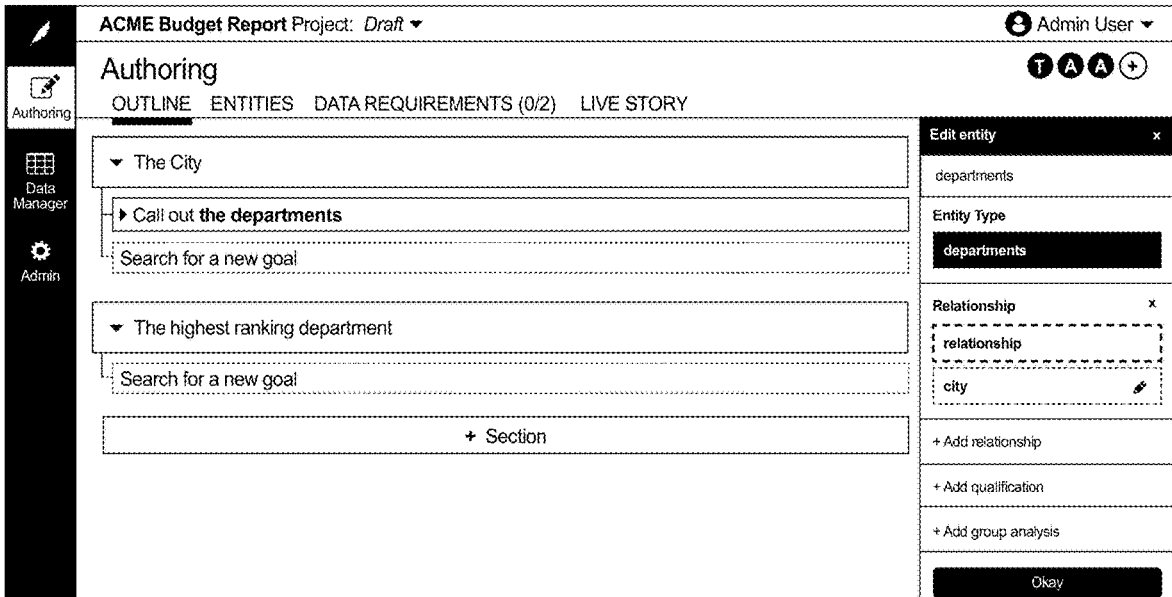
Figures 177, 178:
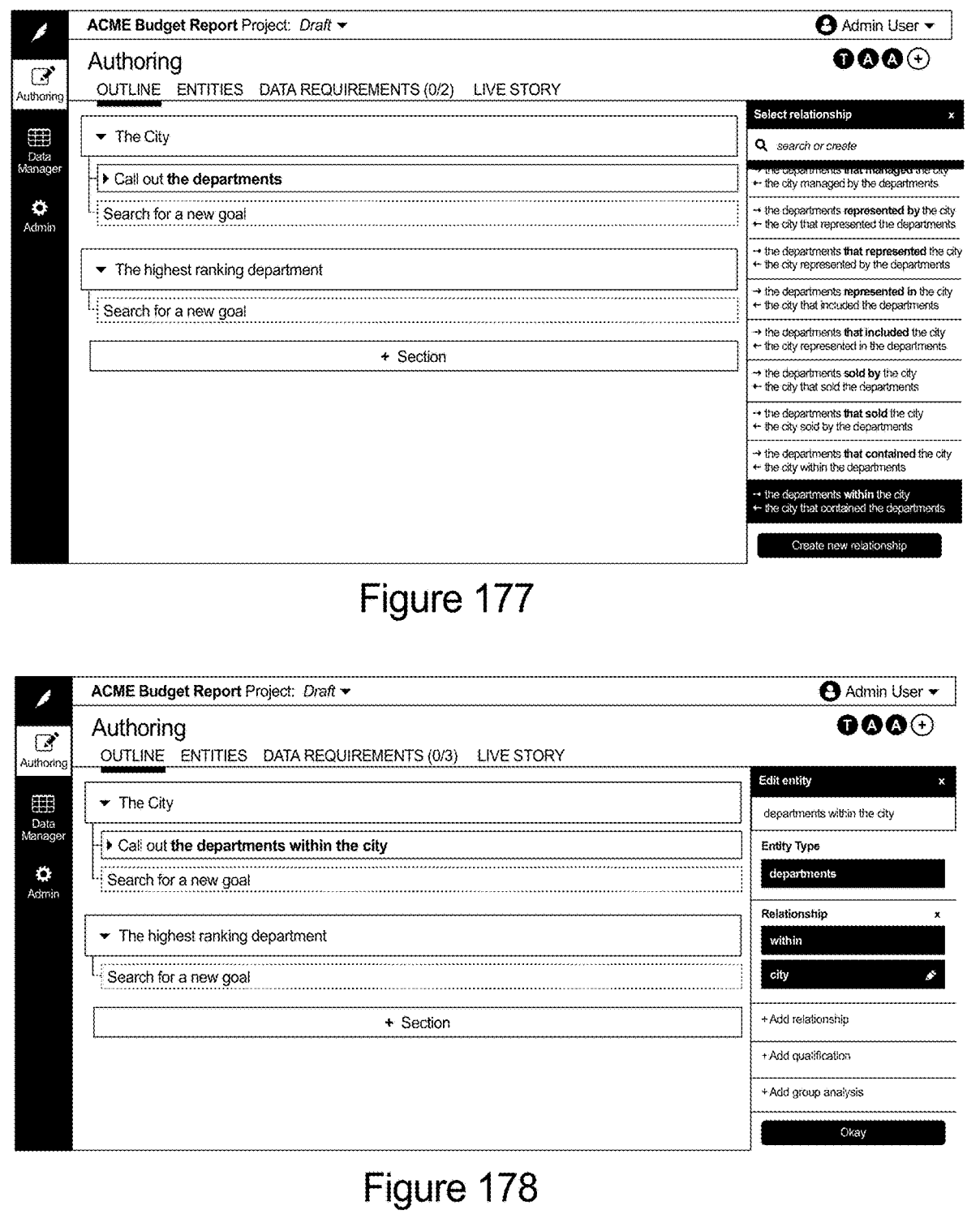

Adding a relationship allows you to tell Quill that an Entity is related to another Entity. To do so, choose to Add Relationship as you create your Entity type. Then set or create the Entity type that this Entity has a relationship to (see FIG. 176). Quill suggests a number of relationships from which you can choose, including "lives in", "managed by", "within", and more. FIG. 177 shows a list of available relationships between two entities (department and city). FIG. 178 shows an entity with a designated relationship. You can also create Relationships that will be added to the library.

Figure 179:
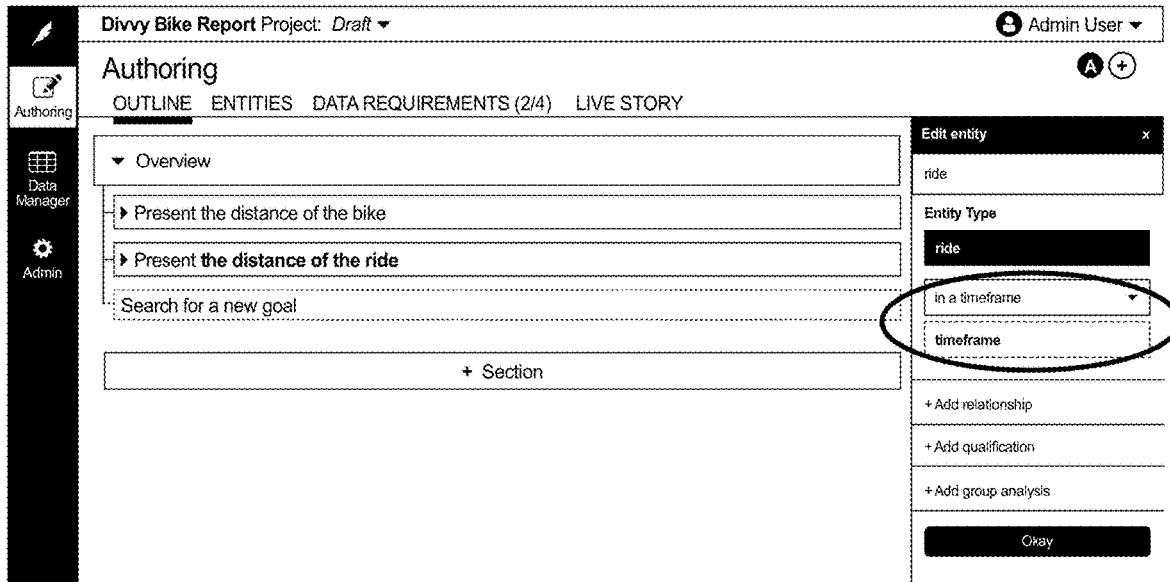
Figure 180:
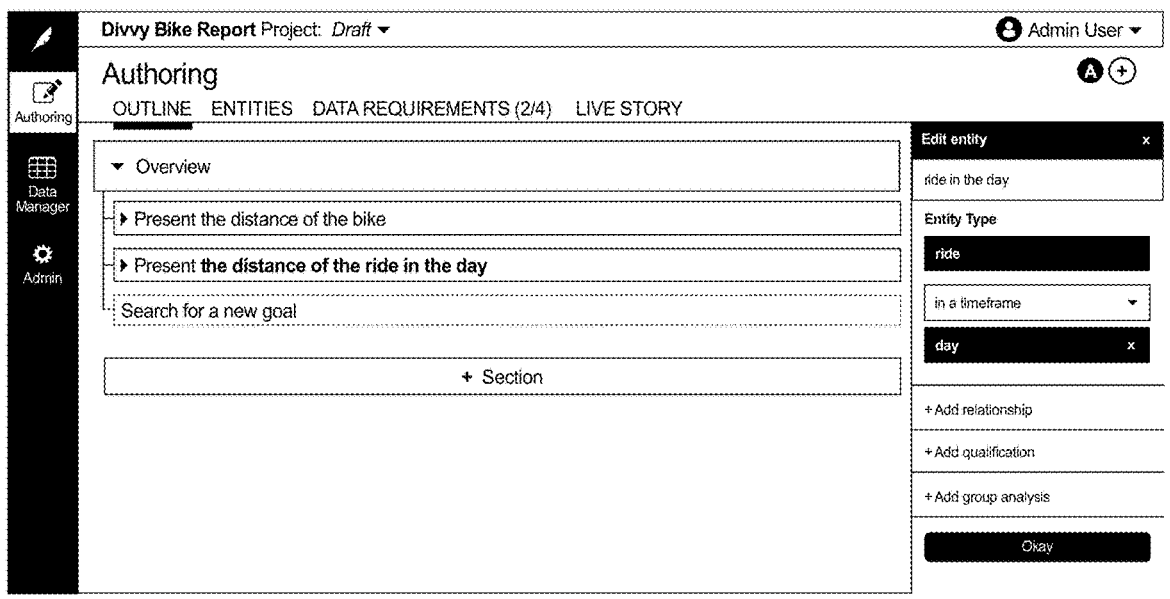

When creating an Entity type of the base type event (see FIG. 179), Quill will prompt you to set a timeframe for it to associate the event with (see FIG. 180).

A5(i)(b)(1)(C): Creating a Relationship

Figure 181:
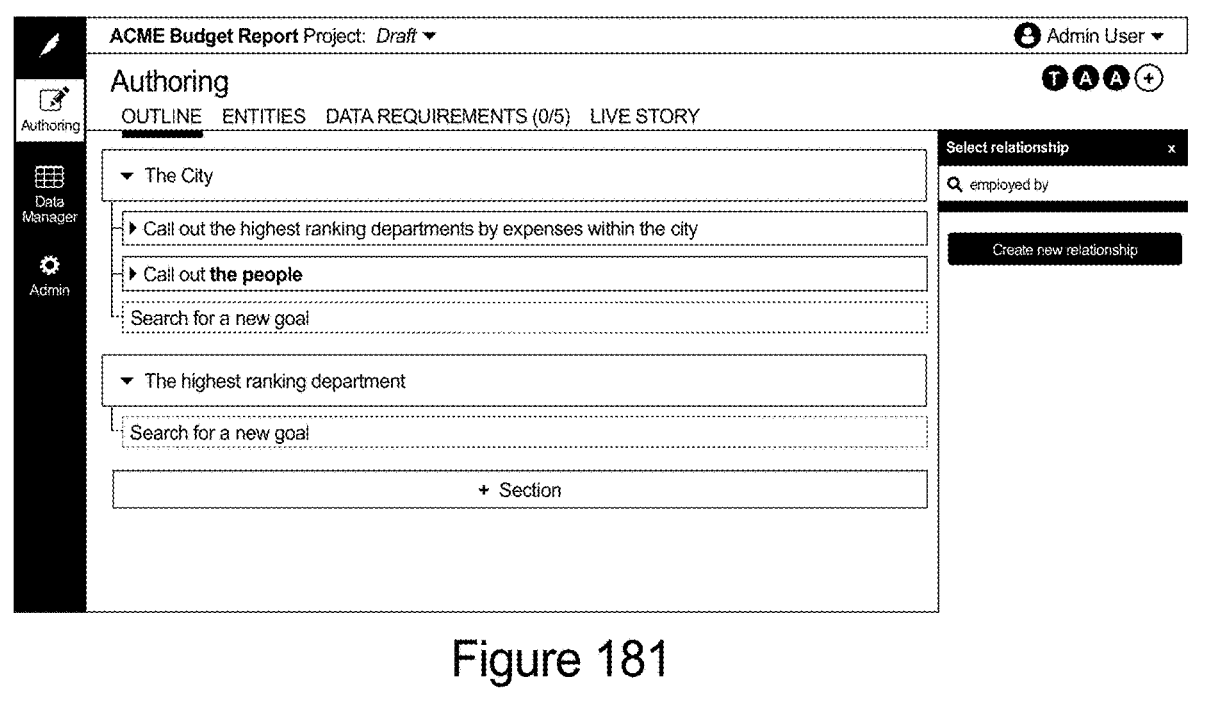

If the Relationships already set in Quill do not meet your needs, you can create your own. Type the relationship you want to create in the "search or create" textbox and click "Create new relationship" at the bottom of the sidebar (see FIG. 181).

Figure 182:
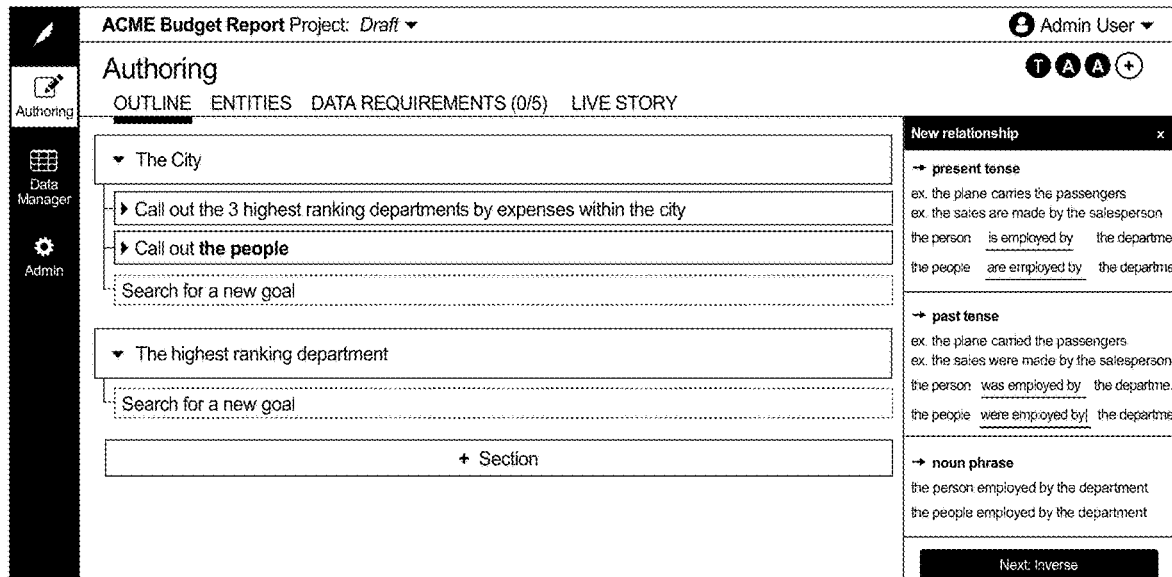

After that, you will be taken through some steps that tell Quill how the new Relationship is expressed. Enter in the present tense and past tense forms of the Relationship, and Quill automatically populates the noun phrase that describes the relationship between the Entities (see FIG. 182).

Figure 183:
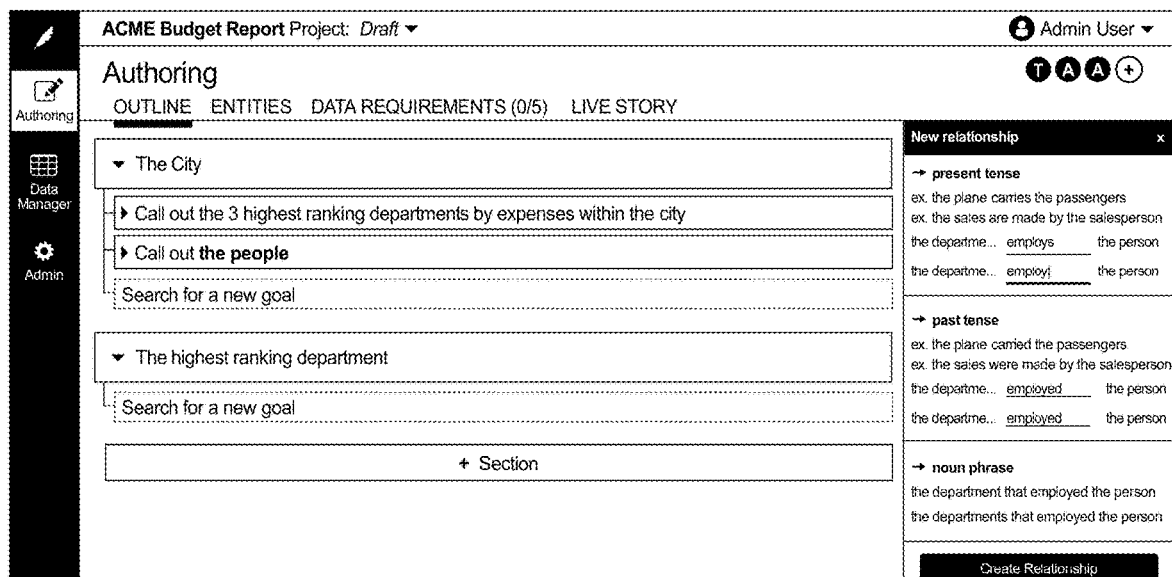
Figure 184:
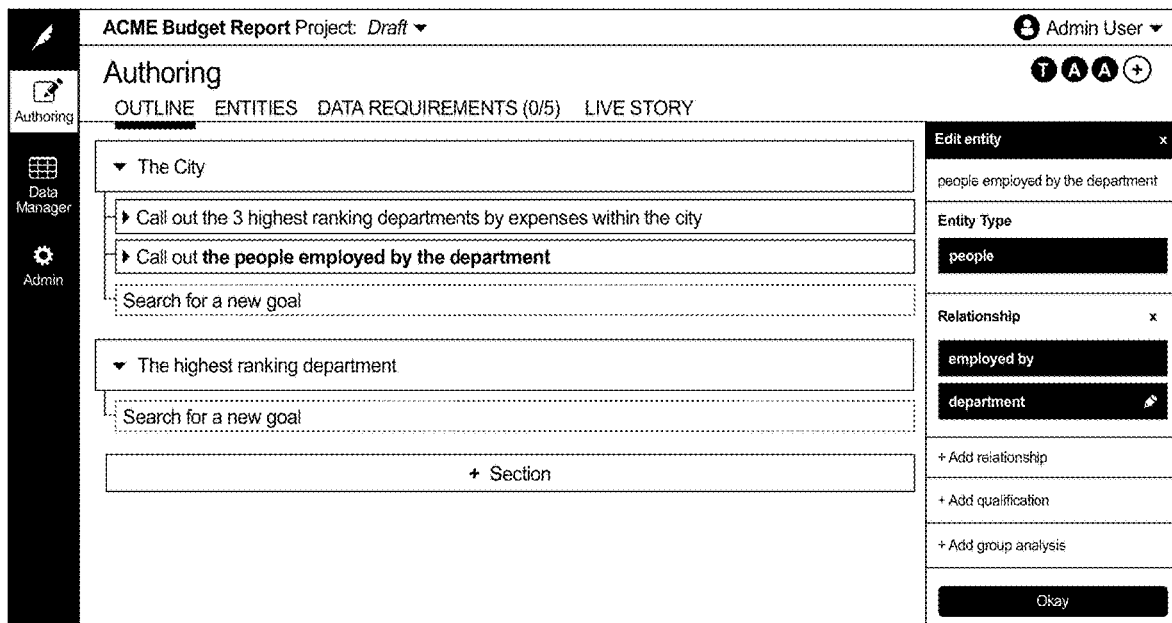

Once you complete the steps for both directions of the relationship (see FIG. 183), Quill will apply the relationship to your Entity types and add the relationship to its library (see FIG. 184). You can use the Relationship again anywhere else in the project.

Figure 185:
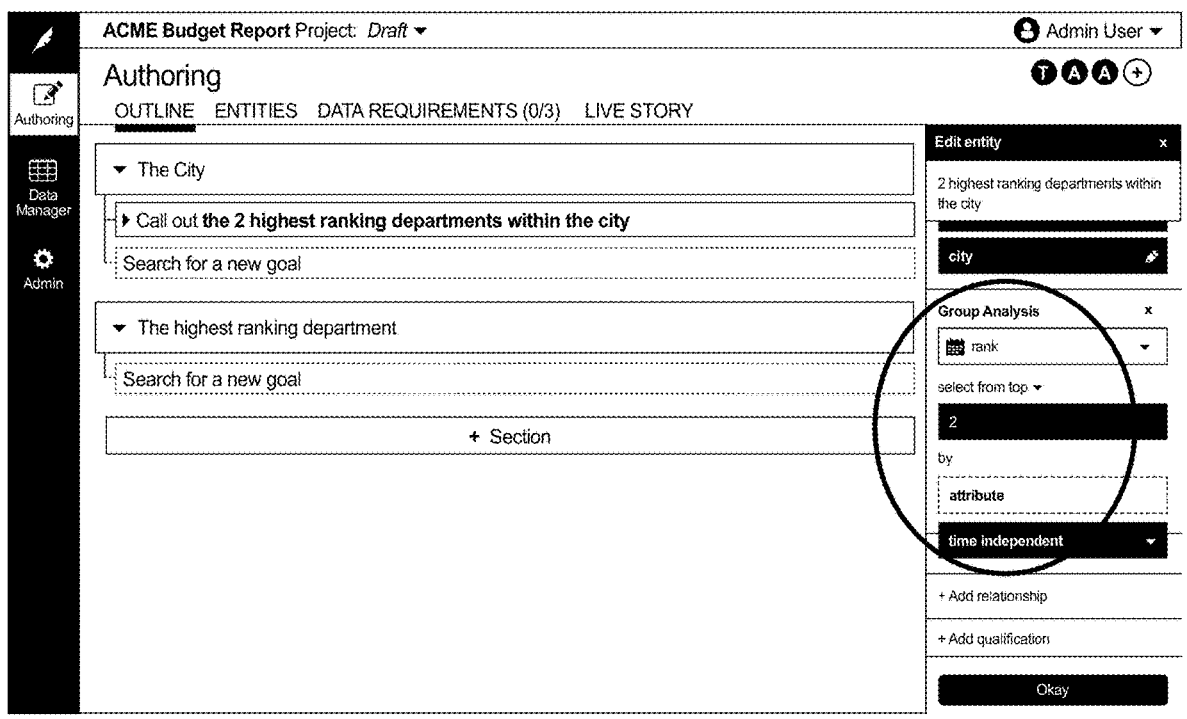

You can also apply Group Analysis to an Entity type (see FIG. 185).

Figure 186:
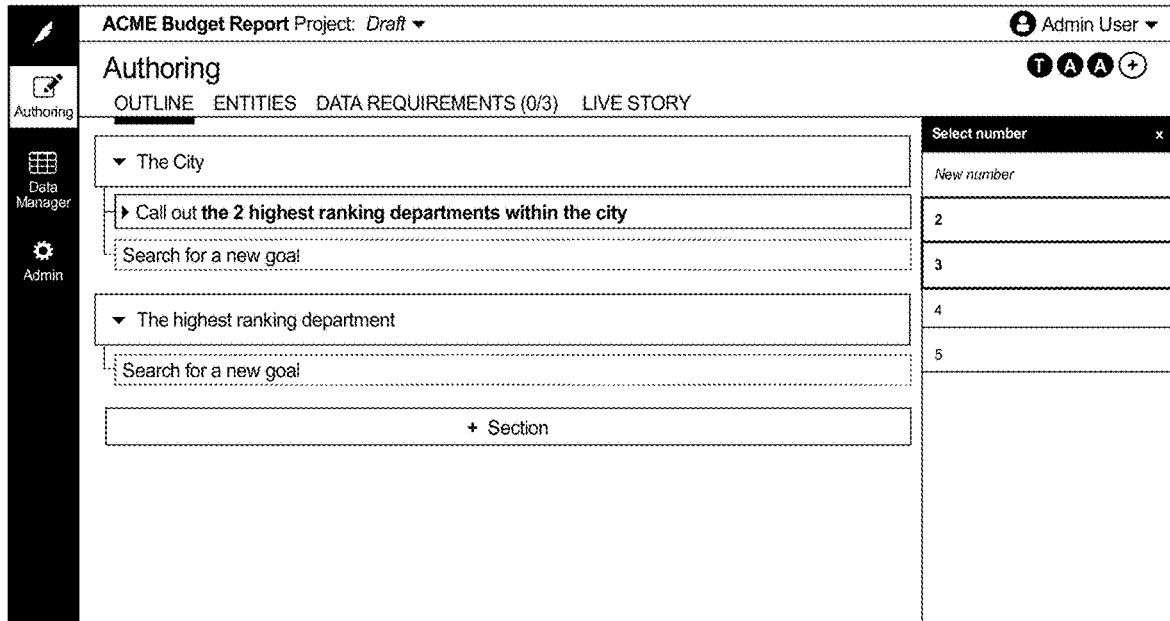
Figure 187:
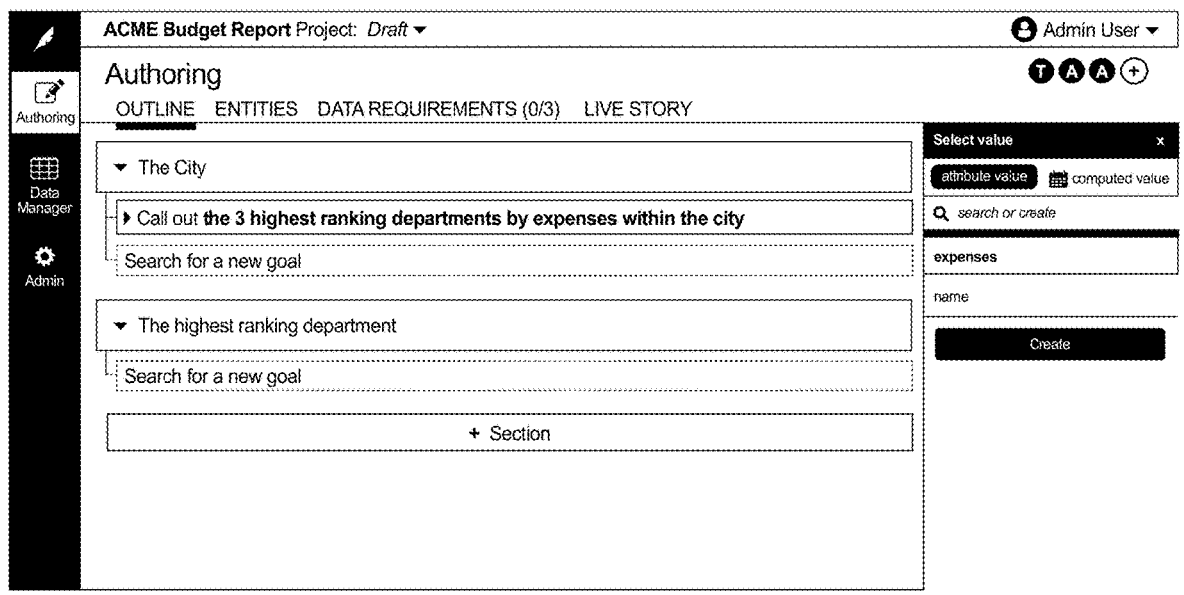
Figure 188:
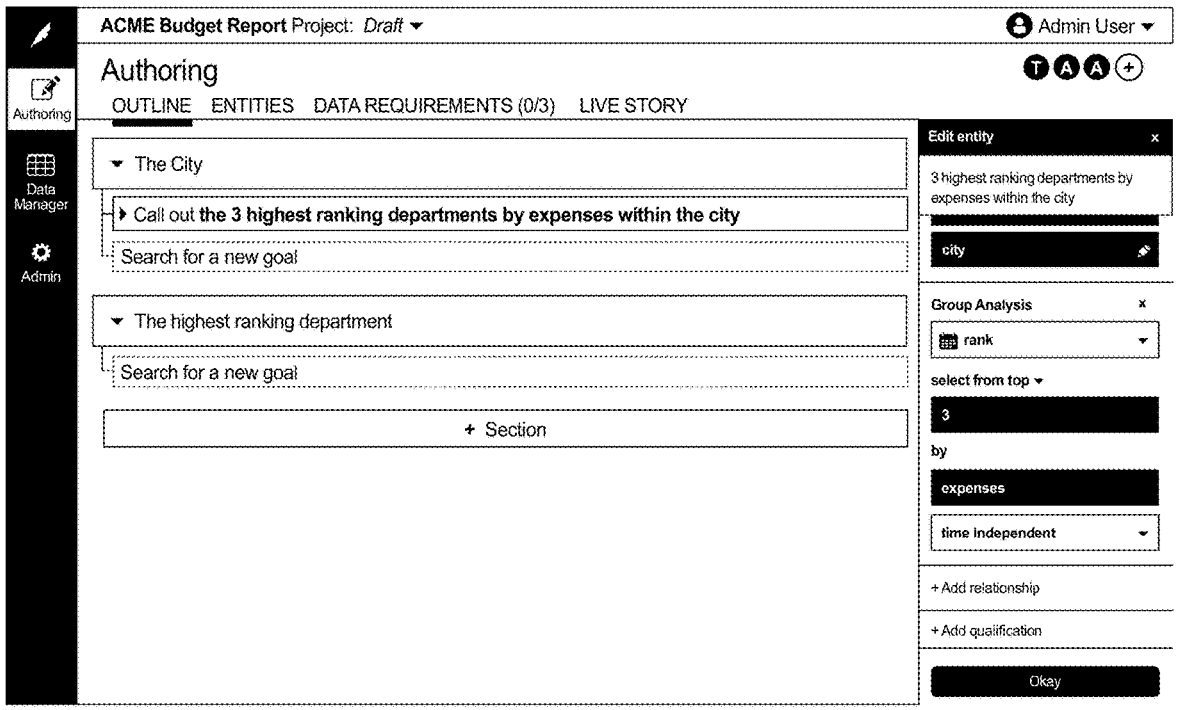

In the example of Appendix A, rank is supported. This allows you to specify which Entity in a list of Entities to use in a Communication Goal. Select whether you are asking for the position from the top or the position from the bottom and the ranking of the Entity you want (see FIG. 186). FIG. 187 shows setting the attribute to perform the group analysis by. FIG. 188 shows an Entity type with group analysis applied.

Figure 189:
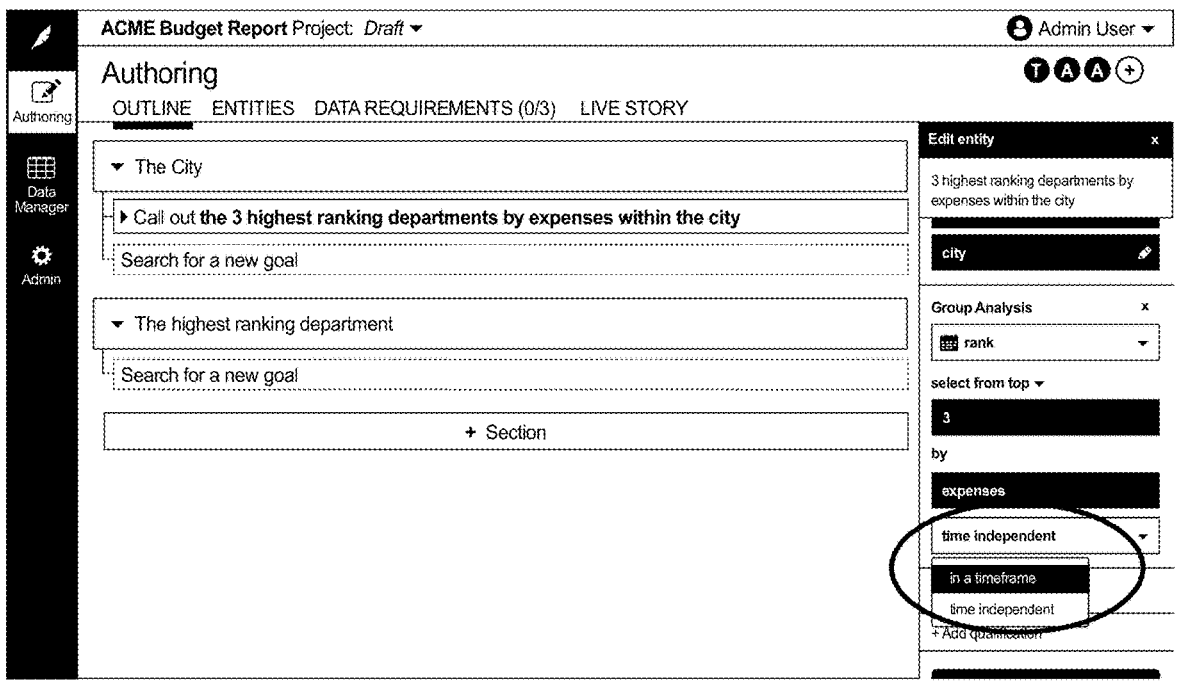
Figure 193:
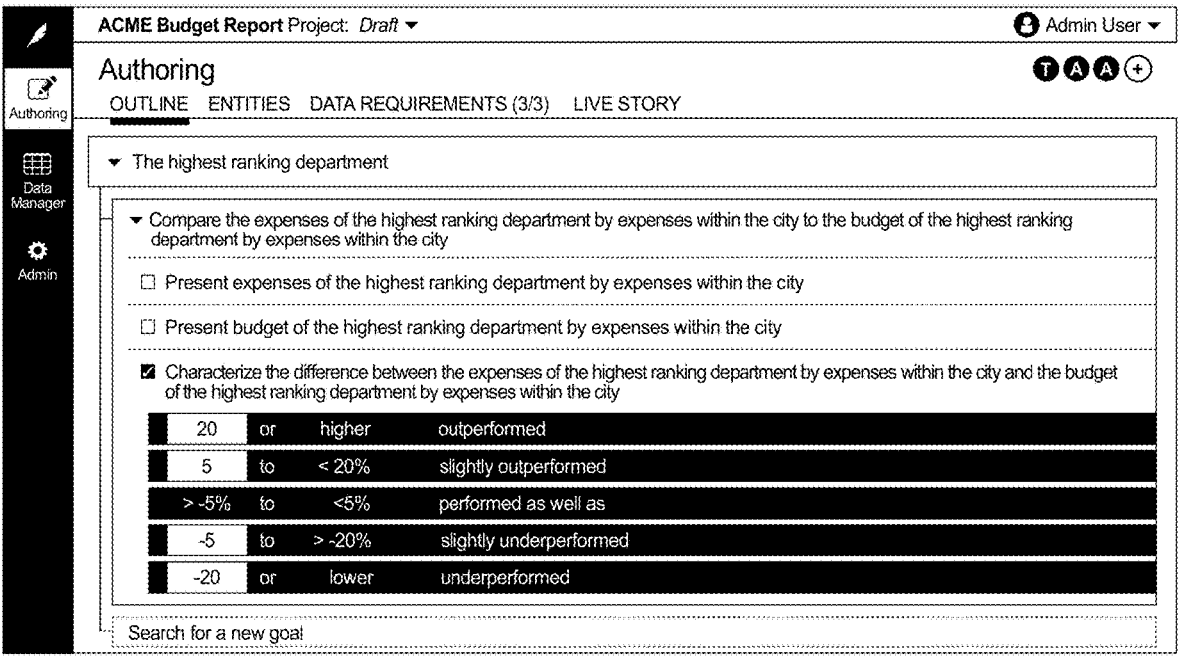

You also have the option of specifying a Timeframe (see FIG. 189).

Figures 190, 191:
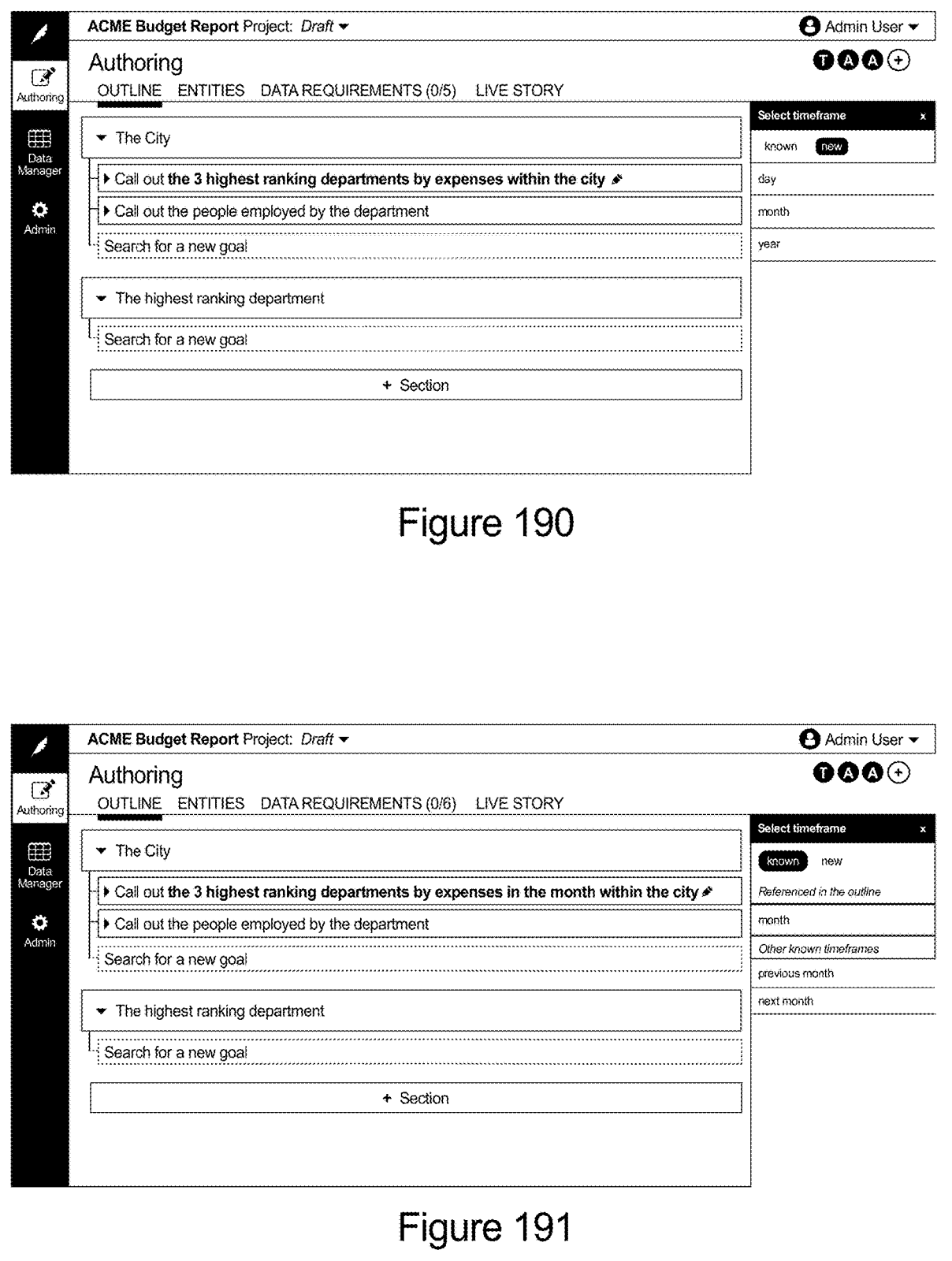

This allows you to restrict the window of analysis to a particular day, month, or year (see FIG. 190).

Create a new Timeframe by selecting one of those three options. Once you've done this, Quill also recognizes the "previous" and "next" instances of that Timeframe (see FIG. 191). In other words, if you create a day Timeframe, Quill will populate the list of known Timeframes with day, along with previous day and next day.

Once you have completed the steps to create an Entity type, Quill adds it to the list of Entity types available for use throughout the story. In other words, you can use it again in other parts of the Outline.

A5(i)(b)(1)(D): Characterizations

Characterizations are editorial judgments based on thresholds that determine the language used when certain conditions are met. Characterizations can be set on Entity types directly or when comparing Attributes on an Entity in a Communication Goal.

Refer to Characterizations in Ontology Management for more information on Entity Characterizations.

To set the characterizations on a comparative Communication Goal, expand the arrow to the left of the Communication Goal (see FIG. 192).

This exposes the list of available subgoals (see section below). At the bottom of this list is a goal to characterize the difference between the attributes. Check the box to expose the thresholds applied to the comparison (see FIG. 193).

Quill has default thresholds to determine the comparative language for each outcome. These thresholds can be changed by entering different values into the boxes. If a value is changed to be less than the upper bound or greater than the lower bound of a different outcome, Quill will adjust the values so that there is no overlap (see FIGS. 194 and 195).

There is also default language to correspond with each of the possible outcomes. This can also be changed to suit your particular needs and the tone of your story. Click on the green, underlined text to open a sidebar to the right where you can add additional expressions and set which expression you would like to be the primary expression (see FIG. 196).

If you have multiple expressions associated with the outcome (see FIG. 197), Quill will alternate between them at random to add Variability to the language. These additional expressions will be tied to the specific Communication Goal where you added them and will not appear for others. You can also opt into and out of particular expressions, as well as delete them using the x. However, you cannot opt out of whichever expression is set as the primary expression.

A5(i)(b)(2): Deleting a Communication Goal

Figure 198:
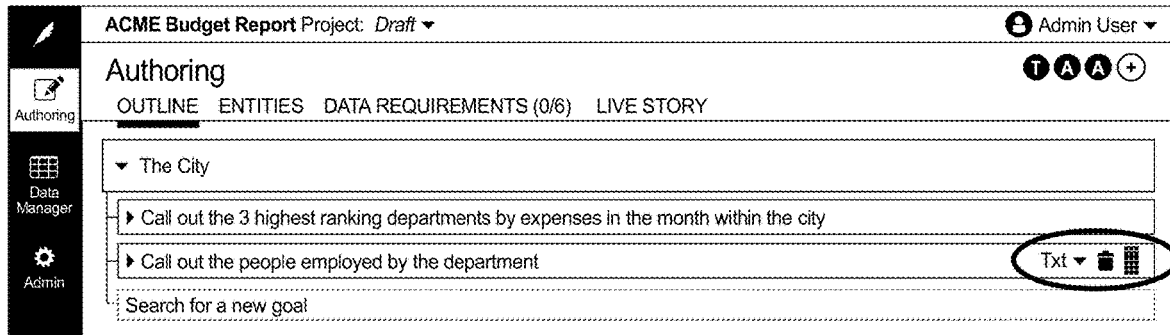

To delete a Communication Goal, hover your cursor over it to reveal a trash can icon (see FIG. 198). Click it to delete the Communication Goal.

A5(i)(b)(3): Moving a Communication Goal

Figure 199:
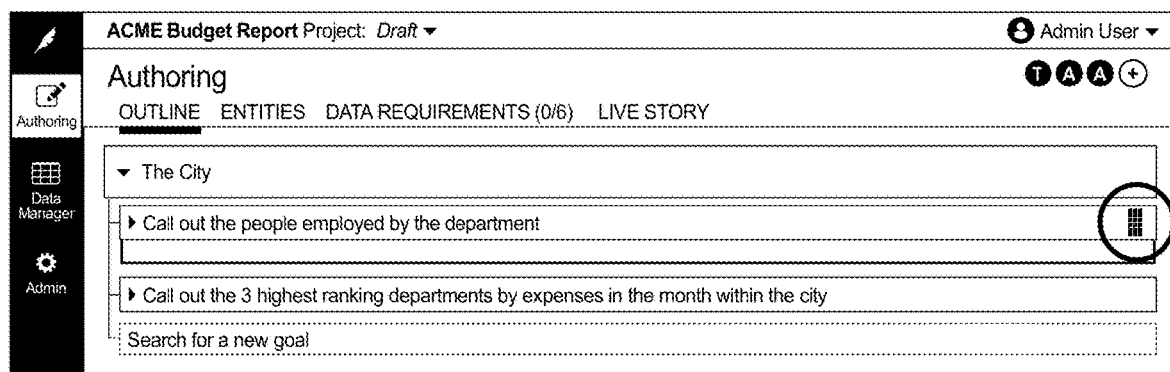

Moving a Communication Goal is done the same way as moving a Section. Hover your cursor over the Communication Goal to reveal the gripper icon (see FIG. 199).

Figure 200:
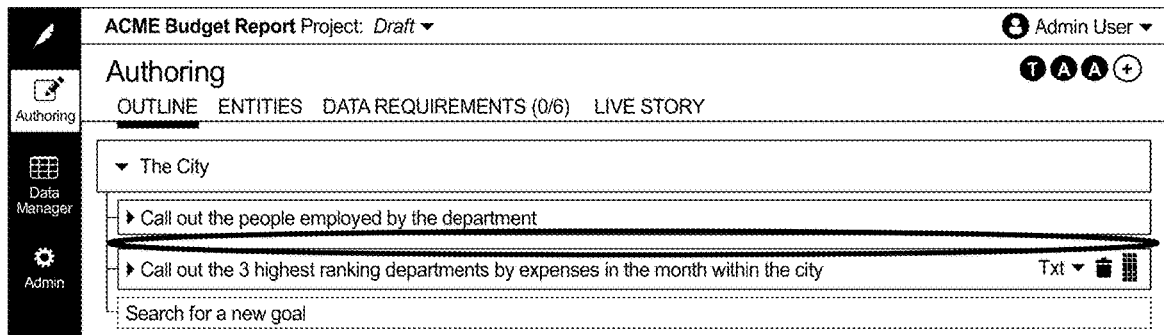

Click and move the Communication Goal within the Section or to another section (see FIG. 200). Be careful when you move Communication Goals to make sure there is space between them.

Communication Goals without space between them are Linked Goals, described below.

A5(i)(b)(4): Linked Goals

Figure 201:
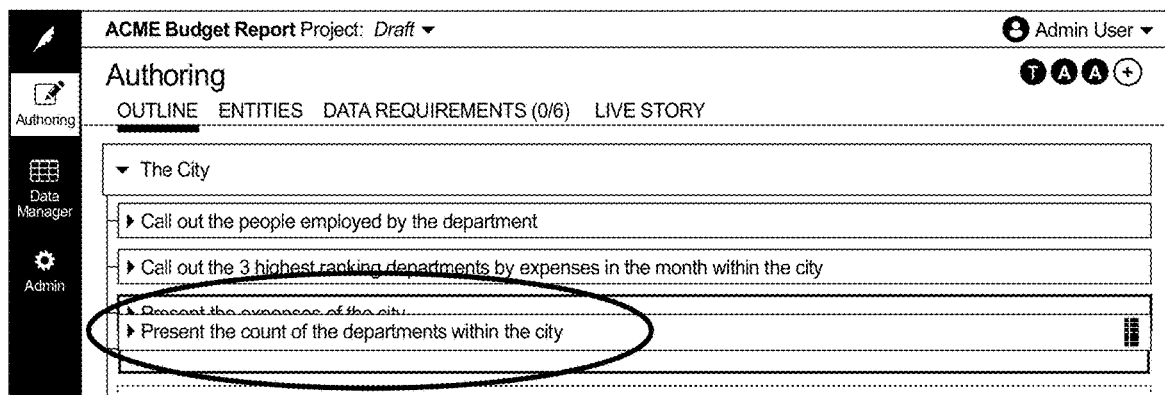

Quill supports linking Communication Goals. This allows the user to express ideas together. For example, you may wish to talk about the number of departments in a city along with the total budget for the city. Hover your cursor over the Communication Goal to reveal the gripper icon, click and drag it above the goal you wish to link (see FIG. 201). They will always be unlinked by revealing the gripper icon again by hovering, and moving the Communication Goal into an empty space on the Outline.

Figure 202:
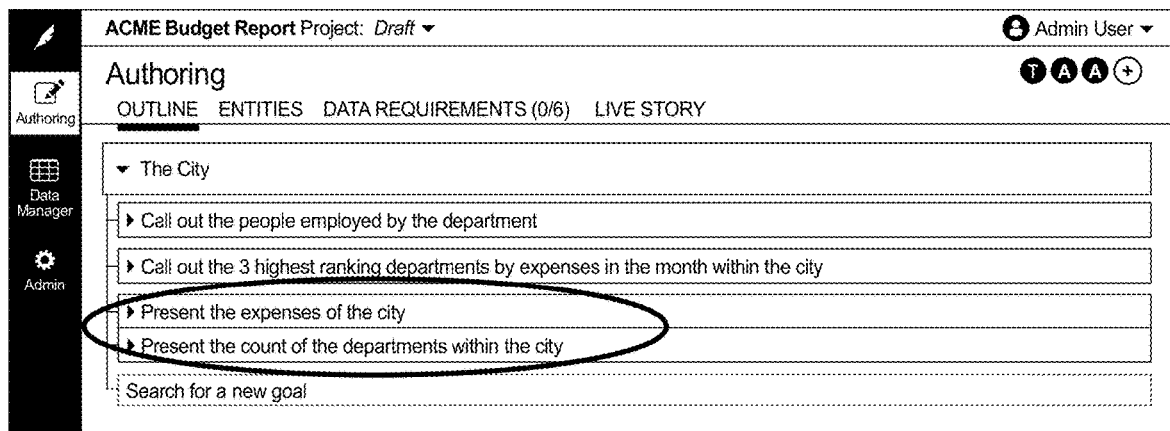

When you link the Communication Goal that expresses the number of departments and the Communication Goal that expresses the total budget for the city (see FIG. 202), Quill will attempt to express them together with smoother language such as combining them into one sentence with a conjunction.

A5(i)(b)(5): Related Goals (Subgoals)

Some goals support related goals, or subgoals. This allows you to include supporting language without having to create separate Communication Goals for each related idea. For example, if you have a Communication Goal comparing attributes on an entity—in this case, the budget and expenses of the highest ranking department by expenses within the city—you may also wish to present the values of those attributes. Expand the Communication Goal to expose those related goals and opt into them as you like (see FIG. 203).

A5(i)(b)(6): Styling Communication Goals

Quill allows for styling Communication Goals for better presentation in a story. Hover your cursor over a Communication Goal to reveal the "Txt" dropdown on the right side (see FIG. 204).

Figure 206:
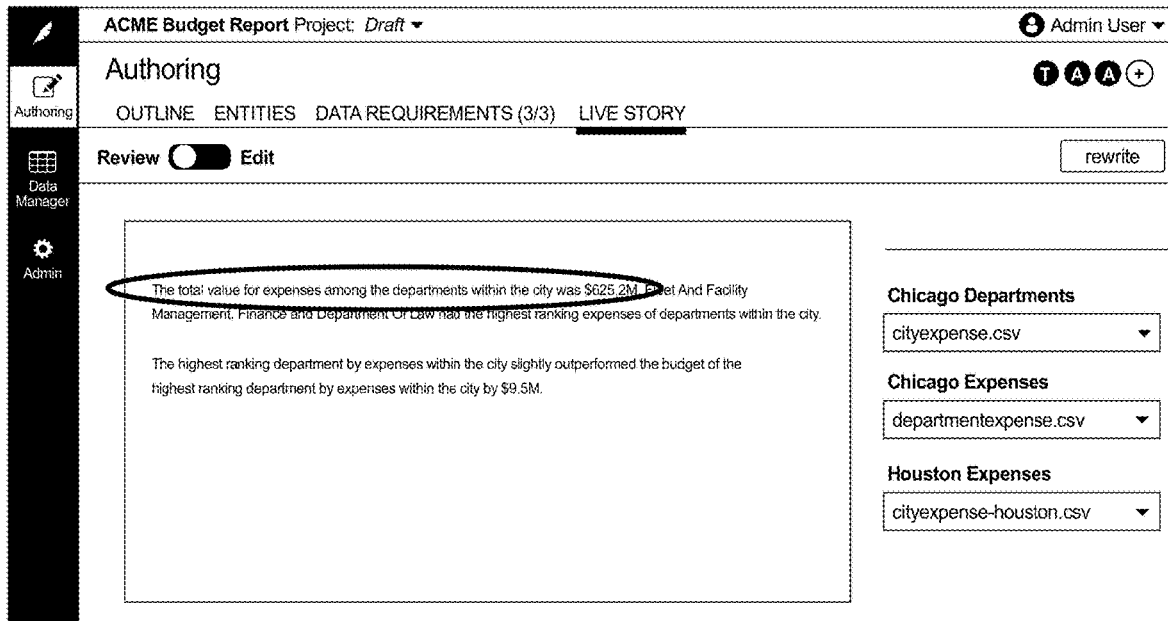
Figure 207:
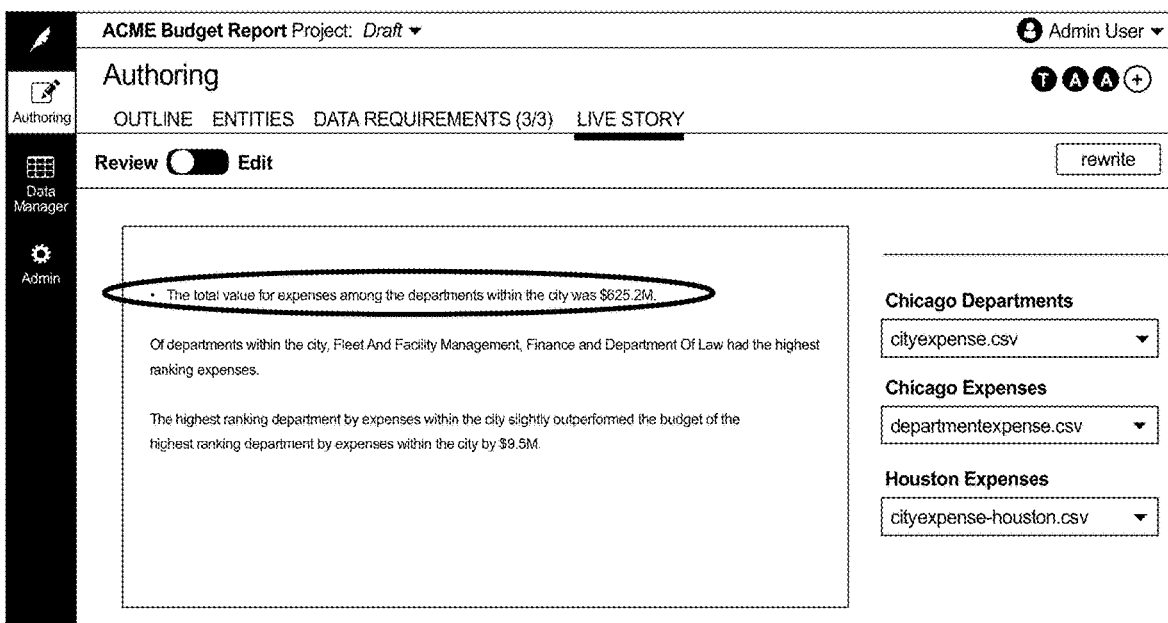

Here, you can choose whether the language expressed is styled as a headline (see FIG. 205), normal text (see FIG. 206), or bullets (see FIG. 207).

A5(i)(b)(7): Charts

Charts are supported for two Communication Goals: Present the [attribute] of [a group] and Present the [attribute] of a [group of events]. For either of these goals, to get a chart, go to the Txt dropdown and select Chart (see FIG. 208).

This will render the Communication Goal as a chart.

Figures 209, 210:
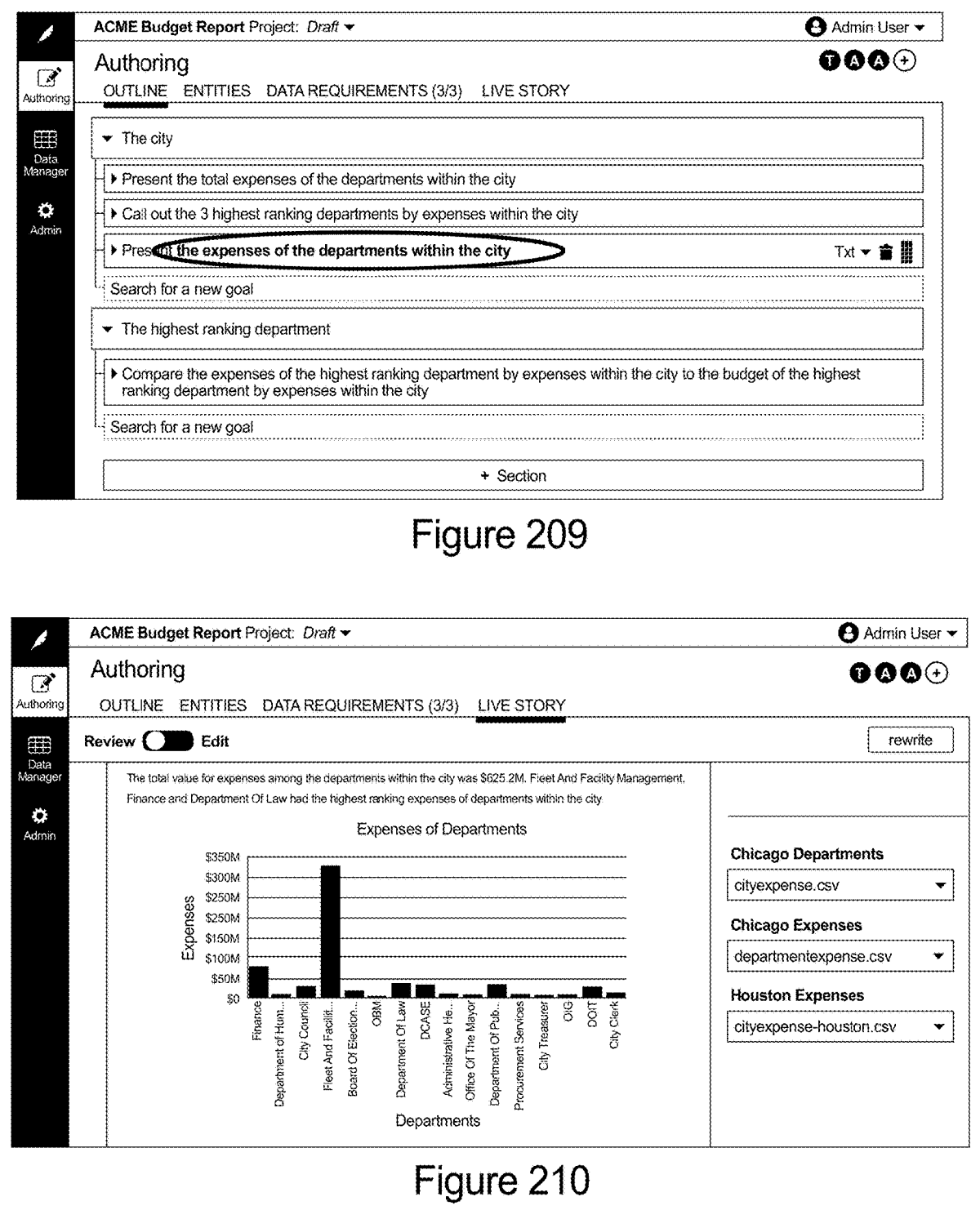

Present the [attribute] of [a group] (see FIG. 209) will result in a bar chart (see FIG. 210).

Figures 211, 212:
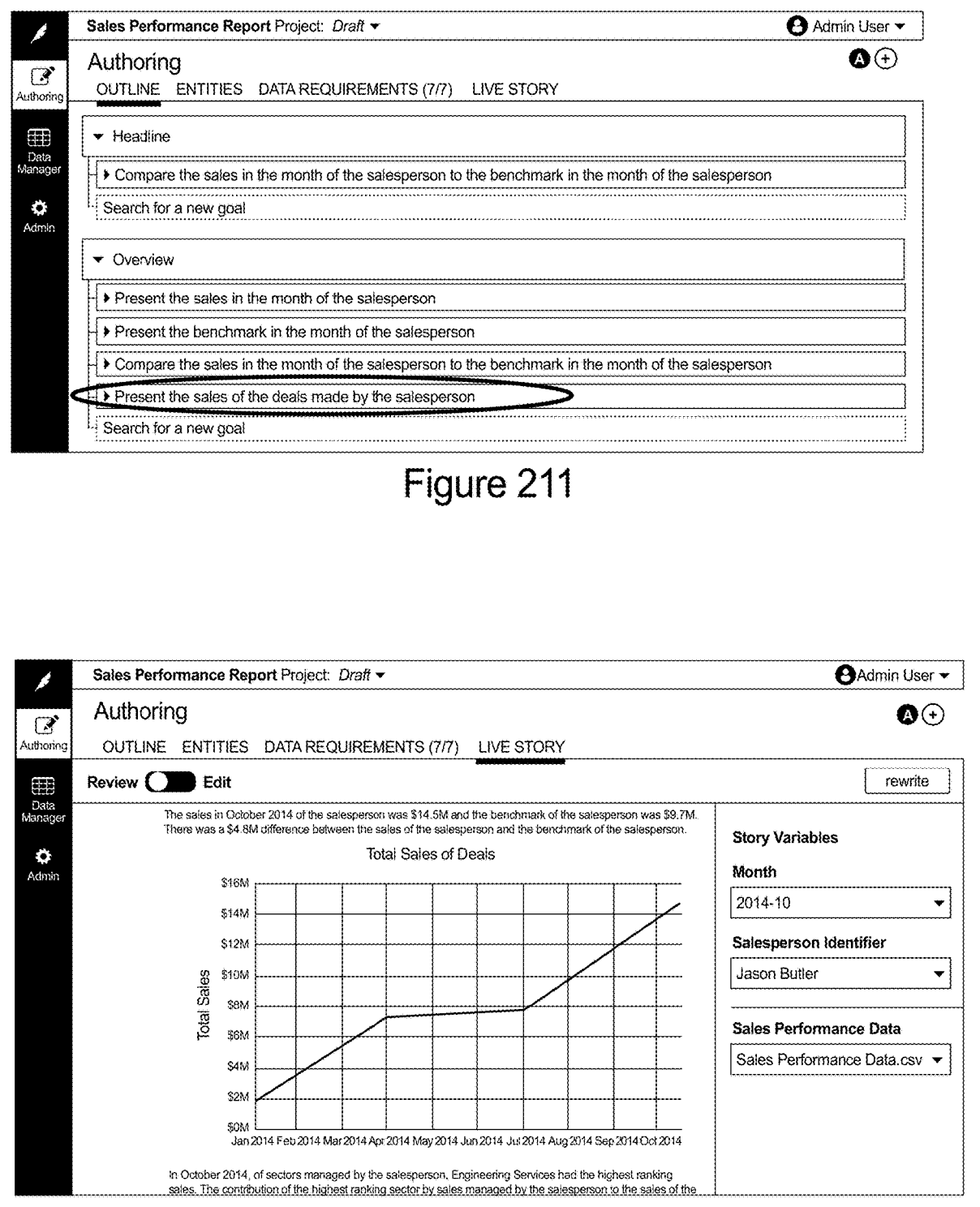

Present the [attribute] of [a group of events] (see FIG. 211) will result in a line chart (see FIG. 212).

A5(i)(c): Data Requirements

Once you have configured your story, Quill will ask where it can find the data to support the Entity types and Attributes you have specified in the Communication Goals. Go to the Data Requirements tab in Authoring to provide this information (see FIG. 213).

The Data Requirements will guide you through a series of questions to fill out the necessary parameters for Narrative Analytics and Communication Goals. For each question, select the data view where that data can be found and the appropriate column in the table.

A5(i)(c)(1): Tabular Data

Figure 214:
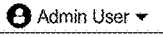

FIG. 214 shows an example where the data is tabular data.

A5(i)(c)(2): Document-Based Data

Figure 215:
Figure 216:
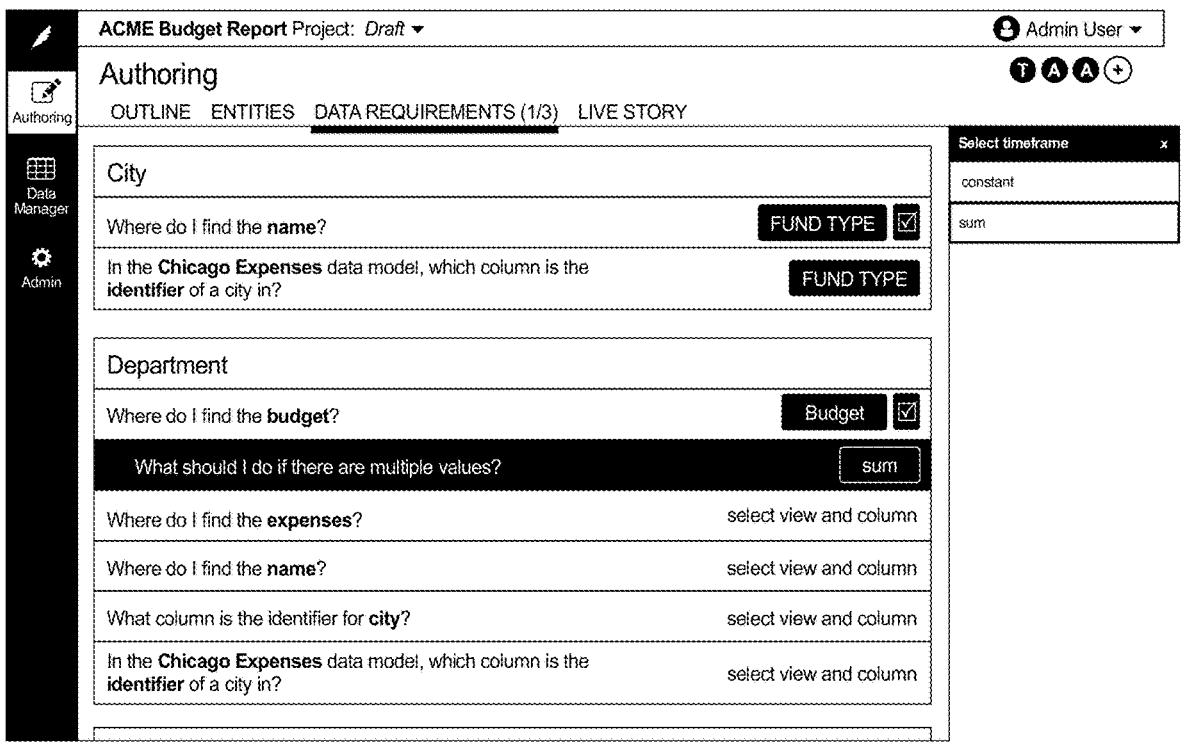
Figure 220:
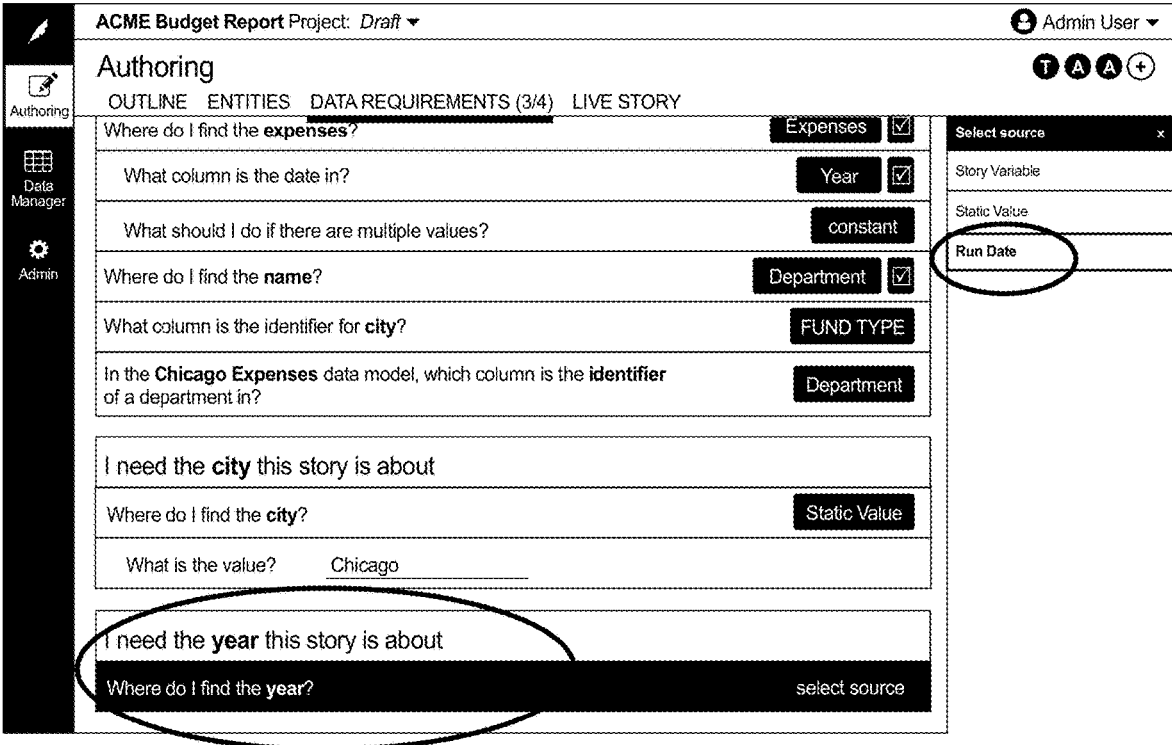
Figure 226:
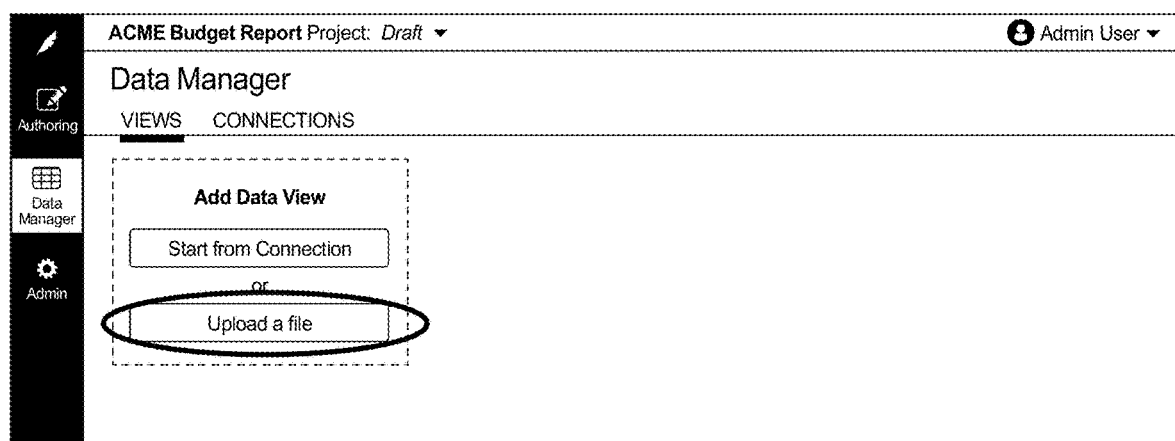

FIG. 215 shows an example where the data is document-based data.

Where the value supplied is numerical, Quill will provide analytic options for cases where there are multiple values (see FIG. 216). "Sum" sums values in a column like a Pivot Table in a spreadsheet. "Constant" is if the value does not change for a particular entity. For example, the quarter may always be Q4 in the data.

Figures 217, 218:
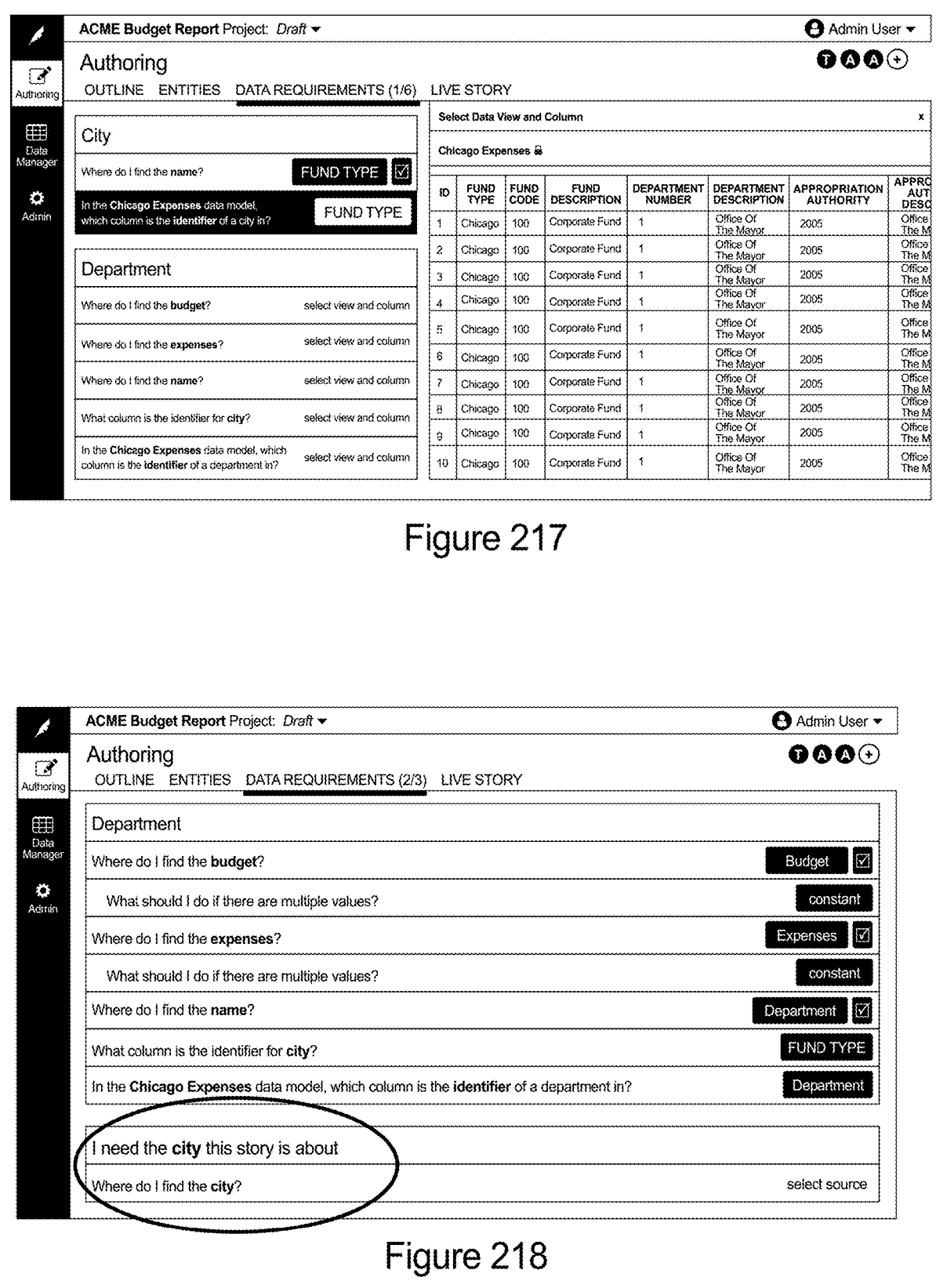

For each Entity type, Quill will ask for an identifier (see FIG. 217).

This is what Quill uses to join data views. An identifier has no validation options as it doesn't actually appear in the story. (Data Validation is discussed below.)

The final question in Data Requirements will be to identify the main Entity the story is about (see FIG. 218).

In the city budget example, Quill needs to know what city the story will be about. This can be set as a static value (e.g. Chicago) or as a Story Variable (see FIG. 219).

A Story Variable allows you to use a set of values to trigger stories. In other words, if your data contains city budget information for multiple cities, setting the city the story is about as a Story Variable will allow you to run multiple stories against the same dataset. The location of the value for the Story Variable is defined earlier in Data Requirements where Quill asks where to find the city.

If there is a Timeframe in the Headline of the story, Quill will need you to identify this in Data Requirements as well.

As with the entity, this can be a static value or a Story Variable. It can also be set as the run date (see FIG. 220), which will tell Quill to populate the value dynamically at the time the story is run. (See the Scheduling section for more information)

A5(i)(d): Data Formatting

Quill allows you to set the format for certain data points to have in your data source so it can be mapped to your Outline. These formats are set based on the ontology (Entities, Attributes, etc.) being used in your Communication goals, with default styling applied to values. See the Miscellaneous section for specific styling information. As you configure the appropriate data formats present in your data view, validation rules can be applied if the types do not match for a particular story run. For example, if Quill is expecting the expenses of a city to be a currency and receives a string, the user is provided with various options of actions to take. These are specified in the Data Validation section below. To select the format of any date fields you may have, go to the Data Requirements tab in Authoring and click the checkbox icon next to a date (see FIG. 221) to pull out the sidebar (see FIG. 222).

Figures 223, 224:
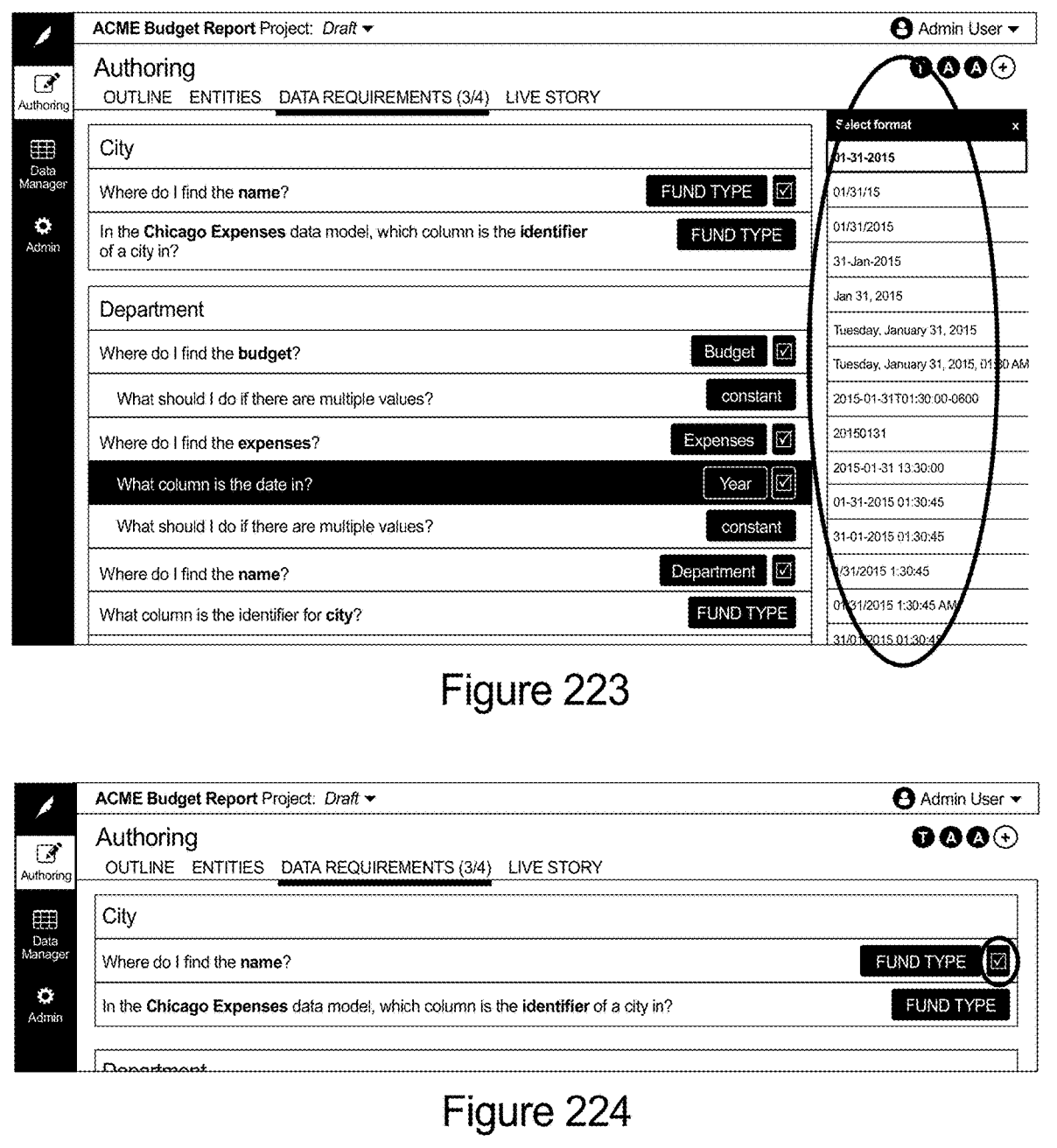

Click on the date value to open a list of date format options and make your selection (see FIG. 223).

A5(i)(e): Data Validation

Quill supports basic data validation. This functionality can be accessed in Data Requirements. Once you specify the location of the information in the data, a checkbox appears next to it. Click this to open the data validation sidebar (see FIG. 224).

Figure 225:
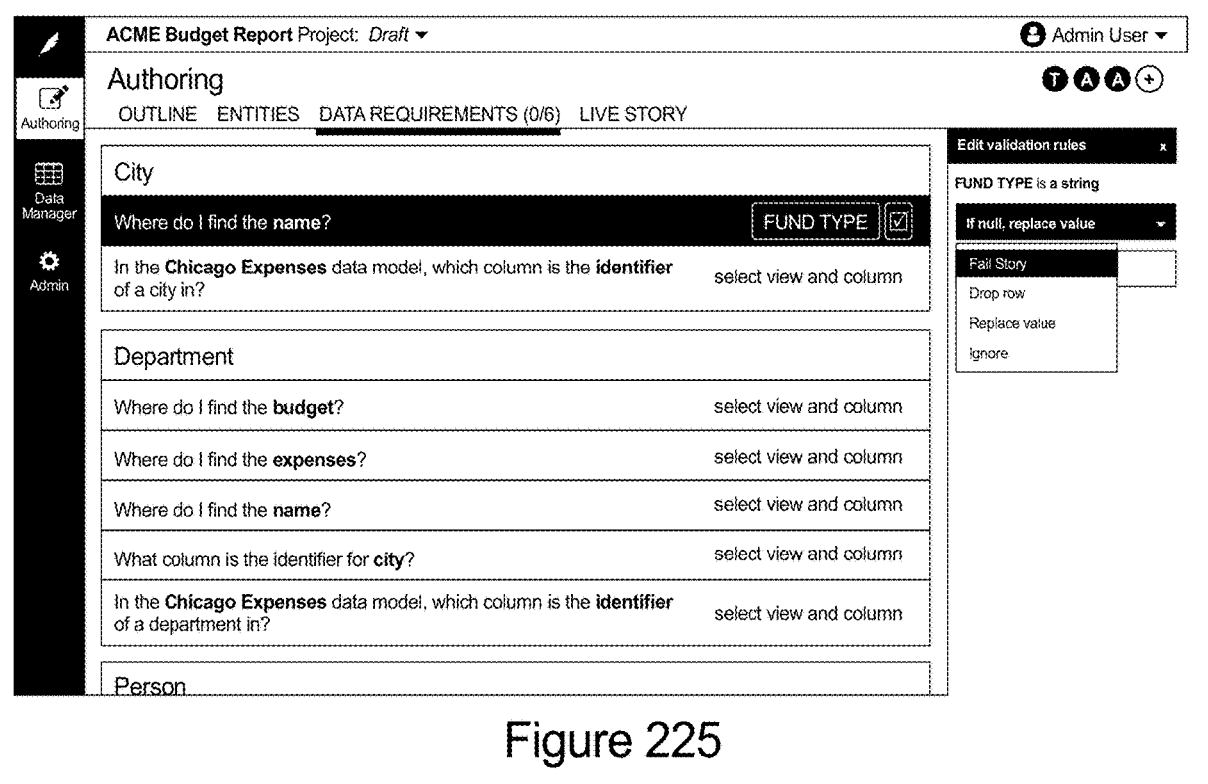

You will be presented with a number of options in a dropdown menu for what to do in the case of a null value (see FIG. 225).

You can tell Quill to fail the story, drop the row with the null value, replace the null value with a value you provide in the text box below, or ignore the null value.

A6: Data Management

Quill allows for self-service data management. It provides everything you need to upload files and connect to databases and API endpoints.

A6(i): Getting Data into Quill

Quill supports data in tabular or document-based formats. Tabular data can be provided to Quill as CSV files or through table selections made against SQL connections (PostgreSQL, Mysql, and Microsoft SQL Server are supported). Document-based data can be provided by uploading a JSON file, creating cypher queries against Neo4j databases, a MongoDB connection, or through an HTTP API connection (which you can also set to elect to return a CSV).

A6(i)(a): Uploading a File

You can upload a CSV or JSON file directly to Quill in the Data Manager. In the Views tab, choose to Upload a file from the Add a Data View tile (see FIG. 226).

Figure 227:
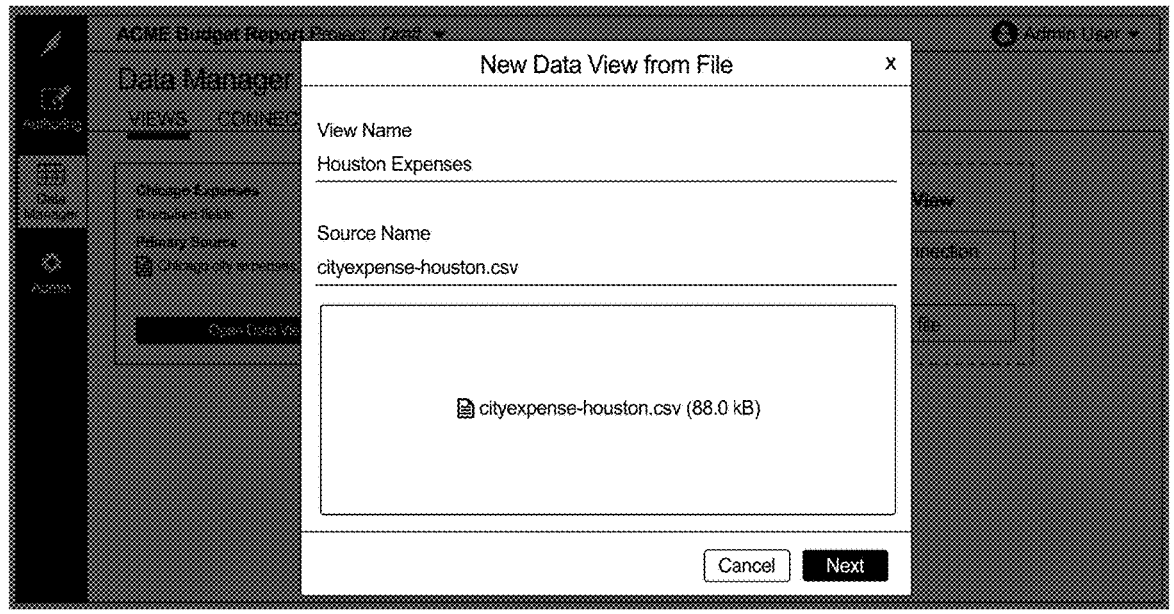
Figure 228:
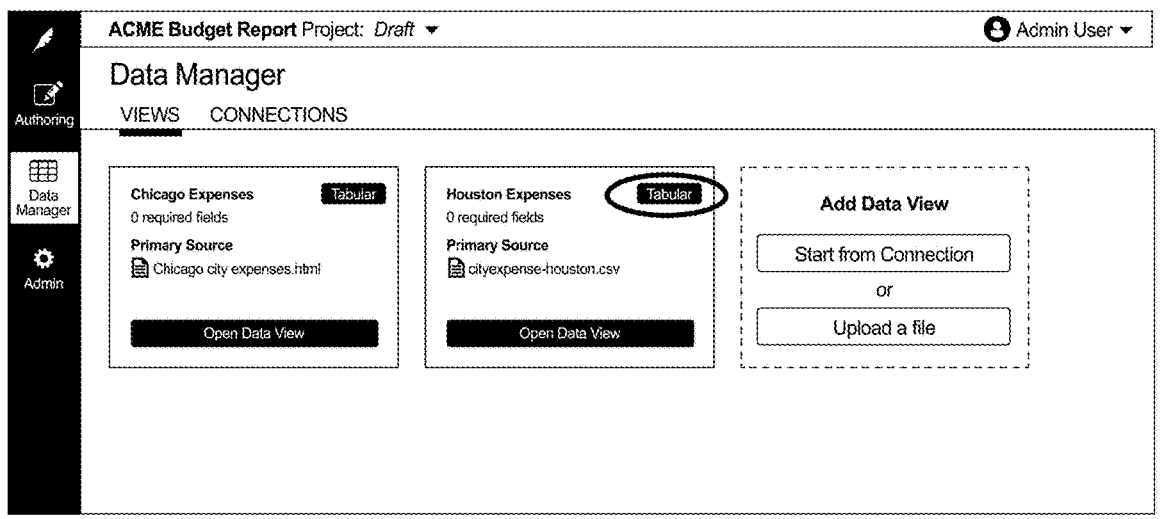
Figures 229, 230:
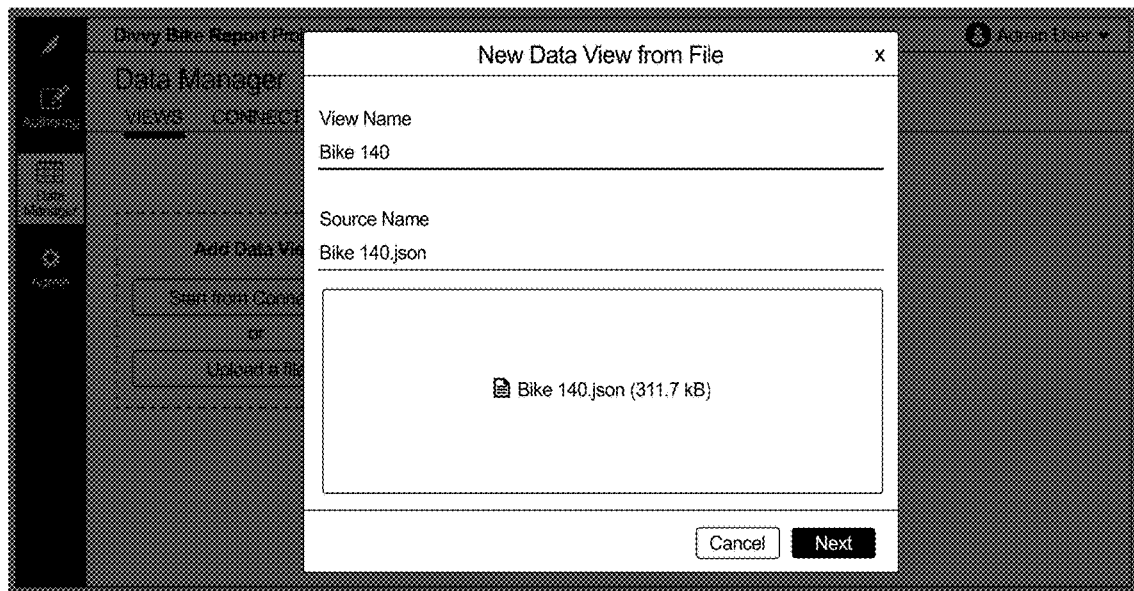
Figures 231, 232:
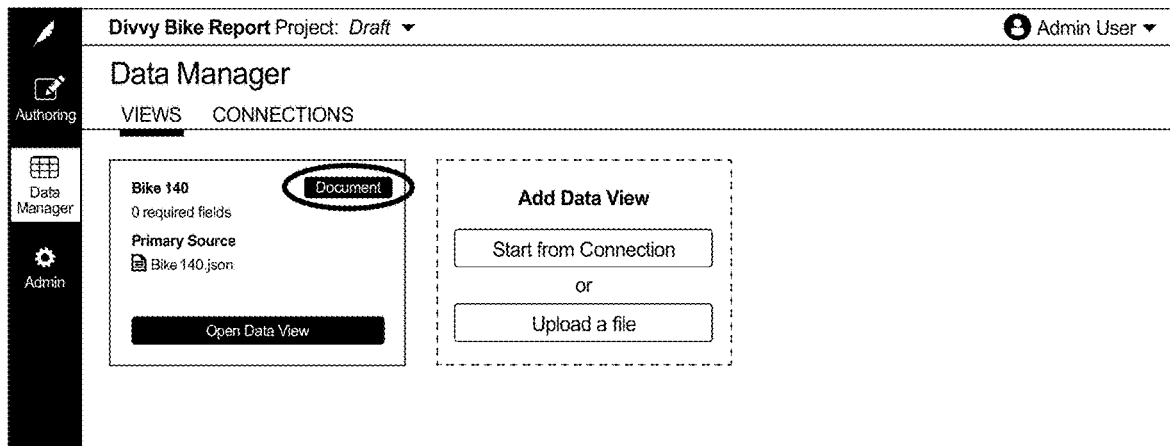
Figure 233:
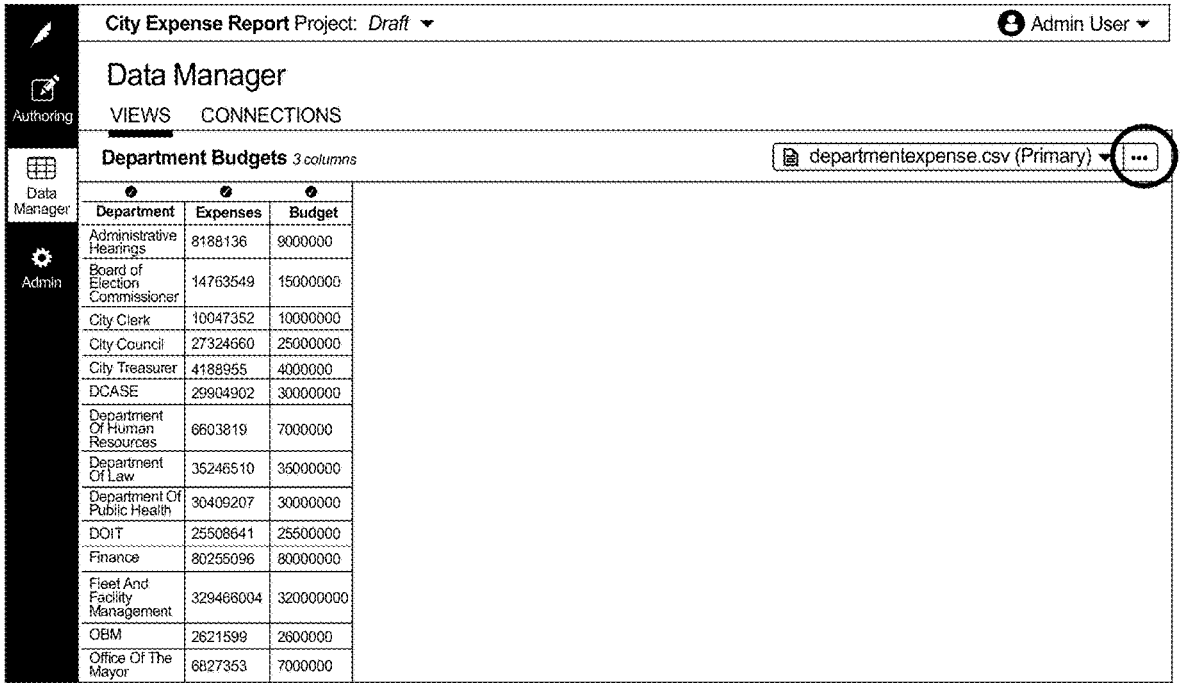
Figure 236:
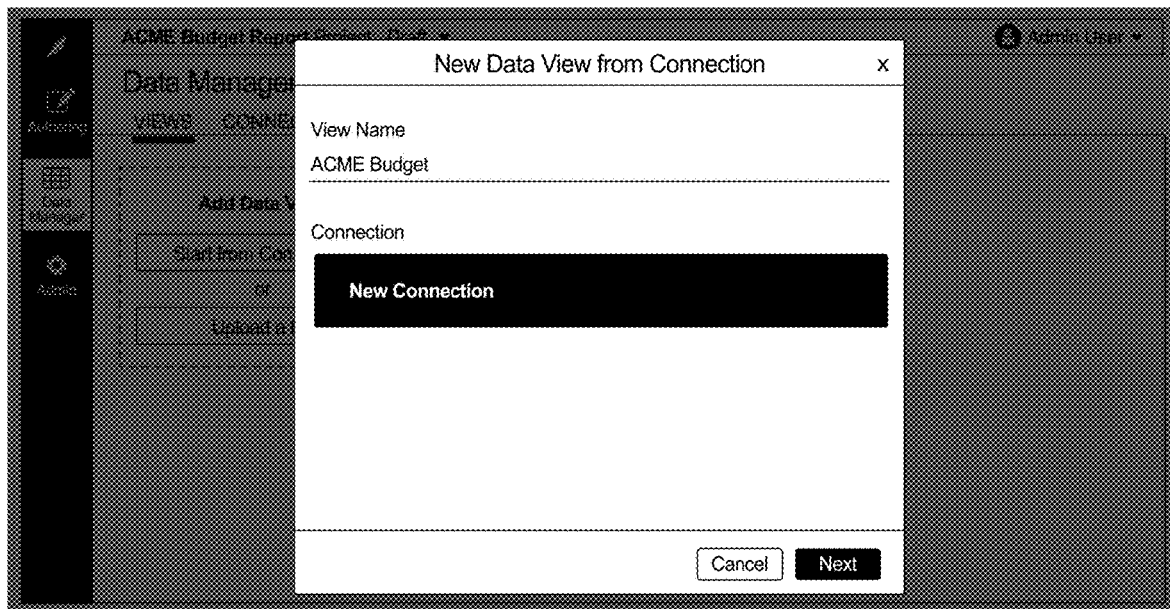
Figure 237:
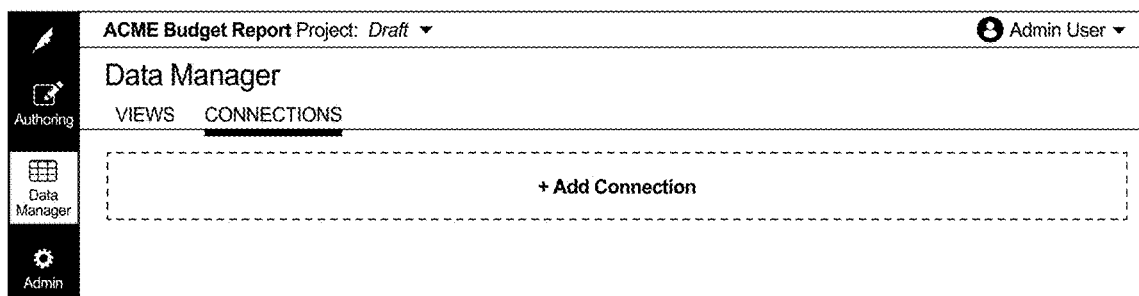

Provide the name of the view and upload the file. The amount of time it will take to upload a file depends on the size of the file for a maximum file size of 50 MB, and operating against a data base connection is recommended. This automatically populates the Source Name. FIG. 227 shows an example where a CSV file is uploaded. FIG. 230 shows an example where a JSON file is uploaded. You can edit the Source Name, which is helpful when file names are difficult to parse and for readability when selecting the file from the Live Story dropdown when previewing your story. Quill automatically detects whether the data is in tabular or document form and samples a view of the first few rows or lines of data. FIG. 228 shows an example of uploaded tabular data, and FIG. 229 shows a sample view of tabular data. FIG. 231 shows an example of uploaded document-based data, and FIG. 232 shows a sample view of document-based data.

Quill also supports uploading multiple data sources into one Data View. This functionality can be accessed in the Data View by clicking the three dots icon (see FIG. 233).

Figures 234, 235:
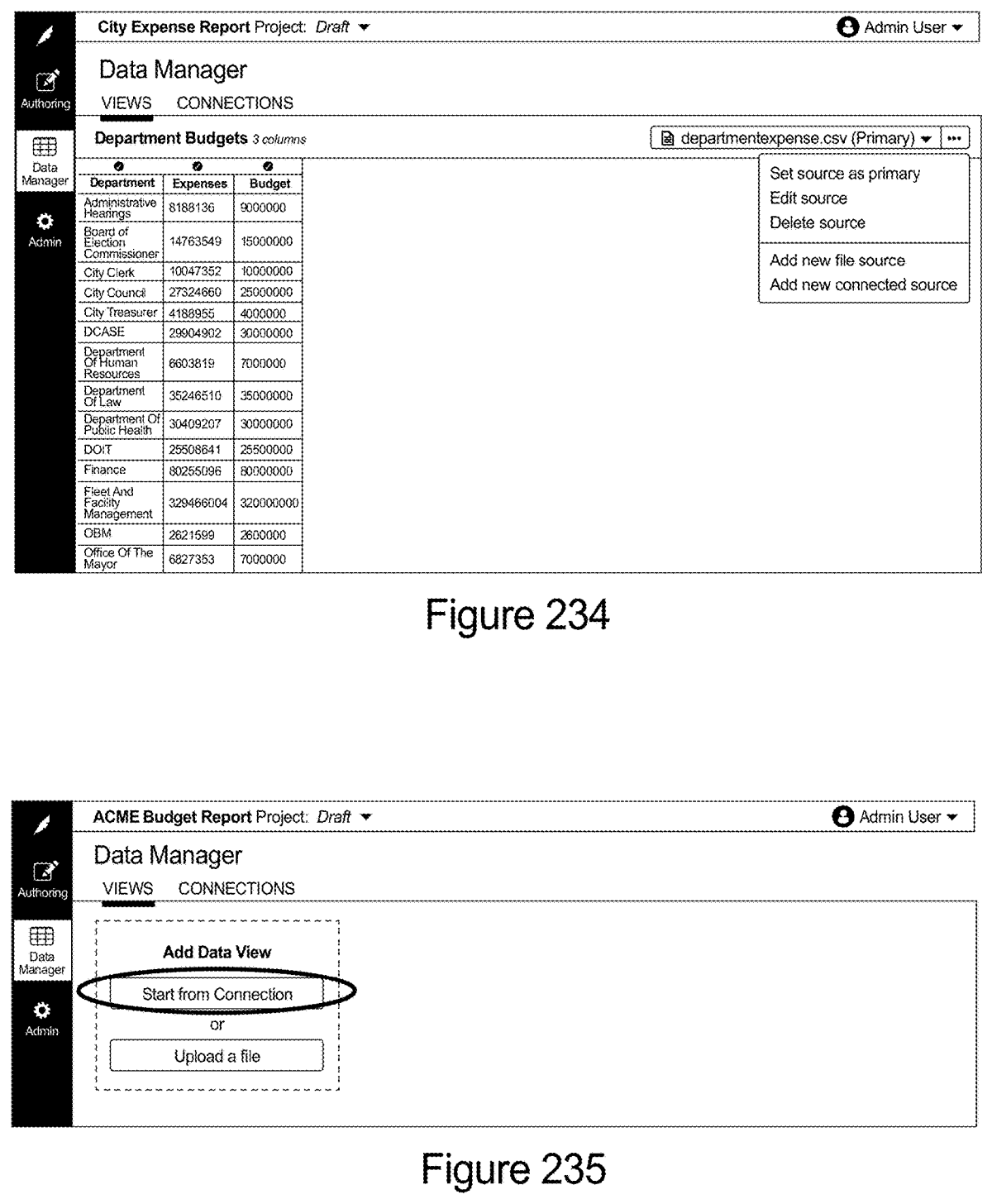

Here, you can upload additional files or add additional connections (see FIG. 234). If you have multiple data sources in a Data View, you can set a source as primary, edit, or delete it. New data files or tables can be added to an existing data view, but only tabular sources can be added to tabular views and document-based sources to document-based views. To make the newly uploaded source your primary dataset, click on the three dots icon and select it as primary. This makes it the file used during runtime story generation requests or Live Story previews.

A6(i)(b): Adding a Connection

You can also provide data to Quill by connecting to a SQL database, a cypher query against a Neo4j database, a MongoDB database, or an HTTP API endpoint. You can add a connection from the Data View tab by choosing Start from Connection from the Add a Data View tile (see FIGS. 235 and 236) or by choosing to Add a Connection from the Connections tab (see FIG. 237).

Figure 238:
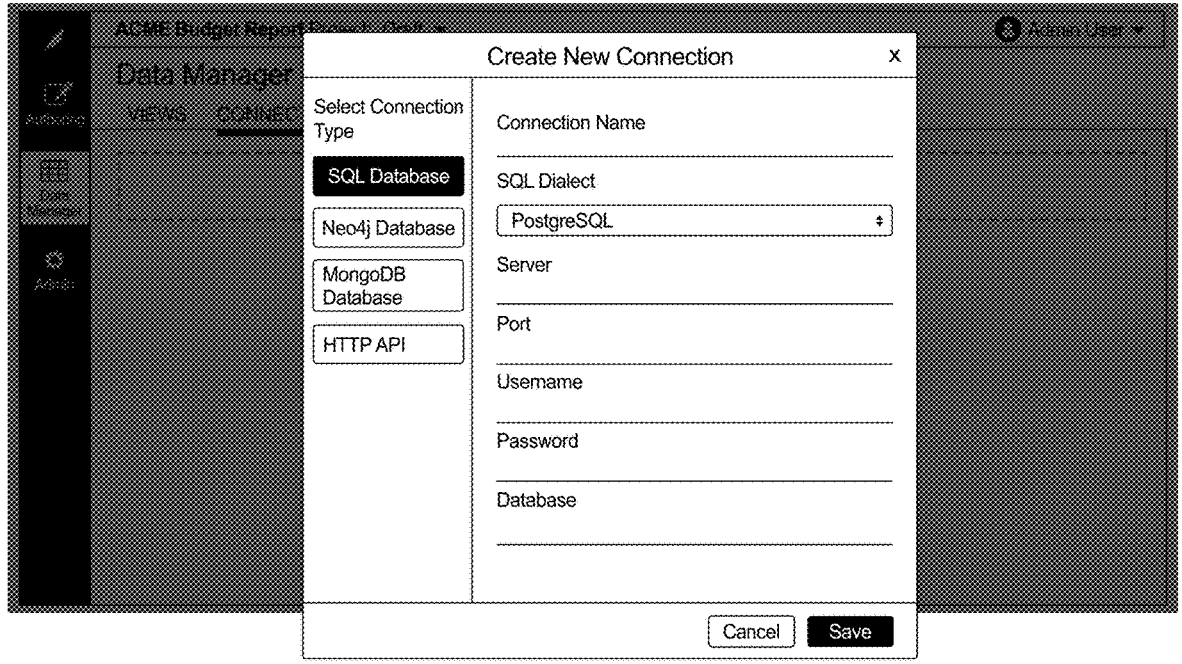
Figure 239:
Figure 240:
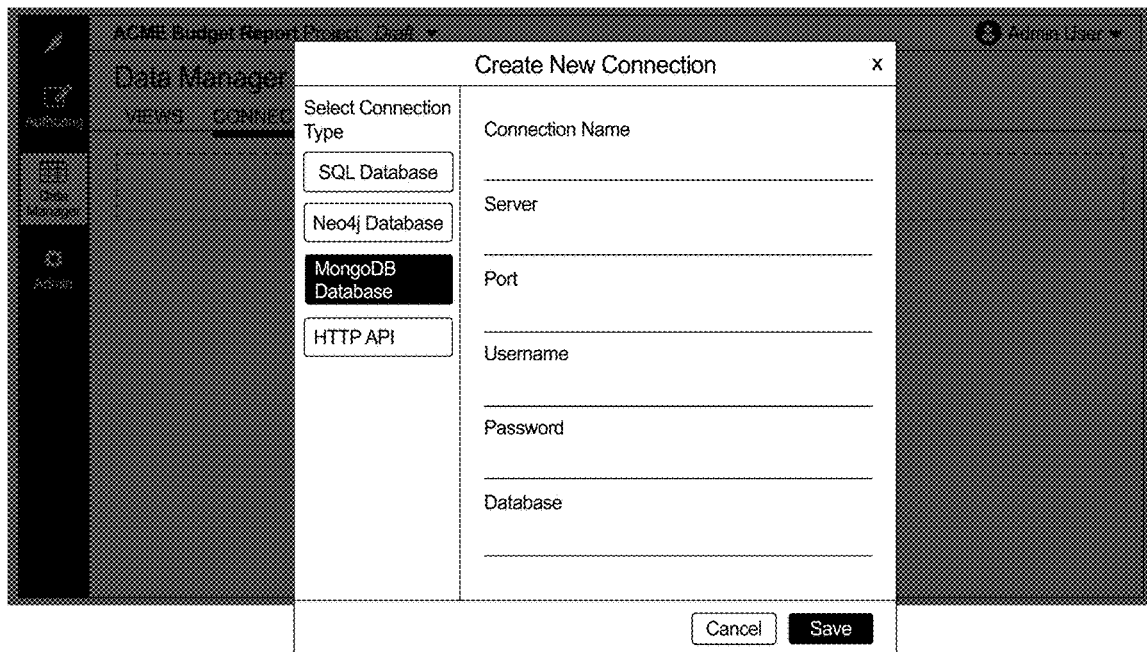
Figure 241:
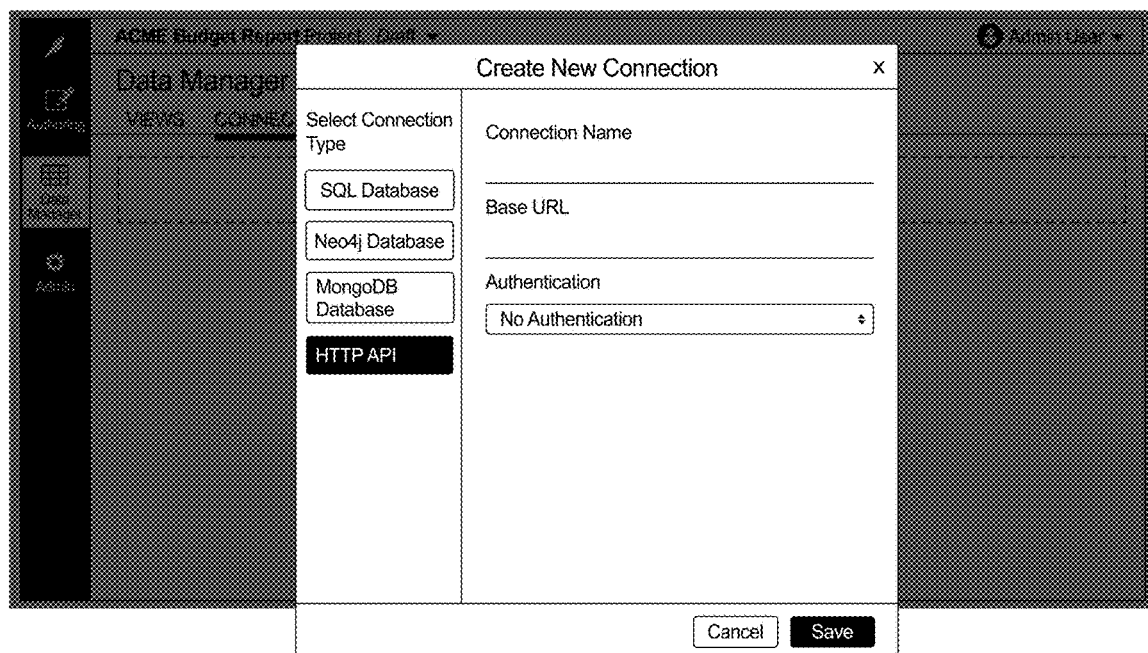
Figure 242:
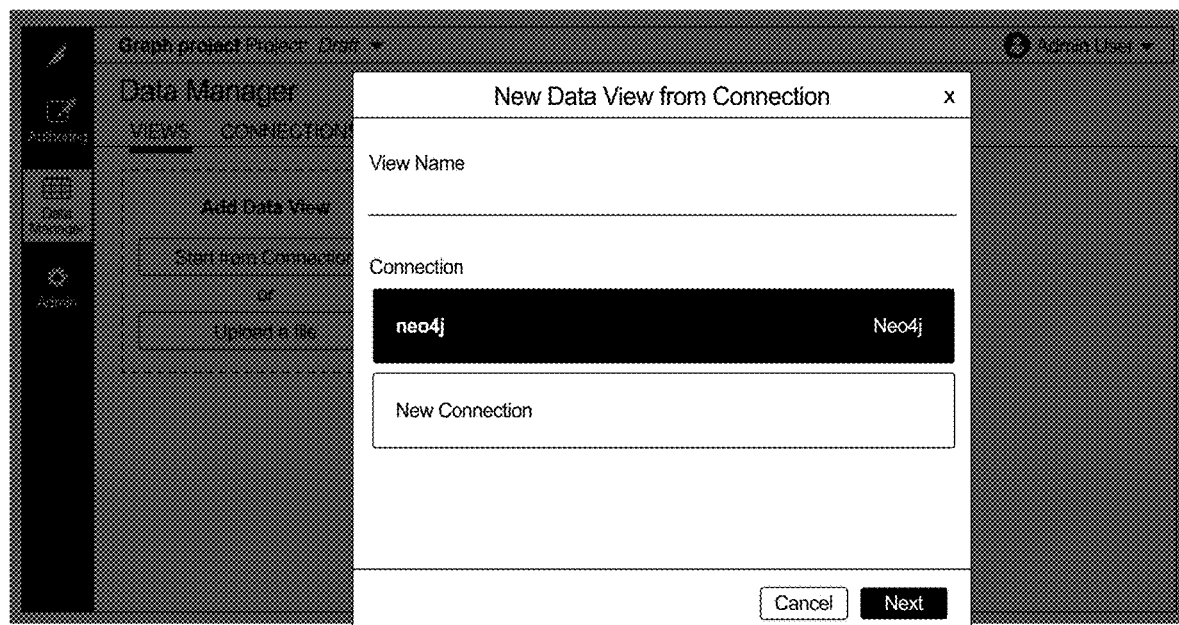
Figure 243:

Quill will ask for the appropriate information to set up each type of connection. FIG. 238 shows an example of credentials for a SQL database connection. FIG. 239 shows an example of credentials for a Neo4j database connection. FIG. 240 shows an example of credentials for a MongoDB database connection. FIG. 241 shows an example of credentials for an HTTP API connection.

The connection will be made, subject to network latency and the availability of the data source. Data Views from connections are made from the Views tab. Choose Start from a Connection and select the connection you created (see FIG. 242).

Quill will prompt you to specify the table to add the data source. For neo4j connections, you will have to put in a cypher query to transform the data into tabular form (see FIG. 243). From there, Data Requirements can be satisfied using the same experience as tabular and document-based views allowing for type validation rules to be set as needed.

A7: Reviewing Your Story

Once you have configured your story with Sections and Communication Goals, and satisfied the Data Requirements against a data source, you can review or edit its contents, understand the logic Quill used to arrive at the story, and monitor the status of stories you run.

A7(i): Live Story

Figure 244:
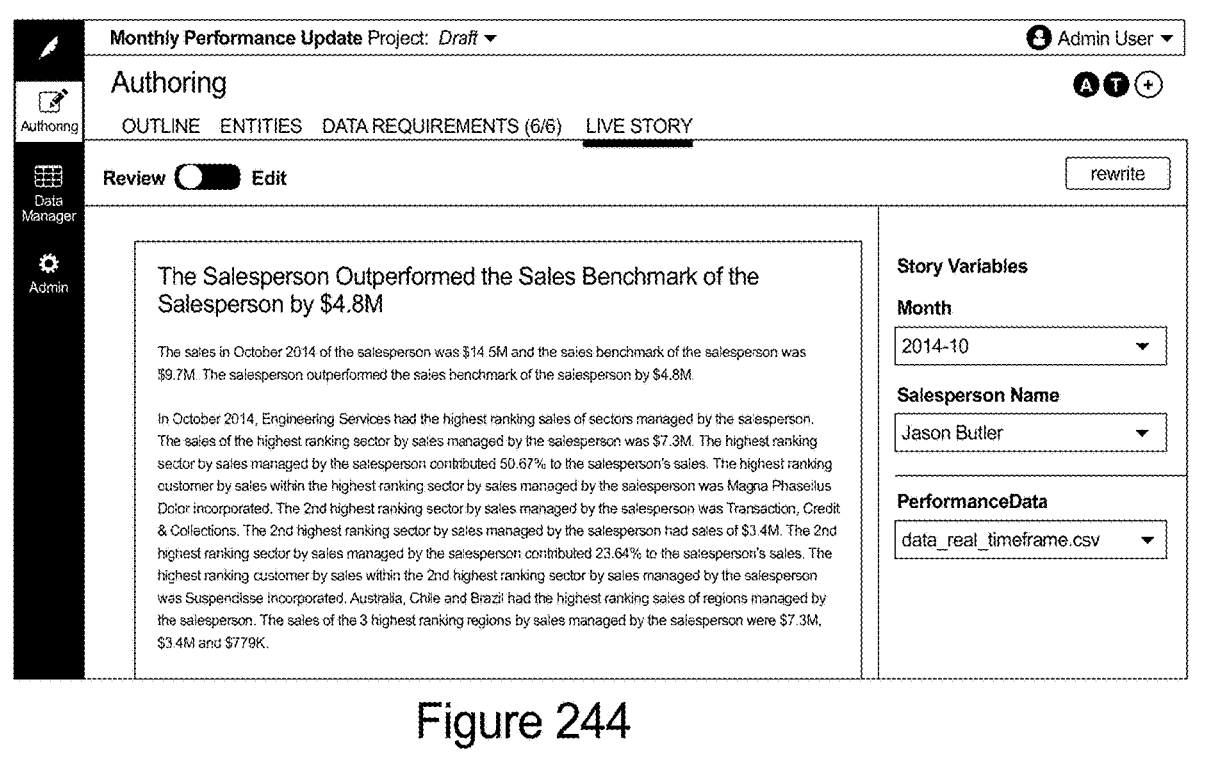

Live Story is where you can see the narrative expression of the story you configured in the Outline (see FIG. 244).

If you have set up your story to be based on Story Variables (as opposed to a static value), you can toggle between them (see FIG. 245) and see how the narrative changes.

You can also switch between data sources (see FIG. 246).

Figures 247, 248:
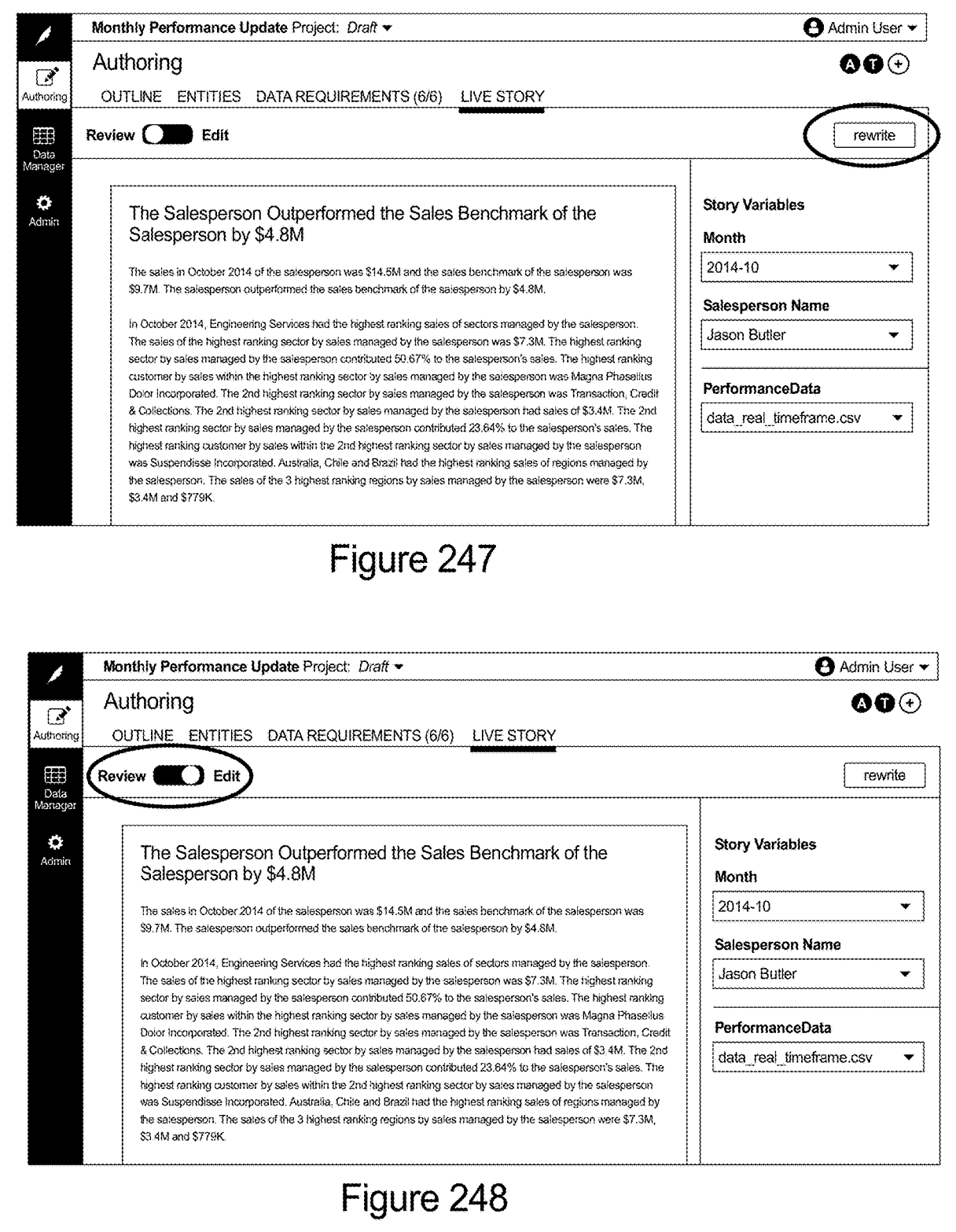

Click the "rewrite" button to generate a new narrative to see how any additional expressions you have added affect the Variability of the story (see FIG. 247).

Live Story has two modes: Edit and Review.

A7(i)(a): Edit Mode

Edit mode allows you to make changes to the language in your story (see FIG. 248).

A7(i)(a)(1): Entity Expressions

You can add Entity expressions from Live Story (in addition to the Entities tab). If you click on any Entity (highlighted in blue under the cursor) (see FIG. 249), a sidebar will open on the right side (see FIG. 250).

You can add Entity expressions by typing in the area next to the plus sign. You can also opt into and out of particular expressions. If you have multiple expressions associated with the Entity, Quill will alternate between them at random to add Variability to the language. Click the rewrite button to see how your story changes. As described in the Ontology Management section, you can also click, hold, and drag an expression to the top of the list and opt out of the additional expressions to set it as primary.

A7(i)(a)(2): Characterization Expressions

You can edit the expressions in any Characterizations you have set on Compare Communication Goals from Edit mode in Live Story. As with Entity expressions, Characterization expressions will be highlighted in blue when you move the cursor over them (see FIG. 251).

Figure 252:
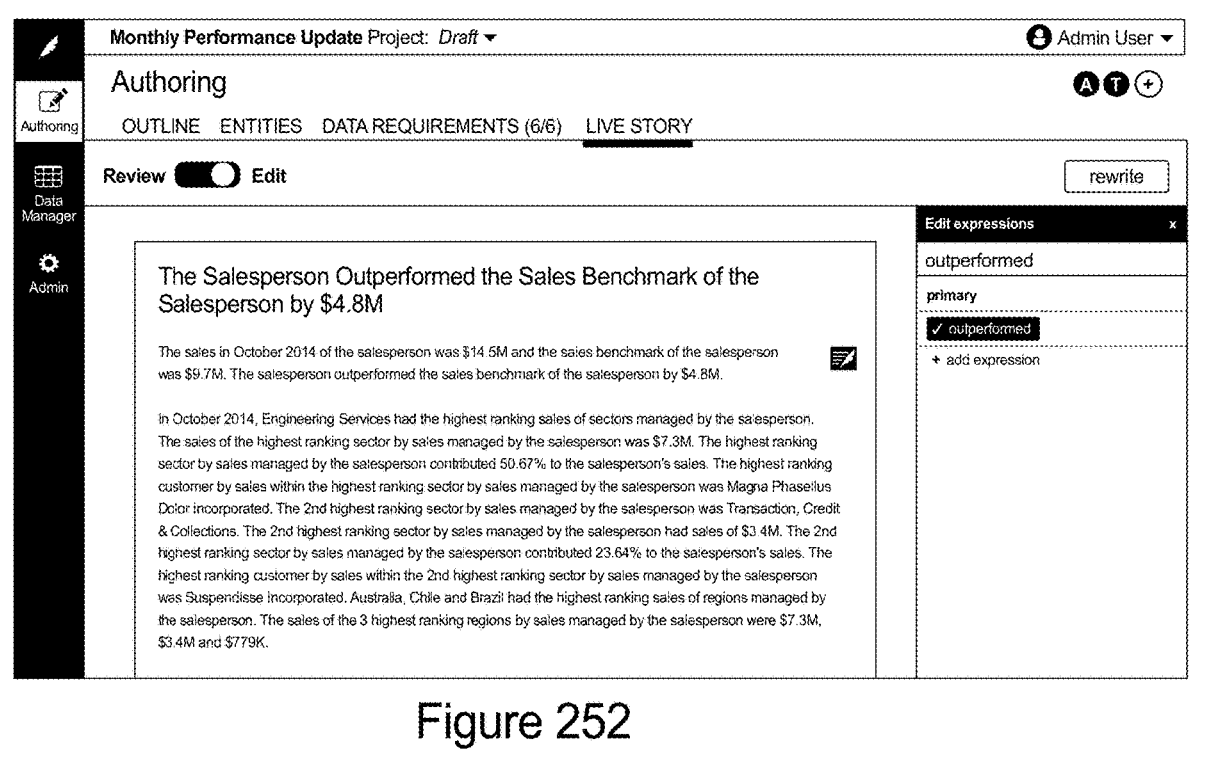

Click on the expression to open a sidebar to the right where you can add additional expressions and set which expression you would like to be the primary expression (see FIG. 252).

Quill will alternate between them at random to add Variability to the language. These additional expressions will be tied to the specific Communication Goal where you added them and will not appear for others. You can also opt into and out of particular expressions, as well as delete them using the x. However, you cannot opt out of whichever expression is set as the primary expression. See Assessment Characterizations in Ontology Management for more detail.

A7(i)(a)(3): Language Guidance

You can add set Language Preferences, such as word order choice, to your story in the Edit mode of Live Story using Language Guidance. Hover over a section (sections correspond to Sections in the Outline) of the story to reveal a Quill icon on the right side (see FIG. 253).

Figures 253, 254:
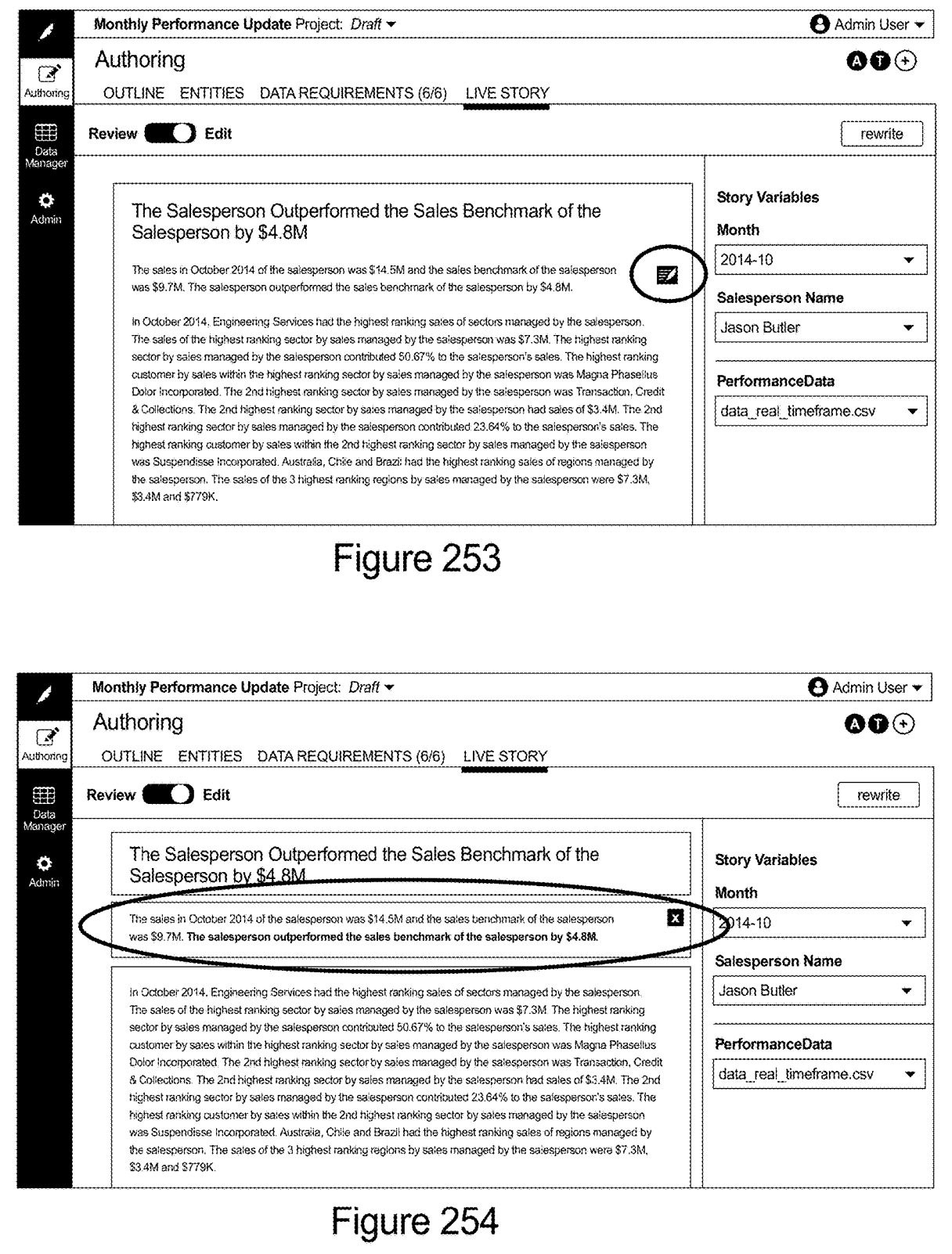

Click it to isolate the section from the rest of the story (see FIG. 254).

Click on a sentence to expose any additional expressions you can opt into (see FIG. 255).

Quill generates expressions using language patterns appropriate to the Communication Goal, so the number of additional expressions will vary and not all sentences will have additional expressions. Quill will alternate between them at random to give your story more language variation.

A7(i)(b): Review Mode

Project Reviewers have access to this aspect of Authoring. In review mode (see FIG. 256), you can read stories and switch datasets to see how they affect the story. You can also see if there are any errors in the story with Quill's logic trace (discussed below).

A7(ii): Logic Trace

Quill allows you to see the steps it takes to express Communication Goals as a story. If you click on any sentence in the story in Live Story in Review mode, Quill will show the underlying Communication Goal or Goals (see FIG. 257).

Figures 257, 258:
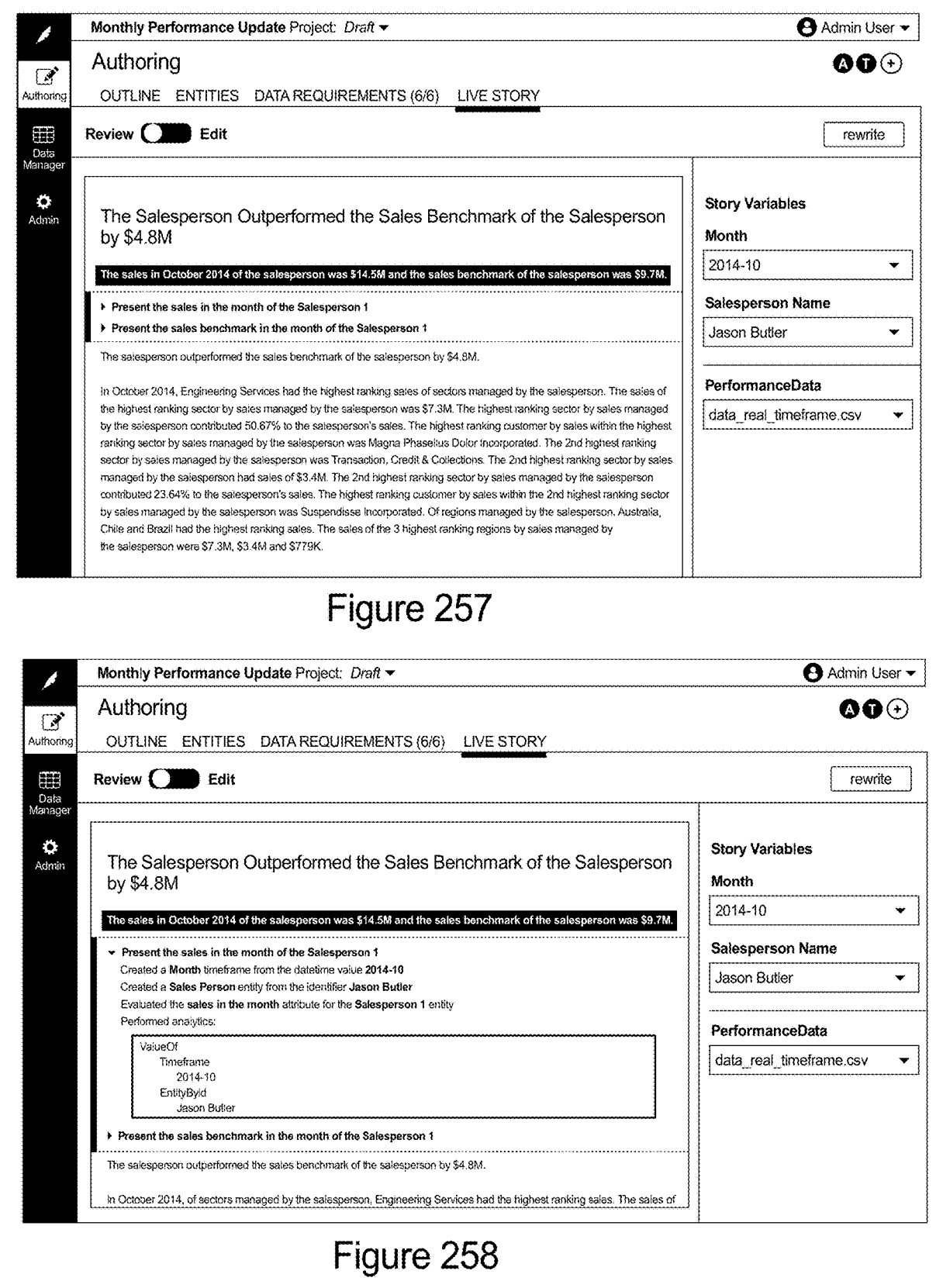

Expand the arrow on the left of the Goal to see the steps Quill took to retrieve data based on the Communication Goal and Data Requirements (see FIG. 258).

In this case, it created a Timeframe and an Entity Type. Then it "shows its work" of pulling the Attribute Value of "sales" constrained by the Timeframe of "month" and associated with the Entity Type "Salesperson 1."

Figure 259:
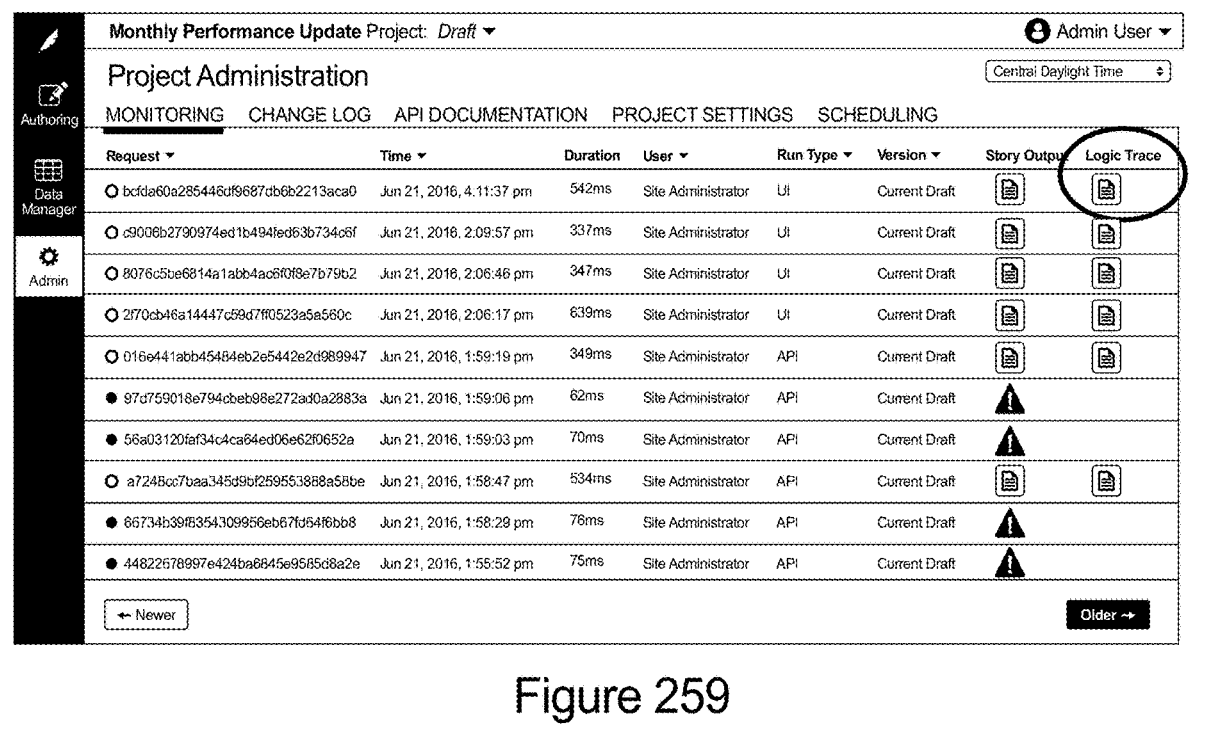

The Logic Trace can also be downloaded as a JSON file from the Monitoring tab in Admin (see FIG. 259).

A7(iii): Monitoring

You can monitor the status of any stories you run, whether they were written in Live Story or generated through API requests in the Monitoring tab in Admin. Here, you can see whether stories succeeded or failed, and filter for specific stories using the available filters below (see FIG. 260).

Use the Newer and Older buttons to scroll through the stories (see FIG. 261), and use the arrows on the column headers to set search criteria. You can filter by story status (see FIG. 262), when the story completed writing (see FIG. 263), the user who requested the story (see FIG. 264), a run type for the story (see FIG. 265), and a version for the story (see FIG. 266).

A8: Managing Story Versions

Quill supports creating and keeping track of changes to and versions of the stories you configure.

A8(i): Drafts and Publishing

Figure 267:
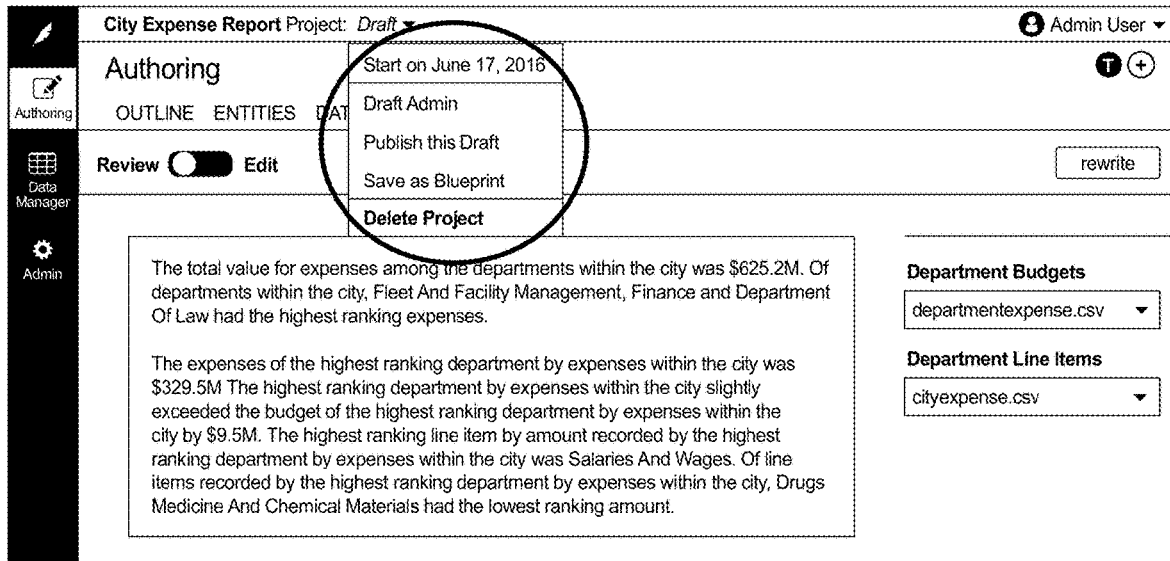

Once you have configured your story and are satisfied with its expression in Live Story, you can Publish the draft of your story (see FIG. 267).

Figure 268:
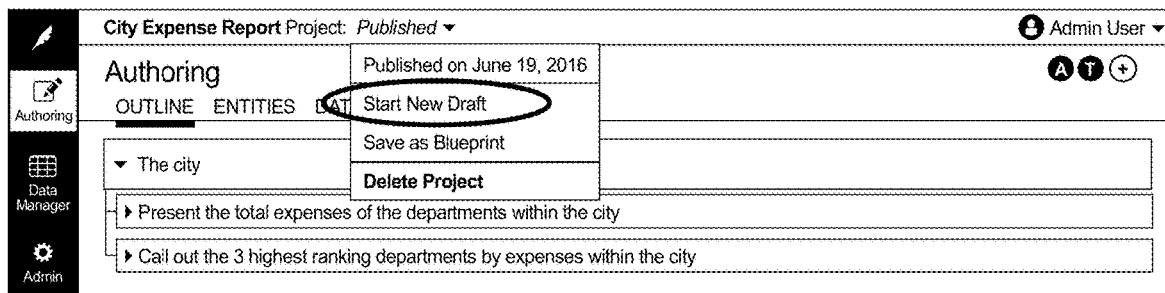

Once Published, your story will go live and that version will be the one that Quill uses when stories are requested through an API connection. After a draft has been Published, any changes you wish to make to the Project should be made after creating a new draft (see FIG. 268).

Figures 269, 270:
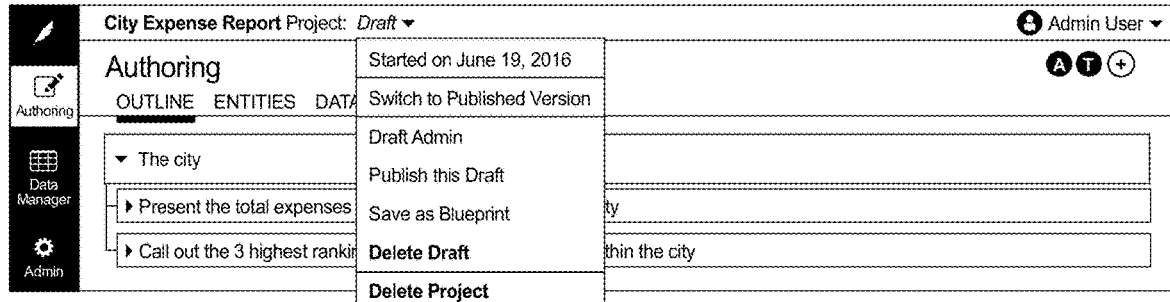

Once a new draft has been created, it can be deleted. You can also switch to the Published version if you want to abandon the changes you have made in the new draft. The drafts and publishing dropdown is also where you can save the Project as a blueprint to share with others in the Organization (see FIG. 269). This is discussed in Sharing.

Project Administrators are the only ones with draft creation and publishing privileges. While Editors may make changes to active drafts, they cannot publish them or create new ones. Reviewers only have access to review mode in Live Story and cannot create, make changes to, or publish drafts.

A8(ii): Change Log

Quill tracks configuration changes made within a Project. Anytime a user makes a change or adds a new element to a Project, it's noted in the Change Log. The Change Log can be accessed in the Admin section of Quill (see FIG. 270).

Figure 271:
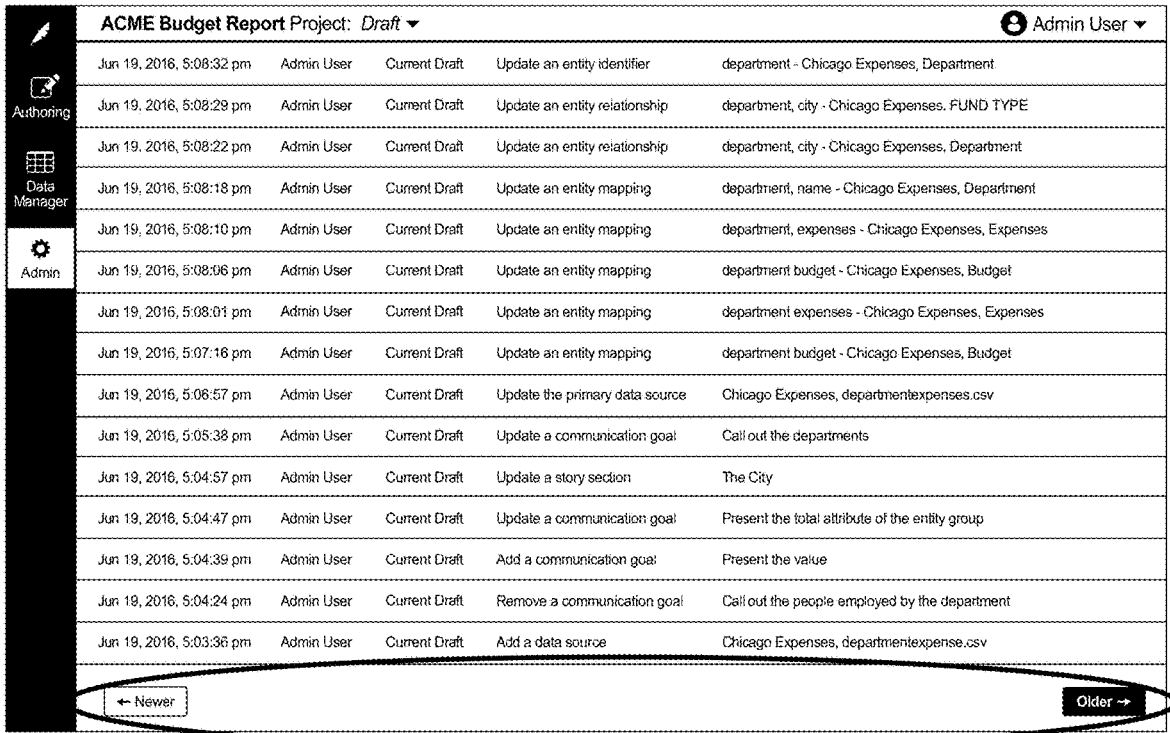

Here, you can see a list of all changes in the Project, the users that made the changes, the date and time the changes were made, and the version of the project the changes were made to. As with Monitoring, you can page through the list of changes by clicking on the Newer and Older buttons (see FIG. 271).

Figure 272:
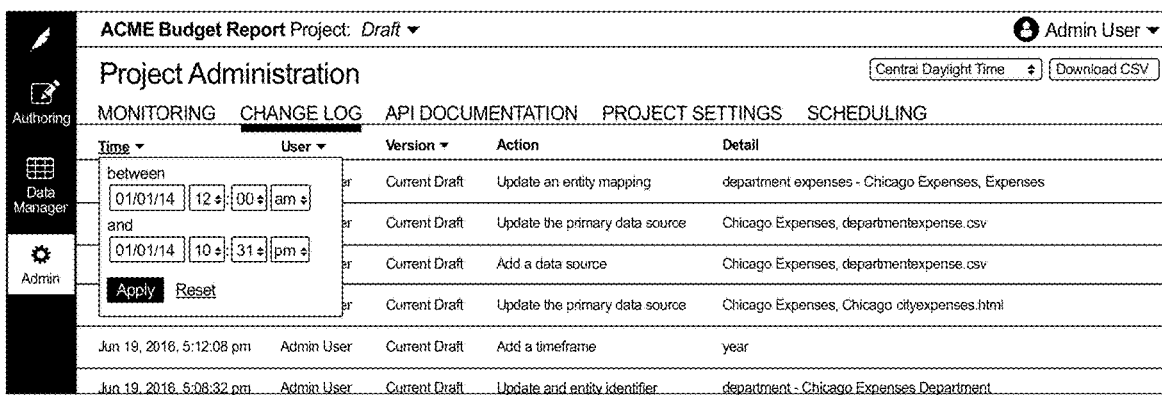

The Time, User, and Version information can be used to filter the list by using the drop-downs next to the column headers. FIG. 272 shows an example dropdown to filter by time.

Figure 273:
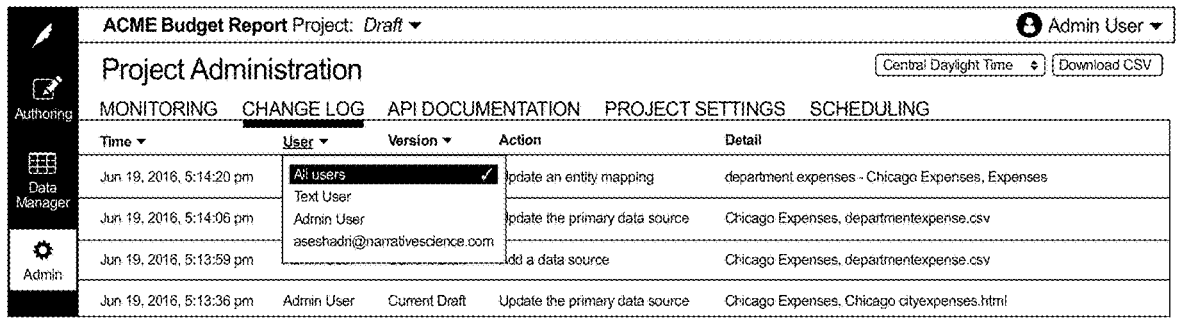
Figure 274:
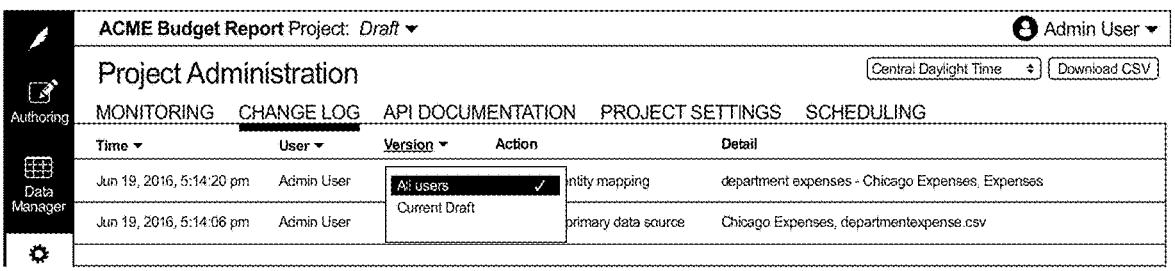

FIG. 273 shows an example dropdown to filter by user. FIG. 274 shows an example dropdown to filter by version.

Figure 275:
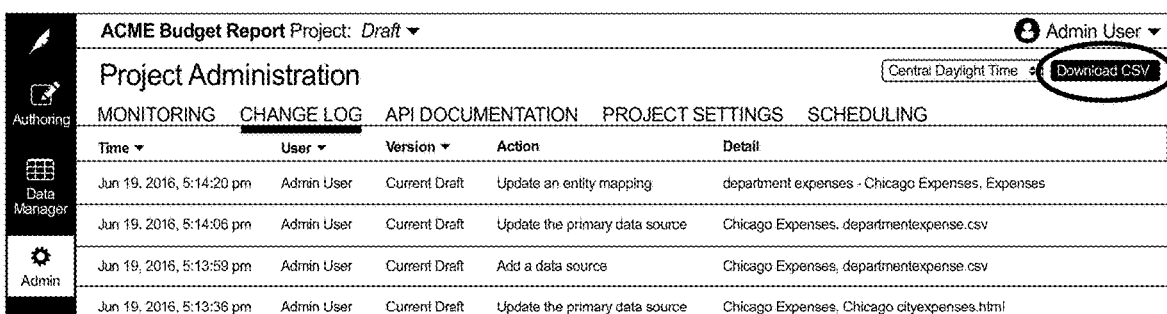

You can also download the changes made as a CSV (see FIG. 275) in order to plot the Project activity or aggregate it for purposes of visualization or archiving.

A9: Writing Stories in Production

A9(i): API

Quill supports on-demand story generation by connecting to an API. The documentation can be accessed from Admin.

Figure 276:
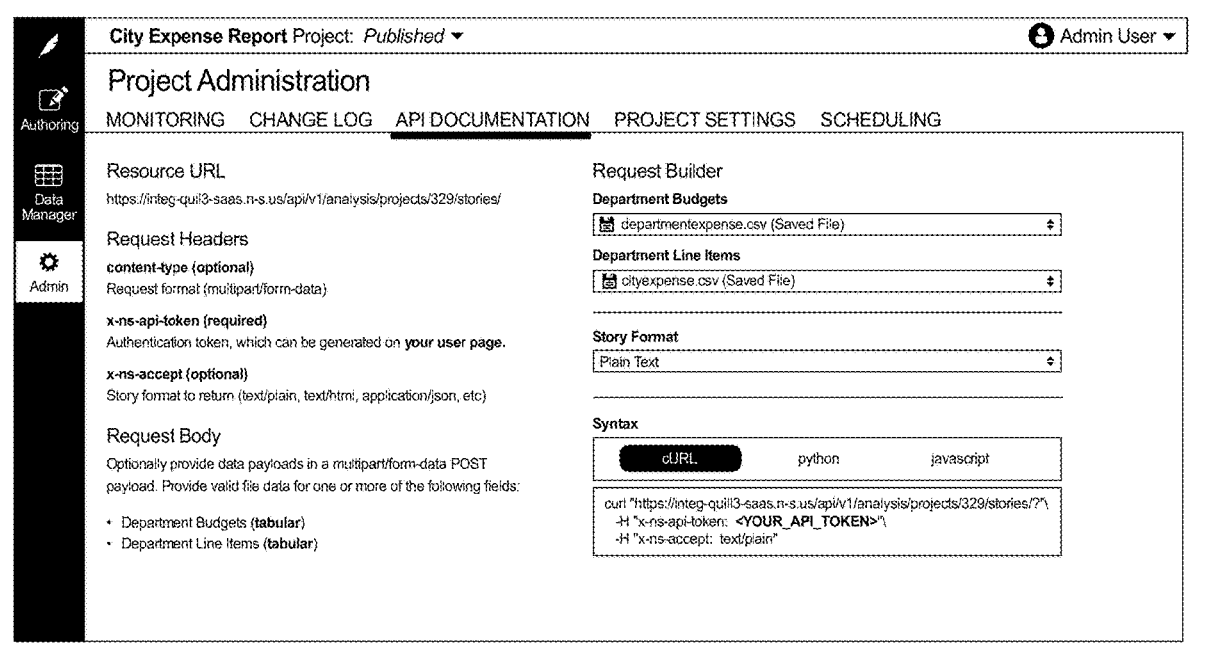

API request samples are available in the API Documentation tab of the Admin section of Authoring (see FIG. 276). These samples are based on the project Outline configuration and available data source connections. Parameters and output formatting can be set here so that stories can be requested to meet specific data requirements from an outside application.

The Request Builder allows the user to select the dataset, set the format (Plain Text, HTML, JSON, or Word) of the output, and choose the syntax of the request sample (see FIG. 277).

An external application can use the sample to post requests to the API to generate stories from Quill once the text in red has been replaced with its specific variables (see FIG. 278).

Each Quill user will be able to request a certificate and key from their system administrator.

A9(ii): Scheduling

Figures 279, 280:
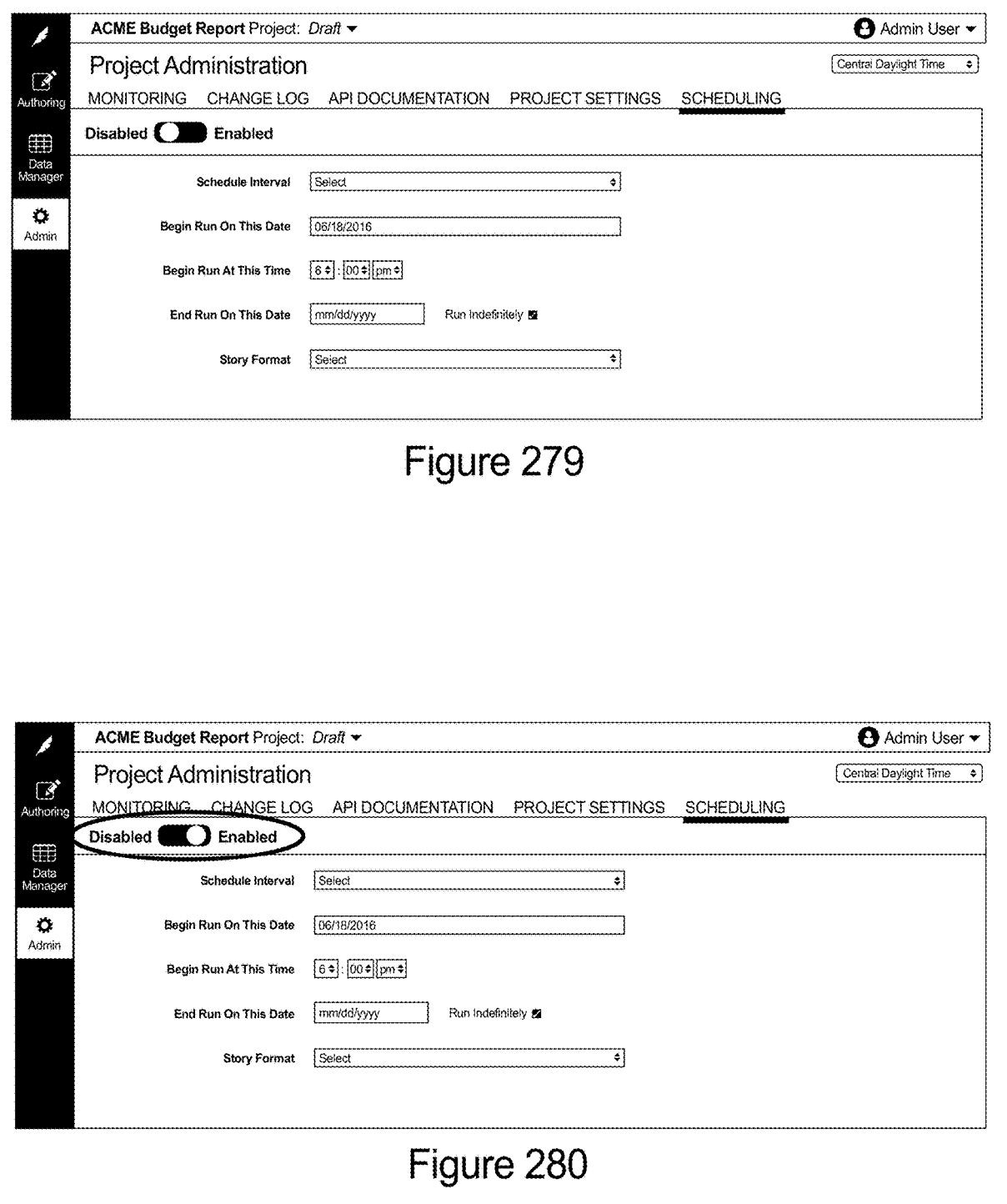

Stories can also be run on a schedule (see FIG. 279).

Figures 281, 282:
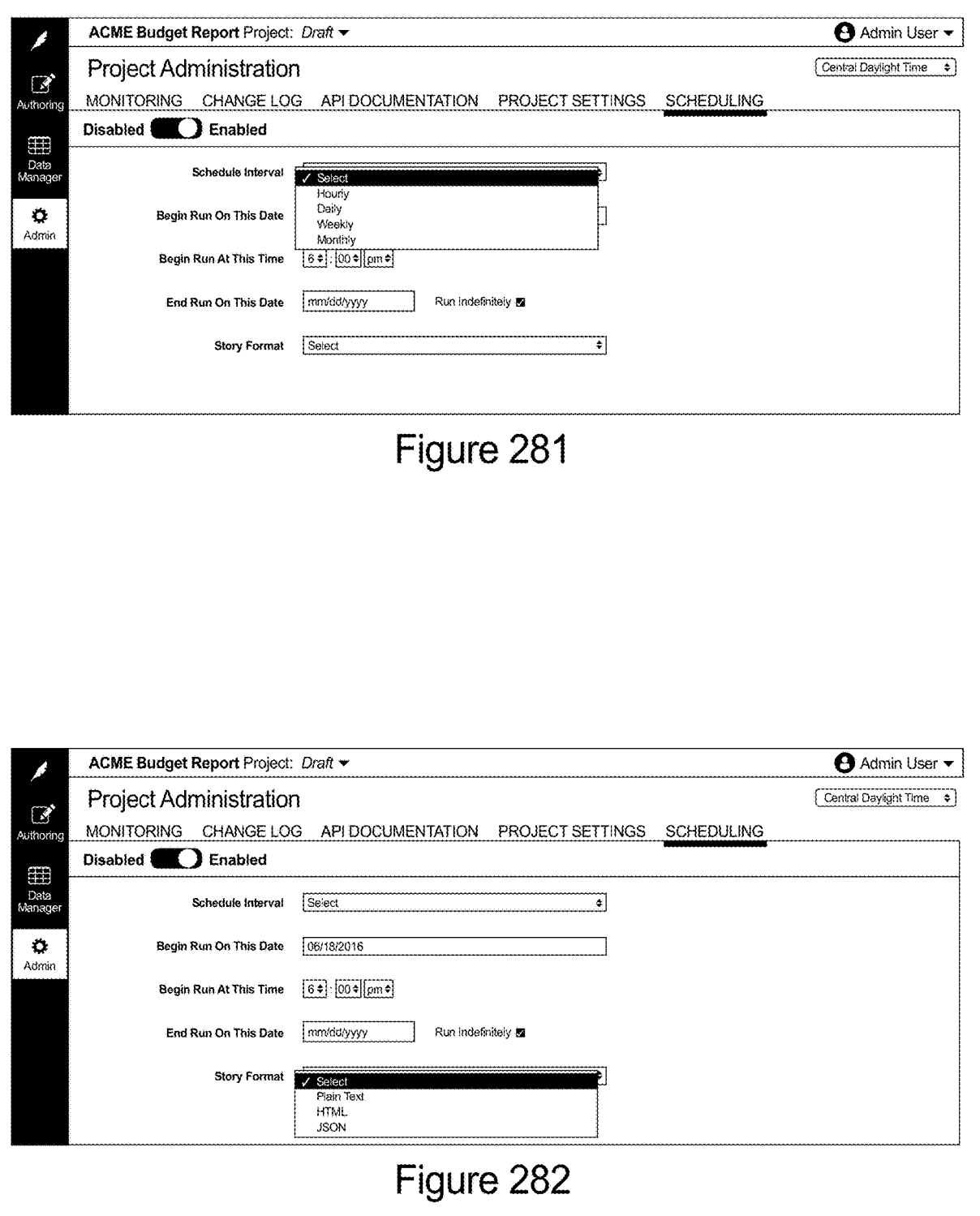

Once Scheduling is enabled (see FIG. 280), stories can be run at scheduled intervals (see FIG. 281) beginning at a specific date and time. The run can be ended at a specific time or continue indefinitely. Additionally, you can set the format of the story to Plain Text, HTML, or JSON (see FIG. 282), which can then be retrieved for viewing from the Monitoring page. Published Project schedules are un-editable at this time. To edit the schedule, create a new draft and update as needed.

A10: Sharing and Reuse

Figure 283:
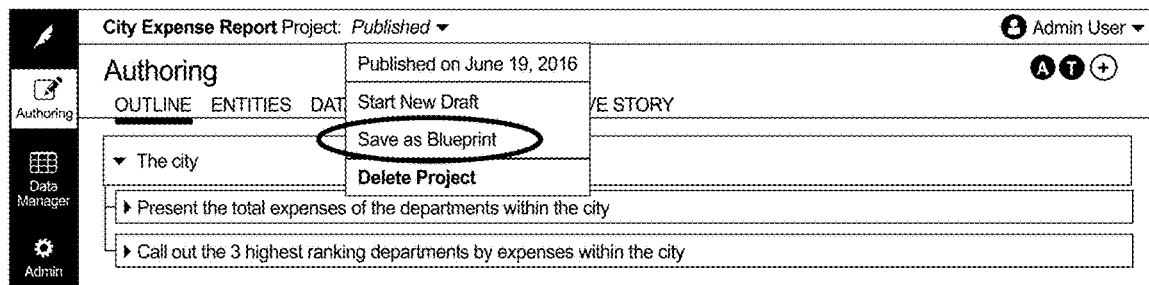

Projects can be shared with other users. The Draft dropdown menu includes an option to Save as Blueprint (see FIG. 283).

Figure 284:
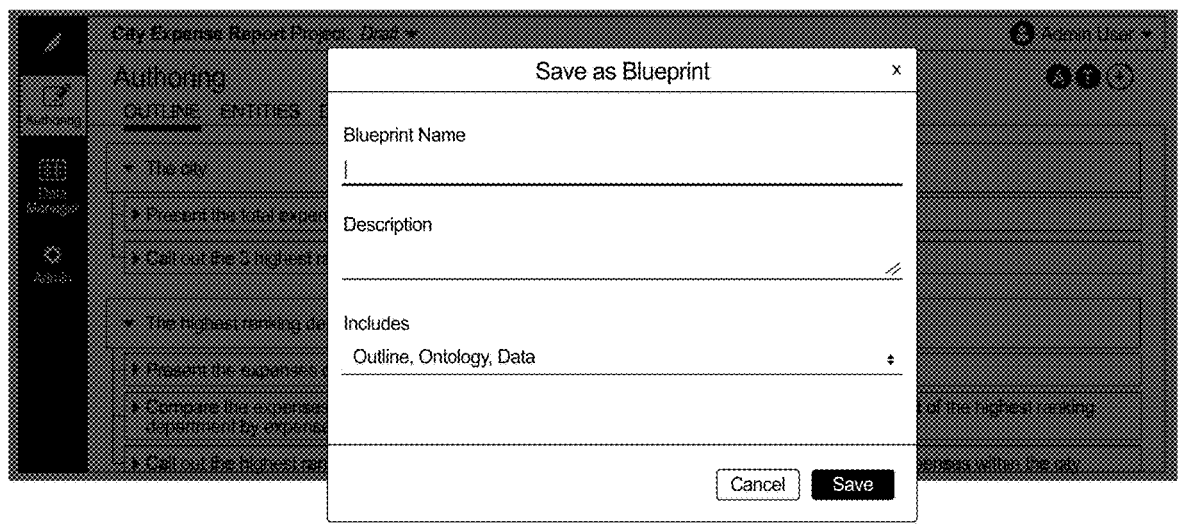

Here, you can give the shared version of the Project a name and description (see FIG. 284).

Figure 285:
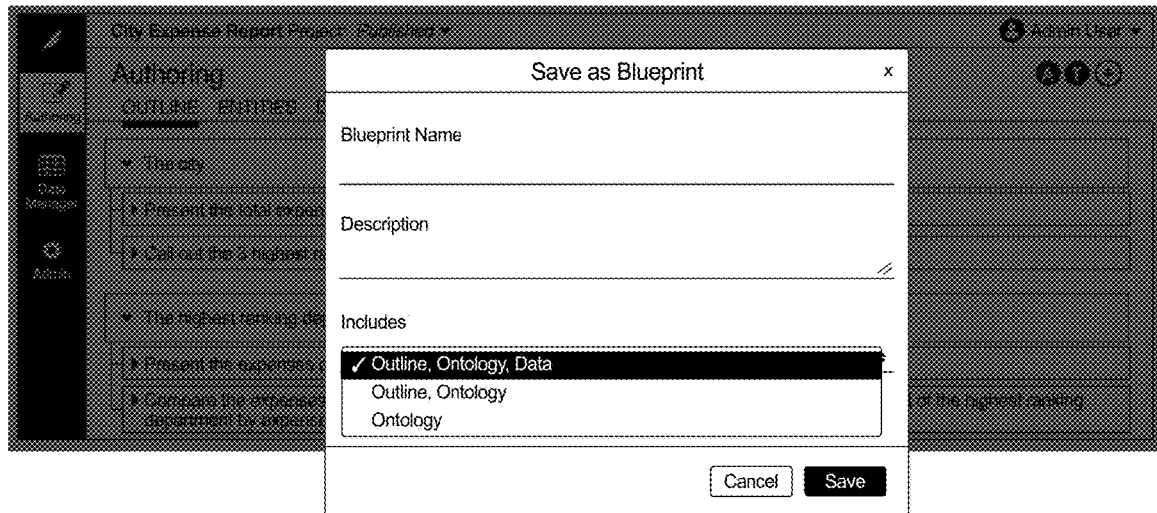

You can also specify how much of the Project you make available for sharing. You can include the Outline, Ontology (Entities), and Data Sources, the Outline and Ontology, or just the Outline (see FIG. 285).

Projects that have been saved as blueprints can be accessed when choosing a blueprint. Quill defaults to including all shared projects, but you can filter blueprints based on what elements they include (Outline, Ontology, Data Sources) (see FIG. 286).

A11: Terminology

The following provides a glossary for various terms used in connection with describing the example embodiment of Appendix A.

An Organization is a collection of Projects managed by an Administrator. Members of an Organization have access to those Projects within it that they have permissions for. Outlines are collections of building blocks that define an overall Story.

Communication Goals provide a bridge between analysis of data and the production of concepts expressed as text.

Narrative Analytics generate the information needed by Communication Goals to generate stories.

Projects are where stories are configured. A Project includes Authoring, the Data Manager, and Admin.

Project Blueprints are templates comprised of an Outline, specific story sections, and collections of Communication Goals.

An Ontology is a collection of Entity Types and Attributes, along with their expressions, that powers how Quill expresses your story.

An Entity Type is any primary "object" which has particular Attributes. An example is that a Sales Person (entity) has Sales (attribute). Relationships provide context for entities within a story.

Every Entity Type has a Base Entity Type that identifies to Quill whether it is a Person, Place, Thing, or Event.

Computed Values are a way of reducing a list of values into a representative value. The currently available aggregations are count, maximum, mean, median, minimum, and total, and the currently available function is contribution.

Characterizations are editorial judgments based on thresholds that determine the language used in communication goals when certain conditions are met.

Expressions are the various words Quill uses to express a particular concept generated by the combination of executing Narrative Analytics and Story Elements.

A Timeframe is a unit of time used as a parameter to constrain the values included in the expression of a Communication Goal or story.

Variability is variation in the language of a story. Variability is provided through having multiple Entity and Characterization expressions as well as option into additional sentence expressions through Language Guidance.

Authoring includes the Outline, Data Requirements, and Live Story. This is where you configure Communication Goals, map Entity Types and Attributes to values in the data, and review generated stories.

Data Requirements are how a user tells Quill the method by which we will satisfy a Communication Goal's data requirements. These are what a Narrative Analytic and Communication Goal need to be able to express a concept. These are satisfied either directly by configuration of the data requirements or through the execution of Narrative Analytics.

A Story Variable is the focus of a story supplied at runtime as a value from a data source (as opposed to a static value).

A Draft is an editable version of the story in a Project. Project Administrators and Editors have the ability to make changes to Drafts. Project Administrators can publish Drafts and create new ones.

The Data Manager is the part of the Project where Data Views and Data Sources backing the story are managed. This is where files are uploaded and database connections are added.

A Data View is a used by Quill to map the Outline's information needs against Data Sources. A Project can be backed by multiple Data Views that are mapped using Identifiers in the schemas.

A Data Source is a file or table in a database used to support the Narrative Analytics and generation of a story.

Admin allows you to manage all aspects of story generation other than language and data. This is where Monitoring, the Change Log, API Documentation, Project Settings, and Scheduling are located.

A12: Communication Goal Families

The example embodiment of Appendix A supports three communication goal families: Present, Callout, and Compare.

Present

The Present goal family is used to express an attribute of a particular entity or group of entities.

Most Present goal statements have the form "Present the attribute (or computed value) of the specified entity/group." For example:
- Present the price of the car.
- Present the price of the highest ranked by reviews item.
- Present the average value of the deals made by the salesperson.

The two exceptions to this form are when the Count or Contribution computed values are used, in which case the statements look like this:
- Present the count of the group.
  - E.g. Present the count of the franchises in the region.
- Present the attribute contribution of the entity to the parent entity.
  - E.g. Present the point contribution of the player to the team.

Callout

The Callout goal family is used to identify the entity or group of entities that has some editorially-interesting position, role, or characteristics. E.g. the highest ranked salesperson, franchises with more than $1 k in daily sales, players on the winning team, etc. Every Callout goal statement has the same structure: "Callout the specified entity/group." For example:
- Callout the highest ranked by sales salesperson.
- Call out the franchises with more than 1,000 in daily sales.
- Callout the players on the winning team.

Compare

The Compare goal is used to compare the values of two attributes on the same entity. Every Compare goal has the same structure: Compare the first attribute of the specified entity to the second attribute. For example:
- Compare the sales of the salesperson to the benchmark.
- Compare the final value of the deal to the expected value.
- Compare the revenue of the business to the expenses.

A13: Miscellaneous

A13(i): Charts

Quill is able to express certain configured goals as Charts, such as Bar and Line. These have default styling and colors and are guided by the Communication Goal's Narrative Analytics. Charts are supported in each available output format.

A13(ii): Supported Document Structures

Generally, Quill supports documents that are homogenous (uniformly structured) with stable keys. Example permutations of supported structures are described below.

A13(ii)(a): Single Document

In this example, as long as all documents contain the same keys (in this case, "a", "b", and "c") Quill can use this data structure.

```
{
    "a": 1,
    "b": 2,
    "c": 3
}
```

A13(ii)(b): Nested Documents

Documents with other documents nested within them are supported, though the nested documents must be homogenous with stable keys across documents.

A First Example is:

```
{
    "a": {
        "aa": 1,
        "ab": 2
    },
    "b": {
        "ba": 3,
        "bb": 4
    }
}
```

A Second Example is:

```
[
    {
        "a": 1,
        "b": [
            {
                "ba": 11,
                "bb":12
            },
            {
                "ba": 20,
                "bb": 44
            }
        ]
    }
]
```

A13(ii)(c): Unsupported Structures

The example embodiment of Appendix A does not support heterogeneous documents (non-uniform) or documents where values are used as keys.

```
{
    "1/1/1900": "45",
    "1/2/1900": "99",
    "1/3/1900": "300"
}
```

A13(iii): Styling Rules

Oxford Commas

Quill does not use Oxford commas. So it writes like "Mary spoke with Tom, Dick and Harry" and not like "Mary spoke with Tom, Dick, and Harry."

Spaces Between Sentences

Quill puts one space between sentences.

Dates

Year: Datetimes that are just years are expressed numerically.
2016→"2016"
1900→"1900"
Month and Year: Datetimes that are just months and years have written out months and numeric years.
2016-03→"March 2016"
2015-11→"November 2015"
Day, Month, and Year: Datetimes that are full dates are written out months with numeric days and years.
2016-03-25→"Mar. 25, 2016"
2015-11-05→"Nov. 5, 2015"

Percents

Percents are rounded to two places, trailing zeros are removed, and a "%" is appended.
53.2593→"53.26%"
53.003→"53%"

Ordinals

Ordinals are written with numerical contractions.
1→"1st"
2→"2nd"
3→"3rd"
556→"556th"

Decimals

Decimals are written out with decimal parts and commas inserted.
1.1→"1.1"
1.9→"1.9"
123456789→"123,456,789"

Currencies

Currencies are currently assumed to be USD. In the future, they can be locale-specific (e.g. Euros). They're styled differently based on how big they are.
Less than One Thousand
Rounds to two decimal places. There are always two decimal places.
3→"$3.00"
399.9999→"$400.00"
Less than Ten Thousand
Rounds to an integer.
5000.123→"$5,000"
4171→"$4,171"
Less than One Million
Rounds to thousands with zero decimal places, appends a "K"
500,000→"500K"
123,456.789→"123K"
Less than One Billion
Rounds to millions with one decimal place if necessary, appends an "M"
500,000,000→"500 M"
500,100,000.12→"500.1 M"
Less than One Trillion
Rounds to billions with two decimal places if necessary, appends an "M"
500,000,000,000→"500B"
500,100,000,000.12→"500.1B"
500,130,000,000.12→"500.13B"

Supported Datetime Formats

The following datetime formats are supported in Quill.
01/31/15
01/31/2015
31 Jan. 2015
Jan. 31, 2015
Tuesday, Jan. 31, 2015
Tuesday, Jan. 31, 2015, 01:30 AM
2015-01-31T01:30:00-0600
20150131
2015-01-31 13:30:00
01-31-2015 01:30:45
31-01-2015 01:30:45
1/31/2015 1:30:45
01/31/2015 01:30:45 AM
31/01/2015 01:30:45
2015/01/31 01:30:45

A13(iv): Using Multiple Data Views

Users can satisfy their outline's data requirements using multiple data views. While it may often be more straightforward to create a de-normalized view in the source database, the following use cases are supported. These apply to both tabular and document-based data sources.

Single Entity Type, Attribute Lookup by Entity ID

Quill can return the Gender from Data View 2 associated with the Sales Person's ID in Data View 1 using the Sales Person ID.

| Data View 1 | |
|---|---|
| Sales Person ID | Sales Person Name |
| 123 | Aaron Young |
| 456 | Daisy Bailey |

| Data View 2 | |
|---|---|
| Sales Person ID | Gender |
| 123 | Male |
| 456 | Female |

Two Entity Types

Quill can match the Transactions in Data View 2 to the Sales People in Data View 1 by Sales Person ID.

| Data View 1 | |
|---|---|
| Sales Person ID | Sales Person Name |
| 123 | Aaron Young |
| 456 | Daisy Bailey |

| Data View 2 | | |
|---|---|---|
| Transaction ID | Amount | Sales Person ID |
| 777 | $100.00 | 123 |
| 888 | $ 70.00 | 456 |
| 999 | $ 20.00 | 123 |

A13(v): Permission Structure

| Quill Access | | | | |
|---|---|---|---|---|
| Role | Create Organizations | Create Users | API Token | Create Projects |
| Site Administrator | X | X | X | X |
| Organization Administrator | | X | X | X |
| Organization Member | | | X | X |

| Project Access | | | | | |
|---|---|---|---|---|---|
| Role | Add Users | Edit Story | Live Story: Edit Mode | Create and Publish Drafts | Live Story: Review Mode |
| Administrator | X | X | X | X | X |
| Editor | | X | X | | X |
| Reviewer | | | | | X |

What is claimed is:

1. An artificial intelligence system for generating a natural language narrative from structured data, the system comprising:
a memory configured to store a plurality of narrative analytics and an ontology;
a communication interface configured to receive a natural language statement identifying a communication goal to be achieved by the natural language narrative;
a processor configured to:
process the natural language statement by mapping the natural language statement to one or more base communication goal statements including one or more ontological objects included in the ontology;
map the one or more base communication goal statements to (i) a subset of the narrative analytics and (ii) a plurality of data requirements for the narrative analytics within the subset of the narrative analytics;
map the data requirements to data within the structured data;
execute the subset of narrative analytics on the mapped data within the structured data to determine a plurality of content items for inclusion in the natural language narrative; and
perform natural language generation (NLG) on the determined content items to generate the natural language narrative expressing the determined content items in a manner that satisfies the communication goal.

2. The system of claim 1 wherein the narrative analytics comprise parameterized computer code that performs analytical operations on the structured data in order to facilitate a determination as to what content is to be included in the natural language narrative so that the communication goal is satisfied.

3. The system of claim 2 wherein the parameterized code for the narrative analytics within the subset are configured for execution to determine the content using the mapped data within the structured data as parameters for the execution.

4. The system of claim 3 wherein the processor is further configured to receive the natural language statement as input from a user.

5. The system of claim 4 wherein the processor is arranged to perform its operations to generate the natural language narrative without requiring the user to directly author program code.

6. The system of claim 1 wherein the natural language statement comprises an operator expressed in natural language and at least one parameter expressed in natural language, and wherein the processor is further configured to (1) determine the mapped narrative analytics subset based at least in part on the operator, (2) map the at least one parameter to an ontological object within the ontology, and (3) determine the data requirements based at least in part on the mapped ontological object.

7. The system of claim 1 wherein at least one of the narrative analytics within the narrative analytics subset is configured to generate a characterization of the structured data in response to execution of the at least one narrative analytic, and wherein the natural language narrative expresses the characterization in natural language.

8. The system of claim 1 wherein the processor comprises a plurality of processors.

9. The system of claim 1 wherein the natural language statement comprises a plurality of parameters, and wherein the processor is further configured to (1) access an ontology, wherein the ontology comprises a plurality of ontological objects, (2) link one or more parameters from the natural language statement to one or more of the ontological objects of the accessed ontology, and (3) determine one or more of the data requirements based on the linked one or more ontological objects.

10. The system of claim 9 wherein the linked one or more ontological objects are linked with computational logic for computing a value of an attribute and/or characterization of the linked one or more ontological objects, wherein the determined one or more data requirements allow the processor to compute the value of the attribute and/or characterization, and wherein the narrative analytics include the computational logic.

11. The system of claim 1 wherein the data requirements comprises a first plurality of parameters, wherein the structured data comprises a plurality of data values associated with a second plurality of parameters, and wherein the processor is further configured to (1) access a data structure that associates a plurality of parameters among the first plurality of parameters with a plurality of parameters among the second plurality of parameters and (2) map the data requirements to data values within the structured data based on associations defined by the accessed data structure.

12. A computer program product for applying artificial intelligence to generate a natural language narrative from structured data, the computer program product comprising a plurality of instructions resident on a non-transitory computer-readable storage medium, wherein the instructions are executable by a processor to a cause the processor to:
  access a memory that is configured to store a plurality of narrative analytics and an ontology;
  receive via a communication interface a natural language statement identifying a communication goal to be achieved by the natural language narrative;
  process the natural language statement by mapping the natural language statement to one or more base communication goal statements including one or more ontological objects included in the ontology;
  map the one or more base communication goal statements to (i) a subset of the narrative analytics and (ii) a plurality of data requirements for the narrative analytics within the subset of the narrative analytics;
  map the data requirements to data within the structured data;
  execute the subset of narrative analytics on the mapped data within the structured data to determine a plurality of content items for inclusion in the natural language narrative; and
  perform natural language generation (NLG) on the determined content items to generate the natural language narrative expressing the determined content items in a manner that satisfies the communication goal.

13. A method of applying artificial intelligence to generate a natural language narrative from structured data, the method comprising:
  a processor accessing a memory in which a plurality of narrative analytics and an ontology are stored;
  a communication interface receiving a natural language statement identifying a communication goal to be achieved by the natural language narrative;
  the processor processing the natural language statement by mapping the natural language statement to one or more base communication goal statements including one or more ontological objects included in the ontology;
  the processor mapping the one or more base communication goal statements to (i) a subset of the narrative analytics and (ii) a plurality of data requirements for the narrative analytics within the subset of the narrative analytics;
  the processor mapping the data requirements to data within the structured data;
  the processor executing the subset of narrative analytics on the mapped data within the structured data to determine a plurality of content items for inclusion in the natural language narrative; and
  the processor performing natural language generation (NLG) on the determined content items to generate the natural language narrative expressing the determined content items in a manner that satisfies the communication goal.

14. The method of claim 13 wherein the narrative analytics comprise parameterized computer code that performs analytical operations on the structured data in order to facilitate a determination as to what content is to be included in the natural language narrative so that the communication goal is satisfied.

15. The method of claim 14 wherein the executing step comprises executing the parameterized code for the narrative analytics within the subset to determine the content using the mapped data within the structured data as parameters for the execution.

16. The method of claim 15 further comprising:
  the processor receiving the natural language statement as input from a user.

17. The method of claim 16 wherein the processor performs the method steps to generate the natural language narrative without requiring the user to directly author program code.

18. The method of claim 13 wherein the natural language statement comprises an operator expressed in natural language and at least one parameter expressed in natural language, and wherein the processing step further comprises the processor (1) determining the mapped narrative analytics subset based at least in part on the operator, (2) mapping the at least one parameter to an ontological object within the ontology, and (3) determining the data requirements based at least in part on the mapped ontological object.

19. The method of claim 13 wherein the executing of at least one of the narrative analytics within the narrative analytics subset generates a characterization of the structured data, and wherein the natural language narrative expresses the characterization in natural language.

20. The method of claim 13 wherein the processor comprises a plurality of processors.

* * * * *